(12) United States Patent
Greenblat et al.

(10) Patent No.: US 7,103,008 B2
(45) Date of Patent: Sep. 5, 2006

(54) COMMUNICATIONS SYSTEM USING RINGS ARCHITECTURE

(75) Inventors: Ilia Greenblat, Hod-Hasharon (IL); Moshe Refaeli, Hod-Hasharon (IL)

(73) Assignee: Conexant, Inc., Red Bank, NJ (US)

( * ) Notice: Subject to any disclaimer, the term of this patent is extended or adjusted under 35 U.S.C. 154(b) by 890 days.

(21) Appl. No.: 10/064,340

(22) Filed: Jul. 2, 2002

(65) Prior Publication Data

US 2003/0172257 A1 Sep. 11, 2003

Related U.S. Application Data

(60) Provisional application No. 60/347,235, filed on Jan. 14, 2002, provisional application No. 60/333,516, filed on Nov. 28, 2001, provisional application No. 60/301,843, filed on Jul. 2, 2001.

(51) Int. Cl.
*H04L 12/28* (2006.01)

(52) U.S. Cl. .................................. 370/258; 370/229

(58) Field of Classification Search ............... 370/258, 370/229
See application file for complete search history.

(56) References Cited

U.S. PATENT DOCUMENTS

| | | | |
|---|---|---|---|
| 4,672,607 A | 6/1987 | Nakayashiki et al. | |
| 4,760,571 A | 7/1988 | Schwarz | |
| 4,933,938 A | 6/1990 | Sheehy | |
| 5,229,993 A | 7/1993 | Foudriat et al. | |
| 5,341,369 A | 8/1994 | Langer | |
| 5,485,578 A | 1/1996 | Sweazey | |
| 5,594,728 A | 1/1997 | Hershey et al. | |
| 6,049,824 A | 4/2000 | Simonin | |
| 6,069,514 A | 5/2000 | Fairbanks | |
| 6,111,859 A | 8/2000 | Godfrey et al. | |
| 6,151,654 A * | 11/2000 | Poisner et al. ............... | 710/240 |
| 6,222,409 B1 | 4/2001 | Kieda et al. | |
| 6,252,264 B1 | 6/2001 | Bailey et al. | |
| 6,309,915 B1 | 10/2001 | Distefano | |
| 6,311,212 B1 | 10/2001 | Chong et al. | |
| 6,339,788 B1 | 1/2002 | Geyer et al. | |
| 6,429,536 B1 | 8/2002 | Liu et al. | |
| 6,437,618 B1 | 8/2002 | Lee | |
| 6,452,931 B1 | 9/2002 | Norman, Jr. | |
| 6,456,407 B1 | 9/2002 | Tammela et al. | |
| 6,463,033 B1 | 10/2002 | Harshavardhana | |
| 6,463,497 B1 | 10/2002 | Arimilli et al. | |
| 6,820,142 B1 * | 11/2004 | Hofstee et al. ............... | 710/25 |

* cited by examiner

*Primary Examiner*—Derrick Ferris
(74) *Attorney, Agent, or Firm*—Hunton & Williams LLP

(57) ABSTRACT

Systems and methods are provided for implementing: a rings architecture for communications and data handling systems; an enumeration process for automatically configuring the ring topology; automatic routing of messages through bridges; extending a ring topology to external devices; write-ahead functionality to promote efficiency; wait-till-reset operation resumption; in-vivo scan through rings topology; staggered clocking arrangement; and stray message detection and eradication. Other inventive elements conveyed include: an architectural overview of a packet processor; a programming model for a packet processor; an instruction pipeline for a packet processor; and use of a packet processor as a module on a rings-based architecture. Additional inventive elements conveyed include: an architectural overview of a communications processor; a data path protocol support model for a communications processor; an exemplary network processor employed as the core packet processor for the communications processor; an exemplary rings-based SOC switch fabric architecture; and a variety of quality of support features.

15 Claims, 64 Drawing Sheets

FIG. 41

R1 register

```
3 3 2 2 2 2 2 2 2 2 2 2 1 1 1 1 1 1 1 1 1 1 9 8 7 6 5 4 3 2 1 0
1 0 9 8 7 6 5 4 3 2 1 0 9 8 7 6 5 4 3 2 1 0
```

| | mb | | c | eq | lt | gt | s | s - sticky bit
eq - equal/zero
lt - less then/negative
gt - greater then/positive
c - carry
mb - reflection of the RAM mult-reader busy indication

REFETCH SPR (spr index - 0) | NEXT_REFETCH | REFETCH  ↖440

TASK SPR (spr index - 1) | DOOR BELL REQ | | COUNT | | UR | MASK | NTV | NTID | CTID  ↖442

TRAP SPR (spr index - 2) | ... | YB | TB | DAAB | PAB | TRAP | DL  ↖444

MINDEX SPR (spr index - 3) | | INDEX2 | | INDEX1  ↖446

COMMUNICATIONS SYSTEM USING RINGS ARCHITECTURE

CROSS REFERENCE TO RELATED APPLICATIONS

Priority is claimed based on U.S. Provisional Application No. 60/301,843 entitled Communication System Using Rings Architecture, filed Jul. 2, 2001, U.S. Provisional Application No. 60/333,516 entitled Flexible Packet Processor For Use in Communications System, filed Nov. 28, 2001, and U.S. Provisional Application No. 60/347,235 entitled High Performance Communications Processor Supporting Multiple Communications Applications, filed Jan. 14, 2002.

BACKGROUND OF THE INVENTION

The present invention relates generally to data communication networks and, more particularly, to receiving and transmitting systems, including ATM and other types of communications platforms and including such components as communications processors, packet processors, network processors, DMAs, FPGAs and other devices and peripheral devices.

The number of business and private home users of computers continues to rapidly grow, with these users typically being connected to local area networks (LANs), wide area networks (WANs), intranets, extranets, direct subscriber line (DSL) networks, etc. With growing demand from such users for increasingly large amounts of data across such networks, bandwidth and data processing and handling speed is an ever-present concern facing service and equipment providers to this vast audience of users. Hubs, routers, modems and switches have been the predominant mechanisms for providing the interconnectivity for many users to access networks. Switches made up of expensive VLSI (very large scale integration) circuits are often used to build out networks. In addition to the drawbacks presented by the expense of implementing such circuits, clock synchronization is of continuing concern in switched networks.

With the proliferation of the digital age, a significant demand has arisen for versatile networking technology capable of efficiently transmitting multiple types of information at high speeds across different network environments. One increasingly popular platform is Asynchronous Transfer Mode, commonly referred to as ATM, which was developed by the International Telegraph and Telephone Consultative Committee (CCITT), and its successor organization, the Telecommunications Standardization Sector of the International Telecommunication Union (ITU-T). ATM is a technology capable of high speed transfer of voice, video, and other types of data across public and private networks. Although widely implemented, ATM is just one example of many platforms used in handling communications and data across networks.

ATM utilizes very large-scale integration (VLSI) technology to segment data into individual packets (also referred to as cells). For example, B-ISDN calls for packets having a fixed size of fifty-three bytes (i.e., octets). Using the B-ISDN 53-byte packet for purposes of illustration, each ATM cell includes a header portion comprising the first five bytes and a payload portion comprising the remaining forty-eight bytes. ATM cells are routed across the various networks by passing though ATM switches, which read addressing information included in the cell header and deliver the cell to the destination referenced therein. Unlike other types of networking protocols, ATM does not rely upon Time Division Multiplexing (TDM) to establish the identification of each cell. Rather, ATM cells are identified solely based upon information contained within the cell header.

Further, ATM differs from systems based upon conventional network architectures such as Ethernet or Token Ring in that rather than broadcasting data packets on a shared wire for all network members to receive, ATM cells dictate the successive recipient of the cell through information contained within the cell header. A specific routing path through the network, called a virtual path (VP) or virtual circuit (VC), is set up between two end nodes before any data is transmitted. Cells identified with a particular virtual circuit are delivered to only those nodes on that virtual circuit. In this manner, only the destination identified in the cell header receives the transmitted cell.

The cell header includes, among other information, addressing information that essentially describes the source of the cell or where the cell is coming from and its assigned destination. Although ATM evolved from TDM concepts, cells from multiple sources are statistically multiplexed into a single transmission facility. Cells are identified by the contents of their headers rather than by their time position in the multiplexed stream. A single ATM transmission facility may carry hundreds of thousands of ATM cells per second originating from a multiplicity of sources and traveling to a multiplicity of destinations.

The backbone of an ATM network generally consists of switching devices capable of handling the high-speed ATM cell streams. The switching components of these devices, commonly referred to as the switch fabric, perform the switching function required to implement a virtual circuit by receiving ATM cells from an input port, analyzing the information in the header of the incoming cells in real-time, and routing them to the appropriate destination port. Millions of cells per second often need to be switched by a single device.

This connection-oriented scheme permits an ATM network to guarantee the minimum amount of bandwidth required by each connection. Such guarantees are made when the connection is set-up. When a connection is requested, an analysis of existing connections is performed to determine if enough total bandwidth remains within the network to service the new connection at its requested capacity. If the necessary bandwidth is not available, the connection is refused.

The design of conventional ATM switching systems involves a compromise between which operations should be performed in hardware and which in software. Generally, but not without exception, hardware gives optimal performance but reduces flexibility, while software allows greater flexibility and control over scheduling and buffering and makes it practical to have more sophisticated cell processing (e.g., OAM cell extraction, etc.).

The various protocols associated with platforms such as ATM, Ethernet and others are distinct and require special handling, which is essentially transparent to the user. One approach to packaging the hardware and software necessary to handle the protocol processing and general communications and data processing is system on a chip (SOC), which typically is made up of several modules, often dedicated to specific tasks, working together. A number of these modules typically are interfaces to the external environment, such as Ethernet or Utopia. Others modules can include processors or memories. To illustrate, FIG. 1 shows a typical SOC 10, such as a communications processor, having a variety of modules, such as CPUs 14, 22, RAM 16, Ethernet interface 18, i/o interface 20, and DMA 24, interconnected via a switch fabric 12.

The challenge currently faced by system designers is integrate the modules into a cohesive system. The usual approach is to define busses, connect the modules on the busses, run signals between the modules via the busses, add bridges to connect busses, and so on. Other challenges to designing a SOC, among others, include: heterogeneous peripheral devices; several active modules (CPU, DMA); performance bottlenecks; performance organization of connectivity and busses; customer reality changes over life of a project; design verification bottleneck, both intra-module and inter-module; and application verification. As demonstrated, these challenges result in a considerable number of mechanisms needing to be debugged during the design of a SOC.

Although the traditional bus oriented approach is extensively utilized, such an approach typically has the following problems: a number interfaces to debug for both timing and logic; architectural decisions typically need to be done early in design busses often create unpredictable timing and loadings; changing anything, like adding peripheral or deleting CPU requires considerable revamping of the system; and so on.

A communications processor is one example of a communications system commonly designed using the traditional buss approach. A robust SOC communications processor may find a myriad of applications, such as for modems, bridges, routers, gateways, multi-service gateways and access equipment, and so forth. Such a communications processor may be PHY [Physical layer]-independent, in which case it will be coupled with an appropriate PHY product, or it may by PHY-integrated, in order to provide the connectivity to the PHY layer of the ATM (or OSI [Opens Systems Interconnection]) layered protocol model. It can be readily appreciated that if such a SOC communications processor is to be robust in terms of the applications it can support, it must be able to process a wide variety of different protocols, such as ATM, FR (Frame Relay), IP (Internet Protocol), TDM, and so forth. Therefore, in such a SOC communications processor, a packet processor for processing the packets of information that may be of a variety of protocols may be implemented.

The processing of packets or cells performed by the packet processor may include the following tasks: packet header analysis (OSI Layer2, Layer3); frame validity—CRC (Cyclic Redundancy Code) check; forwarding decision—look up; header modification/conversion; segmentation and reassembly; data conversion (e.g., encryption); statistics gathering; and so on. In fact, as bandwidth requirements go up, and the demand for wire speed packet processing exists, packet processors have to be optimized to solve packet processing specific tasks. Proposed solutions for packet processing that exist today range from hard wired ASICs (Application Specific Integrated Circuits) (typically inflexible) to programmable packet processors (more flexible).

In the last few years, there has been a need for programmable packet processors for communication systems. The major advantages to programmable solutions can include: flexible adjustment for rapidly changing communication standards; implementation of increasingly complex communications difficult to implement in an ASIC; and consideration to differentiation and Time To Market (TTM) as a crucial aspect in today competitive environment.

From the system vendor's vantage, programmable packet processors generally have an advantage over ASIC solutions. A programmable packet processor can be viewed as a platform to be quickly deployed (in consideration of TTM) and then later one can add/modify system functionality by changing/adding code to the packet processor. The trade-off system vendors would have at the very high end solutions (core rate OC [Optical Carrier]-48, OC-192, for example) would be power and performance in programmable packet processors as compared to fixed ASIC solutions. However, several companies have announced programmable solutions for such core rates, indicating that a programmable solution is needed by vendors for such core rate products.

A programmable packet processor (also referred to as a network processor) would preferably provide a solution in the access space where the expected aggregate bandwidth is in the range of OC-3 to OC-12. Of course, the access market requirements are different from the network edge, and the core. At the access points, systems would need to deal with lots of subscribers (ports), low speed links (T1, xDSL [x Digital Subscriber Line]) and with different access methods (ATM, IP, FR, TDM, etc.), whereas at the edge and the core of the network generally would use one framing solution (MPLS, IP or ATM). Access systems, in this case, typically would be characterized by: a large number of subscribers (ports, flows), high density; requirements for Inter Working Functions (IWFs), such as voice (TDM) to packets (ATM or IP) (e.g., Voice gateways), MAN (Metropolitan Area Network) to WAN (Wide Area Network), Ethernet to ATM or PoS [Packet Over SONET]; data grooms—asymmetric behavior large pipe to many small pipes; and the like. Accordingly, access systems need lots of packet manipulation, especially on media conversions and IWF. Therefore, a programmable (and therefore flexible) packet processor often is a preferred solution.

Such a programmable packet processor could be developed using a standard general purpose microprocessor core. Several processor cores are commercially available, including those that are licensed by Advanced RISC Machines, Ltd., ARC International, MIPS Computer Systems, Inc., and Lexra, Inc. However, the above cores are general purpose cores that would need to be optimized for packet processing. Such optimization typically would include: additional instructions; DMA support; task switch with low overhead; specific bit manipulation instructions; etc. The disadvantages of using such general purpose cores in packet processing applications include: costs incurred from license fee and royalties; limited customization—a special license is usually required to modify the core; create dependency on the core provider roadmap and technical support; over featured—FPU (Floating Point Units), MMU (Memory Management Units]; etc.

Therefore, there is a need for a highly robust programmable packet processor that can support a variety of high end applications, that is capable of handling a variety of protocols, and that provides desired performance in terms of speed and power.

What is also needed is a high performance communications processor implementing such a programmable packet processor as its core network processor (s), and implementing other useful modules, such as memories, DMAs, and interfaces to outside PHY platforms, so that the high performance communications processor can be beneficially implemented as a SOC solution for a myriad of high end communication applications.

SUMMARY OF THE INVENTION

The present invention overcomes the problems noted above, and realizes additional advantages, by providing a number of advantages over prior systems.

The following description is intended to convey a thorough understanding of the inventive aspects by providing a number of specific embodiments and details including, among other things: rings architecture for communications and data handling systems, Enumeration process for automatically configuring the ring topology, automatic routing of messages through bridges, automatic routing of exception messages, extending a ring topology to external devices and providing a flexible and re-configurable system, read return address, write-ahead functionality to promote efficiency, wait-till-reset operation resumption, in-vivo scan through rings topology, staggered clocking arrangement, and stray message detection and eradication.

Other inventive elements conveyed through the embodiments and details discussed below include, among other things: an architectural overview of a flexible packet processor; a programming model for a flexible packet processor; an instruction pipeline for a flexible packet processor; an internal memory to be used with the flexible packet processor; the use of a flexible packet processor as a module on a rings-based architecture; the core of the flexible packet processor and associated compounds (agents and non-agents) on the packet processor.

Additional inventive elements conveyed through the embodiments and details discussed below include, among other things: an architectural overview of a communications processor; a programming model for a communications processor; a data path protocol support model for a communications processor; an exemplary network processor employed as the core packet processor for the communications processor; an exemplary rings-based SOC interconnect fabric architecture employed in the communications processor; a variety of quality of support (QOS) features that implemented in the communications processor; a series of beneficial applications of the communications processor; the various approaches for the software that can be implemented to power the communications processor; specific exemplary strategies for the software in the high performance communications processor; and a performance estimate for RFC 1483 bridging.

BRIEF DESCRIPTION OF THE DRAWINGS

The present invention can be understood more completely by reading the following Detailed Description of the Invention, in conjunction with the accompanying drawings in which:

FIG. 26 is a schematic diagram illustrating exemplary interface signals between two members of a ring network in accordance with at least one embodiment of the present invention.

FIGS. 27 and 28 are schematic diagrams illustrating an exemplary implementation of a ring interface in accordance with at least one embodiment of the present invention.

FIG. 29 is a flow diagram illustrating an exemplary process for determining an intended recipient of a message in a ring network in accordance with at least one embodiment of the present invention.

FIGS. 30–33 are schematic diagrams illustrating exemplary signaling within a ring interface in a ring network in accordance with at least one embodiment of the present invention.

FIG. 34 is a schematic diagram illustrating an exemplary use of bridges in a ring network to minimize latency in accordance with at least one embodiment of the present invention.

FIG. 35 is a schematic diagram illustrating an external ring interface in accordance with at least one embodiment of the present invention.

FIG. 41 is a block diagram illustrating an exemplary implementation of register r1 of a general purpose register of a network processor in accordance with at least one embodiment of the present invention.

FIG. 42 is a block diagram illustrating various registers of a general purpose register of a network processor in accordance with at least one embodiment of the present invention.

DETAILED DESCRIPTION OF THE INVENTION

The following description is intended to convey a thorough understanding of the inventive aspects by providing a number of specific embodiments and details including, among other things: rings architecture for communications and data handling systems, Enumeration process for automatically configuring the ring topology, automatic routing of messages through bridges, automatic routing of exception messages, extending a ring topology to external devices and providing a flexible and re-configurable system, read return address, write-ahead functionality to promote efficiency, wait-till-reset operation resumption, in-vivo scan through rings topology, staggered clocking arrangement, and stray message detection and eradication.

Other inventive elements conveyed through the embodiments and details discussed below include, among other things: an architectural overview of a flexible packet processor; a programming model for a flexible packet processor; an instruction pipeline for a flexible packet processor; an internal memory to be used with the flexible packet processor; the use of a flexible packet processor as a module on a rings-based architecture; the core of the flexible packet processor and associated compounds (agents and non-agents) on the packet processor.

Additional inventive elements conveyed through the embodiments and details discussed below include, among other things: an architectural overview of a communications processor; a programming model for a communications processor; a data path protocol support model for a communications processor; an exemplary network processor employed as the core packet processor for the communications processor; an exemplary rings-based SOC interconnect fabric architecture employed in the communications processor; a variety of quality of support (QOS) features that implemented in the communications processor; a series of beneficial applications of the communications processor; the various approaches for the software that can be implemented to power the communications processor; specific exemplary strategies for the software in the high performance communications processor; and a performance estimate for RFC 1483 bridging.

It is understood, however, that the invention is not limited to the specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

A number of acronyms are used herein to describe various embodiments of the invention. A table of acronyms and definitions therefore is provided as Table 1 below:

TABLE 1

Figure 8:
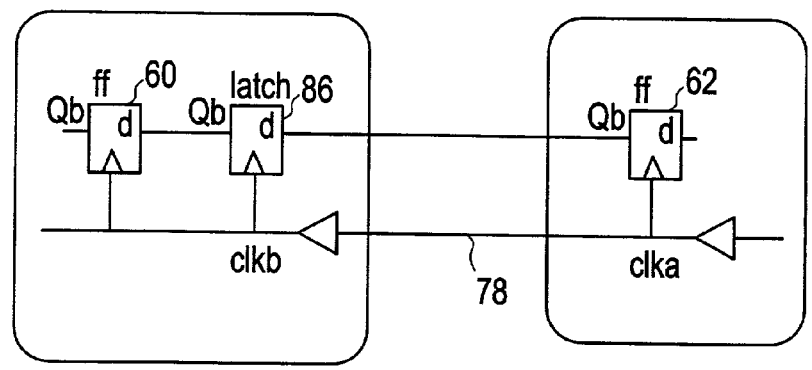

| Acronym | Definition |
| --- | --- |
| AAL | ATM Adaptation Layer |
| ABI | Application Binary Interface |
| ABR | Available Bit Rate |
| ADPCM | Adaptive Differential Pulse Code Modulation |
| ADSL | Asymmetric Digital Subscriber Line |
| ALU | Arithmetic Logic Unit |
| API | Application Programming Interface |
| ARC | ARC Cores |
| ARM | Advanced RISC Machines |
| ARP | Address Resolution Protocol |
| ASIC | Application Specific Integrated Circuit |
| ATIC | ATM Interconnect |
| ATM | Asynchronous Transfer Mode |
| ATMOS | ATM Operating System |
| BGP | Border Gateway Protocol (see FIG. 8) |
| B-ISDN | Broadband Integrated Services Digital Network |
| BLES | Broadband Local Exchange Server |
| BSC | Binary Synchronous Communications protocol (IBM) |
| BSP | Board Support Package |
| BTS | Base Transceiver Station |
| CAM | Content Addressable Memory |
| CBR | Constant Bit Rate |
| CCITT | Consultative Committee on International Telegraph and Telephone |
| CES | Circuit Emulation Services |
| CLEC | Competitive Local Exchange Carrier |
| CMTS | Cable Modem Transmission System |
| CPCS | Common Part Convergence Sublayer (ATM) |
| CPE | Customer Premises Equipment |
| CPP | Control Protocol Processor |
| CPU | Central Processor Unit |
| CRC | Cyclic Redundancy Code |
| CR-LDP | CR-Label Distribution Protocol |
| CS | Convergence Sublayer |
| CTL | Control |
| DDR | Dual Data Rate |
| DLC | Digital Loop Carrier |
| DMA | Direct Memory Access |
| DRR | Data Recovery Report |
| DS | Differentiated Services |
| DSL | Digital Subscriber Line |
| DSLAM | Digital Subscriber Line Access Multiplexer |
| DSP | Digital Signal Processor |
| EA | Effective Address |
| E-IAD | Enterprise Integrated Access Device |
| ENET | Ethernet |
| EPB | External Peripheral Bus |
| EPD | Early Packet Discard |
| EPROM | Erasable Programmable Read Only Memory |
| FIFO | First-In-First-Out |
| FPGA | Field Programmable Gate Array |
| FPU | Floating Point Units |
| FR | Frame Relay |
| FRF | Frame Relay Forum |
| FWD | Forwarding |
| GFR | Guaranteed Frame Rate |
| GPIO | General Purpose Input Output |
| HDLC | High-level data link control |
| HDSL | High-bit-rate DSL |
| H-MVIP | H Multi-Vendor Integration Protocol |
| HPCP | High Performance Communications Processor |
| HW | Hardware |
| IAD | Integrated Access Device |
| ID | Identification |
| I/f | Interface |
| IMA | Inverse Multiplexing over ATM |
| IP | Internet Protocol |
| IPoA | IP over ATM |
| IS | Integrated Services |
| ISOS | Integrated Software on Silicon |
| ISP | Internet Service Provider |
| ITU-T | International Telecommunication Union |
| IWF | Inter Working Function |
| LAN | Local Area Networks |
| LD | Load |
| LP | Low Priority |
| LPM | Longest Prefix Match |

TABLE 1-continued

| Acronym | Definition |
| --- | --- |
| LSR | Label Switched Router |
| MAC | Media Access Control |
| MAN | Metropolitan Area Network |
| MDU | Multi Dwelling Unit |
| MEGACO | H.242 IEEE (voice protocol) |
| MFSU | Multi Function Serial Unit |
| MGCP | IETS standard (voice Protocol) |
| MIB | Management Information Base |
| MII | Media Independent Interface |
| MIPS | MIPS Computer Systems, Inc. |
| MMU | Memory Management Unit |
| MPLS | Multi Protocol Label Switching |
| MSC | Mobile Switching Center |
| MTU | Multi Tenant Unit |
| MVIP | Communication backplane interface |
| NI | Network Interface |
| NP | Network Processor |
| OAM | Operation and Maintenance |
| OC | Optical Carrier |
| OEM | Original Equipment Manufacturer |
| OS | Operating System |
| OSE | A name of OS company |
| OSI | Opens Systems Interface |
| OSPF | Open Shortest Path First |
| PBGA | Plastic Ball Grid Array |
| PBX | Private Branch Exchange |
| PCM | Pulse Code Modulation |
| PDU | Payload Data Unit |
| PHY | Physical layer |
| POS | Packet Over SONET |
| PP | Protocol Processor |
| PPD | Parallel Presence Detect |
| PPPoA | Point to Point Protocol Over ATM |
| PSOS | Portable Scalable Operating System |
| PSTN | Public Switched Telephone Network |
| QOS | Quality of Service |
| RAM | Random Access Memory |
| RED | Random Early Delete |
| RFC | Request for Comment |
| RIP | Routing Information Protocol |
| RISC | Reduced Instruction Set Computer |
| RMII | Reduced MII |
| RSVP | Resource Reservation Protocol |
| RTOS | Real-Time Operating System |
| RTP | Real Time Protocol |
| RX | Receive |
| SAR | Segmentation and Reassembly |
| SDRAM | Synchronous Dynamic RAM |
| SDSL | Symmetric DSL |
| SHDSL | Single-Line High-Bit Rate DSL |
| SIP | SMDS Interface Protocol |
| SMII | Serial Media Independent Interface |
| SMTP | Simple Mail Transfer Protocol |
| SNMP | Simple Network Management Protocol |
| SOC | System-On-A-Chip |
| SP | Strict Priority |
| SPI | Serial Protocol Interface |
| SPR | Special Purpose Register |
| SRAM | Static RAM |
| SSI | Synchronous Serial Interface |
| SSSAR | Service Specific SAR |
| ST-BUS | a TDM protocol |
| SW | Software |
| TCP | Transmission Control Protocol |
| TDM | Time Division Multiplexing |
| TM | Traffic Management |
| TOS | Type of Service |
| TTM | Time-to-Market |
| TX | Transmit |
| UART | Universal Asynchronous Receiver-Transmitter |
| UBR | Unspecified Bit Rate |
| UDP | Universal Datagram Protocol |
| UPnP | Universal Plug 'n Play |
| USB | Universal Serial Bus |
| VBR | Variable Bit Rate |
| rt-VBR | Real Time VBR |
| VC | Virtual Circuit |

TABLE 1-continued

| Acronym | Definition |
| --- | --- |
| VCI | Virtual Channel Identifier |
| VCL | Virtual Channel Link |
| VoATM | Voice over ATM |
| VoIP | Voice over IP |
| VP | Virtual Path |
| VPI | Virtual Path Identifier |
| VLSI | Very Large Scale Integration |
| WAN | Wide Area Networks |
| WBS | Wireless Base Station |
| WFQ | Waited Fair Queue |

One inventive aspect of the present invention is to provide a rings architecture to build a system on a chip (SOC) and allow for ease in configuration, expandability and external interface. This rings architecture, in one embodiment, involves: (1) the use of transactions instead of signals; and (2) the use of a single switch fabric to carry the transactions instead of many connections as typically implemented in buss-based systems. A transaction, in at least one embodiment, includes a instruction generated by a certain module for directing, in a structured way, another module to perform some operation. Transactions are mapped onto single physical connection. A transaction may direct a module to, for example, set a set mode flipflop to one or clear register X or add value Y to counter Z. Transactions also can be used to provide time sequencing. Furthermore, two transactions may be prevented from occurring at the same time, limiting the appearance of simultaneous errors (i.e. bugs).In one embodiment of the present invention, a rings-based system on a chip (SOC) is provided. The rings-based SOC comprises a plurality of ring members on a ring that communicate using point-to-point connectivity, a plurality of ring interfaces for interfacing the ring members with the ring, a message traversing the ring, wherein the message travels one ring member per clock cycle. In this embodiment, the system is adapted so that upon the message arriving at a given ring member the message is processed by that ring member if the message is applicable to that ring member, and if the message is not applicable to that ring member, the message is passed on to the next ring member. Furthermore, subsequent ring members can be adapted to supply backpressure signals to prior ring members.

In one embodiment, the message is applicable to the given ring member based on at least one of an identifier identifying the given ring member and an identifier indicating that the message applies to multiple ring members. The identifier identifying the given ring member can comprise an address for the given ring member. Furthermore, the identifier indicating that the message applies to multiple ring members may, in one implementation, comprise message data designating the message as a supervisory message.

The message may comprise a type field, an address field, and a data field. The message may also comprise an enumberation message, wherein the enumeration message is processed by the ring members in order to assign address space consumed by each ring member. Additionally, a subsequent supervisory message can cause the results of the enumeration message to be returned, thereby allowing a central member comprising a CPU to infer the topology of the system. Alternatively, the message can comprise a reset message that is processed by the plurality of ring members in order to reset the system. Conversely, the message may comprise an activate message that is processed by the plurality of ring members in order to activate the system.

The message also may include a request from a CPU ring member that causes the other ring members to report out their address information. The message may also comprise a write message that is processed by one of the plurality of ring members to write data thereto, a read message that is processed by one of the plurality of ring messages to read data therefrom, and/or a stray message indicator so that the system can identify stray messages.

In one embodiment, the ring members of the rings based SOC comprise a CPU and a plurality of peripherals, and wherein the peripherals are adapted to write ahead changes in peripheral status, thereby reducing the quantity of read messages that are issued by the CPU. The ring of the SOC also may include an external ring interface allowing the ring to communicate with modules that are not part of the ring.

In one embodiment, the rings based SOC further comprises a land bridge that allows the message to proceed from one side of the ring to an other side of the ring without traversing some of the intermediate ring members. The logic of the land bridge may be configured based on the results of an enumeration message.

Additionally, the plurality of ring members and plurality of ring interfaces of the rings-based SOC may comprise a first ring with the SOC further comprising a plurality of second ring members and a plurality of second ring interfaces defining a second ring, both the first ring and the second ring implemented as a system on a chip, and wherein the first ring and the second ring are coupled using a sea bridge. In one implementation, the logic of the sea bridge is configured based on the results of an enumeration message.

Figure 1:
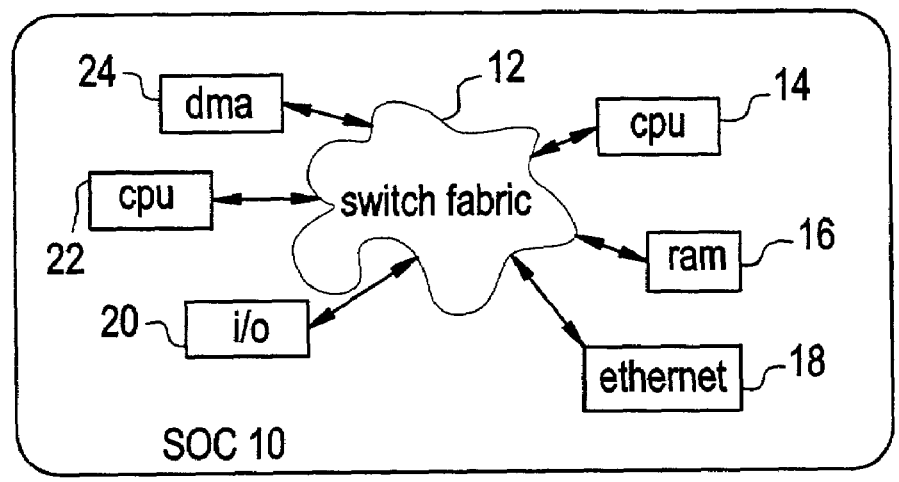
FIG. 1 is a block diagram illustrating a typical system on a chip.
Figure 2:
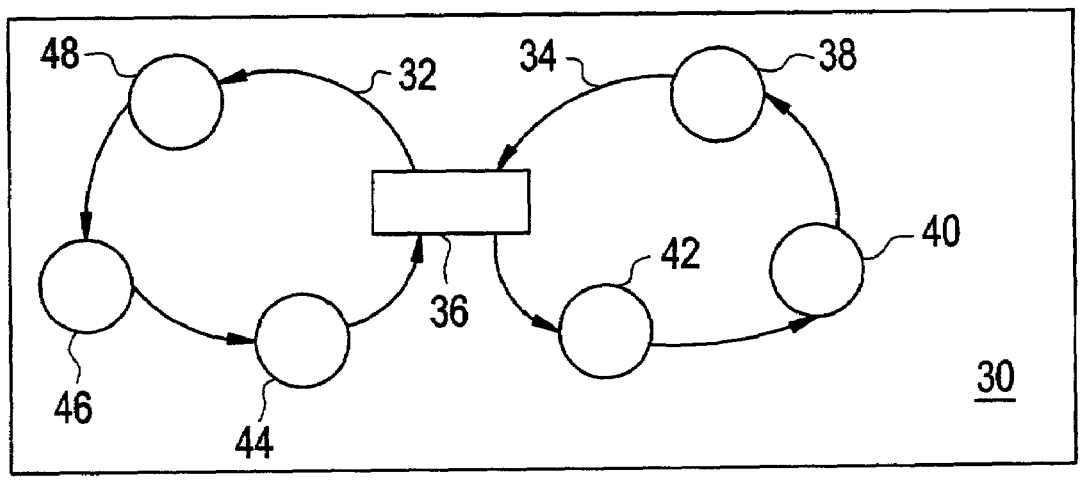
FIG. 2 is a schematic diagram illustrating a ring architecture in accordance with at least one embodiment of the present invention.

Referring now to FIG. 2, an exemplary ring network 30 is illustrated in accordance with at least one embodiment of the present invention. As illustrated, the exemplary ring network 30 includes two rings 32, 34 connected via a bridge 36, each ring including a plurality of modules 38–48. The modules can include any of a variety of modules implemented in SOCs for processing and/or handling data, such as a DMA, an external interface, a timer, a CPU, an I/O, a peripheral, and the like. In this case, the rings 32, 34 and the bridge 36 represent an implementation of the switch fabric 12 of FIG. 1 in accordance with at least one embodiment of the present invention. To summarize the operation of a ring of the ring network 30, consider the following exemplary operation of ring 32. In this example, messages are passed between modules counter-clockwise. When a module receives a message, the module determines if the message the intended recipient of the message. If the module is the recipient, the module removes the message from the ring and processes it accordingly. Otherwise, the module passes the message on to the next module (e.g., from module 44 to module 46) during the next clock cycle. If a module has a message to send, the module waits till there is a free slot and passes the message to the module's left hand neighbor. In this case, each message is one clock long and the messages travel around the ring 32, one hop per clock.

Members of the Ring

Anchor—the host interface. Through this interface, the host resets, configures and controls the setup functions of the ring. The Anchor also can be adapted to determine if it is the primary Anchor.

Bridge (e.g., bridge 36)—a combination of two devices: an upstream link and a downstream link. During the setup stage, the bridge flips the network ID and acts as an Anchor for upstream ring. The host, after the learning stage, programs the bridge about what switching to perform. The bridge snoops on the ring and if a hit detected, consumes the message and carries it on the other side. If the message is not hit, the it is sent down as usual. The bridge typically has two address/mask registers per link direction.

Module—a collective name for components of a ring, such as a CPU, a bridge, a TDM interface, a Utopia interface, an xDSL PHY, a timer, a UART, a FCC, a MCC, a scratch RAM, a CRC calculator, and the like.

External Ring (ExtRing)—used to connect several chips to create a larger topology. An external ring is particularly useful in prototyping future peripherals by FPGA-extending existing ring-based silicon.

Packet Processor (also referred to herein as Vobla)—a network optimized CPU for managing communication logical links. The packet processor, in at least one embodiment, is used to control and terminate streams that are beyond internal functionality of the device. The network side is done through the rings, the other side includes, for example, an external RAM interface.

The rings architecture has many advantages over traditional bus designs and is an effective way to connect many different modules, whether on the same chip or on several chips. Instead of using signals and busses, communication between modules (data and commands) are mapped onto transactions, which in turn are transmitted over ring infrastructure. Ring topology allows predictable delays and easy scalability. Each ring member adds delay of, for example, one clock. The ring clock frequency can be made as fast as needed because of geographical proximity of its members. Rings can be further connected through bridges, such as bridge 36. These bridges are similar to network switching devices in the sense that they are programmed to direct selected portions of the traffic to the other side (e.g., from ring 32 to ring 34). Inside one exemplary embodiment chip, the members of the ring are connected to one another using standard [e.g., 8 bits type/20 bits address/32–64 bit data] connection. When going outside the standard, a smaller/slower interface may be defined.

In the broadest sense, the ring carries two kinds of messages. Setup/Config messages and Work read and write messages. The Setup messages can be used to learn the network topology, assign addresses and to program the members (i.e., the elements of a ring). Setup messages are initiated by a host through a special anchor member. Regular members, in one embodiment, reply to setup messages by providing the host their functionality ID, ring ID and their starting address. The host software can infer from that data the exact topology of the network and the functionality of its members. Work messages, in one embodiment, are initiated by members based on their programming and functionality. On each clock a ring member examines its in-port. If the in-port has valid message, then the member determines if the message is addressed to the member. If so, the member removes the message from the ring and processes the message accordingly. If not (i.e., the message is intended for another member), on the next clock the member transmits it downstream on the out-port when the out-port becomes available.

The following are examples of message types that may be used:

Idle—the connection is idle, i.e., no message; Reset—reset and propagate to reset the entire network;

Enumerate—propagate and obey the Enumeration algorithm (described below);

WhoAmI request—started by the anchor member and flooded unchanged throughout the ring network;

WhoAmI response—each member responds to a WhoAmI request by sending this message—the data field contains values of self-address and several other significant bits that enable the Anchor to learn the topology of the network;

Activate—includes the address of a specific ring member. When this message hits the member, the a subset of the data bits are written into the RIF (ring interface) unit control register—the first bit is activate bit (hence the name). After reset this bit is inactive. This prevents any work activity of the peripheral to take place. Setting this bit to one, enables normal work. Other bits include: scan_mode_enable, stop_clock, in_vivo_scan_test, ring_loopback_enable, (soft reset), as well as other user-defined bits (discussed below). These bits may be reset to zero;

Work write—sent during normal operation. These messages activate various peripherals, fifos (first-in-first-out), write into memory, etc.;

Work read—work messages are used to read from fifos, move blocks of SRAM (static RAM) data and communicate with DMAs, to name a few examples.

Exception—started by regular ring members, to propagate to anchor (the assigned member that initiates the Enumeration process) and/or a PP (packet processor) to signify some condition needing attention;

Freeze—propagate message quickly through the network and disable all activity the rings. Typically used for debug purposes where a fast freeze of the current state is needed.

Message Type Encoding

Table 2 set forth a listing of message types with a proposed encoding structure and description of the encoding.

TABLE 2

| message type | encoding | description |
| --- | --- | --- |
| idle | 00000XXX | |
| supervisor requests | 1111nnnn | |
| | 11111000 | 0xF8 Enumerate. |
| | 11111001 | 0xF9 WhoAmI request. |
| | 11111010 | 0xFA Activate |
| | 11111011 | |
| | 11111100 | f0xFC freeze |
| | 11111101 | |
| | 11111110 | |
| supervisor responses | 11110nnn | |
| | 11110000 | 0xF0 WhoAmI response. |
| | 11110001 | 0xF1 error |
| work_read | 01SWMLFI | 0x40 |
| | | S = enable snoop for the response of this message. |
| | | W = width of the data message 64/32 for return |
| | | M = TBD |
| | | L = enable address modification to indicate last data of frame. |
| | | F = enable address modification to indicate first data of frame. |
| | | I = increment destination. |
| work_write | 10SMLZZZ | 0x80 |
| | | S = Snoop this message. |
| | | M = TBD. |
| | | L = Last data transfer in the message. |
| | | ZZZ = the number of valid bytes in the message. |
| | | (ZZZ = 000 means 8 valid bytes in the message). |

Ring Member Enumeration

While it is possible to pre-assign a hard addressing scheme for the members of a ring network, in at least one embodiment, the modules assign address space for themselves. As the modules are members of at least one ring, each module can take a block of address space and tell the next module its starting address (herein referred to as Enumeration). In many systems, this assignment often gives the same results, so it may not be necessary to actually reprogram the modules, but it reduces the need to change hardware registers every time ring configuration is changed. This self-addressing also serves as a self-test. In rings-based integrated circuit, such as a SOC communications processor, peripherals appear to a CPU as starting address. Each offset from this starting address is assigned to a different command for the peripheral. Note that assigning different peripherals to different CPUs can simply be a matter of programming a location in RAM. Accordingly, several CPU's can be put on a IC without worrying about arbitration.

As discussed above, each member of the ring network has predefined address space. In one embodiment, this is limited to some power of 2. For example, if a UART (Universal Asynchronous Receiver/Transmitter—used for serial communications and having a transmitter and a receiver) needs 5 registers, it allocates 8 addresses for itself. It also should first align the address to a border of 8.

Figure 3:
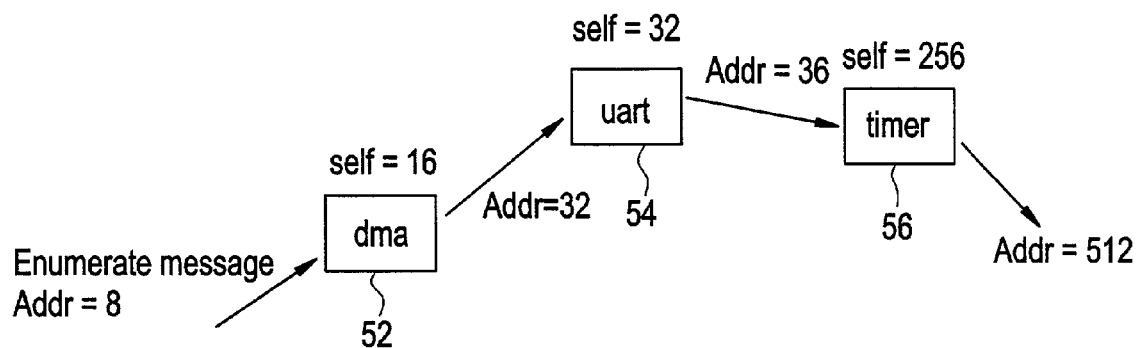
FIG. 3 is a flow diagram illustrating an exemplary enumeration process in accordance with at least one embodiment of the present invention.

The Enumeration process starts with the Anchor member, which sends on its out-port an Enum message to begin the enumeration of rings members. As each member receives the Enum message, the member takes the address field and increments it to fit its own alignment. This becomes the zero offset address. Then the address is incremented to next available block of the same alignment. This last address is sent downstream. Referring to FIG. 3, an exemplary enumeration process is illustrated in accordance with at least one embodiment of the present invention. In this example, assume that DMA 52 needs 16 addresses, UART 54 needs 4 addresses, and timer 56 needs 256 addresses. Further assume that the DMA 32 receives an Enum message having an address value=8. Accordingly, in this example, the DMA 52 would align itself to some power of two (16, in this example) and then claim the next 16 addresses (i.e., addresses 16–31). As a result, the next available address is address 32. Therefore, the DMA 52 would change the address value of the Enum message to address=32 and provide this value to the UART 54. Since address=32 is already aligned with a power of two, the UART 54, in this example, claims addresses 32–35 and assigns address=36 to the next available address of the Enum message. This Enum message is then provided to the timer 56. Since the timer 56 requires 256 addresses, the timer 56 aligns its starting address with a power of two greater than the next available address (e.g., 256) and claims the next 256 addresses. The next available address value of the Enum message is then changed to address=512 and provided to the next member of the ring.

This same enumeration process is repeated for each member of the ring network, except bridges, which are discussed in more detail below. In this case, bridges first allocate their own space and then send the in-port Enum message to the other side of the bridge. Further more, the bridge, in one embodiment, is adapted to flip the zero data. Accordingly, when the Enum message is returned to the bridge on the other side, the bridge passes it back on this side. As a first approximation, bridges can program the routing themselves. If there are no loops, each bridge may need a maximum of two ranges to look at. It is expected that no loops exist for Enumeration protocol. So eventually the Enum message will get back to Anchor. This signifies the end of Enum process.

In accordance with one embodiment of the present invention, a communication system using a ring network architecture is provided. The system comprises a plurality of ring members connected in point-to-point fashion along the ring network, a transaction based connectivity for communicating a message among the ring members, and wherein the message is a configuration message that causes ring members to assign address space in the ring network. In one embodiment, the configuration message is processed by each ring member to cause that ring member to assign address space for that ring member, and wherein the configuration message is then passed to the next ring member.

In one embodiment, the configuration message includes an address that defines a starting address. The configuration message, in one implementation, is originated by an anchor member, which may include a CPU. In this case, each member processing the configuration message can revise the starting address before passing the configuration message to the next ring member. Furthermore, each member processing the configuration message can assign the address space of the member using the starting address and address space sufficient for that member.

In one embodiment, a CPU on the ring network of the system recognizes other ring members using starting addresses assigned to those ring members based on the configuration message. In this case, offsets to the starting addresses of the ring members may be used for different commands for the ring members.

Furthermore, in one embodiment, the ring network includes a bridge. In this case, the configuration message is processed by the bridge by assigning address space for the bridge and then passing the configuration message to the other side of the bridge. The configuration message can be processed by the bridge so that a subsequent message is routed according to whether an address associated with the subsequent message corresponds to one side of the bridge or the other side of the bridge. The subsequent message is passed across the bridge when the address is associated with the one side of the bridge, and wherein the subsequent message is passed through the bridge when the address is associated with the other side of the bridge. Additionally, the bridge, upon receiving a configuration message from one side of the ring network, responds by recording a first address included in the configuration message, passing the configuration message to the ring members on the other side of the ring network, and recording a second address included in the configuration message when the configuration message arrives from the other side of the ring network. In one embodiment, the first address corresponds to a near side of the bridge and the second address corresponds to a far side of the bridge.

In one embodiment, the system further comprises a second configuration message which causes ring members to respond with descriptive data, wherein the descriptive data can includes address space data for the ring members. Using this descriptive data, a CPU member on the ring network can be adapted to infer the topology of the ring network.

In accordance with yet another embodiment of the present invention, a method of assigning address space in a ring network architecture system including a plurality of ring members is provided. The method comprises issuing a configuration message, processing the configuration message at each ring member to assign address space for that ring member in the ring network, modifying the configuration message based on the assigned address space, and passing the configuration message to the next ring member. The configuration message is assigned by an anchor on the ring network, wherein the anchor can include a CPU member.

In one embodiment, the configuration message includes a starting address and the address space is assigned based on the starting address and the address needs of that ring member. In this case, the method step of modifying comprises modifying the starting address before the step of passing.

Furthermore, in one embodiment, the plurality of ring members includes a bridge, wherein the bridge responds to the configuration message by configuring logic that provides for a subsequent message to be passed across or by the bridge depending on an address associated with the subsequent message. The ring network can be adapted to process a first category of message and a second category of message, and wherein the bridge logic is operative only for the second category. In one implementation, the first category is a supervisory message and the second category is a work message.

Activation Register

The activation register, in one embodiment, is part of every ring interface (RIF). It is sent as reply to Who_Am_I message. It concatenates several key parameters of each ring member. It can be used by the Anchor to learn the topology of the network. It can include the following fields: user_controls; module ID; user_ID; soft_reset; invivo; scan_mode; stop_clock activated; and the like. Module ID is a hardwired unique ID for each kind of member on the network. Ring ID is, for example, one-bit used to identify where bridges are inserted. Each time the Enumerate message crosses a bridge, this bit is flipped. Active bit is set/reset by activate (or activate all) message types to allow normal operation of the modules. While this bit is reset, the module should not operate.

Stages in the Operation of a Rings network

Hardware connectivity—This is when the actual hardware is connected and the topology of the Rings is built. Several rings-compliant chips can be interconnected through the external ring interface. The unused interfaces can be shorted out.

Reset—the first message the Anchor typically propagates is a Reset message. It is flooded without clocking. The Host should wait sufficient time for the reset message to flood the whole network.

Wake-Up—after power-up all modules sitting on Rings typically are in reset mode. All modules have all config bits reset.

Enumeration—the Host tells the Anchor to spread the Enumerate message, starting with some address (usually zero). Each Ring member receives the Enum message, computes its own address space needs and transmits downstream the next available address. The bridges add first their own space on the first ring, then transmits the message to the next ring. When other side of the bridge consumes its own message, the closer side continues with the Enum message on the first ring.

Flood the WhoAmI request—the Host instructs the Anchor to flood the rings with WhoAmI request message. All modules simply transmit it downstream, except bridges that follows the Enumeration algorithm. Each ring member first sends its response and clock later try to relay the Request message. This is so the request message will hit the Anchor only after all responses arrived. Anchor can determine the end of WhoAmI sequence by using this fact.

WhoAmI response—Each module, after getting WhoAmI request, sends the contents of its Activation register as part of the WhoAmI response message. The Anchor should present all these messages to the host. It typically is the host's responsibility to infer the network topology from this data.

ProgramWr—After learning the network topology, via Who_Am_I response messages, the host can start configuring the members. Since it knows each member starting address, the host can send requests to write to any register. The last stage is to activate the network by writing active, for example, bit 1 in zero offset register. If during later stages the Host needs to get the value of any register, it can do so by issuing ProgramRd request and waiting for ProgramRd response. Bridges are special case for ProgramWr. Bridges need to be programmed first, before trying to pass data across them.

Activation—After programming stage, the SOC is ready to perform processing and data handling tasks. To start all modules and enable them to work, the Activate message is flooded throughout the ring network.

Mode to kill stray messages—It is foreseeable that because of a bug in design or programming, a message could be sent that is not addressed to any member of the ring. Either its address is above the highest assigned address or it is addressed to empty space between consecutive members. If the address of the stray message is above high limit, it can be routed to the Anchor and consumed or discarded by the Anchor. However if the stray address is pointing to empty space, this message could circle the ring forever. A process used to prevent this endless loop follows: messages can have an additional bit running along with them. If a bridge is passing a message through (not across) it can set this bit on the message. If message arrives to a bridge with this bit set, the bride discards it. Care should be taken to ensure that only one bridge per ring (in case there are several) is operating in this mode. In rings where no bridge exists, the Anchor can perform this action. Messages freshly generated will have this bit zero. Also every time message crosses a bridge (from one ring to another) this bit is cleared. If a message circles the ring for a second time, the designated bridge will discard it.

For each ring, only one bridge should execute the above discard process. Otherwise legitimate messages could be discarded. The solution to this problem is as follows: during the Enumeration process, the bridge initializes its sides as a close side and a distant side. The close side is where the Enum message appears from. The distant size is the other side. In this case, the distant side can be selected to perform the monitoring of stray messages. On the primary ring (where Anchor is located) the job of killing stray messages is done by Anchor.

Rings Topology Issues

Figure 4:
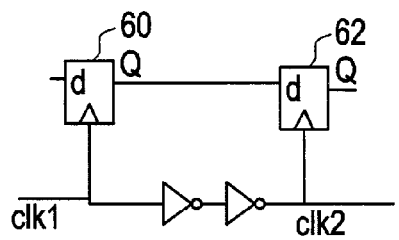
FIGS. 4–8 are a schematic diagram illustrating timing issues in a clocked system in accordance with at least one embodiment of the present invention.

Clock alignment across a SOC often is a critical feature. Failing it will result in races—which are crippling or at least inefficient. While other undesirable clocking artifacts sometimes can be eliminated by lowering the frequency, cooling the chip, exposing it to light, etc., races typically are much more difficult to resolve. As FIG. 4 illustrates, if the delay between clk1 and clk2 is greater than the delay from the output of the first flip flop 60 to the input of the second flip flop 62, a race is likely, meaning that the second flip flop 62 could sample the data output from the first flip flop 61 a whole clock period early.

In rings-based SOC in accordance with at least one embodiment, there typically is no need to align the clocks precisely across the whole chip. Clock alignment is needed only in singular chunks of data, herein referred to as compounds. Most of the compounds are small, such as peripherals. Others are of a medium size, such as DMAs. Some are considerably large, such as a packet processor. For larger compounds, some kind of clock alignment generally is mandatory. But the overall clocking problem can be divided into smaller, easier solved problems. To illustrate, in at least one embodiment, signals going between any two modules are tightly controlled, because they are known in advance and there is only so many of them (for example, three signal groups: clock, data and backpressure). Furthermore, because of the topology, a solution in one section typically implies a solution for the whole system. Of particular importance is the direction along the ring any of the three groups takes, how the clock tree runs, and what special rules/checks/solutions are to be defined and enforced.

Figure 5:
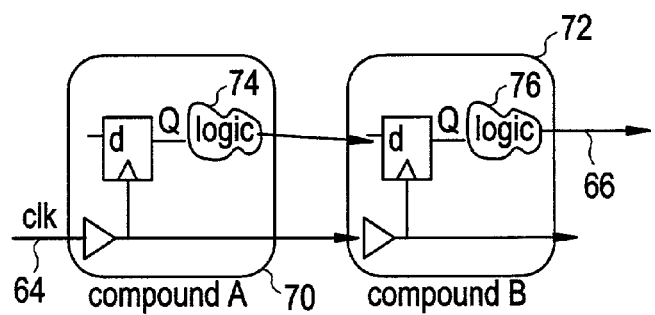

FIG. 5 illustrates a possible solution to the race problem. In this example, the clock signal path 64, in the same direction of the data path 66, is separated into a number of similar compounds (e.g., compounds 70, 72) By controlling the logic 74, 76 on each flip flop leaving a compound, it can be ensured that the delay between flip flops is at least long enough to prevent a race condition. This also can be verified after layout.

Figure 6:
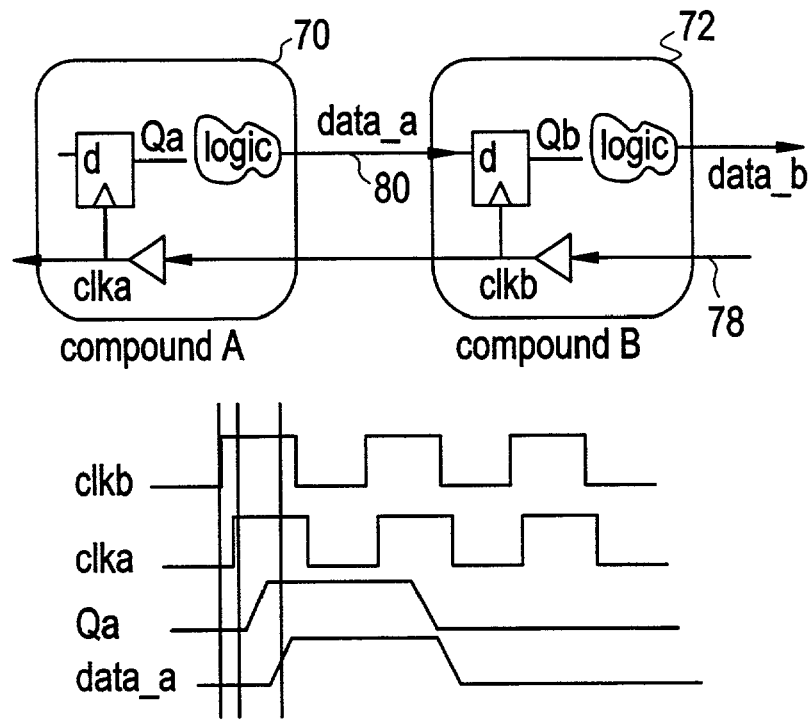

Although the solution illustrated in FIG. 5 may be implemented, in at least one embodiment, the clock signal is propagated in the opposite direction of the data, as illustrated with reference to FIG. 6. By providing the clock signal 78 in the opposite direction of the data signal 80, the potential for race between compounds 70, 72 is significantly reduced or eliminated.

Figure 7:
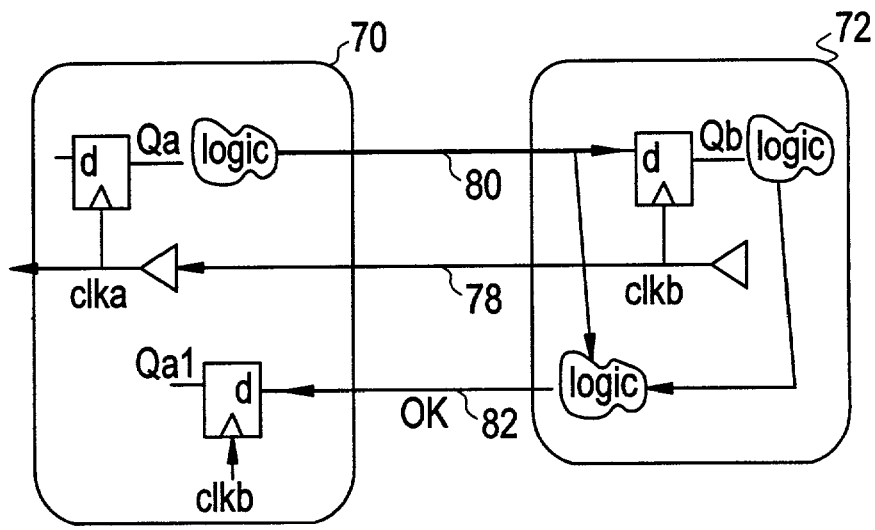

In at least one embodiment, there is at least one signal that goes against the usual flow of data (signal 80), this signal being the OK signal 82, which is utilized to enable backpressure, as illustrated with reference to FIG. 7. The OK signal 82 generally needs special treatment because it's sampling clock lags behind sourcing clock (signal 78). However, this can be solved by ensuring that the return path is longer then clock delay. Alternatively, as illustrated with reference to FIG. 8, a latch 86 may be implemented to ensure that data provided to flipflop 62 changes only after the rising edge of the clock 78 (clkb).

Figure 9:
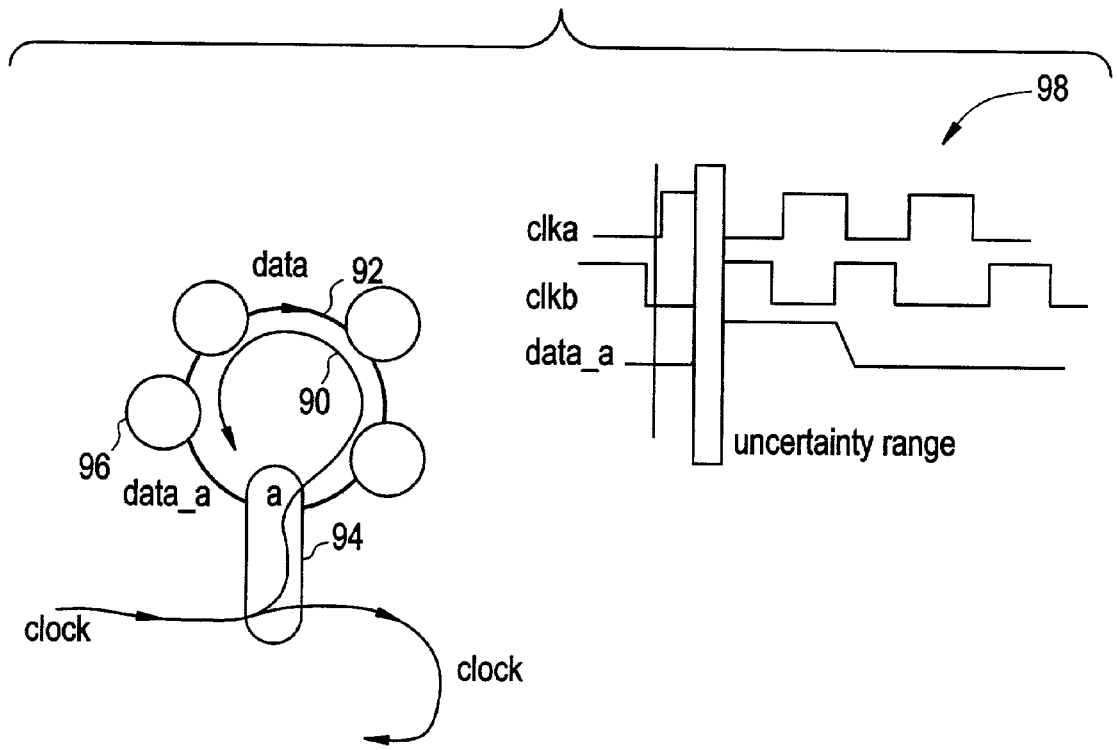
FIG. 9 is a schematic diagram illustrating a mechanism for providing a clock signal in an opposing direction to data flow in a rings network in accordance with at least one embodiment of the present invention.
Figure 10:
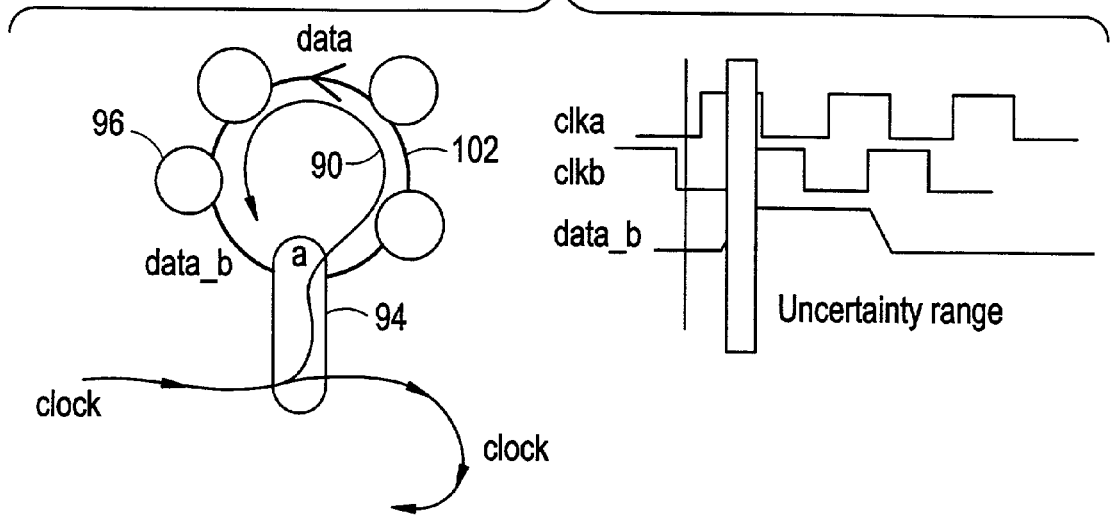
FIG. 10 is a schematic diagram illustrating a mechanism for providing a clock signal in a same direction as a data flow in a rings network in accordance with at least one embodiment of the present invention.

FIG. 9 illustrates a complication resulting from the propagation of the clock 90 in a direction opposing the propagation of data in a ring network having a bridge 94. As illustrated, data_a leaving the bridge 94 goes to member 96 and should be sampled by the rising edge of clkb. However, clkb lags considerably behind clka of the bridge 94. As demonstrated by the waveforms 98, race is eminent. However, by adding latches to the data lines, race can be eliminated or substantially reduced. Likewise, latches should be used on the OK signal to prevent race. It will be appreciated that the latches utility may be limited if the delay between, for example, clka and clkb is greater than about 75% of the cycle time since the substantial timing uncertainty may be introduced. FIG. 10 illustrates a complication resulting from the propagation of the clock 90 in a same direction of the propagation of data 102 in a ring network having a bridge 94. As illustrated, data_b leaves member 96 to be sampled by the bridge 94 using clk_a. As opposed to the situation referenced in FIG. 9, clkb now lags considerably behind clka. However, this may be advantageous if the lag is considerably smaller than the clock cycle since the data can be delayed beyond the danger zone of clock delay. Likewise, the OK signal is covered and the last leg of data is covered. In this case, the only signal that typically must be considered is the OK signal from the bridge 94 to member 96. In this case, a latch can be used at member 96 to prevent race in the OK signal.

Figure 11:
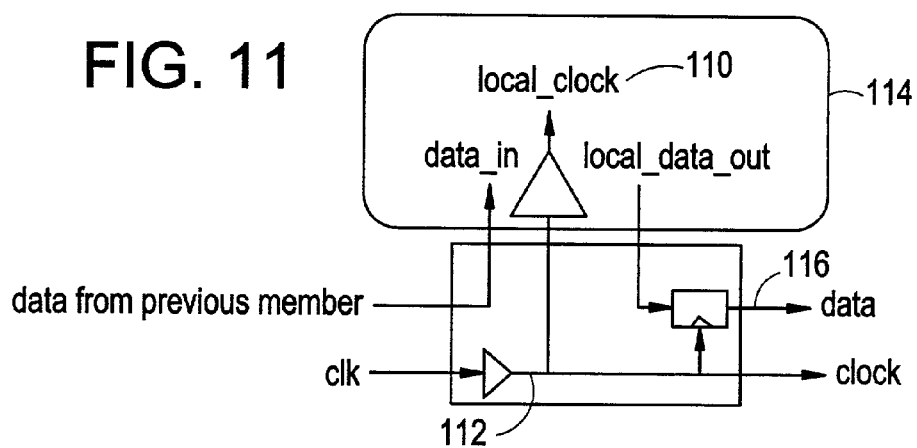
FIG. 11 is schematic diagram illustrating an exemplary implementation of a timing interface of a rings interface in a rings network in accordance with at least one embodiment of the present invention.

It is often desirable to minimize lag between members of a ring, thereby increasing the number of members supported by a single ring as well as minimizing the timing constraints to be considered. However if one or more members are packet processors or other modules having considerable processing tasks, the clock entering such modules often is delayed considerably when the clock is regenerated to drive the big compound. In this case, the same principles apply and may be solved using latches, as illustrated with reference to FIG. 11, which illustrates a data signal and clock signal propagating in the same direction. In this case, the local_clock 110 lags behind the ring_interface clock 112 of the module 114 (e.g., a packet processor). For outgoing data, this typically is not a problem since it changes later then the ring interface flip flops clock. However, for data entering the module 114 from a previous member, race is a possibility. The same situation may occur in the event that the clock signal 112 and the data signal 116 propagate in opposite directions.

In accordance with one embodiment of the present invention, a rings-based system is provided. The system comprises a plurality of ring members on a ring network that communicate using point-to-point connectivity, a message traversing the ring from member to member, where the system is adapted so that upon the message arriving at a given ring member the message is processed by that ring member, if the message is applicable to that ring member, and if the message is not applicable to that ring member, the message is passed on to the next ring member, and where the system further comprises a system clock signal for controlling timing on the ring network wherein the system clock signal is aligned between groups of ring members instead of among all of the ring members. In one embodiment, the system clock signal runs in the same direction as the message, while in another embodiment, the system clock signal runs in the opposing direction to the message. The alignment can be implmented to substantially removes skew among the clock signals. Furthermore, the alignment can prevent a flip-flop at a ring member from sampling data a clock cycle too early.

The system clock signal alignment preferably is performed among adjacent ring members, wherein the alignment for a ring member can be performed with respect to the ring member's upstream and downstream ring member. The alignment can be performed by inserting logic at the ring members that ensures that the delay between adjacent clock signals does not exceed the delay between the adjacent members. Similarly, the alignment can be performed using latches that are clocked by clock signals at individual members.

In one embodiment, the rings-based system further comprises a backpressure signal that runs in the opposing direction to the message, wherein the alignment is performed by inserting logic at the ring members to ensure that the return path for the backpressure signal exceeds the clock delay between adjacent members.

Bridges

Figure 12:
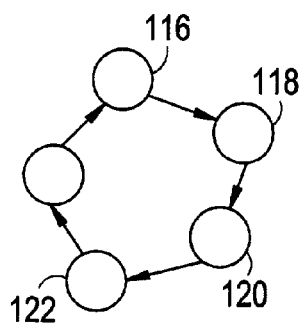
FIG. 12 is a schematic diagram illustrating latency issues in a ring network in accordance with at least one embodiment of the present invention.

As discussed previously, the ring topology in accordance with the present invention arranges module in a logical ring. All data and control is transmitted over this ring infrastructure sequentially around the ring. However, as illustrated by FIG. 12, considerable ring latency may be introduced. To illustrate, if module 116 sends a message to module 118, there is little latency. However, if member 120 is to pass data to member 122, the data must pass through four modules (i.e., four clock cycles), resulting in considerably more latency. Another problem is peak latency. To illustrate, suppose that member 116 transmits mainly to member 122 and member 118 transmits data mainly to member 120. In this case, the communication between members 118 and 120 suffers degradation due to the traffic from member 116 to member 122.

Figure 13:
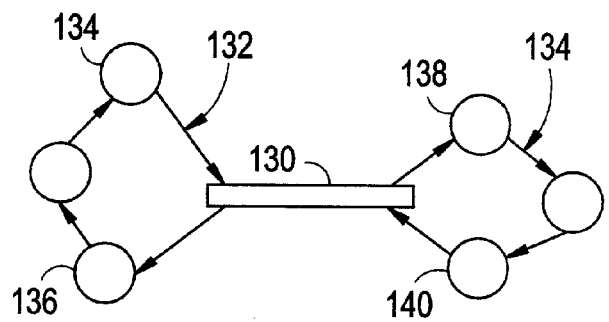
FIGS. 13 and 14 are schematic diagrams illustrating exemplary implementations of bridges in ring networks in accordance with at least one embodiment of the present invention.

In at least one embodiment, a bridge may be used to minimize the latency between members of a ring. As illustrated in FIG. 13, a bridge 130 may be used to connect two rings 132, 134. This bridge is analogous to a sea bridge since it connects two rings together just as a sea bridge connects two islands. The sea bridge, in one embodiment, determines what messages to cross over between rings and what messages to keep on the current ring. So referring to the above latency problems, the sea bridge may be utilized to minimize peak latency issues. To illustrate, if member 134 communicates mainly with member 136, communications between member 138 and member 140 are not affected.

Figure 14:
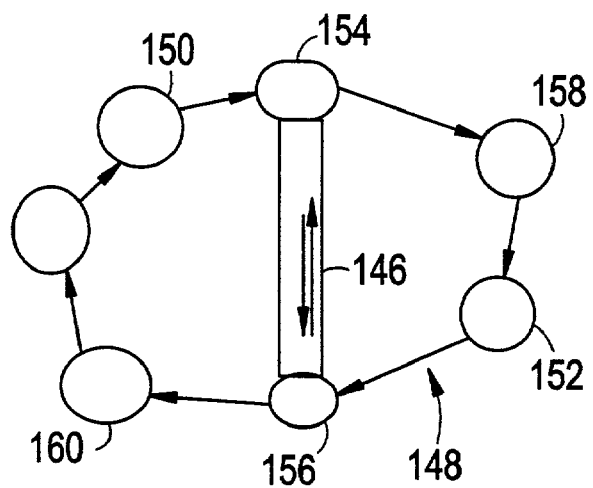

Intraring latency resulting from a relatively large number of members of the ring between the transmitting member and the intended recipient member may be reduced by a land bridge, as illustrated with reference to FIG. 14. The land bridge 146 is utilized within a ring 148 to minimize the number of hops for data/clock signals. To illustrate, without the land bridge 146, data from member 150 to member 152 would have to go though 5 members. However, the land bridge 146 reduces the number of members in the data path between member 150 and member 152 to 3 members (with two of the members being the bridges two interfaces 154, 156).

Figure 15:
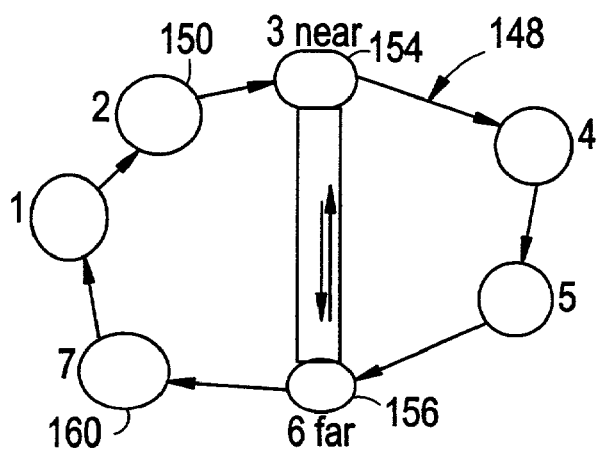
FIG. 15 is a schematic diagram illustrating an exemplary enumeration process in a ring network having a bridge in accordance with at least one embodiment of the present invention.
Figure 16:
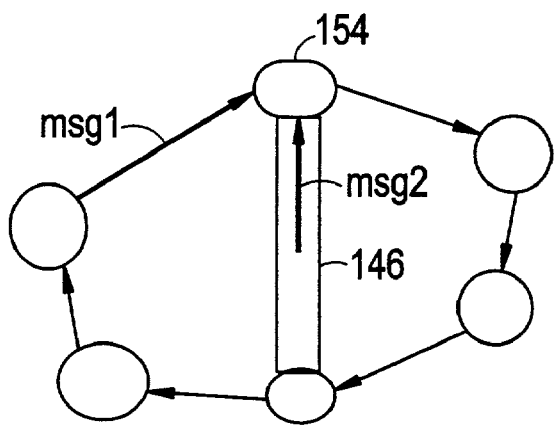
FIG. 16 is a schematic diagram illustrating an exemplary priority scheme for messages received simultaneously at a same interface of a bridge in a ring network in accordance with at least one embodiment of the present invention.
Figure 17:
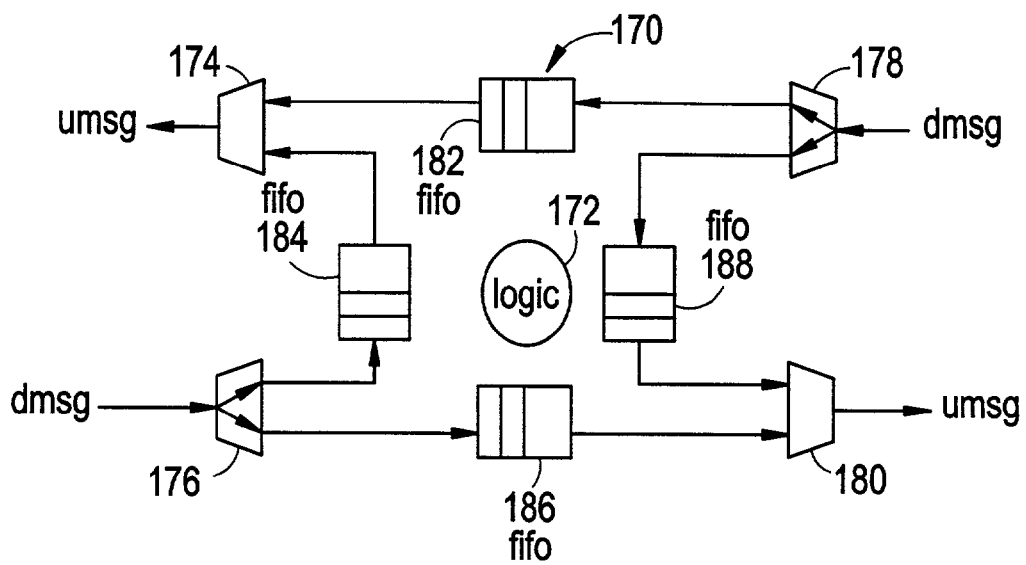
FIG. 17 is a schematic diagram illustrating an exemplary implementation of a bridge in accordance with at least one embodiment of the present invention.

The bridge, either a land bridge or a sea bridge, is adapted to analyze a message received at one of its interfaces and to pass the message through to its other interface or pass on to the next member depending on the intended recipient of the message. For example, when member 150 sends a message to member 158, the land bridge 146 receives the message at bridge interface 154 and determines that the shortest path is to pass the message from the bridge interface 154 directly to the member 158. However, when member 150 sends a message to member 160, the land bridge 146 receives the message at bridge interface 154 and determines that the shortest path is to pass the message through the bridge to the bridge interface 156 and then from bridge interface 156 to the member 160. It is not necessary for a bridge to be aware of the topology of the ring when deciding the more optimal path for a message. Using the enumeration process, the bridge can obtain the information used to make this decision. Referring now to FIG. 15, an exemplary routing process by the bridge 146 is illustrated in accordance with one embodiment of the present invention. For enumeration purposes the land bridge 146 appears as two ring members (interface 154 being one member and interface 156 being the second). The member/interface of the bridge having the lower address (address=3 in this case) becomes the near end, the member/ interface of the bridge having the higher address (address=6 in this case) is marked as the far end. A message arriving at the near end (from direction of the member 150) is passed on if the destination address of the message is greater than 3 and less then 6. Otherwise, the message is passed through the bridge 146 to the far end (interface 156). On the far end, a message arriving at the interface 156 from the direction of member 152 will be passed through to the near end (interface 154) if its destination address is less than 6 but greater than 3. Otherwise the message is passed on to member 160. In at least one embodiment, the address values by which a bridge 146 determines the routing of a message are determined during the enumeration process described herein. FIG. 16 illustrates a situation whereby two messages are received at an interface 154 of a bridge 146 at a same time. As illustrated msg1 and msg 2 are received at the same interface 154 at the same time. In one embodiment, messages transferred between interfaces of the bridge 146 are given priority, whereas in other embodiments, messages received at the bridge interface from members of the ring are given priority. Referring to FIG. 17, an exemplary implementation of a bridge 170 is illustrated. In this example, the bridge 170 includes control logic 172 adapted to control the upstream and downstream muxes 174–180 to pass either the incoming messages through either the fifo (fifos 182–188) between the downstream input and the upstream output, the upstream input to the upstream output, the downstream input to the downstream output, and the upstream input to the downstream output.

In accordance with one embodiment of the present invention, a rings-based system on a chip is provided. This system comprises a plurality of ring members on a ring that communicate using point-to-point connectivity, a message traversing the ring from member to member, the system being adapted so that upon the message arriving at a given ring member the message is processed by that ring member if the message is applicable to that ring member, and if the message is not applicable to that ring member, the message is passed on to the next ring member, and wherein at least one of the ring members comprises a bridge.

In one embodiment, the bridge of the rings-based system is adapted to allow messages to travel from one side to another side of the bridge without passing through intermediate ring members. In this case, the bridge can be configured so that the message arriving at the bridge is routed according to whether an address associated with the message corresponds to one side of the bridge or the other side of the bridge.

Likewise, the message, in one embodiment, is passed across the bridge when the address is associated with the one side of the bridge, and wherein the message is passed through the bridge when the address is associated with the other side of the bridge. Accordingly, the bridge can include logic with a range of addresses, such that the message is routed to one side of the bridge or the other side of the bridge depending on whether the address is within the range. The logic may be established based on a configuration message that causes the ring members to assign their address spaces, and the configuration message may include an enumeration message.

In one embodiment, the plurality of ring members of the rings-based system are a first plurality of ring members comprising a first ring network and the system further comprises a second plurality of ring members comprising a second ring network, wherein the bridge comprises a bridge between the two ring networks. The bridge can be adapted to determine which messages to pass to the second ring network and which messages to keep on the first ring network. In this case, the bridge may be configured so that the message arriving at the bridge is routed according to whether an address associated with the message corresponds to one side of the bridge or the other side of the bridge. The bridge can include logic with a range of addresses, such that the message is routed to the first ring network or the second ring network depending on whether the address is within the range. This logic can be established based on a configuration message that causes the ring members to assign their address spaces. The configuration message, in this instance, may include an enumeration message. Furthermore, the message can be passed across the bridge when the address is associated with the first ring network, and wherein the message is passed through the bridge when the address is associated with the second ring network.

In another embodiment, the bridge is adapted to process a first category of message and a second category of message. The first category of message can include a supervisory message and the second category of message can include a work message. The bridge then can be adapted to make a routing determination based on the second category of message. In this case, the bridge can be adapted to identifies the category of message by examining a message type included in the message.

Stray Messages

A stray message is a message addressed to an unused address of a ring network. The enumeration process typically leaves gaps of unused address space between active modules when the modules align themselves to starting addresses being, for example, a power of two. A stray message usually is a result of a software bug. Unchecked, stray messages may slowly choke the ring network, while such messages are difficult to detect and/or debug. However, not every member of the ring is required to know about much less have the capability to detect or remove stray messages. In one embodiment, this responsibility falls to the Anchor and/or bridges.

Figure 18:
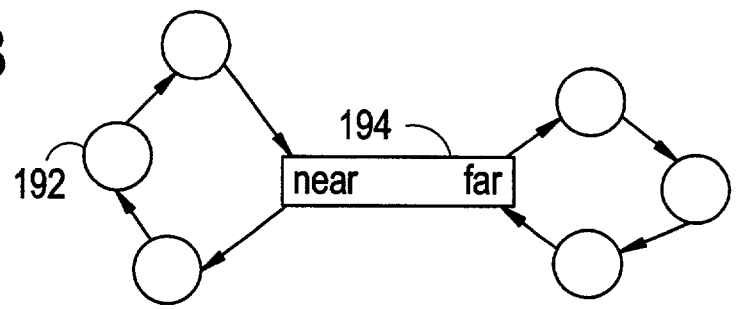
FIGS. 18 and 19 are schematic diagrams illustrating an exemplary process for the elimination of stray messages in a ring network in accordance with at least one embodiment of the present invention.
Figure 19:
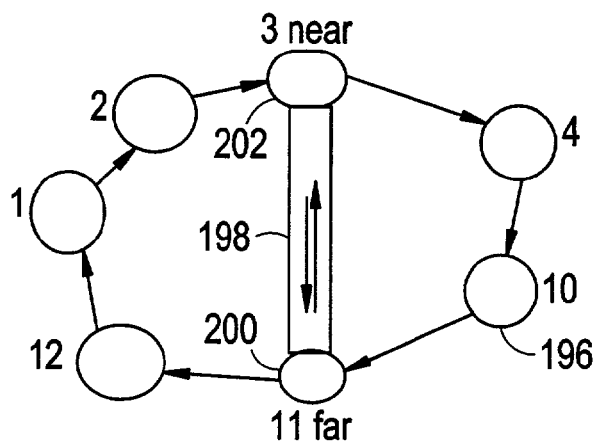

Referring now to FIGS. 18 and 19, a process for removing stray messages is illustrated in accordance with at least one embodiment of the present invention. In the illustrated embodiment, one bit of a message is used as a marker to determine if a message is a stray. The bit normally is set to zero, but when a message passes through an Anchor 192 or bridge 194, the bit is set to one. If the message arrives at the Anchor 192 or bridge 194 again, the Anchor/bridge notes the set bit and discards the stray message, thereby removing the stray from the ring.

However, it will be appreciated that since a bridge has two ring interfaces, one of the interfaces must be selected to filter stray messages, particularly in land bridges. To illustrate, if member 196 sends a message to address=5 (an unassigned address), the land bridge 198 will receive the message at the far end 200 (address=11) and forward the message back to the near end 202 of the bridge 198 (address=3), where the process will be repeated unless the stray message is removed. Accordingly, in one embodiment, the far end 200 of the bridge 198 (i.e., the interface of the bridge furthest away from the anchor) is selected to filter for stray messages. The stray message marker bit of messages received at the near end 202 remain unchanged while the stray message marker bit is set at the far end 200 of the bridge.

Figure 20:
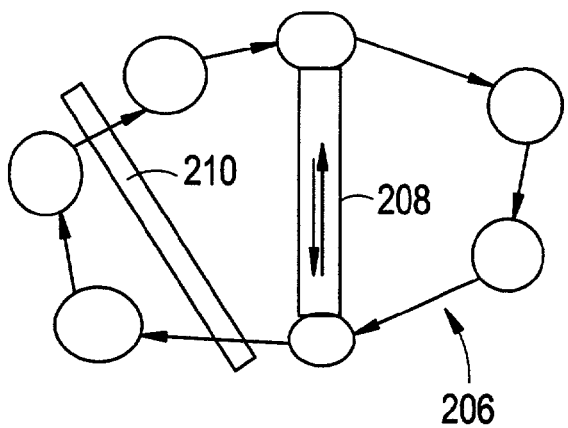
FIGS. 20–22 are schematic diagrams illustrating exemplary ring networks multiple bridges in accordance with at least one embodiment of the present invention.
Figure 21:
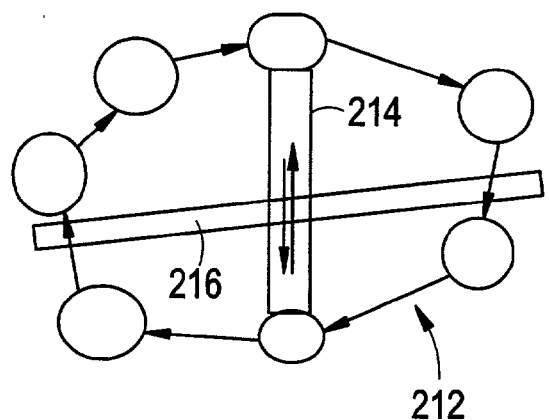
Figure 22:
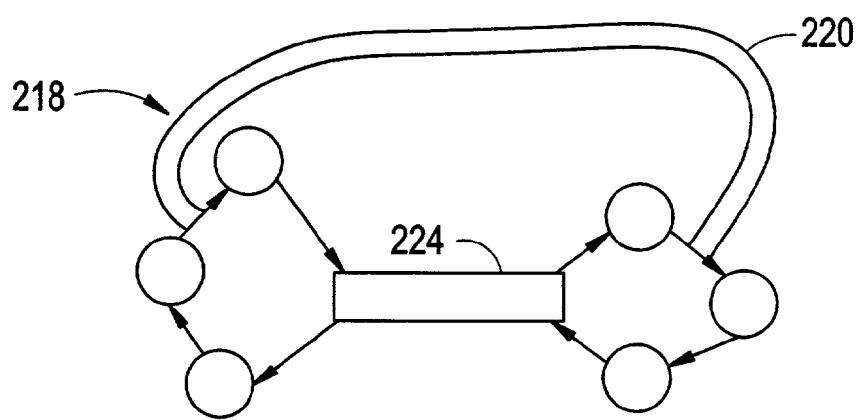

FIGS. 20, 21, and 22 illustrate exemplary ring networks having more than one bridge per ring. To illustrate FIG. 20 includes a ring having two parallel bridges 208, 210, FIG. 21 has a ring 212 with bridges 214, 216 that cross, and FIG. 22 includes a ring network having both a land bridge 222 and a sea bridge 224. Other bridge combinations may be utilized in accordance with the present invention.

Debugging and Testing on the Rings

Figure 23:
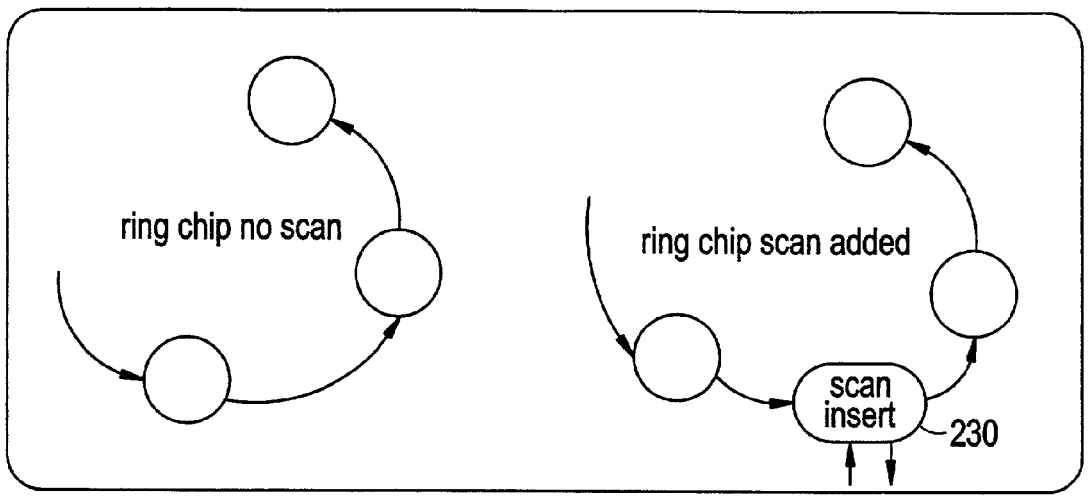
FIGS. 23–35 are schematic diagrams illustrating exemplary implementations of a scan interface in a ring network in accordance with at least one embodiment of the present invention.
Figure 24:
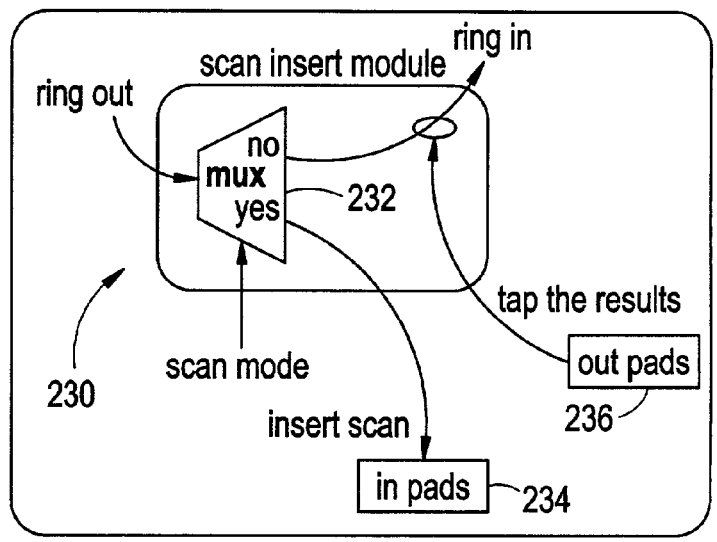

Due to the topology of the ring network, there is an opportunity to use the infrastructure of rings to assist scan and debug. The rings can be used as a scan chain access to individual ring members and also a special in-vivo scan mode (discussed below) may be employed. Referring to FIGS. 23 and 24, the insertion of a scan capability is illustrated. A scan may be enabled by introducing new scan_insert member 230, which is not a regular member. The scan_insert member 230 can be adapted such that it does not introduce one clock delay. For ring signals it is a mux 232 between regular ring data and scan input signals. During test modes this mux 232 inserts scan input signals instead of regular ring data. During normal operation, this mux 232 connects ring infrastructure as usual. In scan mode, the ring is effectively cut off. Insert-scan signals come directly from input pads 234, 236 on the chip. The tap the results pins drive the output pads. The insert scan signals form three major groups: Message type, Message address and Message data.

Figure 25:
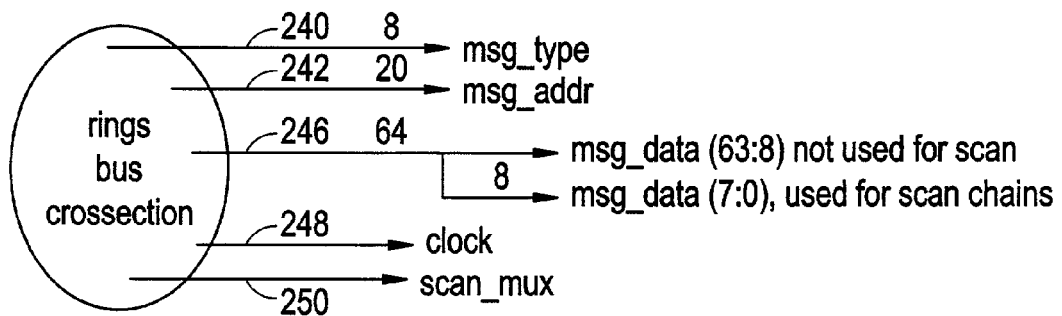

Before the actual scan can commence the ring should be programmed to scan mode. This can done by forcing a sequence of supervisor messages onto the ring. This sequence first resets the ring, then Enumerates it. The last stage is activating for scan of one specific member. After the scan mode is programmed to the member, the actual scan can be done. Scan mux signal is part of the ring. It is programmed via, for example, the external pad to create the shift in sequence. Then for one clock it is negated. During this cycle the scan capture occurs. Then scan mux is asserted again and clocking advances the scan out data. The scan out data is tapped off the wires entering the scan_insert module. Referring to FIG. 25, exemplary signals 240–250 used as scan chains are illustrated. During scan, several message data signals are used as scan chains. The number of data lines depends on how many parallel scan chains are necessary.

In-Vivo Scan

A typical silicon debug scenario is as follows: a chip is run for one billion clocks and a bug is discovered. The test is rerun for half the clocks and then stopped. all flip-flops values at the stopped state the source of the problem or error is hopefully determined. In such a scenario, in-vivo scan may be utilized. For an in-vivo scan, the chip is started as usual. The software is run for the specified number of clocks (note: optionally, a special counter may be used to freeze the rings.) The ring modules are deactivated then deactivated by, for example, a message from a certain module. One specified ring module is re-activated in in-vivo scan mode. This mode causes the module to run shift-out of all its flip-flops. The module's ring interface is responsible for managing the scan-out. It counts bocks of, for example, 32 scan-out bits, packages them in one message and ships the message to the Anchor. The Anchor or other module needs to retrieve these messages out of the Anchor and pass them to debug software. The message type typically is the Program Read Response message, which is designed to get to Anchor. The address is the modules self-address. The data of this message is, for example, 32 bits of scan-out data. Each activation of this mode causes a certain number such messages to be generated. If the modules have more flip-flops then the total bit count of the messages, the designated module can do this activation again and again. To facilitate fast freeze of members state, a special supervisor message (Freeze message) is defined to run quickly around the rings and freeze the state of each module.

In accordance with one embodiment of the present invention, a rings-based system on a chip is provided. The rings-based system comprises a plurality of ring members on a ring network that communicate using point-to-point connectivity, a message traversing the ring from member to member, where the system is adapted so that, during normal operation, upon the message arriving at a given ring member the message is processed by that ring member if the message is applicable to that ring member, and if the message is not applicable to that ring member, the message is passed on to the next ring member, and wherein the system is further adapted for a scan testing mode in which one of the ring members is enabled for a scan output and the other ring members deactivated. The deactivated members can be adapted to pass messages without consuming the messages.

The scan output can be packaged into one or more messages that are transmitted by the one ring member. The one or more messages may be transmitted to a processor, wherein the processor can include a ring member operating as a supervisor that consumes supervisory response messages. In this case, the processor can be adapted to make the data from the one or more messages available to debugging software. Additionally, in one embodiment, a second of the ring members of the rings-based system comprises a processor that issues at least one message that operates to deactivate the other ring members and to enable the one ring member for the scan output.

In one embodiment, the operation of the system in the scan testing mode causes the one ring member to shift out flip-flops associated with the one ring member into one or more messages sent on the ring. The scan testing mode can be initiated by resetting the ring network and enabling the one member for the scan mode, where initiation of the scan testing mode may include enumerating the ring network. In one embodiment, the scan testing mode allows a user of the system to debug the system without adding additional hardware.

Furthermore, in one embodiment, the plurality of ring members are coupled to the ring network using a plurality of ring interfaces having registers, wherein the registers preferably include bits that can be set to deactivate the ring member associated with that ring interface. The registers also may include bits that can be set to enable the ring member associated with that ring interface for the scan output.

In accordance with another embodiment of the present invention, a method of scanning in a ring network having a plurality of ring members is provided. The method comprises observing a defect or anomaly during normal operation of the ring network, issuing at least one message that causes one ring member to enter a scan output mode and other ring members to be deactivated, resuming operation of the ring network, and outputting scan data from the one ring member onto the ring network as messages. The method, in one embodiment, further comprises causing a different ring member to enter the scan output mode in order to isolate the defect or anomaly. The at least one message can comprise at least one supervisory message that configures bits in ring interfaces associated with the ring members. Additionally, in one embodiment, the step of observing takes place at a point in time during the normal operation, and wherein the step of resuming is carried out just prior to the point in time.

During the scan output mode, in one embodiment, the one ring member packages its scan output as messages to be transmitted to a processor ring member. In this case, the processor ring member can be adapted to make the scan output available to debugging software.

Basic Ring Interface (RIF) Overview

Figure 26:
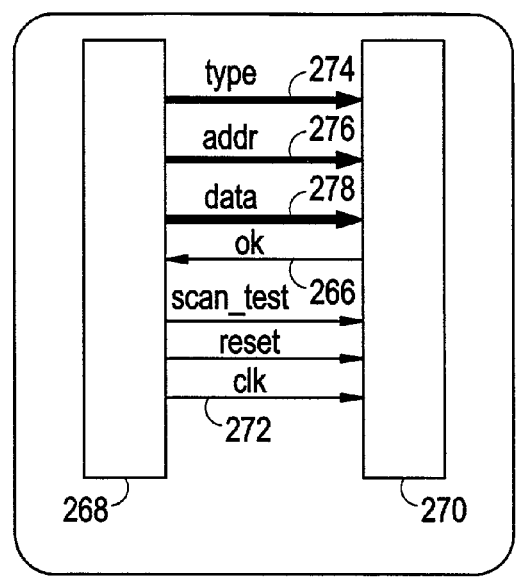
Figure 27:
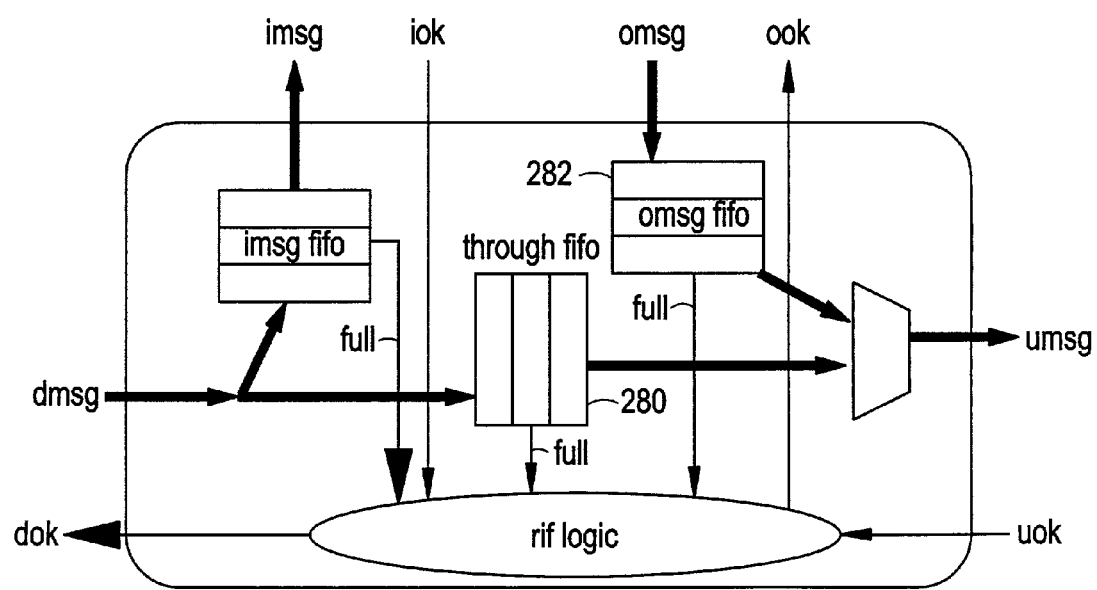
Figure 28:
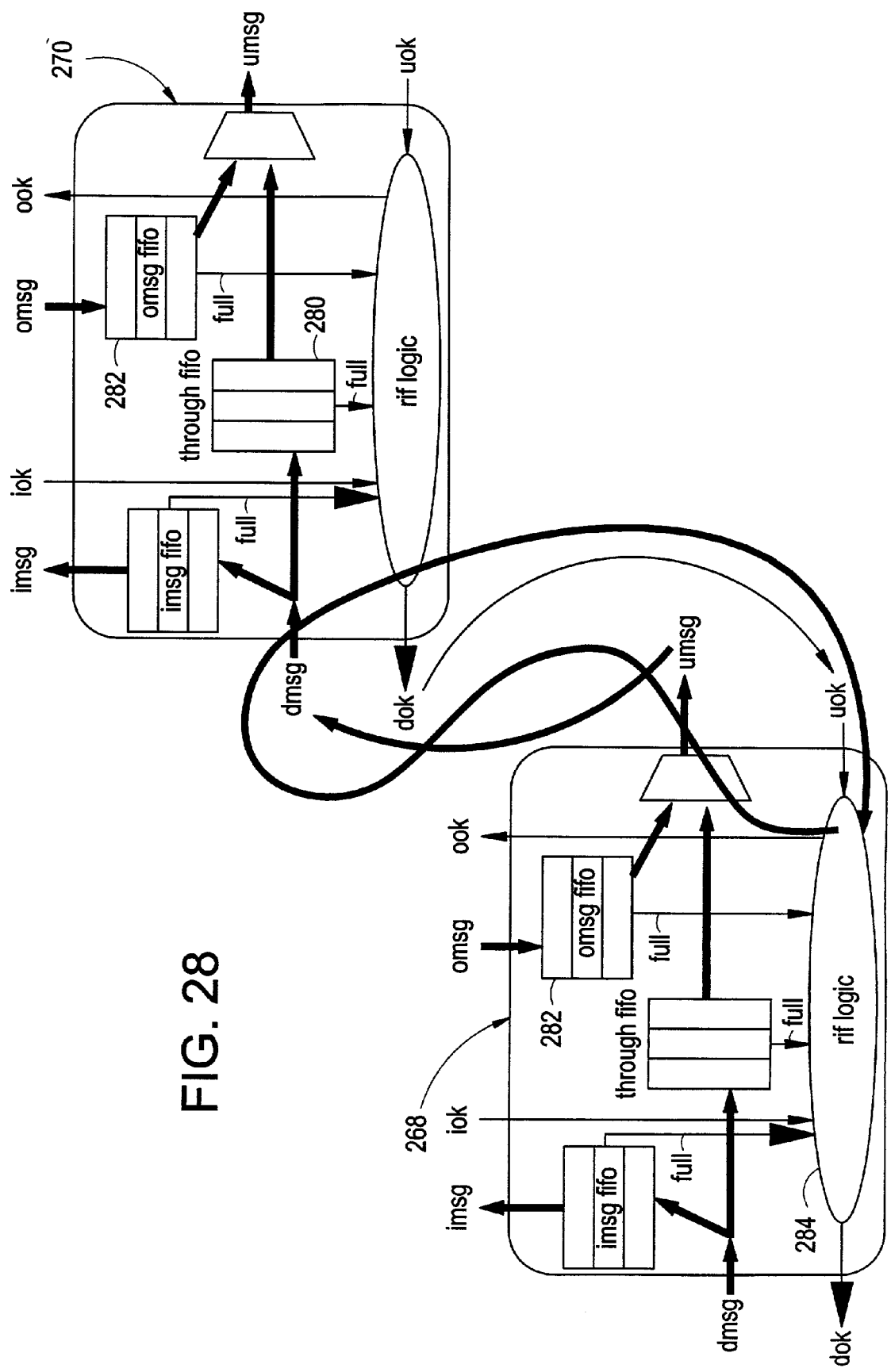

This section covers three issues. The basic ring timing and backpressure protocol. It also presents the ring interface unit block diagram, which in turn is used to describe the interface to the user module connected to the ring. Regular ring members need not be aware of the ring intricacies. The basic ring interface is intended to hide most of the timings and protocols. FIGS. 26, 27 and 28 illustrate an exemplary implementation of ring signaling between modules of a ring network. As discussed previously, in one embodiment, the OK signal 266 (back pressure) flows in a reverse direction to inform member 268 that on the next rising clock 272 it may force new message on type/addr/data lines 274–278. The OK signal 266 is generated by the receiving member 270. By default, in one embodiment, the OK signal 266 is active and the only time it goes down is when the message type is non-idle and there is no room in the correct fifo of member 270. The correct fifo is either fifo 280 for through traffic in member 270 or the messages addressed for member 270 fifo. Thus the OK signal 266 is generated by signals coming from member 268 to member 270 and is sent roundtrip back during the same clock.

The generation of OK signal 266 can be done from flip-flops resident in member 270 and the type lines of message coming from member 268. For example, if the fifo 280 is full, the OK signal 266 is negated, even though the next OK down the ring is active and is freeing an entry in the fifo 280. The same basic OK protocol is used four times in each RIF (ring interface) unit (FIG. 27). The same OK protocol is valid for the four exemplary RIF interfaces.

In accordance with one embodiment of the present invention, a rings-based system on a chip is provided. The rings-based system comprises a plurality of ring members on a ring network that communicate using point-to-point connectivity, a message traversing the ring from member to member, where the system is adapted so that upon the message arriving at a given ring member the message is processed by that ring member if the message is applicable to that ring member, and if the message is not applicable to that ring member, the message is passed on to the next ring member, and the system is further adapted so that downstream adjacent ring members provide a signal to their upstream adjacent ring members that indicates whether a slot is available for the upstream ring member to pass the message to the downstream ring member on a given clock cycle. The receipt of the signal indicating that a slot is not available, in one embodiment, causes the upstream ring member not to pass the message on that clock cycle. In one embodiment, each ring member provides the signal to the immediately prior ring member each clock cycle.

In one embodiment, each ring member couples to the ring network by a ring interface, where the signals regarding slot availability are passed between adjacent ring interfaces. In this case, the ring interface can include an input FIFO and a through FIFO. The signal can be generated by the downstream ring member and passed to an immediately upstream ring member holding the message, where the signal is generated according to the FIFO for the downstream ring member that pertains to the message. In this case, the downstream ring member can be adapted to determine that the input FIFO pertains to the message if the message is to be consumed by the downstream ring member and that the through FIFO pertains to the message if the message is not to be consumed by the downstream ring member. The determination can be made by the downstream ring member examining information descriptive of the message before the message in its entirety is sent from the upstream ring member to the downstream ring member, where the information preferably comprises data from a type field and an address field for the message. The signal can indicate that a slot is available when the input FIFO pertains to the message and the input FIFO can accept a message and/or when the through FIFO pertains to the message and the through FIFO can accept a message.

In one embodiment, the signal generated by the downstream adjacent ring members is a backpressure signal that is generated based on data sent from the upstream ring member to the downstream ring member and then back to the upstream ring member in a round trip fashion during a single clock cycle. Furthermore, in one embodiment, each ring member has a ring interface, wherein each ring interface has four interfaces using or providing the signal which comprises a backpressure signal.

In accordance with another embodiment of the present invention, a method of controlling the transmission of messages on a ring network comprising a plurality of ring members is provided. The method comprises providing a message at a first upstream ring member that is available for output to a second adjacent downstream ring member, receiving a signal at the upstream ring member from the downstream ring member that indicates whether a slot is available for outputting the message on a clock cycle, and outputting the message from the upstream ring member to the downstream ring member if a slot is available and holding the message if a slot is not available.

In one embodiment, the signal is generated based on the content of the message. In this case, the signal can be generated based on whether the message will be consumed by the downstream ring member or pass through to a further downstream ring member. The content of the message preferably includes at least a portion of the message type and/or at least a portion of the message address.

Furthermore, in one embodiment, the downstream ring member is coupled to an input FIFO and a through FIFO, wherein the downstream ring member determines which FIFO pertains to the message. The downstream ring member also can determine whether the pertinent FIFO is capable of accepting the message.

The Imessage path is the messages intended for this member. Each message bus on the diagram above is actually collection of three fields: type/8, addr/20, data/64. It is true for 3 out of 4 interfaces. For Imessage path, the type can be in most cases reduced to work/program and read/write. Also, several other bits of type might be needed, like last and size. For the address field only low order bits are needed. The address bits needed are the bits that cover the internal module address space. The data field might be reduced in some cases to 32 bits or even less, for example 8 bit UART. The Imessage fifo may be a very reduced version of other fifos.

The Omessage fifo 282 transmits messages originating locally to the outside ring. It has to support full fields, because many kinds of messages can be produced. As can be seen from FIG. 28, the OK signal logic 284 originates in the sending member 268. It starts with creating message type and address. Type and address fields travel to member 270, whereas, using these two fields, a decision is made as to whether the message is a through message or it ends at and is consumed by member 270. In each case, the status of the corresponding fifo is transmitted back as the OK signal. The next rising clock samples this OK to mux either previous message or new one or idle. As presented, all four interfaces of RIF have similar turnarounds with their OK signals.

Routing of Incoming Messages

Figure 29:
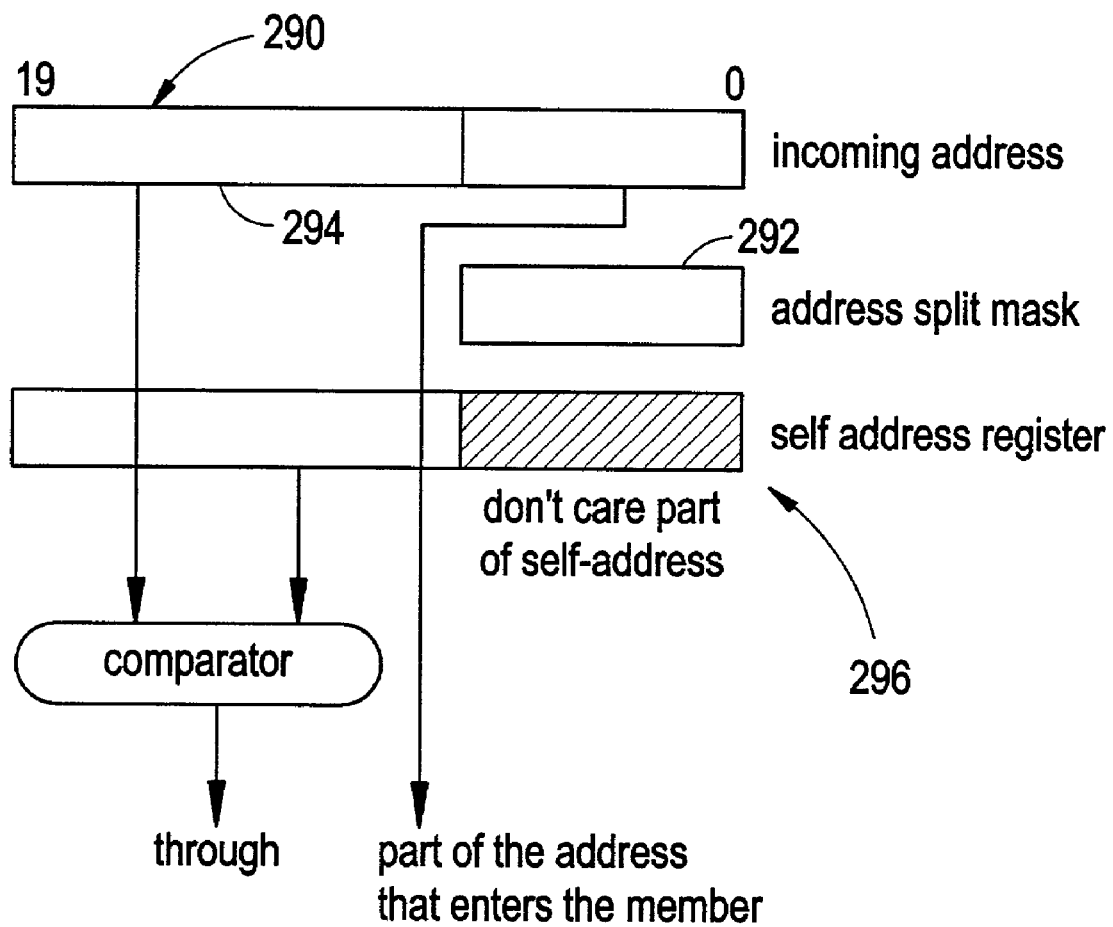
Figure 30:
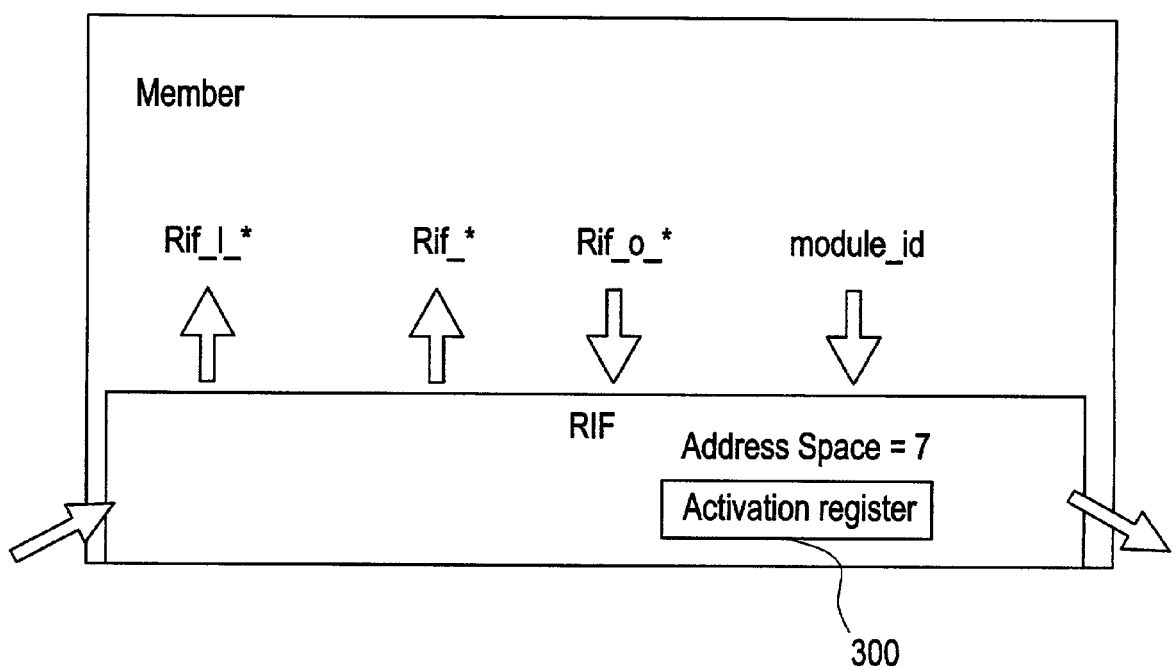
Figure 31:
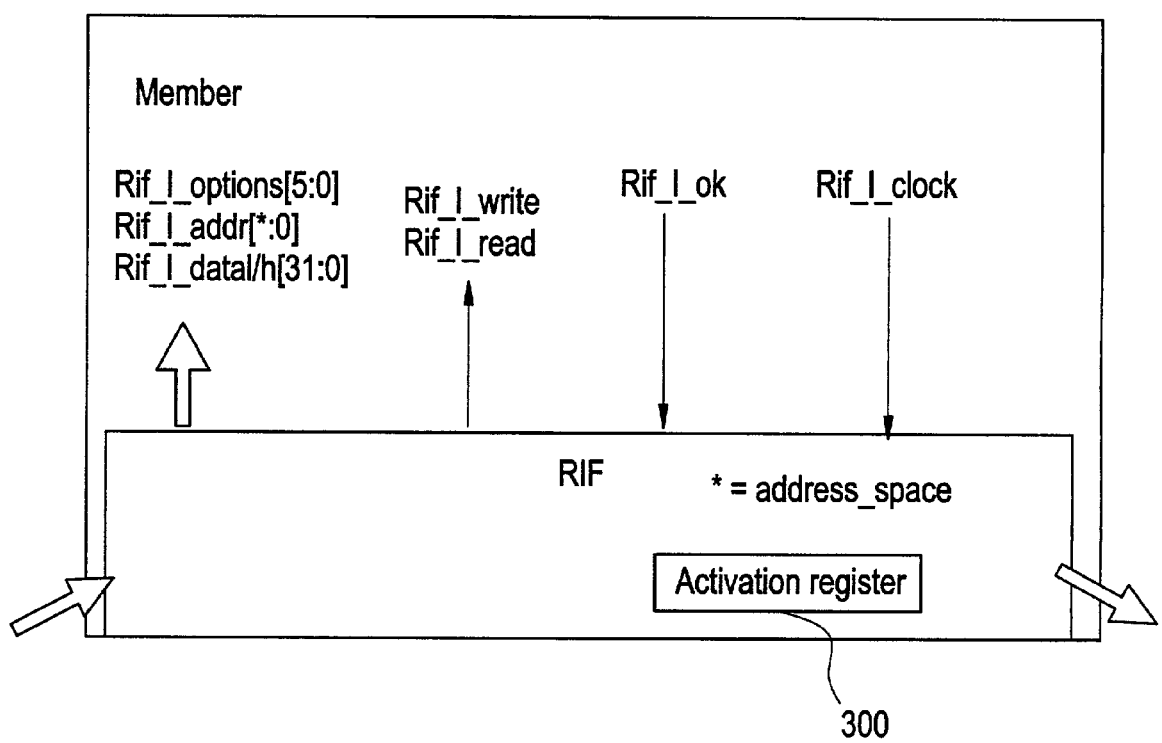
Figure 32:
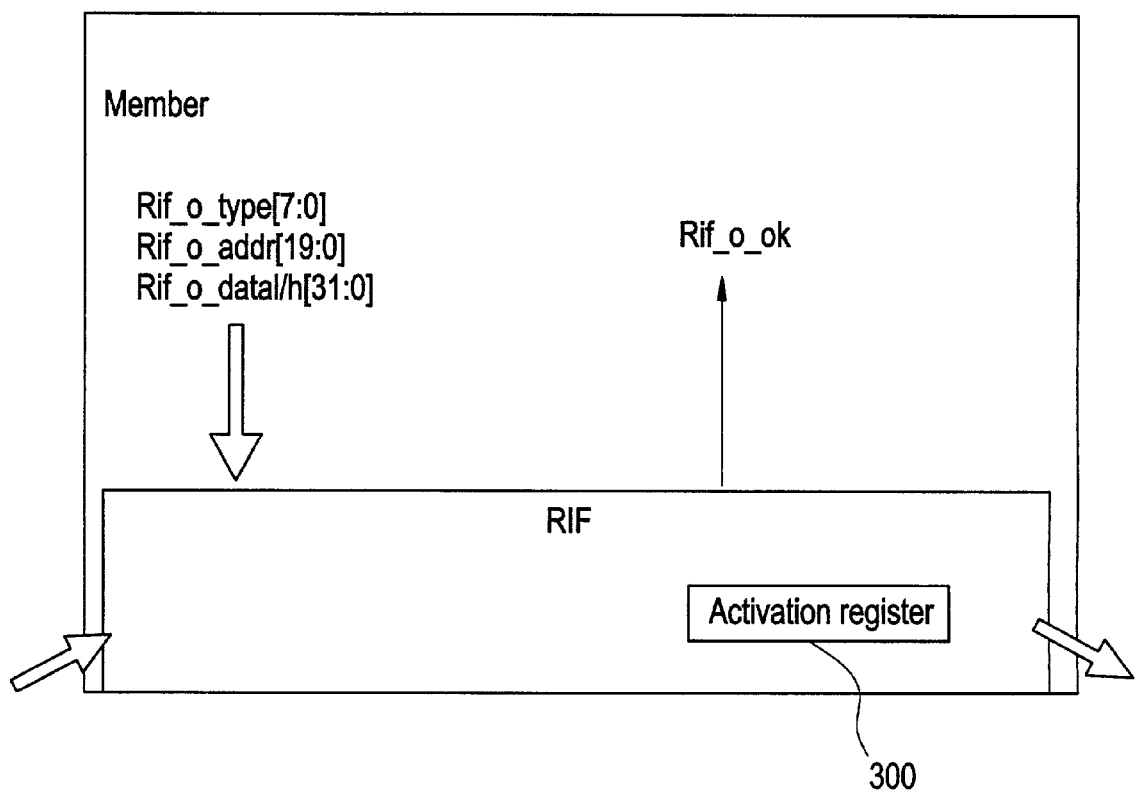
Figure 33:
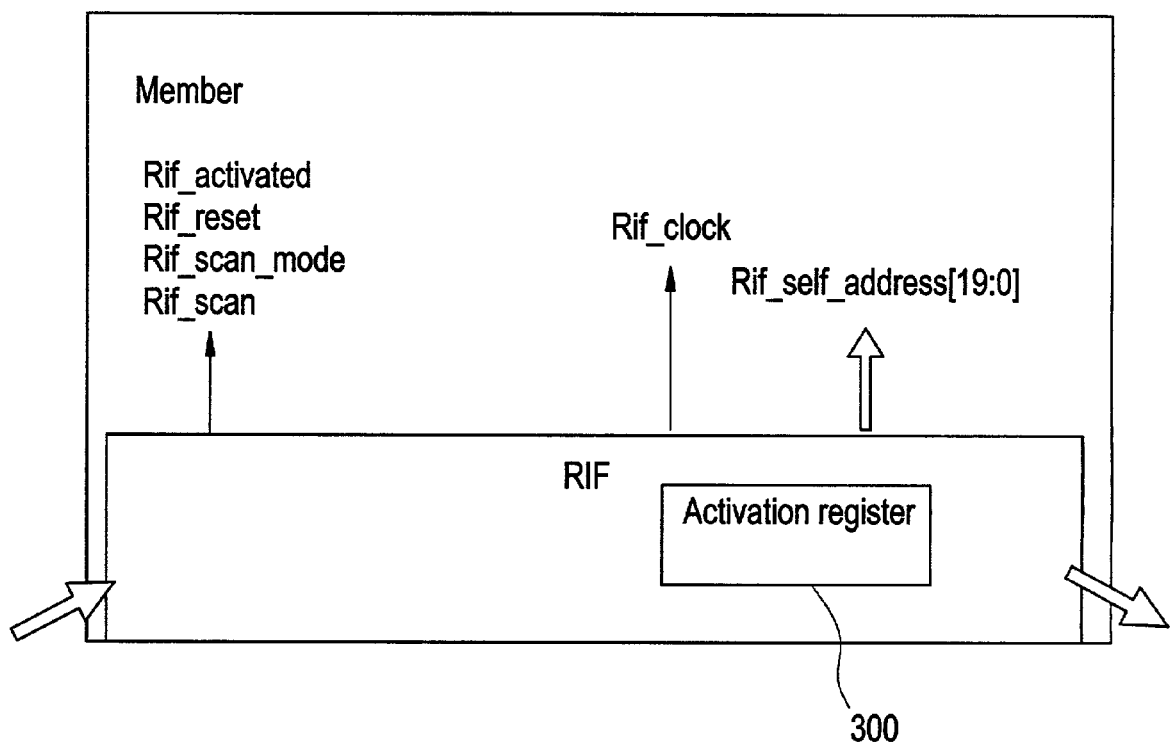

Referring now to FIG. 29, an exemplary process for routing of incoming messages is illustrated in accordance with at least one embodiment of the present invention. As illustrated, incoming messages to a module are examined first to determine if the message is a supervisor or work/program message. Using the address field 290, the intended address of the message can be determined. Since, in one embodiment, the address of the module is aligned to a power of two, an address mask 292 (referred to as split mask) may be used to compare only a subset of the bits of the address. The lower part 294 of the address is passed into the module as an internal address. The subset of bits are compared against a self-address register 296 containing the addresses associated with the module (obtained during the enumeration process). If the subset 294 matches the self-address register 296, the module can consider the message to be addressed to the module. Using the ours/through indication to create the correct DOK (down ok) signal, the above discussion ignores the supervisor messages. Some of supervisors make different use of the address field, when they apply to all members (Enumerate). Some of the supervisor messages are responses from members. These messages carry address of the sender.

Referring now to FIGS. 30–33, exemplary implementations of the RIF 300 are illustrated in greater detail.

The main RIF registers include:

self_address_valid bit flipflop: indication that Enumeration was run and address assigned;

self_address: value of self address. This register typically is 20 bits although fewer bits may be used, as the lower part of this register typically is zero;

idnumber: a constant parameter used to identify the associated member;

ADDRESS_SPACE: this is the number of bits used by internal address space. It is used to calculate the address space claimed by the ring member.

activated bit : This bit is reset at hardware reset and modified further by activate messages. If this bit is active, the ring interface is in work mode. It will process work messages. If this bit is inactive, the ring member should wait for programming or activation; scan_enabled bit in activation register: turns the module into scan mode. Reset by hardware reset, further modifiable by activation messages.

in_vivo scan and related: scan out of all registers during interruption of normal work. This is done on per module basis.

RIF Signal Descriptions

By convention, the term input refers to a signal entering a ring interface and output refers to a signal driven by the ring interface.

The pins to a subsequent ring member/from a previous ring member include:

rif_d_type[7:0]: input, message type rif_d_addr[19:0]: input, message address rif_d_data[63:0]: input, message data rif_d_ok: output, backpressure, goes back to previous member rif_d_clock: input, clock in signal rif_d_scan: scan mode enable (the actual muxing signal, not test mode)

rif_d_reset: input, h/w reset rif_d_passed_me: input, indicates that message passed through bridge or Anchor already Pins for messages entering the ring member include:

rif_i_write: output, this message is valid write and can come from a program or work write. The RIF module modifies the options bits (see below) in case of program write.

rif_i_read: output, this message is valid read.

rif_i_options[5:0]: output, rest of the bits of type in the message. These bits are relevant to more sophisticated members, snooping on last and such. For simple members they do not have to be used. Option bits have one out of two possible interpretations. One for read and one for write. For write: snoop, last and size. For read: enable snoop, width of the response (64 bit or 32 bit, for example), enable last address modification (end of frame indication), enable first address modification (start of frame) and increment destination. Discussed above with reference to message type encoding.

rif_i_addr[15:0]: output, relevant part of address rif_i_datal[31:0]: output, relevant part of data low rif_i_datah[31:0]: output, relevant part of data high rif_i_ok: input, tells the RIF that message is accepted by member. On the next clock, a new message may be sent.

Control pins entering the RIF include:

rif_activated: output, reflects activated bit in activation register, if not enabled this bit prevents work messages entering/exiting the member. Also, peripherals should not start transmit/receive operations with this bit disabled.

rif_reset: output, either hard reset or soft reset;

rif_scan_mode: output, reflects scan bit in activation register if enabled, this member is under scan test;

rif_scan: output, scan muxing signal if enabled, in shift of scan operation, if disabled with mode, means capture;

rif_self_address[19:0]: output, self address;

rif_clock: clock for local flipflops;

rif_user_id[1:0]: user defined modifier of module ID input;

rif_user-control[3:0]bits from activation register for user definition and use;

Pins for messages going to the next member of the ring include:

rif_u_type[7:0]: output;

rif_u_addr[19:0]: output;

rif_u_datal[31:0]: output, data low;

rif_u_datah[31:0]: output, data high;

rif_u_ok: input, back pressure from next member;

rif_u_clock: output, clock out signal;

rif_u_scan: output, scan mode enable (the actual muxing signal, not test mode); rif_u_reset: output, hardware reset;

rif_u_passed_me: output, indicates that message passed through bridge or Anchor already; Pins for messages exiting the member include:

rif_o_type[7:0]: input, message type bits (type[7:3] !=0) act as valid indication;

rif_o_addr[19:0]: input, message address;

rif_o_datal[31:0]: input, message data low half;

rif_o_datah[31:0]: input, message data high half;

rif_o_replace: input, request to replace the relevant part of datal with self address bits;

rif_o_ok: output, tells the member that message is accepted by RIF;

Anchor RIF interface

The Anchor RIF interface, in one embodiment, is a variation on the RIF interface used by regular ring members. It has one more state variable—active/passive Anchor. If the Enumerate message comes through dmessage inputs, then an Anchor declares itself passive. If Enumeration message comes from omessage input, then the Anchor declares itself an active Anchor. An active Anchor consumes all supervisor messages, whereas in regular RIFs, supervisor messages are ignored by passing them all to imessage output. For work messages there is another difference. Anchors have self-address space like any other ring member. Work messages addressed to Anchor address space are consumed. Anchors also participate in stray message kills (as discussed above). If message addressed above (or below) Enumerated address space, it will be caught and discarded by the Anchor.

Bridge RIF

A primary function of the Bridge to direct traffic between rings. During Enumeration, the Bridge learns all it has to know about the topology. Signal interfaces of a bridge are identical to two sets of regular RIF. The only exception is clock, which has a tree-topology. Other tug-along signals, like scan, take the longest (crossover) route. From a hardware point of view bridge can be viewed as two RIFs connected back to back. However, the bridge provides additional functionality. For one, the bridge records the first input to receive the Enumeration message. The end lucky to get hit first by Enumeration is labeled near, because it is closer to the Anchor. The other end is labeled far. Also the incoming Enumeration address is recorded as low range. The Enumeration message is sent to the other far side. When it returns on the far side dmessage input, The address is recorded again as high address. At this point bridge is ready to work.

During normal operation, Supervisor request messages, in one embodiment, are crossed to the other side. Supervisor response messages are moved to near umessage output. Program write messages and Program read requests are treated as work messages. Program read responses are moved to the near umessage output. Work messages are routed based on low/high bounds. If message address is between low/high bounds it is moved to the far umessage output. Otherwise the near side gets it. The far side also participates in detecting and removing stray messages.

In one embodiment, messages appear to member module through rif_i_* signals.

These signals include:

rif_i_write: changes just after rising edge of the clock. if active means valid write message arrived. Valid means correct type and context, The user does not have to worry about decoding message types and such;

rif_i_read: changes same, means valid read message arrived;

rif_i_options[5:0]: bits extracted from type part of the message. For read they mean snoop, width, last, first and increment and for write they mean last, snoop and size bits;

rif_i_ok: member generates positive acknowledge to ring interface. This signal should be valid (or negated) shortly after rif_i_read or rif_i_write become valid. If OK is negated during this cycle, on the next cycle same message data will be driven. Members should make every effort to keep this signal very active;

rif_i_addr[19:0], rif_i_datal[31:0] and rif_i_datah[31:0]

General controls entering a RIF include:

rif_clock: clock;

rif_reset: reset;

rif_activated: member received ok to operate. This signal is useful for Rx peripherals, not to start bothering anyone without activation;

rif_self_address[19:0]: self address on the ring;

Constant controls exiting a member and entering ring_control include:

module_id[7:0] these two bits can be used by members to tell the system something specific about themselves. For example Ethernet MACs can use one of these signals to tell the world if they are 10 or 100 mbit connected;

rif_o_type[7:0] is the type of outgoing message;

rif_o_addr and rif_o_datal/datah are rest of the message bits;

rif_o_ok: if in current cycle this signal is inactive (low), don't change the message on the next positive edge.

Ring_control parameters include:

ring_interface_unit (also called ring_control) has 2 parameters, which should be set at verilog instance time. ADDRESS_SPACE: this number signifies the number of internal address lines that should enter the member. For example, member has internal memory map of 256 bytes it needs 8 address lines to address this space. Its ADDRESS_SPACE should be set to 8. It also means that to recognize a message to this member the 12 most significant bits of the message address are used. MODULE_ID: each hardware ring member gets, for example, 8 bits for a unique ID. This ID is unique to all instances of the same hardware, for example, all Ethernet MACs have the same ID. To distinguish between different MACs, self_address and user_id bits can be used. Module ID can be examined by Anchor using Who_Am_I messages. Module ID typically is part of the response by any module.

Reset on the Ring

Each ring-based SOC typically has only one Anchor. The hardware reset starts at this Anchor. The Anchor has a hw_reset input pin. From this pin, reset is sent in two directions. One direction is down the ring. The other direction is to the module that hosts the Anchor, for example, a packet processor. The reset propagates through the ring in the logical ring order. It is the same path all supervisor messages take, although the reset is a signal rather than a message. However it is unconditionally flip-floped at each ring member. It is also possible to force soft reset on ring members using Activate messages.

In accordance with one embodiment of the present invention, a rings-based system is provided. The rings-based system comprises a plurality of ring members on a ring network that communicate using point-to-point connectivity, a message traversing the ring from member to member, wherein the system is adapted so that upon the message arriving at a given ring member the message is processed by that ring member if the message is applicable to that ring member, and if the message is not applicable to that ring member, the message is passed on to the next ring member, and where the message causes a reset, such as a soft reset, of the given ring member if the message is applicable to that ring member. The message preferably includes address information corresponding to the given ring member. The message can include an activate message that includes at least one bit for causing a reset.

The message, in one embodiment, causes a reset by writing at least one bit from the message into a ring interface for the given member. In this case, the ring interface can includes a bit that is reset by the message, where the bit preferably includes an activated bit or a reset bit. The ring interface can be adapted to provide an output to the given ring member for causing the reset, wherein the output preferably includes a control pin coupled to the given ring member.

In accordance with another embodiment of the present invention, a rings-based system is provided. The rings-based system comprises a plurality of ring members on a ring network that communicate using point-to-point connectivity, a message traversing the ring from member to member, wherein the system is adapted so that upon the message arriving at a given ring member the message is processed by that ring member if the message is applicable to that ring member, and if the message is not applicable to that ring member, the message is passed on to the next ring member; and wherein the system further comprises a reset control signal that causes multiple members of the ring network to be reset (such as a hard reset).

The reset control signal can include a hardware signal that is sent independent of the message. Furthermore, the reset control signal can be sent on a different line from the message. The reset control signal can be adapted to cause all ring members except for the member from which the reset signal originates to be reset. The reset control signal, in one embodiment, causes a reset by causing the reset of bits in ring interfaces corresponding to the multiple members. In this case, the ring interfaces can provide an output to their corresponding ring members to cause the resets, where the outputs can include control pins coupled to the corresponding ring members.

In accordance with an additional embodiment of the present invention, a rings-based system is provided. The rings-based system comprises a plurality of ring members on a ring network that communicate using point-to-point connectivity, a message traversing the ring from member to member, the system being adapted so that upon the message arriving at a given ring member the message is processed by that ring member if the message is applicable to that ring member, and if the message is not applicable to that ring member, the message is passed on to the next ring member, wherein the system includes a message that can cause a reset of the given ring member if the message is applicable to that ring member, and wherein the system further includes a reset control signal that causes multiple members of the ring network to be reset. The message that can cause a reset can cause a soft reset of the given ring member, wherein the reset control signal causes hard resets of the multiple members.

Message Types and Formats

Messages come in roughly four categories:

Supervisor requests—include reset, Enumerate, Who_Am_I requests, activate, freeze. These messages are generated by Anchor and are flooded through the network.

Supervisor response—include Exception, WhoAmI_response. These supervisor messages are generated by regular members and float to the Anchor for its attention.

Programming—include regular work write and read messages.

Work—includes work_read and work_write.

The Enumerate message: The Enumerate (or Enum) message is initiated by the active Anchor. In each ring system there is only one active Anchor. Anchor decides it active, if it is told to start the Enumeration through omessage inputs. The message can include a header field, a data field, a next available address field, a ring ID, and the like. The ring ID is bit flipped every time the message crosses a bridge. It is recorded in activate register in every ring interface. This bit can later be used by software to determine the exact ring topology.

Who_am_I message: To learn the topology, Anchor starts WhoAmI_request message. Each member that receives this message, firstly responds to it, then relays the request message. This order assures that Anchor will see the request message only after all responses. Thus it can determine that the WhoAmI process ended. In request message the field typically used is the type field. The address part of the message is the module's Self_Address. The data field holds info about the module.

Activate message: The Activate message is issued through the Anchor. It carries the address of a specific member and a few bits in the data field used to write the activation register. The bits in the activation register control the state and behavior of the members.

Freeze message: The freeze message unclogs rings and deactivates all members.

Tools for Module and Ring Network Builders

Write Ahead Mode—Read operations in a rings-based architecture typically is much more time consuming than write operations. Accordingly, in another inventive aspect of at least one embodiment of the present invention, status registers are usually inspected by CPUs before sending or receiving data. It generally is desirable to get status fast. The delay of two-way trip from CPU to peripheral and back often is unacceptable. The present invention provides that the peripheral, every time its status changes, sends it ahead to one or more pre-arranged locations in a CPU's RAM or other device. The extension of this idea is to change every critical read to send-ahead write. In essence, every time important parameter changes in some perihperal, its value is written to an agreed memory in the asker space. For example, the CPU needs to know how many free entries are there in a Utopia fifo. Instead of doing read operation initiated by CPU, the fifo, each time this number significantly changes, will write it in some agreed location of CPU's RAM. The CPU now only needs to read its local memory.

To implement the above write ahead modality, a rings-based system on a chip is provided in accordance with one embodiment of the present invention. The rings-based system comprises a plurality of ring members on a ring that communicate using point-to-point connectivity, a message traversing the ring from member to member, where the system is adapted so that upon the message arriving at a given ring member the message is processed by that member if the message is applicable to that ring member, and if the message is not applicable to that ring member, the message is passed on to the next ring member. The system also is adapted to process both read messages and write messages. The plurality of ring members includes a CPU and at least one peripheral that exchanges date with the CPU, wherein the peripheral includes at least one status memory that stores data describing the status of the peripheral, and where the system is configured to write ahead status changes that are accessible by the CPU.

The system also can be adapted to perform write ahead status changes that would otherwise be initiated by the CPU as read operations. Likewise, the write ahead operations can be programmed to occur based on read operations that would otherwise be initiated by the CPU on a regular basis. The system can be adapted to write ahead status changes to a RAM on the CPU or a RAM that is accessible by the CPU. The CPU can comprise a control protocol processor in a communications chip or network processor in a communications chip. The status memory may comprise at least one status register.

In at least one embodiment, the write ahead operations are performed for some peripheral status changes but not other peripheral status changes. Additionally, the write ahead operation is performed or not performed depending on the nature of the status change. Alternatively, the write ahead operation is performed or not performed based on the magnitude or the quantity of the status change.

In accordance with another embodiment of the present invention, a write-ahead method in a rings based communication system, such as a communications processor or a network processor, is provided. The method comprises identifying at least one module in a ring network that includes status registers that store status information of regular interest to a processor in the ring network, identifying which status information can be transmitted to the processor as a write ahead operation initiated by the at least one module instead of a read operation initiated by the processing, and programming the at least one module to transmit the identified status information as a write ahead operation. In one embodiment, the step of programming causes the average number of read operations initiated by the processor to decrease.

In one embodiment, the identification comprises identifying which status changes are of critical importance or of regular interest to the processor. Alternatively, the identification can include identifying what magnitude or level of status change will cause the write ahead operation.

Land Bridges—Most members on a ring typically communicate in an asymmetric way. For example, EnetRx (Ethernet receiving) traffic is mostly from a peripheral to a packet processor. For EnetTx (Ethernet transmitting) it is the other way around. Pair of members is asymmetric if one is mainly the sender and the other is mainly the receiver in their relationship. In this case it makes sense to put the sender upstream from the receiver. But some pairs are almost symmetric. A packet processor paired with a DMA is such an example. As such, no matter how they are placed on a ring, one direction is bound to suffer. In this case, one or more land bridges generally will provide the solution.

Figure 34:
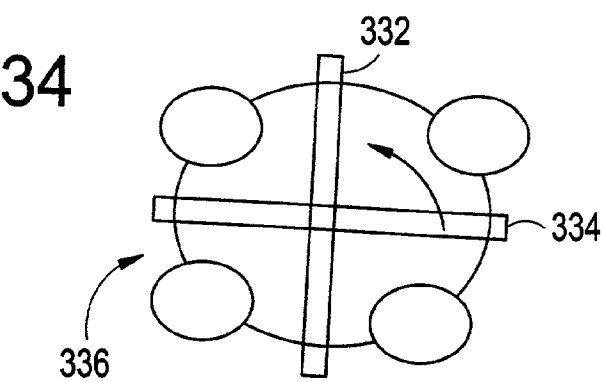

As discussed previously with reference to FIG. 14, a single land bridge can be added to minimize latency between two members of a ring. As illustrated in FIG. 34, two or more bridges 332, 334 may be added to a ring 336 to further minimize the number of modules between any two ring members. Although each bridge 332, 334 adds two interfaces (members) to the ring network, this generally will not affect the latency significantly since a message is unlikely to travel the entire perimeter of the ring network due to the bridges.

Implementation of an External Ring Interface

Figure 35:
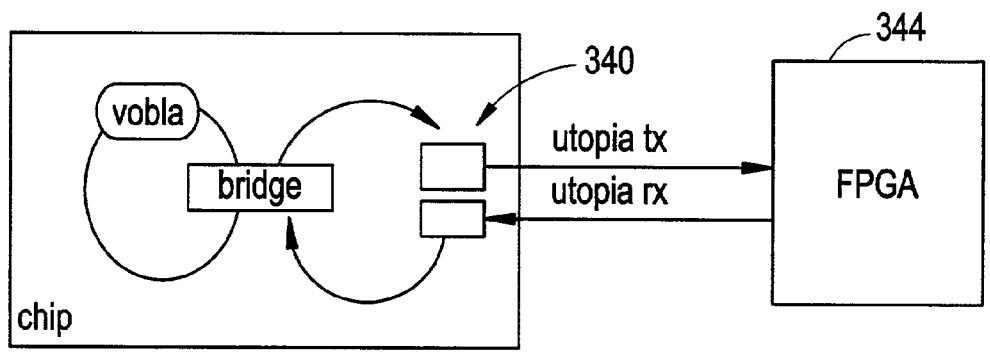

Referring now to FIG. 35, an exemplary external ring interface 340 is illustrated in accordance with one embodiment of the present invention. Ring connections between two members can include more than 100 signals. Each message can include, for example, at least 104 signals. Therefore, it may be unreasonable to add this amount of pins (twice) to implement the external ring interface. As such, it may be preferably to implement a dual purpose peripheral interface 340, such as Utopia. Normal mode of operation for an Utopia interface is sending/receiving ATM cells. In a similar manner, two rings networks, such as two network processors, can be connected with Utopia interfaces back to back. In this mode, instead of cells, Utopia pins will convey messages. This will slow the specific ring speed, but not the chip speed since if the Utopia interface is behind a bridge, only messages to the other side are slowed down, not the internal messages. Using Utopia infrastructure for this, also enables us to connect an external FPGA 344 (Field-Programmable Gate Array) as a new peripheral.

The following is non-inclusive list of some of the identified advantages associated with the rings topology of the present invention: high speed circuit design—all connections are point to point unidirectional connections; scalability—once the address routing is resolved the actual topology can be changed relatively easily; the switch fabric is transparent to software, only delays are affected by the topology; typically easier to implement than crossbar or switch design; debug and test visibility—each member can be examined and operated alone; possibility of late processing load balancing—different peripherals can be assigned to different CPUs; and the possibility of no need for precise across-the-chip clock alignment—clock can be adapted to run along messages.

Although any of a variety of CPUs may be implemented as a module of the ring network topology described herein, ring networks are particularly well-suited for packet processors, various embodiments of which are described in detail below. The packet processor of the present invention may on occasion be referred to herein as the Vobla, the network processor, and similar variations. According to one embodiment, the network processor of the present invention may be implemented as part of a communications processor having multiple modules that are interconnected using the rings architecture described above. The modules in such an arrangement for a communications processor may include the network processor of the present invention (for data plane processing of packets), a control packet processor (for control plane processing as a flow manager), various peripheral modules, and so forth.

In accordance with one embodiment of the present invention, a rings-based system is provided. The rings-based system comprises a plurality of ring members on a ring network that communicate using point-to-point connectivity, a message traversing the ring from member to member, where the system is adapted so that upon the message arriving at a given ring member the message is processed by that ring member if the message is applicable to that ring member, and if the message is not applicable to that ring member, the message is passed on to the next ring member; and the system further comprising means for providing an external ring interface that enables communication with at least one external peripheral device. The means can comprise a field programmable gate array and/or a memory port ring member on the ring network. The at least one external peripheral device can include one or more of a DSP, encryption engine, external bus, external memory, a second ring network, and the like.

In one embodiment, the means is adapted to perform handshaking between the protocols of the ring network and the at least one external peripheral device, wherein the handshaking preferably includes converting message data from the ring network into transaction data. The means also can be adapted to allow the ring network to write out messages to the at least one external peripheral and the at least one external peripheral to generate transactions converted into messages for the ring network.

The means, in one embodiment, operates as a shared memory between the ring network and the at least one external peripheral. In this case, the means may include a memory that operates as a RAM for messages received from the ring network and as a FIFO for transactions received from the at least one external peripheral device. The means also may include a memory, wherein the ring network can write data to an address in the memory to cause an interrupt in the at least one external peripheral device.

In one embodiment, the ring network is a first ring network on a first chip, where the rings-based system further comprises a second ring network on a second chip, and wherein the first ring network and the second ring network interface through the means to the at least one external peripheral device.

Alternatively, the ring network can include a first communications processor including a first protocol processor and a second network processor, and the system can further comprise a second communication processor including a second protocol processor and a second network processor, wherein the first communications processor and the second communications processor interface through the means to the at least one external peripheral device.

In accordance with yet another embodiment of the present invention, a network processor implemented on a chip is provided. The network processor comprises means for processing a plurality of protocols including ATM, frame relay, Ethernet, and IP, said means being programmable using a set of library commands to process additional protocols, and wherein said means comprises an arithmetic logic unit (ALU), a load/store unit (LSU), a preload/bump unit (PBU), a register file unit (RFU), an agent interface, and an internal memory. The network processor, in one embodiment, further comprises a fetch unit and a program sequencer.

The ALU can be adapted to perform arithmetic and logic operations on data operands. The LSU can be adapted to perform address calculations in order to address data operands in the internal memory. The LSU calculates an effective address according to one of five available options, including: (1) effective address is the content of a register from the RFU; (2) effective address is the sum of content of a first register from the RFU and content of a second register from the RFU; (3) effective address is the sum of content a first register from the RFU and content of a second register from the RFU after the second register is shifted by a specified number of bits; (4) effective address is the sum of the content of a register from the RFU and a displacement that occupies a specified number of bits in an instruction word; and (5) effective address is an absolute address included in the instruction word. The PSU, in one embodiment, performs decoding of instructions received from the internal memory. The fetch unit can be adapted to control what instructions are fetched from memory for decoding by the PSU. The internal memory can be adapted for storing program information and data.

The RFU, in one embodiment, comprises a first register file for a current task and a second register file for preloading register values for a next task. In this case, data may be read to or written from the first register file based on a comparison between a current task ID and a task ID associated with the first register file. The RFU also can comprise a third register file for storing register values for the current task that are not stored in the first register file. In this case, data may be read to or written to the third register file when the current task ID and the task ID associated with the first register file are not the same. In one embodiment, a task switch is performed by the network processor by making the next task the current task and preloading a further next task. The performance of a task switch can include treating the second register file as the third register file after the task switch.

The agent interface, in one embodiment, allows the network processor to interface to external modules for executing instructions, where the external modules can include one or more of a CRC module, encryption module, hashing module, and table lookup module.

In yet another embodiment of the present invention, a communications processor implemented on a chip is provided. The communications processor comprising a network processor including means for processing a plurality of protocols including ATM, frame relay, Ethernet, and IP, said means being programmable using a set of library commands to process additional protocols, wherein said means comprises an arithmetic logic unit (ALU), a load/store unit (LSU), a preload/bump unit (PBU), a register file unit (RFU), an agent interface, and an internal memory. The communications processor further comprises a protocol processor for controlling the network processor, wherein the protocol processor performs control plane processing and the network processor performs data plane processing. The network processor can be adapted to process instructions by performing a fetch, decode, address, execute, and a write.

In one embodiment, the network processor and the protocol processor are ring members on a ring network, and further comprising a plurality of other ring members on the ring network. In this case, the network processor includes a plurality of compounds that share a single ring interface to the ring network, wherein the compounds can include, for example, a doorbell agent for controlling the execution sequence of tasks for the network processor. The compounds also may include a multireader agent for servicing requests to read data from the internal memory, a message sender agent for sending messages onto the ring network, a DMA agent for sending messages to initiate a DMA controller on the ring network, a CRC agent for performing CRC calculations, and/or a debug module. Generally, a packet processor includes the following capabilities that are typically not found in general purpose microprocessors:

Zero overhead task switching—Usually, each interface (I/f) port would require at least 2 tasks (RX [receive], TX [transmit]) to handle the datapath processing. A system that includes several ports would require about two or more active tasks for each port. As such, the packet processor should be able to switch tasks with minimum overhead. The packet processor may allocate shadow memory (4–8 tasks) to store registers and task status. The priority scheme to choose the next_task_to_run is hardware (HW) based and is not performed by software (SW) as in a RISC (Reduced Instruction Set Computer) model.

Parallel engines—Processing of packets can use parallel machines to accelerate performance. Examples for this capability include DMA, CRC, Lookup engine, and Peripheral Transfer Machine. A well-built packet processor would have the mechanism in place to issue and receive synchronically transactions to parallel machines without stalling the packet processor.

Data movements—Packet processing require data movements from First-In-First-Out (FIFO) memory to internal memory, and from internal memory to external memory and vice versa. This is performed using parallel Direct Memory Access (DMA) machines. Data transfers should be optimized and deterministic within boundaries. Hence the right mechanisms have to be in place between the DMAs and the packet processor to allow the transactions between the engines and to ensure deterministic behavior.

Scalability—One way to scale the throughput of a packet processor is by instantiating several engines. Hence, it is desirable that the programming model and the system architecture be flexible enough to accommodate scalability.

Special instructions—Packet processing uses special operations that are not common for a general purpose processor. Instructions like Compare immediate under mask (to match specific bits), activation of parallel engines using instructions like CRC, DMA, HASH, LIST SEARCH, and mechanisms such as Sticky bits for compare and jump, are derived from the needs of packet processing.

I nter-task communication—Inter-task communication is supported by the architecture. Traditional RISC machines generally use SW for this communication.

Efficient link list operation—Data structures like link lists, queues and buffers are common in communication systems. A flexible packet processor should be able to manage a large number of different queue types in an efficient and quick way.

Exemplary processing requirements

According to one aspect of the invention, the flexible packet processor should support processing of the following: ATM, Frame Relay (FR), IP/Ethernet, IWF (TDM to Packets), AAL2 for wireless base stations, IP, and MPLS.

ATM is by far the largest access method in the access space. A packet processor in the space should to be able to terminate ATM virtual circuits (VCs) Customer Premises Equipment (CPE) and should be able to switch ATM. ATM is of particular interest because a vast majority of the DSL approaches use ATM as the carrier technology. Frame Relay is of interest because it is commonly used in corporate access (e.g., using T1 s or NxT1 ).

After dominating the LAN space, Ethernet is becoming a cost effective technology for the Metropolitan Area Network (MAN). This simplifies the need for a costly router (no ATM) at the corporate edge. This is a new approach that ISPs (CLECs [Competitive Local Exchange Carrier]) use as a way to replace the old Telco access (leased lines). However, Ethernet access does not solve the issue of how to deal with corporate voice. Typical requirements for IP/Ethernet would be IP routing and Ethernet bridging at 100 Mbps and approaching 1 G-Enet.

Packet processing for inter-working functions (IWF) (e.g., TDM to packets) is typically found in Voice Gateways (VG) and in Wireless Base Stations (WBS). The VG interface the POTS (plain old telephone system) network on one side and the packet network on the other side. Voice calls are modified (compressed and packetized, or uncompressed and circuitized) between the networks. Hence typical processing requirements at the VG include: termination of AAL2 streams; support for CES (Circuit Emulation Services) (AAL1) to emulate T1 services; termination of RTP (Real Time Protocol) (VoIP) packets; and the like AAL2 processing may find useful application for Wireless Base Stations. New generation WBSs use ATM as their backbone network. To optimize bandwidth, AAL2 may be chosen to carry both voice and data. In that case, the following processing requirements result: AAL2 Termination at the BTS (Base Transceiver Station); AAL2 Switching the BTS and at the MSC (Mobile Switching Center)/BSC (Base Station Controller); AAL2 Termination is done at the MSC/BSC (OC-3 and IP is routed to ISP); and IMA (Inverse Multiplexing over ATM) is being used as the connection between BTSs and the MSC both for redundancy and for cost.

The flexible packet processor should handle IP because IP processing can be found in various applications in the access space, such as the following: ISP aggregation router; DSLAM for handling frames; Cable modem head end; Wireless base station; MPLS (Multiprotocol Label Switching) is a newcomer to the access space. It is being used for traffic management and for Quality of Service (QoS) control. It is desirable that access equipment support LSR (edge device) (Label Switched Router) for MPLS.

As demonstrated above, the access market requires different access methods. The access market has a need for IWF between these different methods, which, in turn, drives the requirement for unique processing capabilities. Also, the different market segments have many similarities regarding their processing requirements. Thus, a flexible packet processor according to the invention can form the basis of an access platform that is capable of addressing multiple applications in this space.

Architectural Overview of a Flexible Packet Processor

The flexible packet processor in accordance with various embodiments of the present invention is a general-purpose network processor core, allowing it to support many system-on-chip (SOC) configurations. A library of modules containing memories, peripherals, accelerators, and other processor cores makes it possible for a variety of highly integrated and cost-effective SOC communication devices to be built around the packe processor. Figures hows a block diagram of an exemplary SOC chip 350 made up of the network processor core 354 and associated SOC components (described below) according to an embodiment of the invention. Although not indicated in this configuration, a typical SOC can contain more than one network processor core 354.

Internal Memory Expansion Area (Internal Memory 352)—On-chip memories operating at full core frequency are connected to the network processor core 354 through this component. The internal memory is unified and can be used for both program and data storage. Different technologies such as SRAM or ROM can be used to implement the internal memory.

Network Processor Core 354—The network processor core is the processor in which the network data path application code is executed, and which may include: a program sequencer unit (PSU); a load store unit (LSU); a fetch unit (FTU); a data arithmetic logic unit (DALU); a register file (RFU) including support of fast task switching; a preload and bump unit (PBU) for efficient task switching and context save and restore; and the like. These components are discussed below in greater detail.

Figure 36:
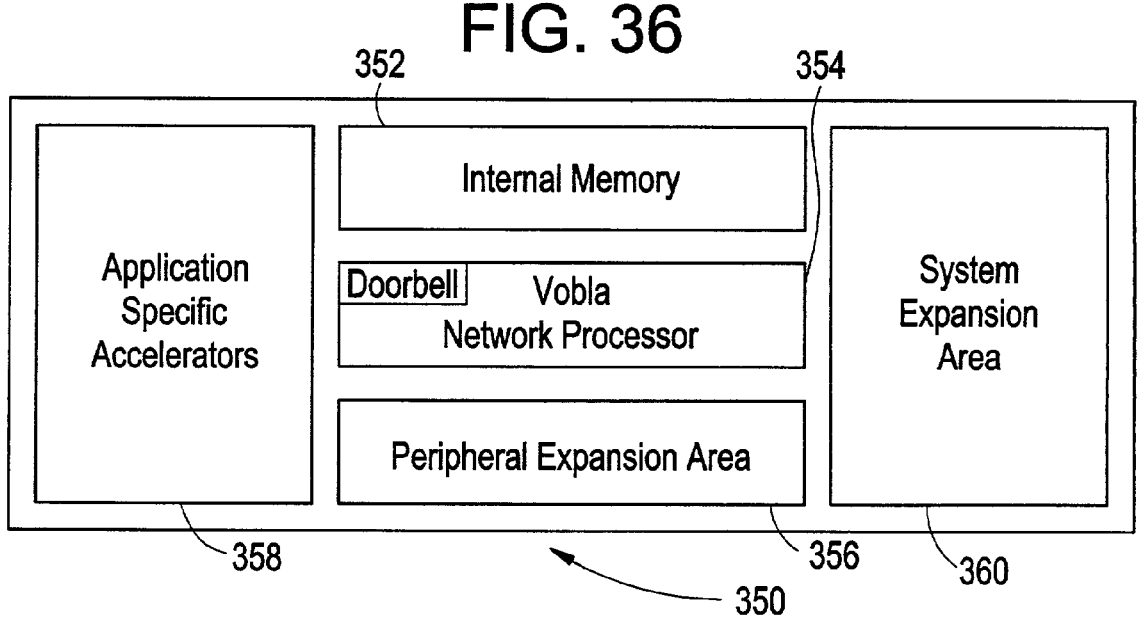
FIG. 36 is a block diagram illustrating an exemplary system on a chip utilizing a ring architecture in accordance with at least one embodiment of the present invention.

A companion (sometimes called a compound) that is tightly coupled to the network processor core is the doorbell scoreboard module (doorbell) shown in FIG. 36. The doorbell receives requests for service from peripherals, accelerators and DMAs, and then determines a next task ID once a task switch occurs in the network processor.

Peripheral Expansion Area 356, Accelerators 358 and System Expansion Area 360—These components shown in FIG. 36 include the functional units that interface between the network processor core and the application, including the functions that send and receive data from external input/output sources. In addition, these components include accelerators 358 that execute portions of the application in order to boost performance and decrease power consumption. These components are application-specific and may or may not include various functional units such as: a host interface; an external memory interface (e.g., SDRAM controller); a serial interface (USB, UART, SSI ([Synchronous Serial Interface], Timers); a communications interface (Utopia, MII); a CRC accelerator; a able look up coprocessor; Smart FIFO; a data pump; a direct memory access (DMA) controller; as well as other CPU cores, such as packet processors (PPs).

To provide the data exchange between the core and the other on-chip blocks or modules, the following ports may be implemented: data memory ports (address, data read and data write) used for data transfers between the core and memory; program memory port (address and data read) for fetching code from the memory to the core; agent port to support tightly-coupled external user-definable functional units such as peripherals, accelerators, DMA's, smart FIFOs, and so forth; and a context memory port (address, data read and data write) used for the preload and bump of registers for fast task switching.

Figure 37:
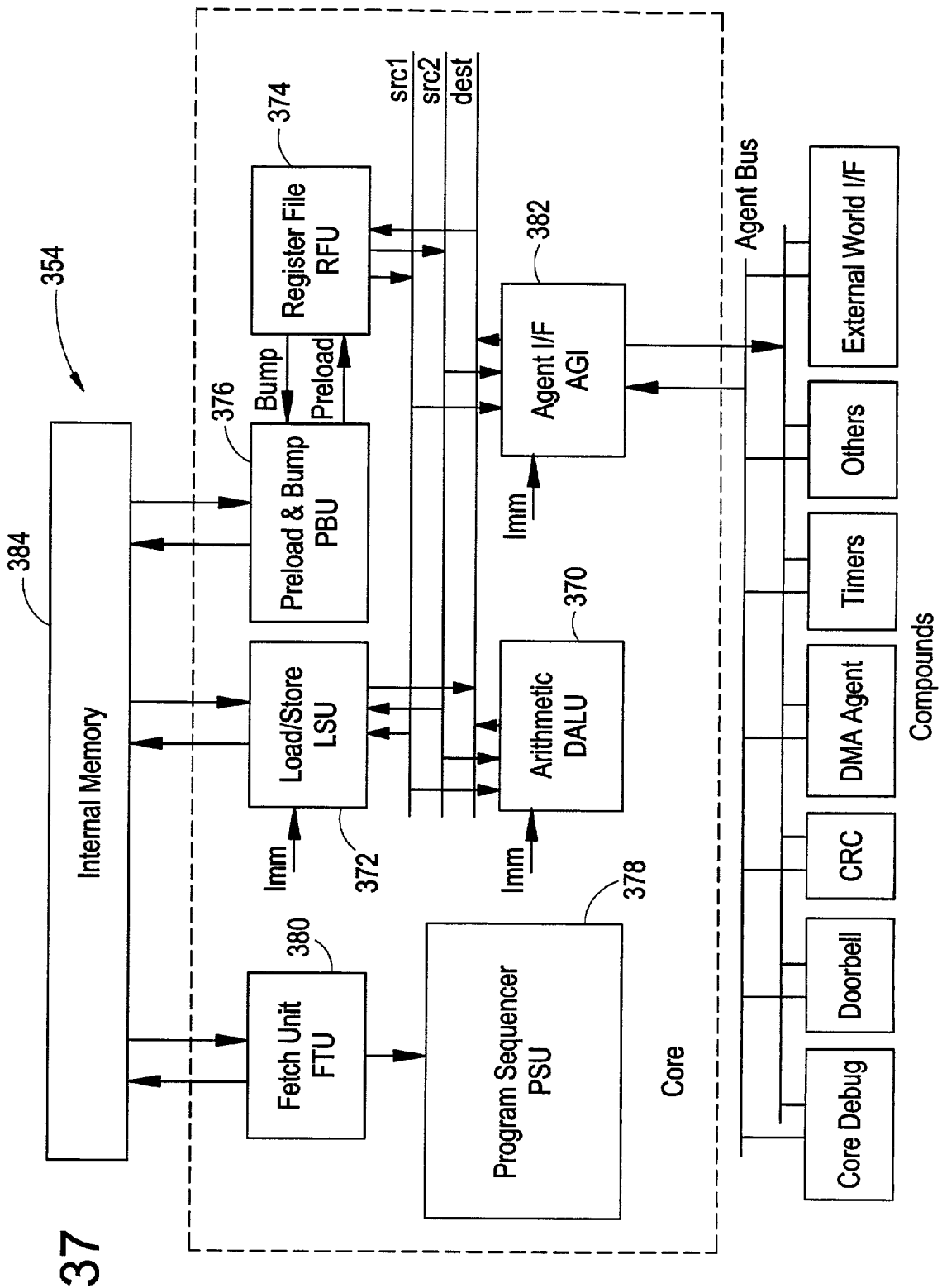
FIG. 37 is a schematic diagram illustrating the exemplary network processor of the system on a chip of FIG. 36 in accordance with at least one embodiment of the present invention.

Referring now to FIG. 37, the network processor core 354 is illustrated in greater detail in accordance with at least one embodiment of the present invention. As discussed above, the network processor core, in one embodiment, includes the following:

Data Arithmetic Logic Unit (DALU or ALU) 370 The DALU 370 (also referred to as the ALU below) performs the arithmetic and logical operations on data operands in the network processor core. The data registers can be read from or written to memory over, for example, a 32-bit wide data bus as 8-bit, 16-bit, or 32-bit operands. The source operands for the ALU 370 are 32 bits wide and originate either from data registers or from immediate data (Imm). The results of ALU operations are stored in the data registers.

According to one aspect of the invention, ALU operations are performed in one clock cycle. The destination of each arithmetic operation can be used as a source operand for the operation immediately following the arithmetic operation without any time penalty. In one embodiment, the components of the ALU 370 are as follows: an integer arithmetic unit for 32-bit non-saturated three-operand arithmetic operations; a logic unit for 32-bit logic operations; a bit field unit (BFU) for multi-bit shift, rotate, swap and bit-field insert and extract operations; and a condition code generation unit.

The ALU 370 may read two operands from the register file via the dual source bus (src1 and src2 in FIG. 37), or one operand from a register via the source bus and a second immediate operand via the immediate bus (Imm input to DALU on FIG. 37). The ALU 370 generates a result into a destination register via the destination bus (dest on FIG. 37).

The condition codes are optionally generated in the condition code register (part of the R1 register, discussed further below) depending on the instruction type.

The ALU 370 may support both signed and unsigned arithmetic. Most of the unsigned arithmetic instructions are performed the same as the signed instructions. However, some operations may require special hardware and may be implemented as separate instructions. When performing an unsigned comparison, for example, the condition code computation is different from signed comparisons. The most significant bit of the unsigned operand has a positive weight, while in signed representation it has a negative weight. Special condition codes and instructions may be implemented to support both signed and unsigned comparisons.

The Load Store Unit (LSU) 372

The LSU 372 performs address calculations using integer arithmetic needed to address data operands in memory. In addition, the LSU 372 generates change-of-flow program addresses. The LSU 372 operates in parallel with other network processor core resources to minimize address generation overhead.

The effective address (EA) used to point to a memory location for a load or a store is calculated according to one of the following options. According to one embodiment, only the 16 least significant bits (LSBs) of the calculation result are considered. The options for calculating the EA include:

Register indirect, No update (Rn): The EA is the content of a register Rn from the register file.

Indexed by register Ri (Rn+Ri): The EA is the sum of the contents of the register Rn and the contents of the register Ri.

Indexed by a shifted register Ri (Rn+(Ri<<m)). The EA is the sum of the contents of the register Rn and the contents of the register Ri after Ri is pre-shifted to the left by m bits.

Indexed by displacement (Rn+xx): The EA is the sum of the contents of the register Rn and a displacement xx that occupies m bits in the instruction word. The displacement is sign-extended and added to Rn to obtain the operand address.

Absolute address: The EA is the absolute address expressed in the instruction.

The Network Processor Registers

The network processor registers are classified into three types: General Purpose Registers (GPR); Special Purpose Registers (SPR); and Hidden registers (HR). The general purpose registers may be used by the programmer to load data from memory, execute arithmetic or logic operations, and store the data back into memory. The special purpose registers are registers that have an associated functionality, such as a task SPR, and so forth. Generally, SPRs may not be loaded or stored directly from/to memory. According to one approach, a dedicated move instruction can move data between general purpose registers and special purpose registers. Hidden registers are registers which are not exposed to the programmer, but reside in the hardware as part of the machine control (e.g., a current PC [Program Counter] register).

The General Purpose Register File 374

The network processor of the present invention includes a special register file architecture and a memory block that are capable of managing a large number of tasks (threads) with substantially no cycle penalty. The memory block has the capacity to store the register context of the tasks. The register file architecture performs a reduced number of context save and restore operations and enables each active task with its own context registers.

The benefits of this approach, discussed in detail below, include at least some of the following: support of nearly unlimited tasks; no cycle overhead for context save and restore operations upon task switches; transparency to the programmer; and cost-effectiveness and low circuit overhead.

One conventional approach to the multi-task switching issue provides that every task switch is accompanied by a context save and restore cycle, usually performed by software. This approach takes extra cycles. Another conventional approach uses special circuitry that allows access to the memory using wide busses, thus enabling multiple registers to be saved or restored at a time. This approach reduces the number of cycles, but complicates the interface to the memory (the Tricore CPU from Siemens uses this approach). Another approach uses multiple register files, one for each task. This approach has the disadvantage of limiting the number of tasks to the number of register files, and this is also a costly and limiting solution. The large number of register files can also impact the frequency of operation due to fan-out limitations. (Products using this approach include, for example, the Intel IXP12000 and Lexra NetVortex LX8000 Network Processor.) According to one approach taken by the instant invention, the programming model of the network processor core has 32 general purpose registers. These registers can be read from or written to over the memory data buses (e.g., referring to FIG. 37, the src1, src2, and dest buses). Source operands for ALU instructions originate from these registers. According to one beneficial aspect of the invention, the destination of an ALU instruction is a register and such a destination can be also be used as a source operand for a subsequent ALU instruction in the operation immediately following, without any time penalty.

At the heart of the network processor core 354 is a set of three register files and dedicated hardware that implements a mechanism for automatically saving and restoring the registers such that a task switch is accomplished with minimal overhead on the main flow. Upon entering a task, both the current and next task identification (task ID) are sampled. These three register files are as follows: the active register file—used to run the current task; the Shadow1 register file—contains the valid register values of the current task that do not exist in the active register file; and the Shadow2 register file—used to preload register values of the next task concurrent with the current task run. The active register file has 32 general purpose registers. These registers are part of the programming model and are exposed to the programmer. According to one approach, each register of the active register file has a 32-bit data field and a 6-bit tag field. The tag field holds the task ID, which identifies the task for which the data register value is valid.

The network processor core 354 includes a boundary register which specifies for each of the registers whether it is considered a global register or a general register. The global registers may store global values that can be shared among multiple tasks, or they may store temporal values that are not preserved when the task yields and resumes processing.

The Shadow register files (Shadow1 and Shadow2) are not part of the programming model, i.e., they are not exposed to the programmer. Each of the Shadow1 and Shadow2 register files includes, for example, 32 registers of 32 bits.

According to one approach, task switches do not require an explicit save/restore of the general registers. Saves and restores of the general registers are done implicitly by hardware according to the following mechanisms. In case of a write to a general register, the task ID associated with the register of the active register file is first compared to the current task ID. If the result is equality, this means that the register is maintained by the current task, and, therefore, the register is overwritten with the new value and the current task ID is marked in its tag field. A non-equal result means that the register contains valid data for a different task. In this case, the old register content is first sent to a write queue buffer to be saved in memory in a task ID context table, and then the new value is overwritten to the register and the current task ID is marked in its tag field.

In case of a read from a general register, the task ID associated with the register is first compared to the current task ID. An equal result means that the register contains valid data for the current running task, and thus the data is read directly from the register. A non-equal result means that the register contains valid data for a different task. However, the valid data for the current task for that register resides in the Shadows register file, as it was preloaded to Shadow2 concurrent with the execution of the previous task. As a result, the register value is read from the Shadow1 register file, and the register of the active register file remains unchanged.

A read or write access to a global register accesses the active register file directly without changing the register's tag. Concurrent with the execution flow of the current task, a special machine (the PBU 376 of FIG. 37) preloads the register values of the next task ID into the Shadow2 register file.

Upon a task switch request, the following actions should take place: the preload of the register values of the next task should be completed; the Bump buffer is emptied—all data which was sent to the bump unit is saved in the context table; the next task becomes the current active task; the Shadow2 register file becomes the shadow for the current task (Shadow1); and a new next task is sampled and a new preload procedure is initiated onto Shadow2. Special care should be taken (and special logic may be implemented) to prevent hazard cases. For example, a mismatch in the register value occurs if a register in the active register file is tagged for a task ID which is identical to the next task ID, and that register is accessed as a destination in the current task. In this case the register value should be first saved in memory in its context location and then overwritten with the new value of the current task. However, since the previous task is identical to the next task, it could be that the register value is already preloaded into the next task shadow register file (Shadow2). In this case, the preloaded value into Shadow2 is no longer valid.

Figure 38:
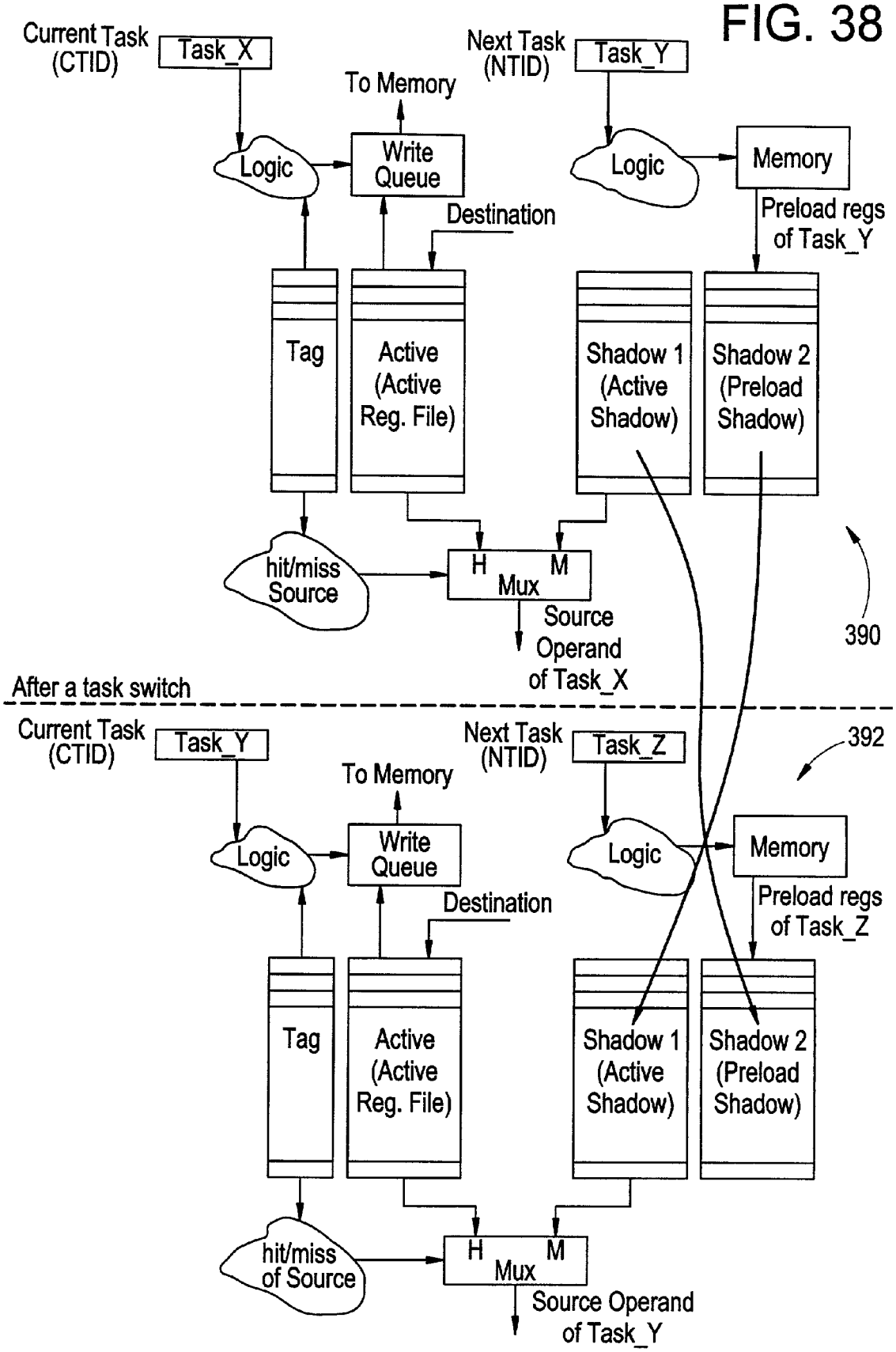
FIG. 38 is a flow diagram illustrating a low overhead task switch in a network processor in accordance with at least one embodiment of the present invention.

FIG. 38 illustrates the register files structure and a mechanism for low overhead task switch according to an embodiment of the invention in accordance with the discussion above. In the top half 390 of FIG. 38, the current task ID is Task_X, the next task ID is Task_Y. In the bottom half 392 of FIG. 38, after a task switch the current task ID becomes Task_Y and the next task ID becomes Task_Z.

In accordance with one embodiment of the present invention, a method for efficient processing of tasks in a communications system is provided. The method comprises sampling a current task identifier and a next task identifier, providing a first register file for storing values for a current task, and providing a second register file for storing values for the current task that are not in the first register file. The method further comprises providing a third register file for preloading values for the next task, and performing a task switch by making the next task identifier the current task identifier and sampling a further next task identifier. The method can further comprise the step of completing the preload of the register values for the next task identifier which after the task switch is the current task identifier. In this case, the method may also comprise using the third register file as the second register file after the task switch.

The first register file, in one embodiment, comprises registers with a data field and a task identifier field. In this case, the first register file has 32 registers, each register having a 32 bit data field and a 6 bit task identifier field. The first register file may be exposed to a programmer of the communications processor and the second register file and the third register file are hidden from the programmer. In one embodiment, task switches are performed without an explicit save/restore of the register files.

The method can further comprise performing a write during execution of the current task by: comparing the current task identifier to a task identifier in the first register file; writing a value to the first register file when the current task identifier is the same as the task identifier in the first register file; and writing a value to the first register file when the current task identifier is not the same as the task identifier in the first register file after the content in the first register file is saved to a memory. The content in the first register file can be saved to a task identifier context table.

The method may also comprise performing a read during execution of the current task by: comparing the current task identifier to a task identifier in the first register file; reading a value from the first register file when the current task identifier is the same as the task identifier in the first register file; and reading a value from the second register file when the current task identifier is not the same as the task identifier in the first register file. In this case, the content of the first register file may not be changed as a result of the read.

In an additional embodiment of the present invention, a system for efficient processing of tasks in a communications system is provided. The system comprises means for sampling a current task identifier and a next task identifier, a first register file for storing values for a current task, a second register file for storing values for the current task that are not in the first register file, a third register file for preloading values for the next task, and means for performing a task switch by making the next task identifier the current task identifier and sampling a further next task identifier.

In one embodiment, the means for performing a task switch completes the preload of the register values for the next task identifier which after the task switch is the current task identifier. Similarly, the means for performing a task switch uses the third register file as the second register file after the task switch.

The first register file comprises registers with a data field and a task identifier field, wherein the first register file can have 32 registers, each register having a 32 bit data field and a 6 bit task identifier field, and further wherein the second register file and the third register file each have 32 registers.

The system may further comprise a processor which performs a write during execution of the current task by: comparing the current task identifier to a task identifier in the first register file; writing a value to the first register file when the current task identifier is the same as the task identifier in the first register file; and writing a value to the first register file when the current task identifier is not the same as the task identifier in the first register file after the content in the first register file is saved to a memory. The content in the first register file can be saved to a task identifier context table. The processor may comprise an ALU.

The system may also comprise a processor which performs a read during execution of the current task by: comparing the current task identifier to a task identifier in the first register file; reading a value from the first register file when the current task identifier is the same as the task identifier in the first register file; and reading a value from the second register file when the current task identifier is not the same as the task identifier in the first register file. In this case, the content of the first register file is not changed as a result of the read. In one embodiment, the means for performing a task switch comprises a preload and bump unit. The processor may comprise an ALU.

The Preload and Bump Unit (PBU) 376

Referring back to FIG. 37, The PBU 376 controls the access of data memory for the automatic save and restore of registers in their context table in memory. A save of a register content in its location in the table context is performed whenever the register in the active register file is addressed as a destination and the register contains valid data for a task different from the current running task. Generally, only one request for a save can be captured in the PBU 376 for a single instruction because only one destination can appear in an instruction.

The PBU 376 includes a write queue with a number of entries in order to minimize the interference with the main program flow, thus optimizing the total execution time. Whenever a register addressed as a source does not contain valid data for the current running task, the data is read from the Shadow1 register file where it was previously preloaded.

The PBU 376 is also responsible for controlling the preload of the next task registers into the Shadow2 register file. The PBU 376 generates the data memory accesses for save (write) and preload (read) using the context address and data busses. According to one embodiment of the invention, the load store cycles of the active flow have highest priority, followed by the preload cycles, and, at the lowest priority, are the save cycles from the write buffer.

The Program Sequencer Unit (PSU) 378

The PSU 378 performs the instruction decoding and generate the controls for the other core units. The PSU 378 controls the program flow including all scenarios involving the change of flow.

Fetch Unit (FTU) 380

The FTU 380 is responsible for controlling the program counter (PC) for instruction fetch operations. According to one embodiment of the invention, the PC may be derived from one of the following sources: sequential increment; jump to an absolute address; jump to an address specified by a register; task switch to a next task entry point; relative change of flow; exception control (e.g., reset, breakpoint, patch, etc.); and return from trap.

Messaging Interface (Agent Interface) 382

A few instructions are executed in an external module (e.g., DMA, accelerators, etc.) connected to the network processor core. A messaging bus (Agent Interface or AGI) from the core to the external module enables the definition and support of such an extension of the instruction set.

Memory Interface 384

According to one aspect of the invention, the network processor core uses a unified memory space wherein each address can contain either program information or data. This memory space is typically based on on-chip RAM and ROM. The memory module should have separate ports for program, data and context accesses. Also, this memory module may have additional ports for accesses from the external world, such as the ring interface.

A Programming Model for a Flexible Packet Processor

The programming model describes the rules for writing network processor programs. After a brief introduction that explains in general terms the organization of the network processor code and the flow of data through the system, the programming model (e.g., state resources, interfaces and instruction groups) is outlined in high level terms. Then, the execution flow and performance issues are discussed. And last, the programming model is detailed.

Organization of the Network Processor Code

According to one embodiment of the invention, the network processor comprises a 32-bit single issue RISC processor tailored for real-time communication processing goals. According to an embodiment, the network processor has 32 general purpose registers, built-in support for multitasking, communication peripherals, on-chip SRAM, a DMA interface to external SDRAM, a built-in interface to an on-chip control processor (referred to as the host processor or the Packet processor [PP] or the Control Packet processor [CPP]).

It is desirable that the network processor have hardware support for up to 62 tasks. The hardware support includes generation of task activation triggers, automatic task scheduling, save and restore of registers to and from the shadow register area in internal SRAM, special instructions for yielding the CPU, and support for passing messages between tasks.

Each network processor task has a dedicated register set. The task registers are preserved across the periods in which the task is not running. A network processor task can access internal memory with load and store instructions, and can copy data from internal to external memory and vice-versa using special DMA instructions.

Figure 39:
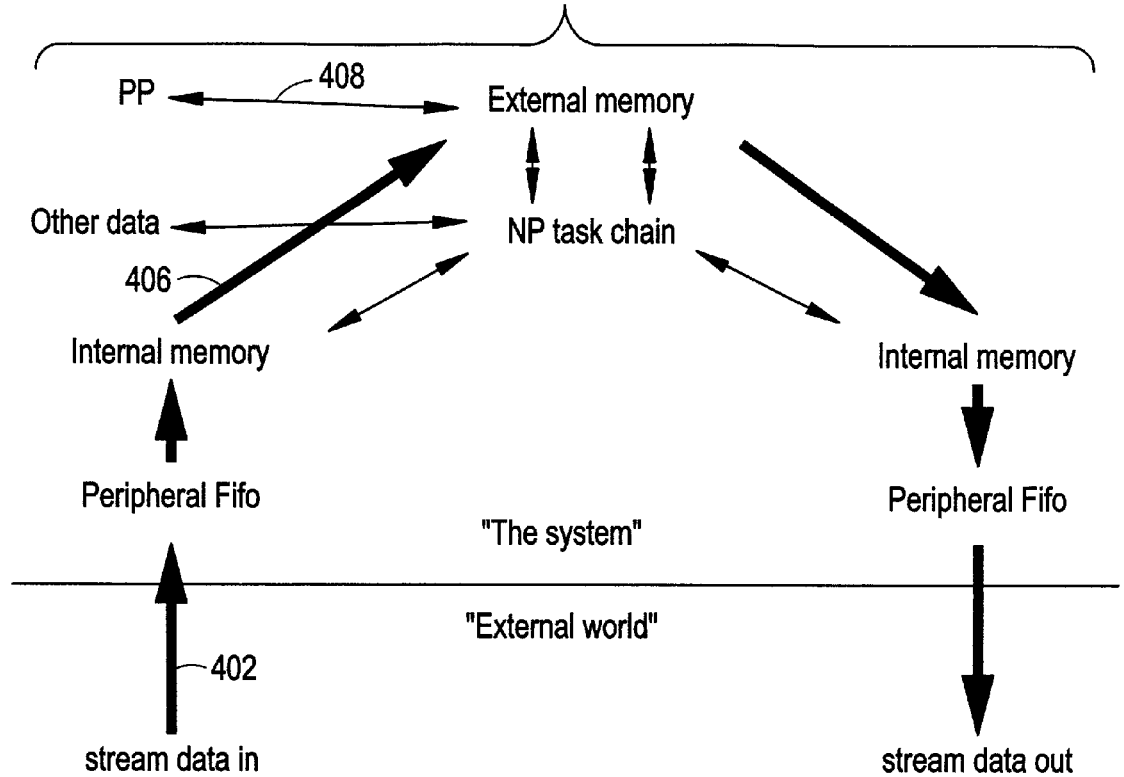
FIG. 39 is a flow diagram illustrating exemplary data paths in a network processor in accordance with at least one embodiment of the present invention.

The data which a task operates upon can be classified into the following categories (with reference to FIG. 39):

Data from the communication peripherals (arrow 402):

This data is copied, using a special instruction from the peripheral's FIFO, into internal memory (arrow 406). On the transmit side, this data is copied, using a special instruction, from internal memory into the peripheral FIFO. This type of data, which is in transit through the device, can be referred to as stream data. Stream data exchanged with the host processor (arrow 408): This data is passed by a network processor task, usually in external memory, for further processing to the host processor. On the transmit side, the host processor passes this data to a network processor task for transmit-related tasks (such as encapsulation, shaping, scheduling, and so forth) and for transmission through a peripheral. Stream data is also handed over between network processor tasks. There are cases when the stream data is not touched by the host processor.

Configuration data: This data resides in internal memory and is set at initialization time by the host processor or by initialization procedures on the network processor (e.g., buffer size). Configuration data is consumed, but not produced, by the task.

Flow state data: This data is kept in internal or external memory, and describes, for example, the state of each ATM connection or the state of the current Ethernet frame. Part of this data is used and updated by the task (e.g., the cell count for a connection).

Task state data: This data is kept in internal memory (or registers), and is used by the task to keep information in case the task does not complete the work intended to be accomplished during a single period of possession of the CPU.

A High Level View of the Programming Model

According to an embodiment of the invention, the programming model for the flexible packet processor includes the following elements. state resources—the hardware memory entities which hold the state of the program; interfaces—of the ways in which the program should behave to interact with hardware resources which are external to the processor; and instruction set—the description of the basic tools with which the program performs its operations.

State Resources

Figure 40:
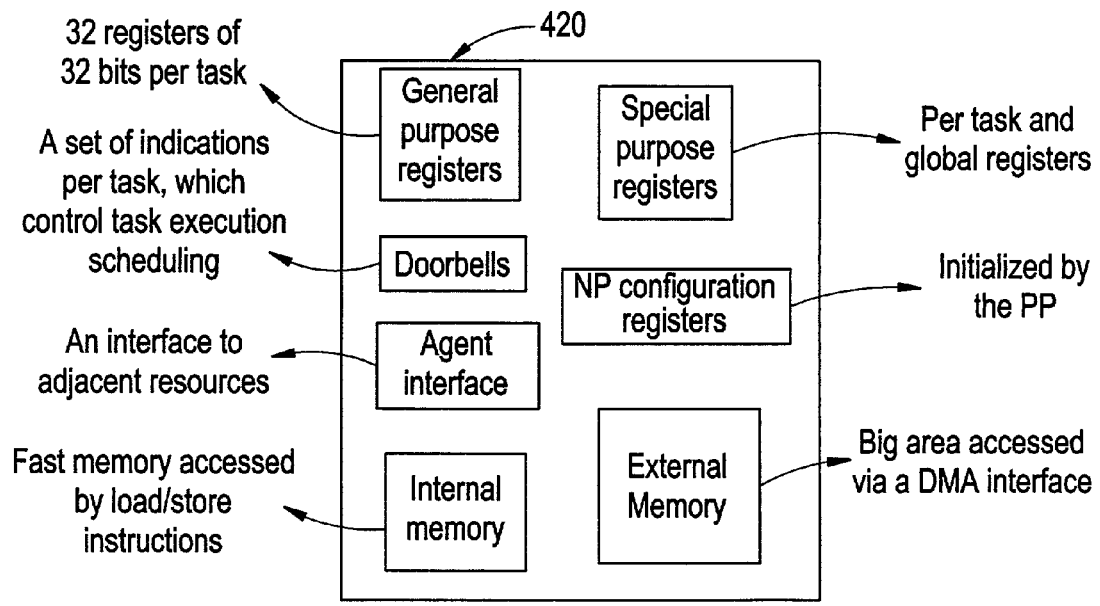
FIG. 40 is a block diagram illustrating exemplary state resources of a network processor in accordance with at least one embodiment of the present invention.

FIG. 40 provides an overview 420 of the state resources for the network processor according to an embodiment of the invention.

Interfaces

DMA interface. The DMA interface controls the DMA machines, which copy data from the NP SRAM to external DRAM and vice versa. The DMA interface is set up by the PP at initialization time, and accepts action commands from the NP via special instructions. The DMA interface connects to the doorbells and the task scheduling mechanism.

Peripheral FIFO interface. The peripheral FIFOs are set up by the PP at initialization time, and are instructed by special NP instructions to copy a data unit to internal memory (from internal memory in the case of a TX). The peripheral FIFOs are connected to the doorbells and the task scheduling mechanism.

Accelerators/Coprocessors interface. In general, there may be two kinds of accelerators/coprocessors: (1) accelerators/coprocessors that are tightly connected to the network processor core and that are accessed via a special agent instruction (e.g. CRC, multireader, message sender, etc.). These reside within network processor Compound entity; and (2) accelerators/coprocessors that are ring members and can be accessed by any other ring member interposed on the ring (via messages over the ring).

Host (PP) processorinterface. In general, the PP will be able to initialize NP configuration registers, to share data with the NP in internal and external memories, to request services from an NP task, and to receive interrupts and messages from the NP.

Instruction set Instructions perform the various types of actions, such as the following: arithmetic, logic, register manipulation—modify data in registers; load/store—move data between SRAM and registers; flow control—changes in the program counter; task management—control of inter-task changes in the program counter; agent interface instructions—DMA (move data between the SRAM and the SDRAM), access to serial ports (move data between the SRAM and communication peripherals), and accelerators (specialized communication processing functions such as a CRC calculation on a block of data); special purpose register moves (and activation of coprocessors)—move data between GPRs and SPRs.

Execution Flow and Performance Considerations

Generally, the CPU executes instructions sequentially until it encounters an instruction which changes the program flow. For example, this instruction can be a conditional or unconditional branch or jump within the task, which checks a condition bit in one of the general purpose condition registers, or an instruction which terminates the current task and starts execution of another task. Instructions which cause a non-incremental change to the program counter take more then one cycle and are optionally followed by a one instruction delay slot. Other instructions which influence the program flow are: arithmetic and compare instructions which modify the condition code bits, and instructions which modify the task entry point (the address from which the task will resume execution in its next execution round).

Types and states of tasks. Tasks can be in one of three states: running, pending and dormant. At any given time there is one running task executing on the CPU. When something requests the service of a task, the task becomes pending. Each time the running task voluntarily yields the CPU, the highest priority task is selected from the pending tasks. Tasks for which nothing has requested their service are dormant, and they will not be enabled for execution and will not run. According to one embodiment of the invention, the number of tasks is determined at initialization time and there is no dynamic creation/elimination of tasks.

Tasks can be classified by the reason (trigger) that causes a task to become enabled for execution. In other words, tasks can be classified by the entity which they serve:

Peripheral: a task which serves a communication peripheral. Each time the RX peripheral receives a unit of data (e.g., 64 bytes of an Ethernet frame) in its FIFO or when a TX peripheral has space for a unit of data available in its FIFO, that peripheral sends a service request to their servant task.

Timer: A timer can be preprogrammed with a period cycle count. Each time it periodically expires, the timer sends a service request to its servant task.

Inter-task messages: Data (usually stream data) can be exchanged or handed over between tasks. One approach for this is to send a message (e.g., containing the data pointer) to the other task, accompanied by a service request. Usually, a task serves only one master (the master being the source of service requests). This means that peripherals, timers and inter-task messages can all request service in the same manner.

There are two more sources which can cause a task to become pending:

DMA: A task is permitted to yield the CPU during a DMA request (in this way the DMA will work in parallel with the CPU, and the CPU will not be stalled). The task usually wants to resume execution when the DMA action is completed. Upon completion, the DMA will send a service request to the originating task.

Self-request: There is a limit to an execution period (the time between two sequential task switch events) of tasks. The execution of the current task usually may not be preempted by an external event, so it is the programmer's responsibility to provide for yielding the CPU before reaching the time limit per task. When a task yields the CPU (e.g., to allow another task to execute) before it has completed the intended work, the task can issue the self-request service request before yielding in order to schedule itself for future execution.

Task Triggers and Task Doorbell Bits

Task doorbell bits are the place where the service requests are registered. A network processor task can be enabled for execution by several request sources:Ordinary priority request from a serial module (e.g., a data fragment is ready in the receive FIFO and was copied to a predefined SRAM location or the transmit FIFO finished the transmission of the previous data fragment.).

High priority request from a serial module. (e.g., the RX FIFO over a threshold or the TX FIFO under a threshold).

Completion of DMA requests.

Self-request (produced by the software).

Message from another task (produced by the software and using the same doorbell bit as an ordinary priority request from a serial module).

Message queue above threshold (produced by the software and using the same doorbell bit as the high priority request from a serial module).

Timer (uses the same doorbell bit as the ordinary priority request from a serial module).

According to one aspect, for each doorbell bit there is a mask bit. The exceptions are the first two doorbell bits, which have a common mask bit, and the self request bit, which can not be masked. If the mask bit is set, the task will be enabled for execution by the matching request; otherwise, the request is blocked.

According to one approach, about twelve tasks are expected to serve serial channels (e.g., 6 for receive and 6 for transmit). These tasks will usually be activated by requests from serial channels. The rest of the tasks are expected to be activated by timers, messages from other tasks, or the host (e.g., doorbell bits 1 and 2).

A task which has more work to do then the maximum allowable latency should yield and use the self-request (doorbell bit 5) to be scheduled again (e.g., a timer handler, task). Any task can be activated by a completion of a DMA request that the task originated.

When a task is scheduled for execution, the request and mask bits of the service request that activated the task are cleared. In the case where there are regular and urgent bits, both are cleared.

Mask Bits and DMA

Mask bits can be set by software, and, in some cases, they are set automatically by hardware. A mask bit, together with the associated request bit, is cleared by hardware when the request is served by the task (the task becomes running). Mask bits can be set with a special instructions and can optionally be specified in DMA and YIELD instructions. When a task issues a DMA request and this DMA is not the last action in the task, the programmer should set a DMA doorbell mask bit and clear all other mask bits (this task should not return to execution because of any other request, for example the serial.). When the task returns to execution after completion of the DMA, all mask bits will be clear.

According to one approach, there is a default state of the mask bits for all tasks, with the first bit set and all the others cleared. Another option, the auto set in DMA and YIELD instructions, instructs the hardware upon DMA completion to set the mask bits to the default state. When a task issues its last DMA request, it sets the auto set indication. The last YIELD instruction of a task should also set the mask bits to the default state.

According to one approach, the network processor DMA is able to serve two external busses (it can be a-single DMA machine in some implementations.) An immediate DMA ID field is specified in DMA instructions. Its value is an index into a translation table (the table may be programmed by the CPU or by writing to special purpose registers on the network processor). The translation result contains information like: big/little endian, and so forth. When all the DMAs initiated by a task (DMAs for which acknowledgement was requested) are complete, the DMA doorbell request bit is set.

Using a count field in one of the special purpose registers, it is possible to yield if all DMAs of the task have not been completed. Also, when a DMA instruction is executed, and there is no place in the pending DMA transactions queue, it is possible that the network processor may be stalled.

Task Priority and Scheduling

Each time the current task suspends its execution, the hardware scheduler selects from the pending tasks the one with the highest priority, and starts execution of that task. Various approaches could be taken to task scheduling.

According to one approach, the algorithm for selecting the next task for execution is as follows. The tasks which participate in the selection of the next task for execution are the tasks for which their corresponding mask bit in the Task Global Mask Register (TGMR) is cleared. Tasks which participate in the selection of the next task and have unmasked requests are divided in to four groups and served in the following order:

1. Highest priority group: includes urgent requests of task numbers 0–31.
2. Second priority group: includes regular requests of task numbers 0–31.
3. Third priority group: includes urgent requests of task numbers 32–63.
4. Lowest priority group: includes regular requests of task numbers 32–63.

Within each group, the requests are serviced according to the task number. Lower task number requests are served before higher task number requests. The task resides in the higher priority class, starting from the time the urgent doorbell bit was set, until the time its doorbell mask is set to default by an option of the yield instruction, or until its doorbell mask is explicitly cleared by an instruction. According to one approach, the tasks are in an urgent state as long as the handling of all pending urgent events is not completed (including when the task yields while doing a DMA during such a period).

When a task starts execution, the doorbell request bit which caused it to run and the matching mask bit are cleared. The other request bits are not modified. The regular and the urgent request bits are considered to be two levels of the same request and have a common mask bit. They are both cleared when the request is serviced. A task can explicitly raise its priority to urgent, and return its priority to natural (normal priority, unless there is an urgent request pending) by using an agent instruction that writes to the doorbell register. This can be used to increase task priority for the period spent in a critical section or in an urgent code fragment.

Task Switching Performance

According to one aspect, instructions that yield the CPU take 2 cycles (they have a delay slot). The other performance issue is the time it takes to restore the registers of the new task. Usually the registers of the next task are pre-loaded during the execution of the current task.

Inter-task Communication

Global registers. A global register is a general purpose register that is shared between all network processor tasks, and which can be safely used and modified by each task. (A task has to make sure that it completes the whole sequence, which includes the shared register use/update, needed for the action performed, before yielding the CPU.)

Inter-task messages. Sending messages between tasks is done using queues. Additional information is provided in the discussion regarding data structures.

Common program. More then one task can execute the same object code, for example, such as two tasks that service the reception of two identical serial channels. Also, all tasks can share code in functions.

Internal and external memory. Sharing information in memory is a matter of convention between the tasks. For complex atomic modifications, it is possible to either have a server task with an exclusive right to access the structure or to use semaphores as described further below. (Complex atomic means that the modification requires a series of external memory accesses, between which the data structure is in an inconsistent, i.e., erroneous, state.) An example of a need for such a modification would be the update of a linked list queue whose descriptor is in external memory. Generally, it is recommended to avoid using such structures when possible.

Host-Network Processor Communication

Network Processor task to host messages and interrupts. Described in connection with the discussion on data structures.

Host to Network Processor task messages. The host is able to post a message to the input message queue of any task. The host also sets the doorbell bit of the target task. The host should not post messages to an input message queue to which a network processor task posts messages.

According to one approach the network processor, either with a hardware mechanism or a software task, should notify the host when the host message queue changes its position relative to a close to full threshold. Using such a threshold will permit a less time-constrained handling of messages on the network processor side and eliminates the need for a check if not full inquiry on the host side.

Host to Network Processor commands. There is a command register that is written to so that the host can control network processor execution. For example, such commands may include a reset, an activate task N, a deactivate task N (without aborting its current execution), and a start execution of task N (i.e., give task N a request without aborting the currently executing task).

Host-network processor parameters. According to one approach, for each task an area is allocated at compilation time to hold the parameters that are initialized by the host and used by the task. The addresses of these areas are maintained together with the frame pointers and the entry points, and are loaded by the boot initialization routine (into R6, discussed further below) of each task. These parameters are also read by the host, and are used in the initialization drivers.

State Resources

General Purpose Registers

According to one approach, there are 32 general purpose 32-bit registers to be used by the tasks. Some of the registers, r0–rN, do not preserve their values across task switching; they are common to all tasks. These are referred to as common registers. The other registers, rN+1–r31, are preserved across task switching. These registers are referred to as private registers. According to one embodiment of the invention, these private registers are saved and restored from their shadow location by the hardware, transparently to the programmer. N is a global value, preferably programmed at initialization time. According to one approach, N (which should be odd) is 15, although other values of N may be used depending on design considerations. The programmer should allocate the correct shadow area for the registers, which should be the number of tasks multiplied by the number of private registers. The programmer should use registers contiguously, starting from r31 downwards.

According to one aspect of the invention, some of the registers have special hardware support, as follows:

r0 is interpreted as constant 0; writes are ignored.

FIG. 41 illustrates register r1 (430) in greater detail in accordance with at least one embodiment of the present invention.

r1 condition codes: sticky condition (1 bit); arithmetic conditions (equal/zero [1 bit], less than/negative [1 bit], greater than/positive [1 bit], carry [1 bit], overflow [1 bit], doorbell bits [6 bits], and user defined condition bits [16 bits]).

r31: user defined condition codes (32 bits).

r30: entry point address of the task.

r28: link address 1 (function return address).

r29: link address 2.

According to one approach, the convention for register allocation is similar to the approach taken for application binary interfaces, or ABI. ABI is a standard that allows object code interoperability of functions compiled by different compilers or written in different languages. Register allocation according to this approach is as follows:

r27 and other r2x registers (26>2x>20) are allocated to a fixed meaning. Registers which are allocated to some meaning by convention are expected to maintain the meaning over function calls. They can be modified within functions, but only according to their meaning. Each task might have different registers allocated to fixed meanings.

r27: parameter area pointer and stack pointer of the task. The compiler or the programmer statically allocates up to three stack frames per each task. The compiler computes the area used by level0 code (first frame), and the maximum area needed for automatic variables of level1 functions of the task (second frame) and of level2 functions of the task (third frame). There is a global limit of memory size of local function variables (enforced by the compiler). Whenever there is an indirect function call, the maximal stack frame will be allocated. All accesses to local variables will be translated by the compiler to offsets on r27, and there is no need for a stack pointer register for dynamically allocating frames on the stack and for modifying the stack pointer during function calls and returns.

According to one approach, the compiler limits the function call depth to two. The compiler may also identify those functions which do not yield and do not call other functions, allocate their frame in an area common to all tasks, and use absolute addresses to access local variables (this may save memory per task in this case). Other registers can also be allocated by convention to: data unit address in internal memory, data unit pointer in external memory, connection table base address, and so forth. Registers which are allocated to some meaning by convention are expected to maintain the meaning over function calls. Such registers can be modified within functions, but only according to their meaning.

r16, r17: These registers do not preserve their value over any function call. They can be used without saving in level2 functions and in level1, which do not expect the value to be preserved over a level2 function call. The r16 and r17 registers are used to pass parameters and get results to/from level1 and level2 functions. Even in the case when there are no parameters passed, these registers do not preserve their value over any function call. Preferably, the compiler forbids functions of more than two parameters.

The compiler and the assembly programmer may use the r16, r17 order for level1 functions and the r17, r16 order for level2 functions. This may eliminate saving and restoring of r16 when both level1 and level2 functions have a single parameter. Also, r16 and r17 are the only private registers which can be modified in level2 functions.

r18–r19: These registers should not be modified within level2 functions. They can be used without saving in level1 functions, and they do not preserve their value over level1 function calls.

r20–r26: These registers should not be modified within level1 and level2 functions. These registers can be used without saving in level0 code. Some of these registers can be assigned to a fixed meaning, in which case they can be modified within functions according to their fixed meaning.

r0–r15 are scratch or global registers that are common to all the tasks, and which are not changed by the hardware task switching.

r2–r5 hold information that is frequently used and shared between tasks, such as the buffer array base address (r2) and the free buffer pool address (current) (r3). These registers can hold popular (often used) constants, such as a table base address or an arithmetic constant.

r8–r15 are used to hold information which does not need to be preserved across yields, such as intermediate results of an arithmetic computation.

r6–r11 do not preserve their value over function calls.

r12, r13: These registers preserve their values over calls to level2 functions which do not yield.

r14, r15: These registers preserve their values across calls to level1 and level2 function which do not yield.

Table 3 summarizes the register conventions discussed above.

TABLE 3

| | private or common | special HW handling | fixed meaning | modified by functions | used as parameter |
|---|---|---|---|---|---|
| r0 | Common | constant 0 | NA | Yes | No |
| r1 | Common | conditions | No | Yes | No |
| r2–r5 | Common | No | Part | within fixed meaning | No |
| r6–r11 | Common | No | No | level 1 & 2 & yield | No |
| r12, r13 | Common | No | No | level 1 & yield | No |
| r14, r15 | Common | No | No | No | No |
| r16, r17 | Private | No | No | level 1 & 2 | Yes |
| r18, r19 | Private | No | No | level 1 | No |
| r20–r27 | Private | No | Part | No | No |
| r28 | Private | level 1 return address | No | No | No |
| r29 | Private | level 2 return address | No | level 2 | No |
| r30 | Private | entry point | NA | Yes (TBD) | No |
| r31 | Private | conditions | No | Yes (TBD) | No |

By way of summary, registers can be safely used in the following cases:

r8–r9: level2 function code which does not contain a yield; level1 function code which does not contain a yield or a call to a level2 function; and level0 code which does not contain a yield or a function call.

r10–r11: level1 function code which does not contain a yield or a call to a level2 function which yields.

r12–r15: level0 code which does not contain a yield or a call to a function which yields.

r16, r17: any level2 function code; level0/1 function code which does not contain a function call.

r18, r19: any level1 function code; level0 code which does not contain a function call.

r20–r2X: any level0 code.

Indication Registers

According to one approach, registers r1 and r31 contain indications which can be used in branch conditional instructions. They can be explicitly updated by any instruction, but some of the bits in r1 are implicitly updated by compare instructions and by arithmetic/load instructions. The carry bit is also implicitly updated by some arithmetic instructions.

RI is a global register; its value is not preserved after task switching. R31 has a copy per task.

The doorbell and mask fields in r1. The doorbell sub-field contains a copy of the doorbell bits of the current task. The mask bits are a copy of the task's mask bits. Writes to these fields are ignored.

Compare instructions, the sticky bit options. Compare instructions modify the three condition code bits, LT, EQ, and GT. Optionally, the compare instructions can also update the sticky bit. These instructions specify a condition, such as one of NONE, LT (less than), LE (less than or equal to), EQ (equal to), NE (not equal), GT (greater than), or GE (greater than or equal to). If the condition is satisfied by the compare, the sticky bit is set; otherwise, the sticky bit is not altered. This feature is useful to efficiently implement several tests of error cases as well as other AND/OR conditions. Compare instructions also have an option to overwrite the sticky bit. FIGS. 87–90 (discussed below) illustrate various mechanisms for using the accumulative condition flag, i.e., the sticky bit, to execute branch instructions in processing systems, such as a network processor or communications processor.

Serial status. The serial status indications (e.g., error, over-run/under-run, and last), optionally together with the data fragment size, should be loaded by the programmer from a fixed memory location into r1 or r31.

User defined indications. The user can keep state information in the user-defined part of r1 or r31. It may be desirable for an indication to be created once and used several times. The user can also load to r1 or r31 a part of an array of indications.

Arithmetic instructions modify the condition codes. Arithmetic instructions can modify the zero, negative, and positive condition code bits. The following arithmetic instructions modify the carry condition code bit: ADD, SUB, ADDI, SUBI, SRR, SLR, SLI, SRI, and CLB Branch, jump and yield conditional. Conditional branch/jump and yield instructions test a single condition bit, which can be any bit in r1 or r31, and compare that bit to either 0 or 1. Conditional branch/jump instructions take three cycles when taken and 1–2 cycles when not taken, while unconditional branch/jump instructions take two cycles; in both cases they have an optional delay slot. Conditional instructions. In most of the instructions the 3-bit conditional execution field is used to specify whether the instruction is unconditional or it is conditional upon the sticky condition bit being true or false. One of the three bits is reserved for future use.

Link Registers

Branch/jump instructions can be used to call subroutines. They have an opcode bit which specifies whether the return address is to be saved, and another opcode bit which specifies whether the return address should be saved in r28 or r29. The return address is either PC+1 or PC+2, depending if the delayed branch option is used. The function call depth is limited to two, and the depth of each call/return is specified in the instruction. Functions which do not call other functions should be defined and called as depth 2.

The Task's Entry Point Register

R30 contains the address at which the task will resume execution after a yield. It is modified by any instruction which modifies r30 and is optionally modified by the YIELD instruction. It can optionally be modified by DMA instructions which yield.

Hidden Registers

Program counter—according to one approach, there is a single program counter in the system (not per-task) and it is not directly accessible by the software in any manner.

Special Purpose Registers

Special Purpose Registers (SPRs) are network processor core registers that are not defined as one of the General Purpose Registers (GPRs). Special instructions (SPRL and SPRS) are defined to enable the movement of data between SPRs and GPRs. Special Purpose Registers in the network processor include the Refetch SPR 440, the Task SPR 442, the Trap SPR 444, and the Mindex SPR 446, as shown in FIG. 42.

Refetch SPR 440. The refetch SPR is a 32-bit register that holds the first and second program memory addresses of the instructions to be refetched when getting out of a trap. Bits 15:0 hold the first instruction address (called refetch) and bits 31:16 hold the second instruction address (called next_refetch). When the network processor receives a break request and is not already in the trap mode, it continues instruction execution from the program location pointed out by the break vector and the trap mode bit is set (in the task SPR). The address of the instruction that would have been executed but for the occurrence of the breakpoint is saved in bits 15:0 of the refetch SPR. The following instruction that was supposed to be executed but for the occurrence of breakpoint is saved in bits 31:16 of the refetch SPR.

Leaving the trap mode is performed by executing the RFT instruction. This instruction causes a program jump to the program location specified by the refetch SPR bits 15:0, followed by the program location specified by the refetch SPR bits 31:16. This also clears the trap mode bit.

The refetch SPR is a read/write register that can be accessed through the SPRL and SPRS instructions.

Task SPR 442. The task SPR is a 32-bit read only register. The task SPR contains information on the current executing task and on the next task to be executed:

DOORBELL REQ reflects the doorbell request bits of the current task.

CTID reflects the Current Task ID.

NTID reflects the Next Task ID.

NTV reflects Next Task Valid bit.

MASK reflects the doorbell mask bits of the current task.

UR reflects the urgency level of the task (1=urgent).

COUNT reflects the doorbell counter value of the current task.

When there is a yield and both the bump buffer is empty and the context of the next task is already pre-loaded, the network processor switches to the next task. At this point the NTID is loaded into the CTID and the next task ID together with the next task valid bit from the doorbell are sampled into the NTID and into the NTV, respectively.

If the NTV bit is set, then the NTID is locked and there will not be further sampling. If the NTV bit is cleared, then the doorbell next task ID will continue to be sampled on each cycle until the valid bit is set.

The new valid next task ID is used by the pre-load logic to pre-load the next task's context. The task SPR can be read by using the SPRL instruction. All other bits of the task SPR are reserved and will be read as zero. The CTID, NTID and NTV bits are cleared by reset. The default state (and the reset state) of the mask of each task is 0b100.

Trap SPR 444. The trap SPR is a 32-bit register. The trap SPR include the trap mode bit, the illegal instruction status bit, and the breakpoint status bits:

Bit 0—Illegal Instruction (IL). When there is an illegal instruction, the IL bit is set. The IL bit can be cleared only by reset.

Bit 1—Trap Mode (TRAP): When TRAP bit is set, the network processor is in the trap mode. A breakpoint event causes the program flow to jump to a program location (pointed to by a given vector) and to enter the trap mode of execution by setting the trap mode bit. When in trap mode, no breakpoint and/or patch events will be accepted. The trap mode bit will be cleared by a RFT (Return From Trap) instruction or by writing zero to the trap mode bit. When the trap bit is cleared, further breakpoints and/or patches will be accepted.

Bit 2—Program Address Break (PAB): This is a breakpoint status bit, which when set, indicates that a program address breakpoint occurred. This bit is cleared by an RFT instruction or by writing zero to it.

Bit 3—Data Address Break (DAB): This is a breakpoint status bit, which when set, indicates that a data address breakpoint occurred. This bit is cleared by an RFT instruction or by writing zero to it.

Bit 4—Task Break (TB): This is a breakpoint status bit, which when set, indicates that a task ID breakpoint occurred. This bit is cleared by an RFT instruction or by writing zero to it.

Bit 5—Yield Break (YB): This is a breakpoint status bit, which when set, indicates that a yield breakpoint occurred. This bit is cleared by an RFT instruction or by writing zero to it.

Semaphores

Semaphores are commonly used when a section of code that contains yields should not be executed by more then one task at a time. This happens when the code is handling some data structure resource that is shared between tasks. Current examples which might entail the use of semaphores are: adding and removing from a linked list queue whose descriptor is in external memory; releasing a multicast buffer (update of the reference count); emulation of a task's message queue in external memory; and a task that tries to put an inter-task message into a full message queue can use the hardware mechanism to wait until the queue is not full.

The alternative solution of not yielding while in the critical section is not efficient. The alternative solution of having a dedicated task responsible for the resource, and thus serializing the actions performed on the resource, is in some cases complicated to implement and is in some cases inefficient.

Network processor software semaphores in accordance with the present invention are implemented over a hardware mechanism which makes it possible to prevent the scheduling of tasks specified in a bitmap (the TGMR register).

The number of semaphores is limited only by size of the memory space allocated for semaphore support. Every semaphore requires a one byte indication of free/busy state plus a 64-bit mask of tasks registered for the particular semaphore. While performing the critical section protected by a semaphore, the task's priority should be raised and also all issued DMAs should be treated as urgent in order to minimize semaphore holding time.

There could not be too many semaphores in the system (e.g., in order to comply with the goal of keeping the internal memory requirement reasonable), yet there are many shared external memory resources (data queues, contexts, lookup tables, etc.) that may require semaphore protection. According to one approach, the semaphore ID (number) is chosen based on a simple arithmetic operation (e.g., a MOD of significant bits) on the resource address.

The network processor scheduler hardware includes a bitmap in an SPR register (SPR bitmap). Each bit in the bitmap, when set, prevents the scheduling of the task whose ID corresponds to the bit index. The network processor the form of a 64 bit mask (where only the bit corresponding to the task ID is set in this mask).

The following pseudocode in Table 4 illustrates the use of a semaphore:

TABLE 4

Pseudocode Illustrating the Use of a Semaphore

```
bad_list—hardware 64-bit mask indicating which tasks can not be run.
semX_indic—software indication per each semaphore (X) that indicates whether it is
  occupied.
semX_mask—software 64-bit mask per each semaphore (X) comprises registration of the
  waiting tasks.
produce X(semId) from the resource address
checkX:                                   ; This is the frequently used code fragment - efficiency
                                            is vital.
    ld.b r2,semX_indic                    ; load the "semaphore is busy" indication - a byte or
                                            a bit.
    bc.neq sem_occupied                   ; and test it.
                                          ; Do the critical section code and release the
                                            semaphore.
    sti 0xff,semX_indic                   ; If it was not occupied, grab it and do the critical
                                            section.
    seturg on
    CRITICAL
    SECTION X
    seturg off
    sti 0,semX_indic                      ; Release the semaphore
    clear semX_mask bits in bad_list      ; agentw. Let all in, highest priority task will be
                                            selected.
    . . .                                 ; Rest of the task code and yield.
sem_occupied:                             ; Register myself on the semaphore, and prevent myself
                                            from running.
    ld.d r2,r3,semX_mask                  ; Get the 64-bit mask of tasks waiting for this
                                            semaphore.
    set bit of current task in r2,r3
                                          ; "Optimization": the current task_id is prepared in a
                                            doubleword mask in the init routine.
    st.d ;2,r3,semX_mask                  ; Save the mask for common use.
    set semX_mask bits-in bad_list
                                          ; agentw. Prevent everyone (and myself) who is
                                            waiting to semX from being scheduled in.
    set my task's doorbell bit            ; Re-activate my request
    yield.epsem_released                  ; Go to sleep until it is my turn to use the semaphore.
sem_released:                             ; The semaphore was held by someone, but now it
                                            might be free.
    ld.d r2,r3,semX_mask                  ;
    clear bit of current task in r2,r3    ;
    st.d r2,r3,semX_mask                  ;
    set semX_mask bits in bad list
                                          ; agentw. Prevent everyone else who is waiting to
                                            semX from being scheduled in.
    b              checkX                 ; Re-check the lock - avoids nasty bugs.
```

Notes:
Using r30 bits as semaphore indications and adding a test-set-branch-conditional instruction can improve the cycle count of the frequent case.
Using a byte as the semaphore indication, the overhead is 5 cycles.
Using an r30 bit as the semaphore indication, the overhead is 4 cycles.
Adding a branch-conditional-and-set instruction, the overhead is 3 cycles.

software can add or remove a list of tasks specified in the specified in a software bitmap to the above list. The software registers in the SPR bitmap those tasks which are prevented from execution because they are waiting for one of the currently occupied semaphores (see bad_list below).

The software holds an indication in internal memory for each semaphore that indicates whether that semaphore is currently in use/occupied (see semX_indic below.) The software also holds for each semaphore a 64 bit bitmap corresponding to the tasks that are currently awaiting access to the semaphore (see semX_mask below). For each task awaiting the semaphore, this bit, which corresponds to that task's ID, is set.

According to one embodiment (not reflected in the table below), the software also holds the task ID of each task in The general operation of the use of semaphores is as follows. Whenever a task seeks to enter critical section number X, the task checks the internal memory indication of semaphore X to determine if there is currently any other task in the critical section.

If the semaphore indication is clear, the task sets the indication and enters the critical section. After completion of the critical section (e.g., which contains external memory accesses and task switches), the task clears the semaphore indication. It is possible that while the task was in the critical section other tasks may have registered themselves as awaiting access to the semaphore and prevented themselves from being scheduled in by the hardware scheduler. So the current task will enable these other tasks, which are registered as awaiting scheduling for the semaphore, by removing their list from the hardware bitmap.

If the semaphore is set, the task branches to semX_occupied, registers itself in the list of tasks awaiting the semaphore, and disables those tasks by adding the list to the hardware bitmap. Task switching is then initiated after setting the resumed execution in the semX_released label. When the task resumes execution, the task deregisters itself from the list of tasks that are awaiting the semaphore, and prevents other tasks on the list from being scheduled by adding them to the hardware bitmap. The task then executes the code, which checks the semaphore indication.

In accordance with one embodiment of the present invention, a method of employing semaphores to limit access to a shared resource used by a multi-tasking processor is provided. The method comprises the steps of providing a first bitmap in a register that prevents specified tasks from running because the specified tasks are awaiting access to an occupied semaphore, storing an indication in memory that indicates whether the semaphore is occupied, storing a second bitmap in memory that identifies tasks that are awaiting access to the semaphore, and attempting to access the semaphore based on checking the indication in memory. Wherein a task checking the indication in memory determines that the semaphore is available, the method can further comprise the steps of setting the indication to indicate that the semaphore is occupied and performing the processing for the task, wherein performing the processing for the task includes critical section execution. The critical section can include at least one of external memory accesses and task switches.

The method can further comprise the step of resetting the indication to indicate that the semaphore is available after the step of performing the processing for the task. Furthermore, the method additionally can comprise the step of removing from the first bitmap those tasks now included in the second bitmap in memory that identifies tasks that are awaiting access to the semaphore, thereby allowing those tasks to be scheduled for access to the semaphore.

In one embodiment, when a task checking the indication in memory determines that the semaphore is occupied, the method can further comprise the steps of including the task in the second bitmap and revising the first bitmap to reflect the tasks from the list in the second bitmap. The method further can include the steps of removing the task from the second bitmap when the indication reflects that the semaphore is available and revising the first bitmap to reflect the tasks from the list in the second bitmap, thereby allowing the task to access the semaphore and perform the task processing.

In accordance with another embodiment of the present invention, a system employing semaphores to limit access to a shared resource used by a multi-tasking processor is provided. The system comprises a first bitmap in a register that prevents specified tasks from running because the specified tasks are awaiting access to an occupied semaphore, an indication in memory that indicates whether the semaphore is occupied, a second bitmap in memory that identifies tasks that are awaiting access to the semaphore, and means for attempting to access the semaphore based on checking the indication in memory, The means for attempting can be a processor executing a task, wherein the task can be enabled to access the semaphore when the indication reflects that the semaphore is available. Also, the task can be enabled to register itself with the second bitmap and updates the first bitmap when the reflects that the semaphore is occupied. The task execution can include processing a critical section including at least one of external memory accesses and task switching, wherein the indication in memory is reset to indicate that the semaphore is available after processing the critical section.

The Software Data Model

Figure 43:
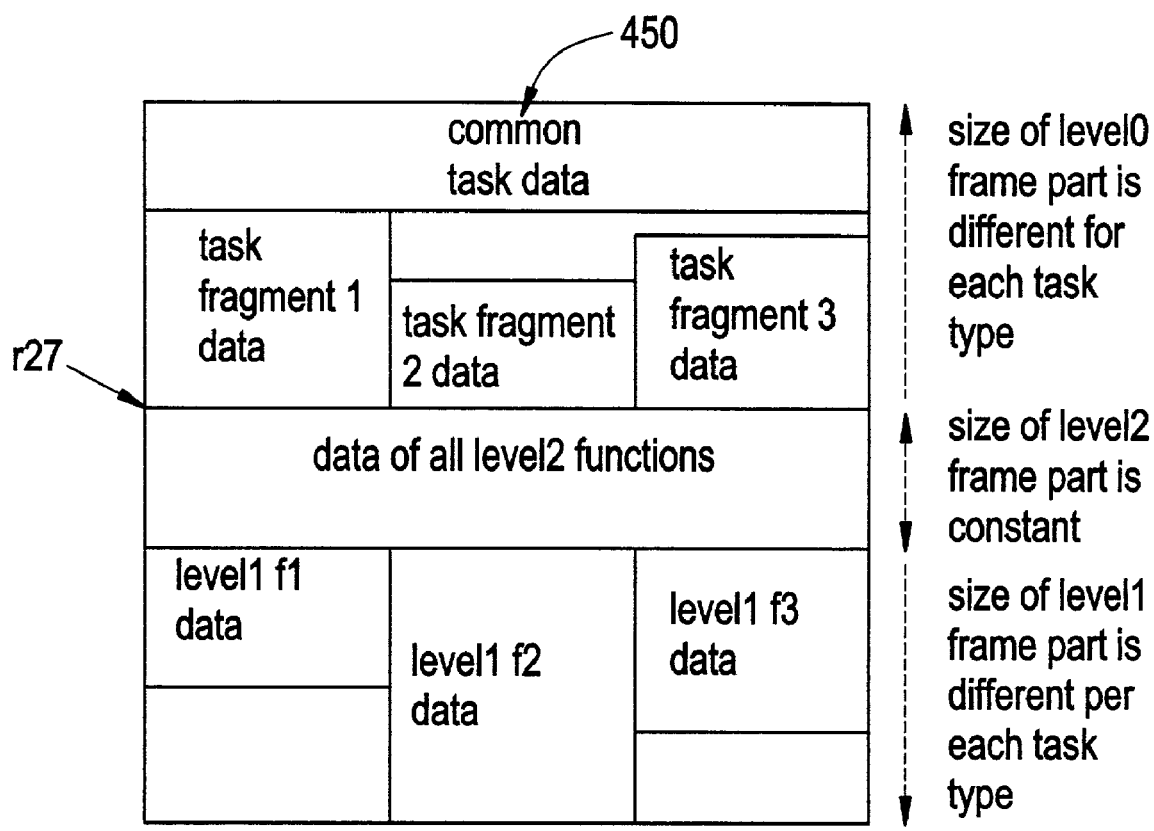
FIG. 43 is a block diagram illustrating an exemplary software model for a network processor in accordance with at least one embodiment of the present invention.

Referring now to FIG. 43, an exemplary software data model 450 is illustrated in accordance with at least one embodiment of the present invention. There are two major types of data allocated in internal memory: global data and task/function data.

Global data:

.adata start global data definitions, examples:

.long generic_taskmessage_q[8];

.struct_structure_name instance_name;

.adata end

Global data has a global name scope and can be symbolically referenced from anywhere in the code. References are translated to absolute addressing.

Task/function data:

.task [common] task_type_name task data definitions and task code.

.task end [task_type_name]

.func level1/2 function_name function data definitions and function code.

.func end [function_name]

Local data definitions have a local name scope (detailed below) and references are translated by the assembler to r27+immediate offset. Functions can be defined either within a task definition or outside of any task definition. Function names, which are defined outside of any task definition, have global name scope and can be called from any place in the code. They can access their local data and the global data. Function names which are defined within a task definition have a scope of the task definition. They can be called only by level0 code of that task type. They can access the common data of the task (detailed below).

There is hardware support for keeping return addresses for two levels of nesting of function calls. A static stack frame will be maintained, made of three parts, for each task instance. This should solve the problem of allocation of the correct size of dynamic stacks. It will also make function calls more efficient by eliminating handling of the stack pointer and of the return address. This means that at definition time the level (1 or 2) of each function is specified. Functions which do not call other functions will be defined as level2 functions.

For each task type, the assembler creates two data sections, level0 data and level1 data. Their sizes will be used by the PP software to allocate memory for the static frame of each task instance of this task type, and to initialize r27 of the task instance. A task definition can appear several times for the same task type. Such a definition shall be referred to as a task fragment. The data definitions in each of the fragments are in union with the data definitions in each of the other fragments (overlap, occupy the same memory location).

During a task fragment definition, an optional common keyword can be used, in which case the data definitions will overlap with any other data definitions, and the scope of the data names will be all the fragments of the same task type.

The non-common fragments of a task can be used to implement the different functions (referred to as handlers), which the generic task does. The pointer to the handler is passed in the inter-task message. All the handlers will return to a label in the common part of the task. The common part of the task will only handle the input message queue and dispatch to the handlers.

The size of the level0 frame for a task type is the size of the data definitions in the common part plus the maximum of the sizes of the data definitions in non-common fragments of the task type.

Level1 functions can be called only explicitly (i.e., they can not be called using a pointer.) The assembler will find all the calls to level1 functions and will compute the level1 frame size for this task type as the maximum of the sizes of the data definitions of level1 functions called by this task type.

Level2 functions can be called via a pointer. The assembler will check that the data allocated in each level2 function is not more then a system level constant (80 bytes) and will add this constant to the offsets of data definitions of level1 functions.

Scope of labels: local in functions and task fragments. Global to all fragments of that task type when in the common task fragment. Labels in task fragments and level2 function names can be passed to the PP software (flow manager) in the object file using the directive: .export label_name.

According to one approach, the assembler will produce a single code section, which will contain the code of all the tasks and functions. Other function types might be considered, such as ones which do not have local data in memory or which receive as a parameter a pointer to a scratchpad area for their use. Also to be considered is code which is not associated with tasks and functions. (All the labels in this code will have global scope. It might be used for additional types of functions.)In cases when the caller's frame is no longer needed (an error condition, for example), it might call a function of the same level, which will use the caller's frame.

The Instruction Set

Addressing modes:

Instruction addressing. All instruction addresses are word addresses, they are shifted left 2 bits to generate the memory address.

Absolute: Jump to the absolute address specified in the 16-bit immediate instruction field.

PC relative: Branch to an offset from the current program counter specified in the 12-bit immediate signed instruction field.

Register: Jump to the address, which is contained in the register specified in the instruction.

Implicit task entry point: During task switch, jump to the entry point of the next enabled task (in r30 of that task).

Data addressing: Data addresses are byte addresses that are taken as is, regardless of the access size.

Register with offset: The address is the sum of the value contained in the register, with the sign extended 8-bit immediate instruction field.

Register with index register: The address is the sum of the value contained in the register, with the value contained in the index register.

Instruction Groups

According to one embodiment of the packet processor of the present invention, the following instruction groups are supported: arithmetic and logic operations; register data manipulation; load/store (to internal memory); program flow; task yielding; and agent instructions (DMA, communication peripherals, CRC, CAM, etc.).

Instruction Pipeline for a Flexible Packet Processor

Figure 44:
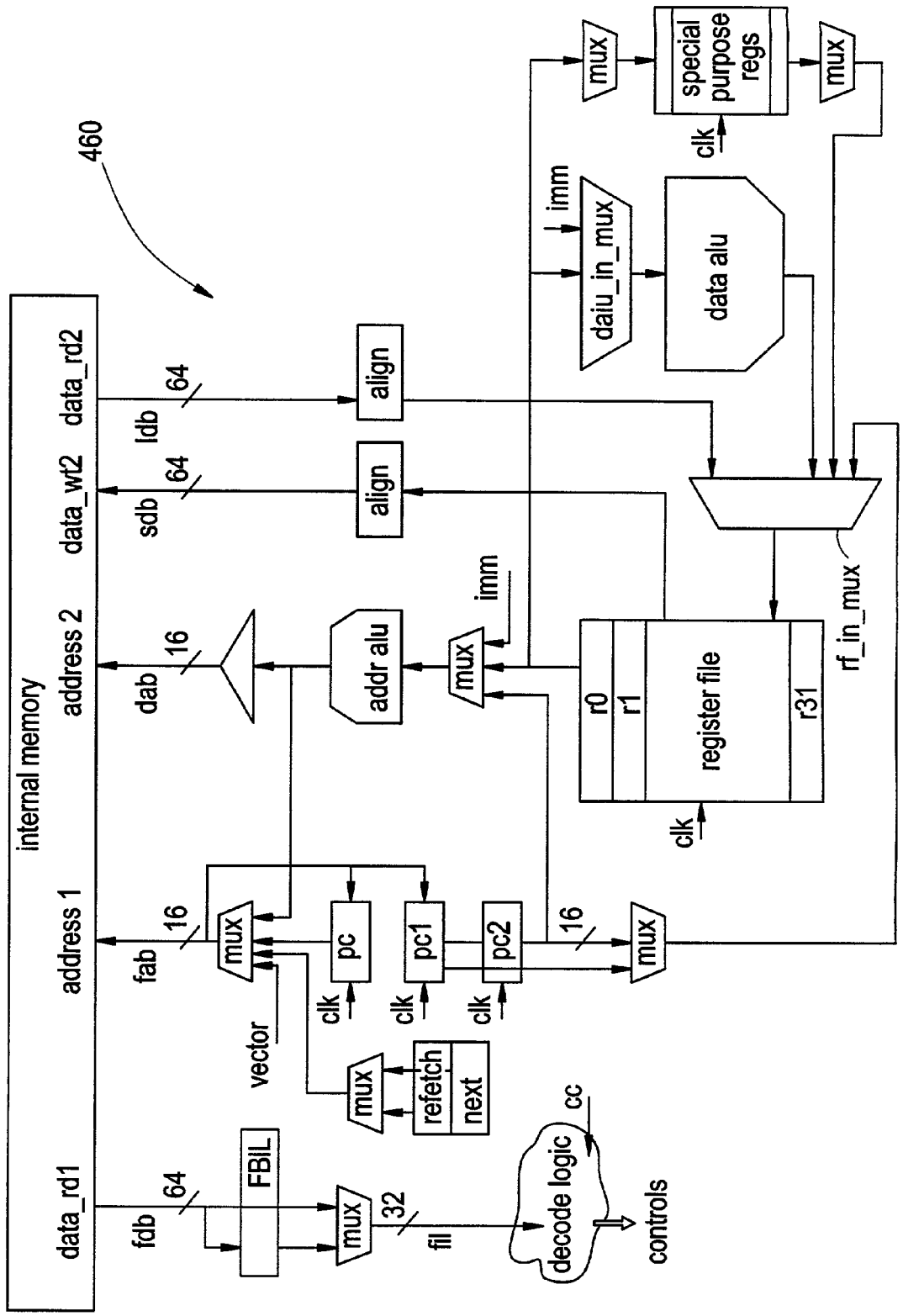
FIG. 44 is a flow diagram illustrating an exemplary network processor pipeline in accordance with at least one embodiment of the present invention.

Referring now to FIG. 44, an exemplary network processor pipeline 460 is illustrated. According to one embodiment of the invention, the network processor pipeline 460 consists of five stages: fetch, decode, address, execute and write. The network processor pipeline 460 enables a standard design flow and standard memories. The network processor can perform an instruction together with a data load or store from/to a unified internal memory in each cycle. The network processor pipeline 460 enables an arithmetic instruction to use as its source operands data that was loaded by the previous instruction without any bubble. Conditional jump and branch instructions have no penalty when the condition is not taken while a penalty of 2 cycles occurs if the condition is taken and there is a change of flow. To reduce this penalty, delayed jump and branch instructions are provided. In addition to the data ALU there is an address ALU to enable efficient pointer calculation on data access. The network processor general purpose registers (r0–r31) are updated during the write stage without distinction as to whether they are updated from a load operation or from a data ALU operation.

Pipeline Stages

There are five pipeline stages: Fetch; Decode; Address; Execute; and Write.

The Fetch Stage

During the fetch stage, the network processor core places the next instruction fetch address. This next fetch address can originate from the Program Counter (PC) in the normal sequential flow or can come from the address ALU when there is a jump or branch instruction. A 32-bit new fetched instruction is assumed to be ready during the next clock cycle after a specific access time from the specific internal memory. Since the network processor internal SRAM is unified for both data and programs, and since it should support 64-bit access for data, the network processor initiates a fetch of 2 instructions (64 bits). The Fetch Unit (FTU) contains a fetch buffer to hold fetched instructions that were still not processed.

The Decode Stage

At the decode stage, the new instruction fetch is complete and the decoding of the new instruction is performed. The decode logic determine the type of the incoming instruction and the operations that should be performed at each pipeline stage for the execution of the instruction.

The Address Stage

During the address stage the data address for a load from memory or for a store to memory is calculated by the address ALU. The address ALU get its source operands, which can originate from one or two of the GPR registers, an immediate address offset or an absolute address. In jump or branch instructions, the destination address is also calculated by the address ALU. One of the address ALU inputs is the PC itself for branch address calculation. After address calculation is performed, the core places the new data address on the Data Address Bus (DAB) or the new program address (for change of flow) on the Fetch Address Bus (FAB). If the instruction is a store, data to be stored into memory is placed on the Store Data Bus (SDB) during this stage.

The Execute Stage

The data ALU execution is done at the execute stage. Source operands are read from the register file to the Data ALU, and data arithmetic is performed. For example, if the instruction is an ADD of r1 with r2, then r1 and r2 are mux-ed into the data ALU and arithmetic addition is performed during the execute stage. Condition Codes (CC) are also calculated at this stage. By the end of the execute stage, the data arithmetic execution result together with the CC are ready.

The Write Stage

At the write cycle, the register file is updated. The update can come from various sources: a destination of an arithmetic result, loaded data from memory, a move from a Special Purpose Register (SPR), or a move of an immediate value into the register file. In case of a jump or branch to a subroutine, the PC is also latched into one of the two LINK registers inside of the register file. The CC register is also updated at this stage.

Restricted Sequences

Figure 45:
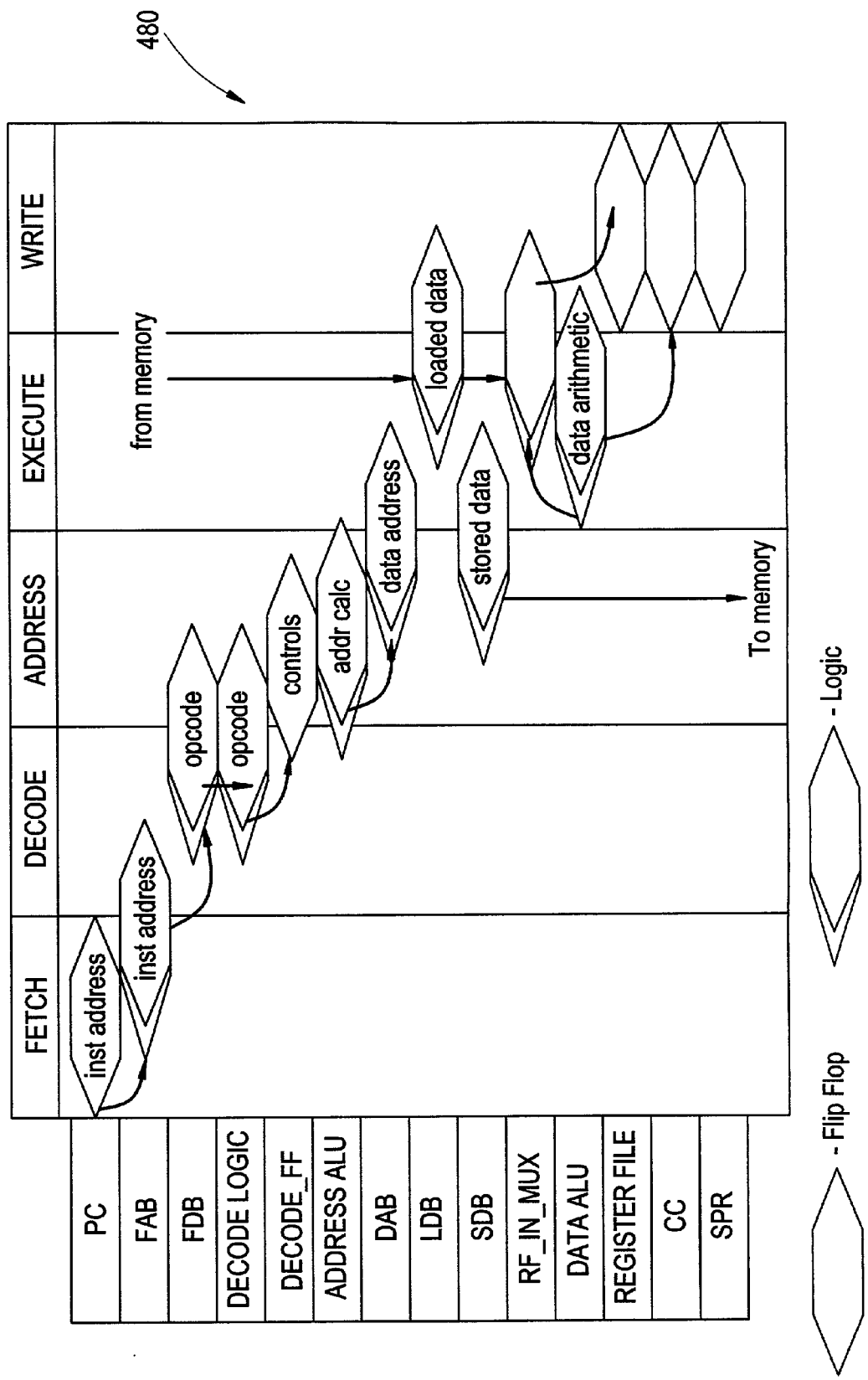
FIG. 45 is a flow diagram illustrating an exemplary network processor pipeline timing in accordance with at least one embodiment of the present invention.

The network processor pipeline is designed to enable a standard design flow with standard memory interfaces. It is a five stage pipeline which is optimized for sequences that are frequently used and sequences that have a large effect on performance. By optimizing some of the sequences, there may be other sequences that might be problematic. These may be solved by inserting software restrictions. Table 5 below lists some of the sequence restrictions according to one embodiment of the invention.

sor core. FIG. 45 starts with the update of the Program Counter (PC) with the address of the next instruction. The Fetch Address Bus (FAB) gets its content from the PC and starts a memory fetch access. A new instruction is available on the Fetch Data Bus (FDB) during the decode cycle and passed directly to the decode logic. The address ALU operates during the address stage and sends a new data address to the data memory. If the operation is a load then the loaded data is available on the Load Data Bus (LDB) during the execute stage. If the operation is a store then the stored data is placed on the Store Data Bus (SDB) during the address stage. The Data ALU gets its source operands and executes the data arithmetic at the execute stage. By the end of the execute stage, data arithmetic result and the Condition Codes (CC) are ready to be latched into the destination register on the next clock edge of the write cycle. If it is a load instruction then the loaded data is also latched into the destination register on the positive clock edge of the write cycle. All register update operations are going through the rf_in_mux and the actual update is on the write cycle. An update to any one of the Special Purpose Registers (SPRs) is also done at the write stage.

TABLE 5

| No. | Sequence Restriction | Description |
|---|---|---|
| 1 | Register update followed by a store | Any instruction which updates an r register (for example: move instructions, ALU instructions, load instructions, etc.) may not be followed immediately by a store instruction of that same r register. This includes instructions that update CC flags in r1 following by a store of r1. |
| 2 | Register update followed by a use of this register as a memory pointer | Any instruction which updates an r register (for example: move instructions, ALU instructions, load instructions, etc.) may not be followed immediately by an instruction which uses that same r register as a memory pointer or as a source for a memory pointer calculation Instructions that might use an r register as a pointer include: load, store, jump, branch, yield, and case This includes instructions that update CC flags in r1 followed by an instruction that use r1 as a memory pointer |
| 3 | Register update followed by a use of this register by AGENT WRITE instructions or by DMA instructions | Any instruction which updates an r register (for example: move instructions, ALU instructions, load instructions, etc.) may not be followed immediately by AGENT WRITE instructions or DMA instructions which use that same r register. |
| 4 | Instructions inside a delay slot | Change of flow instructions are not allowed in any kind of a delay slot Change of flow instructions include: Jump or Branch instructions Yield instructions Case instruction RFT instruction DMA instructions with the yield option set |
| 5 | Instruction inside the delay slot of a "yield" | The only instructions that are allowed in a delay slot of a yield instruction are: Store instructions Agent Write instructions DMA instructions (only when the yield option is not set) |
| 6 | Change of True sticky bit before a conditional store or conditional agent write or agent read instruction | Any instruction which updates the conditional sticky bit may not be followed immediately by a: conditional store instruction. conditional agent write instruction. conditional agent read instruction |
| 7 | SPRS to nrefetch SPR followed by an RFT instruction | SPRS instruction with nrefetch SPR as its destination may not be followed immediately by an RFT instruction |
|  | r31 register update followed by a conditional change of flow with one of r31 bits as a condition | Any instruction which updates the r31 register may not be followed immediately by a conditional change of flow instruction which uses one of r31 bits as a condition |

Pipeline Timing Diagram

Figure 46:
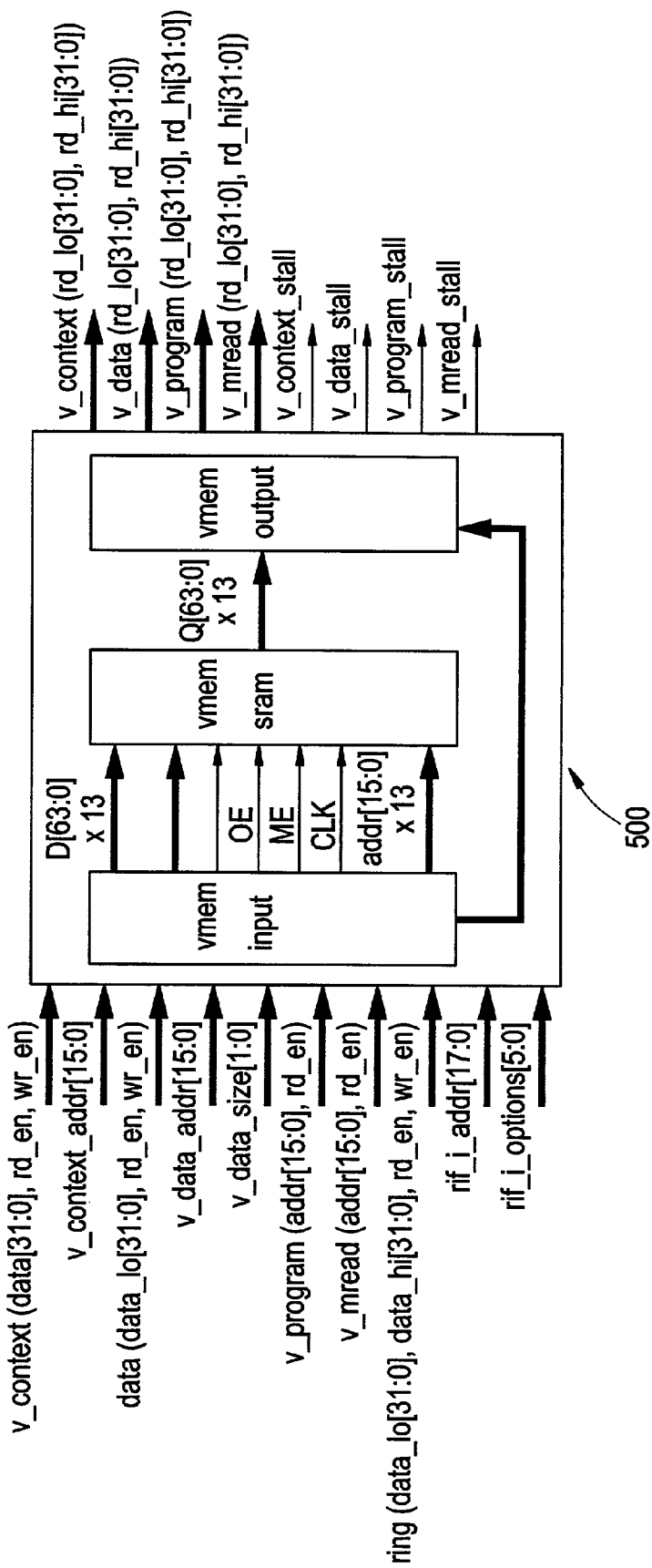
FIG. 46 is a schematic diagram illustrating an exemplary internal memory for implementation in a network processor in accordance with at least one embodiment of the present invention.

The pipeline timing and stages 480 are illustrated with reference to FIG. 45. This diagram 480 together with the pipeline block diagram 460 from FIG. 44 illustrates the basic flow through the pipeline stages inside the network proces- An Internal Memory to be Used With the Flexible Packet Processor Referring now to FIG. 46, an exemplary internal memory 500 for implementation in the network processor (NP) is illustrated. According to one aspect of the invention, the Vobla (network processor [NP]) Memory (VMEM) 500 is a small and fast memory located near the network processor NP core. The VMEM 500 serves the NP with three separate ports and the rest of the system with two ports. The main features of the VMEM according to one embodiment of the invention include: operates with the NP clock; supports multiple ports (e.g., five ports); maximum bandwidth of, for example, about 8 Gbytes/second (5 accesses×200 MHz×8 bytes); 64 Kbytes of SRAM—first area between 0 to 48 KB and second area between 64 to 80 KB.

SRAM Mapping and Priority

The SRAM, in one embodiment, is divided into three sub areas: 0 to 8 K—data and tasks context; 8 to 48 K—data and program; and 64 to 80K—program. The above 64 KB memory space can be accessed by the ring for writes and by the multireader for reads. According to one embodiment, the priority in each one of the memory areas is according to the following rule: (1) ring interface—highest priority; (2) program; (3) data (load/store); (4) context; and (5) multi reader—lowest priority.

Interfaces of the VMEM

The VMEM supports the NP by three ports: data (load/store), program, and context. The VMEM supports the ring interface and the NP compound by two ports: multireader and ring writer.

Network Processor Program Bus (v_program)

This is a read port from the NP. Each access of this bus is for aligned double words (64 bits): 15 bits for Address bus, A(17:3). This allows access to 32K double words or 256 Kbytes. A(2:0) are don't care bits in this case and 64 bits data out bus.

Network Processor Data Port (v_data)

This is a read and write port from the NP. The data size can be a byte (8 bits), half-word (16 bits), word (32 bits), or double word (64 bits). The access has to be aligned to the data size (half word on the boundary of half word, etc.). All the accesses are right aligned: byte in bits 0 to 7, half-word in bits 0 to 15, and word in bits 0 to 31. A special data aligner for this port will arrange the incoming and outcoming data according to the address and size transaction. The interface will generate the byte enable signals to the VMEM according to address bits A(2:0) and the size of the transaction, where: 16 bits Address bus—A(15:0)—Allows access to the first 64 Kbytes of the VMEM address space; A(2:0) and data size control enable signal; 48 Kbytes of SRAM in current implementation; 64 bits data out bus for read access; and 64 bits data in bus for write access.

Network Processor Context Port (v_context)

This is a read and write port from the NP. The data size is a word (32 bits) for write access and a double word (64 bits) for read access. The interface will generate the byte enable signals to the VMEM according to address bit A(2). No data aligner is needed for this interface, where:11 bits Address bus—A(12:2)—allows access to the first 2K words (8 Kbytes) of the memory space—A(1:0) and A(15:3) are don't care bits in this case; 64 bits data out bus for read access; and 32 bits data in bus for write access.

Multireader Port (v_mrd)

This is a read port from the multireader. The data size is a double word (64 bits).

13 bits Address bus—A(17:3). Allows access to all the VMEM address space.

A(2:0)—don't care.

64 bits data out bus for read access.

Ring interface Write Port (rif_i)

This is a write port from the ring interface. The data size can be from 1 to 8 bytes and the data should be in a one aligned double word so only one access to the memory is needed. The data is left aligned (big endian) and a special data aligner for this port will arrange the incoming data according to the VMEM address. The interface will generate the byte enable signals to the VMEM according to address bits A(2:0) and the size of the transaction, where 18 bits Address bus—A(17:0)—allows access to all the VMEM address space; and 64 bits data in bus for write access.

VMEM Micro Architecture

Basic SRAM Module

According to one approach, the VMEM uses two kinds of SRAM modules: a single port SRAM organized as 512 words of 64 bits (4 KB) and a single port SRAM organized as 2048 words of 64 bits (16 KB). Each SRAM gets 8 Byte Enable (BEs) control signals.

SRAM Memory Array

The SRAM array is divided into 13 SRAM modules and the overall size is 64 Kbytes. The first group is between 0 to 48K bytes. In term of address space, each pair of SRAMs occupies 8 Kbytes. The odd SRAM contains the first, third 8 bytes, etc. (0–7, 16–23, etc.), while the even SRAM will contains the second, fourth 8 bytes, etc. (8–15, 24–31, etc.). The second group is between 64 to 80K bytes. This group include a single 16K byte SRAM.

VMEM Control

The control is responsible for supporting the SRAM macros with addresses and data, and for routing the data from the SRAMs to the right bus. A contention occurs when there are two or more accesses to the same SRAM macro. In that case, a priority mechanism is needed for avoiding starvation. The VMEM sends a stall signal and the delayed transaction is kept by the VMEM until receiving service. The write access from the ring Interface port has the highest priority.

Restrictions. Any access to an unimplemented memory will respond with garbage information without a special notification to the system. Any access that crosses the eight byte boundary of the SRAM macro (i.e., a transaction to address12 and size of 8) is invalid and the result is unpredictable and without an error notification.

Data In Path

Data In aligners. There are two data aligners in the Data In Path:Data aligner for the NP Data bus. The input to the data aligner is aligned to the right with a size of 1, 2, 4 and 8 bytes.

Data aligner for the Ring write bus. The input to the data aligner is aligned to the left (big endian) with a length of 1 to 8 bytes which is part of a one double word (64 bits) entry in the SRAM.

Data In buffers. There are two 64-bits data buffers for storing the incoming data from the NP data bus and NP context bus in case of a contention in the VMEM. Since the ring write bus has the highest priority it does not need a buffer.

Address In Path

Address In buffers. There are four 16-bit address buffers for storing the incoming address from the NP data address bus, NP context address bus, NP program address bus, and the multireader address bus in case of contention in the VMEM. Since the ring interface has the highest priority it does not need a buffer.

Address In Muxes. There is a 4 to 1 mux (multiplexer) for each of the SRAM macros. The first two ports of all muxes are connected to the ports: ring write address and multi-reader address.

There are a two options for the third port: NP Context address port—connects to the two muxes that support the two SRAM macros occupying address 0 to 8K bytes; and NP Program address bus—connects to the ten muxes that support the ten SRAM macros in address 8K to 48K bytes. The NP data address bus is connected to the 12 address in muxes (the last SRAM is not connected to the data bus).

Data Out Path

Data Out Muxes. There are four data out muxes of 64 bits. A 13 to 1 mux for the multireader data out bus. This mux is connected to the 13 SRAM macros that reside in address 0 to 48K bytes and 64 to 80K bytes. A 12 to 1 mux for the NP data out bus. This mux is connected to the 12 SRAM macros that reside in address 0 to 48K bytes. A 11 to 1 mux for the NP program data out bus. This mux is connected to 10 SRAM macros that reside in address 8K to 48K bytes and to the one SRAM macro that resides in address 64K to 80K bytes. A 2 to 1 mux for the NP context data out bus. This mux is connected to 2 SRAM macros that reside in address 0 to 8K bytes.

Data Out aligner. There is a data aligner for the NP data out bus. The output of this aligner is right aligned according to the access size (1, 2, 4 and 8 bytes) and the access address.

The Core of the Flexible Packet Processor and Associated Compounds (Agents and Non-Agents)

A block diagram of the network processor core according to one embodiment of, the invention was provided in FIG. 37. The network processor compounds are those modules of the ring network implemented by the network processor that are tightly connected to the network processor core. Network processor compounds share a single ring interface and address space with the network processor core. In other words, according to one embodiment of the invention incorporating the network processor into a SOC using rings-type architecture, the network processor core and the network processor compounds are all elements of a single ring member.

Network processor compounds include agents and non-agents. Agents are programmed by network processor commands through the network processor agent interface, discussed below. Non-agents are programmed by internal agents or through the ring interface by external members.

Figure 47:
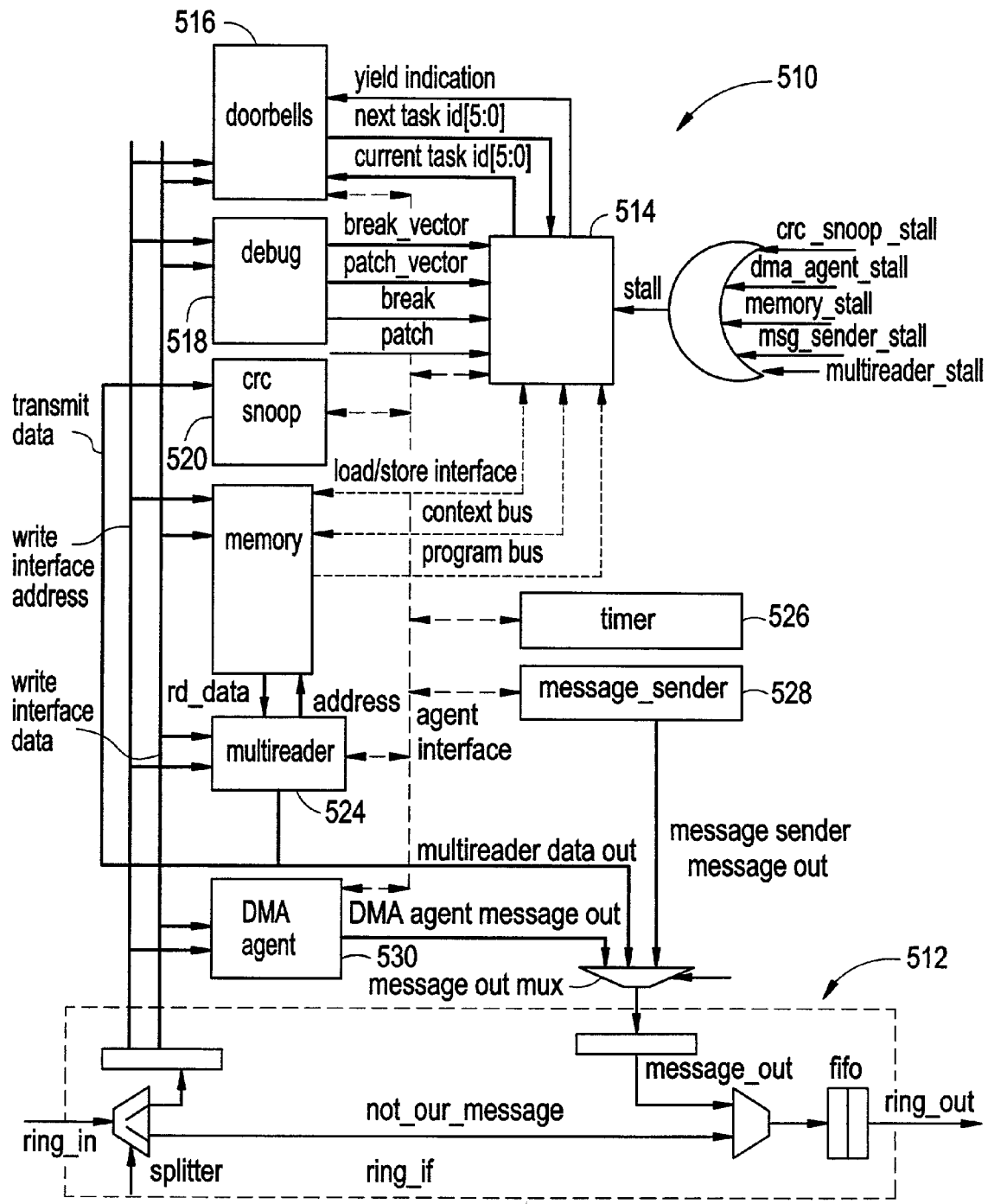
FIG. 47 is a schematic diagram of an exemplary network processor in accordance with at least one embodiment of the present invention.

FIG. 47 is a schematic diagram of the network processor 500 according to an embodiment of the invention. FIG. 47 illustrates the ring interface 512 (dotted box at the bottom) and the network processor, which includes the network processor core 514 and the various compounds. The compounds include agents such as the doorbell agent 516, CRC/snoop agent 520, multireader agent 524, timer agent 526, message_sender agent 528, and DMA agent 530.

Multireader Agent 524

The multireader module is an engine that serves requests to read portions of data from the network processor memory and sends the received data back to the destination. In one embodiment of the network processor, the destination is most likely to be located external to the network processor compound (the only internal modules that might use this data are the CRC snooper or the memory in a mode when portions of the memory are copied from one location to another location). The multireader is connected to the ring write interface, and to the agent interface, from which it could get requests to read data from the memory.

Operation

The multireader agent and the network processor memory share the same address space. Hence the multireader responds only to messages of work read type. The memory will respond only to messages of work write type.

According to one aspect of the invention, the multireader can get requests for data from the following modules: 1) local network processor (via the agent interface); 2) the three DMA controllers; 3) remote (external to the compound) network processor; and 4) the host (PP).

All the external requests for memory reads are stored in request FIFO. The local network processor requests are stored in a special request entry. There are two reasons why two different queues are used for the requests. The first reason is to have the ability to stall the local network processor if it asks for a new multiread request before the previous one was served. The second reason is to have the ability to know when the local network processor multiread was finished. These features can not be implemented by hardware for the other request sources, since the other requests sources are generated by members connected to the ring.

The network processor request entry is written from the agent interface and the request FIFO is written from the ring. All the requests are stored in the request entry or FIFO until they are serviced.

The order of serving the multiread requests is as follows: If the network processor entry has a valid multiread request, it will served before any other request in the request FIFO. If the network processor request entry is empty other requests will be served on first-in-first-out basis.

The multireader, in one embodiment, has the ability to stall data sent to the ring. A stall of data delivery could occur if the output FIFO of the ring is full, or there is a higher priority message that should be sent to the ring (for example DMA, message sender messages).

Figure 48:
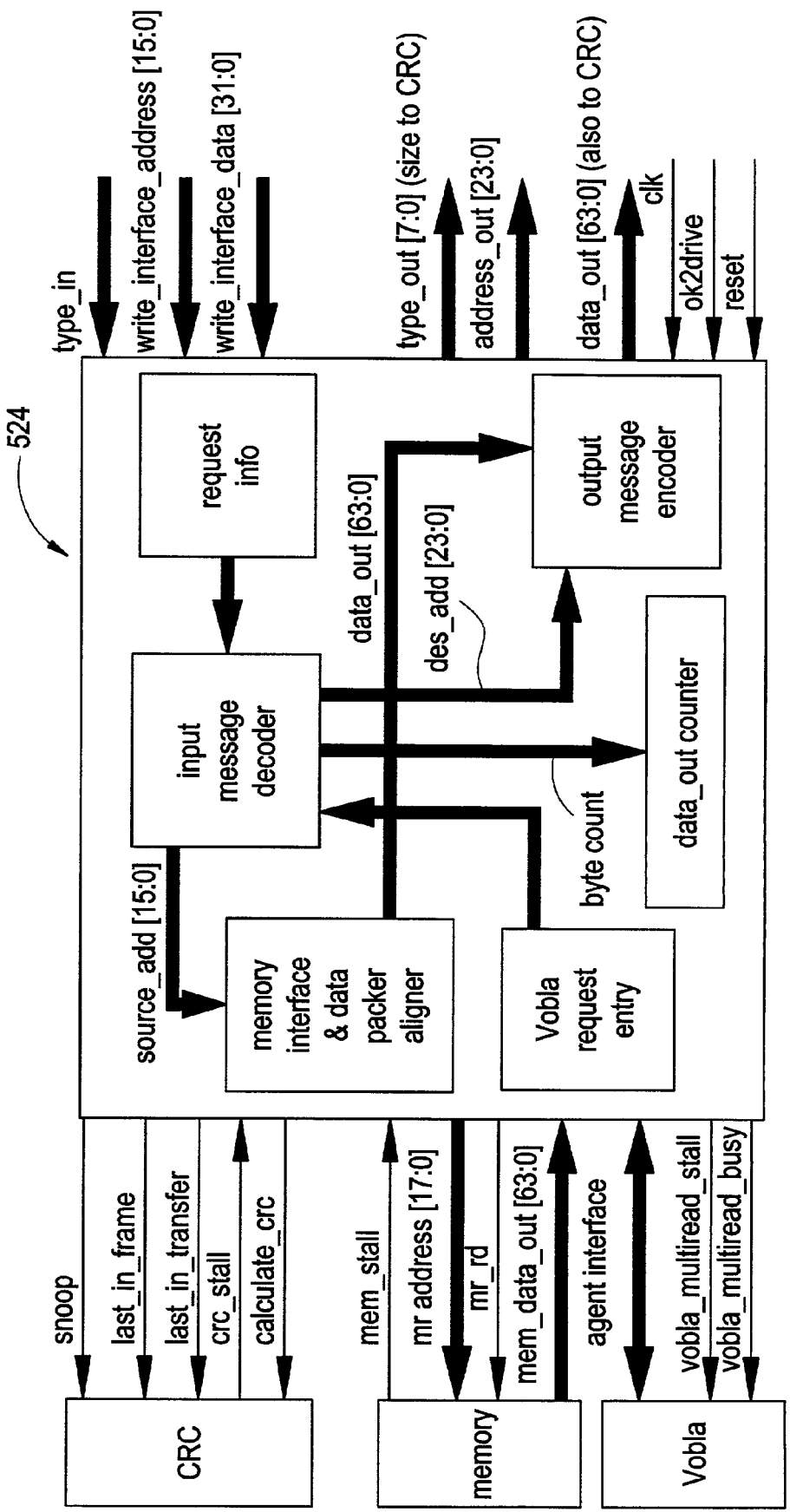
FIG. 48 is a schematic diagram illustrating an exemplary multireader agent in accordance with at least one embodiment of the present invention.

The multireader request FIFO preferably is 8 entries deep (which should be sufficient to avoid the overrun case). FIG. 48 is a schematic diagram of the multireader agent 524 according to an embodiment of the invention.

Data Packing and Alignment

The network processor memory, in one embodiment, uses a 64-bit data port. The multireader wants to take advantage of this fact so every memory read will be of eight bytes. In this system there is a need to allow byte size data transfers over the ring from any memory location to any destination address.

The data that is read from the memory and sent on the ring in a ring is aligned to the left (MSB [most significant bit] of the message) because big endian byte orientation is used. Because of those requirements there is a need to add an aligner in the multireader.

Another goal is to minimize data transfers over the ring and enable straight forward writing to FIFOs. This goal is satisfied using data packing logic which means that all the transferred messages except the last one will contain 8 valid bytes. The last message might contain less than 8 bytes, in which case the message type will indicate how many valid bytes there are.

Figure 49:
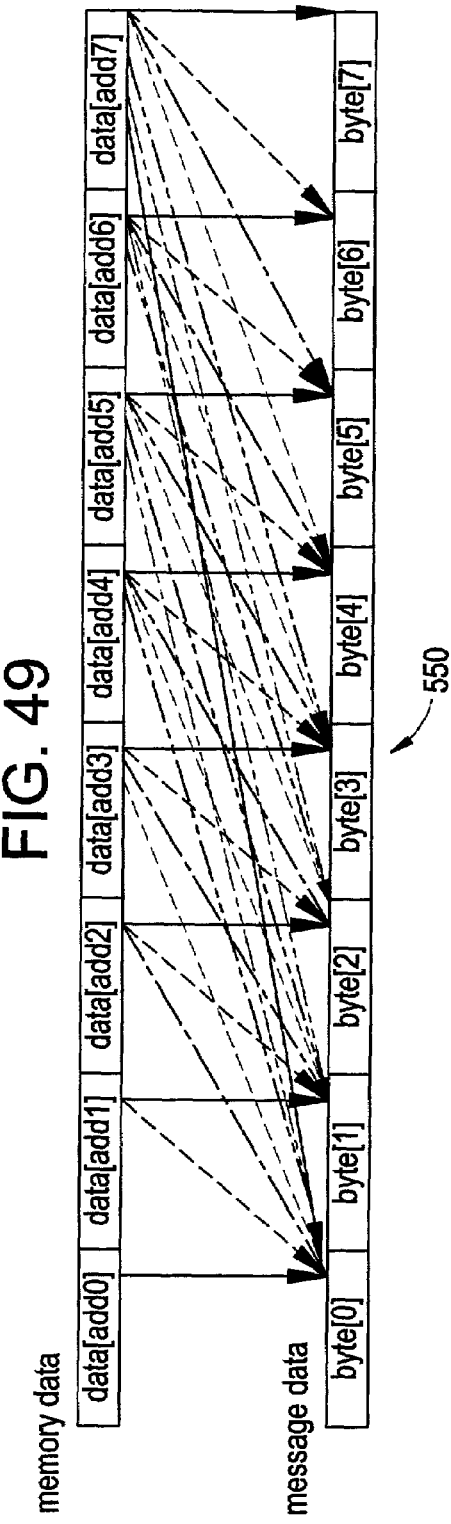
FIG. 49 is a flow diagram illustrating an exemplary data alignment and packing process in accordance with at least one embodiment of the present invention.

The alignment and packing is done in the following manner. FIG. 49 describes the data alignment 550 in case the last message contains 8,7 . . . , 1 valid bytes, when reading from an aligned address. It should be noted that when data is written to memory, the opposite alignment should be performed. For example, consider the following scenario: reading 10 bytes starting at address=5. The multireader will send the following data in the messages (X in the data part of the message means that this byte is don't care).

Multireader—Memory Interface

The multireader starts to issue memory read cycles if there is at least one multiread request pending in the multireader request FIFO or request entry. Every read cycle that the multireader issues to the memory is a 8 byte request (in order to reduce the number of requests). The memory read cycle starts when the multireader generates the address and read strobe for the memory. The memory detects this request and, if not busy with other requests, it drives the data to the multireader on the following cycle. If the memory is busy and can not drive the data to the multireader, it stalls the multireader. The multireader waits for the data from the memory as long as the stall signal is asserted.

It is desirable that the originator of the multiread request will have the ability to know that the multiread operation is complete. If the originator of the multireader request is the local network processor, it will have the ability to know if the multiread operation had finished. The multireader will send the network processor a signal indicating that the multireader did not finish the multireader transfer of the local network processor. The multireader busy indication will be asserted when the multiread request is registered in the network processor entry and negated after the last message containing data of this request is sent to the ring.

For other originators of multiread requests (like the remote network processor or PP), the indication of multiread transfer end is controlled by software. The software control is achieved by preparing a special data word at the end of the transferred block. The destination of the multiread operation snoops this data. When this data is detected the multiread operation is finished. Note that only one transfer can be active during the time of the snoop (otherwise it will not be possible to detect which operation is finished).

Sending a Message With First/Last Data in Frame Indication.

The multireader looks in the type field of the incoming message (multiread request) or in the options bits of the network processor multiread request, and, if the bit F is set, the first message in the multiread process will be sent with a destination address which indicates the first byte in the frame.

The multireader also looks in the type field of the incoming message or in the options bits of the network processor multiread request, and, if the bit L is set, the last message in the multiread process will be sent with a destination address which indicates the last byte in the frame. (Every FIFO in the system should have three addresses which when writing to it indicates first, last data in the frame). The Multireader will modify bits 2,3 of the destination address according to the F,S bits.

Calculating CRC of Message Data In case there is a need to calculate the CRC of the message data, the multiread request must set the S option bit. This bit will cause the multireader to send all the messages with the type in which the S (snoop) bit set. The CRC machine will snoop those messages and calculate the data CRC. Since the CRC machine is a 32-bit machine and the message data is 64 bits wide, the CRC machine should have ability to stall the multireader from sending data to the ring when the CRC calculation on the data has been completed.

Multireader Input and Output Message Formats

A general multireader message will have the following format, as set forth in Table 6, for multireader input and output message format.

TABLE 6

| Field | Description |
|---|---|
| type[7:0] | The type field describes the incoming message type. The following types are valid:<br>type[7:0] = 00000XXX: idle<br>type[7:0] = 010XXLFI: work read |

TABLE 6-continued

| Field | Description |
|---|---|
| address[23:0] | The field describes the starting address for reading data from Vobla memory. |
| data[31:0] | This field contains information required for generating the output message and the operation of the multireader.<br>data[23:0] = Destination address of the data.<br>data[31:24] = The number of bytes to read from the Vobla memory, (if data[31:0] is zero the multireader reads 256 bytes) |

Table 7 illustrates the multireader output message format for the multireader sending data to the rings. It should be noted that the multireader input message type is always a read type, and the output message is always a work_write type.

TABLE 7

| Field | Description |
|---|---|
| type[7:0] | The type field describes the outgoing message type. The following types are valid<br>type[7:0] = 00000XXX: idle<br>type[7:0] = 100FLZZZ: work write. |
| address[23:0] | The address of the destination. This information is based on what was extracted from the input message data field, and the option bits of the message type (L/F/I). |
| data[63:0] | data[63:0] - This field contains the data that was read by the multireader. |

Network Processor Multiread Request Format

Figure 50:
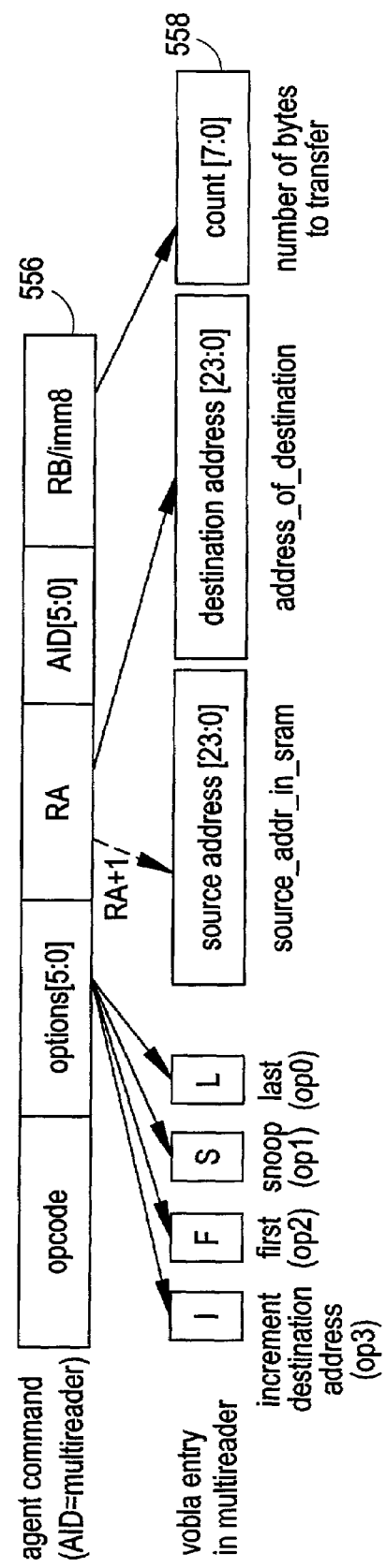
FIG. 50 is a flow diagram illustrating a mapping of data from a multireader agent bus to a multireader operation in accordance with at least one embodiment of the present invention.

When the network processor initiates a multiread request, it has to write to the network processor entry in the multireader. FIG. 50 describes how the multireader maps the data on the agent bus 556 to the multireader operation 558. The options are:

L—indication of last multireader request in frame (L=I last).

F—indication of first multireader request in frame (F=I first).

S—snoop indication for the CRC snooper (S=I snoop this message).

I—increment destination address, after every multiread transfer.

If the network processor sends new multiread requests while the multireader is busy serving previous requests those requests will stall network processor. (Note: If count value is zero the multireader reads 256 bytes from the memory.)

Requests Serving Priority

According to one approach, if there are more than one multiread request pending, the priority of serving them will be: (1) serving local network processor requests if there are pending requests; and (2) serving all other requests on a FIFO basis.

Multireader Operation Scenarios—Examples.

Example A—Sending data to serial transmit FIFO:(1) The serial sends a request to fill its transmit FIFO.

(2) The request is registered in the doorbell logic. When this request is serviced, the network processor sends an agent write command to the multireader asking for data transfer.

(3) The multireader decodes the message (or the agent command) and initializes its operation.

(4) The multireader initiates memory read cycles and data from the memory is sent to the multireader.

(5) The multireader packs the data, generates the output message, and sends it to the ring if the ring is vacant. The destination is the transmit FIFO in the peripheral.

(6) The process of reading data and sending it to the destination repeats itself until all the data transfer is complete.

Example B—Sending data to DMA write (transmit) buffer: (1) The DMA controller issues a multireader message. This message asks for data transfer from the memory to the DMA controller write buffer (The message will contain the destination address and the number of bytes that are required and the starting location in the network processor memory).

(2) The multireader decodes the message and initialize its operation.

(3) The multireader initiates memory read cycles and data from the memory is sent to the multireader.

(4) The multireader packs the data, generates the output message, and sends it to the ring if the ring is vacant. The destination is the write buffer in the DMA controller.

(5) The process repeats it self until all the data transfer is completed.

Software/Hardware Restrictions

According to one embodiment of the invention, the following restrictions may apply: do not activate more than one multireader at a time from each source (except the DMA, which can send two) in order not to cause overflow in the FIFO; and if the destination of the multiread request is one of the NP memories, only aligned transactions are supported because the memory does not support overflow of memory entry during a write (split one write command to two).

Message Sender Agent 528

Figure 51:
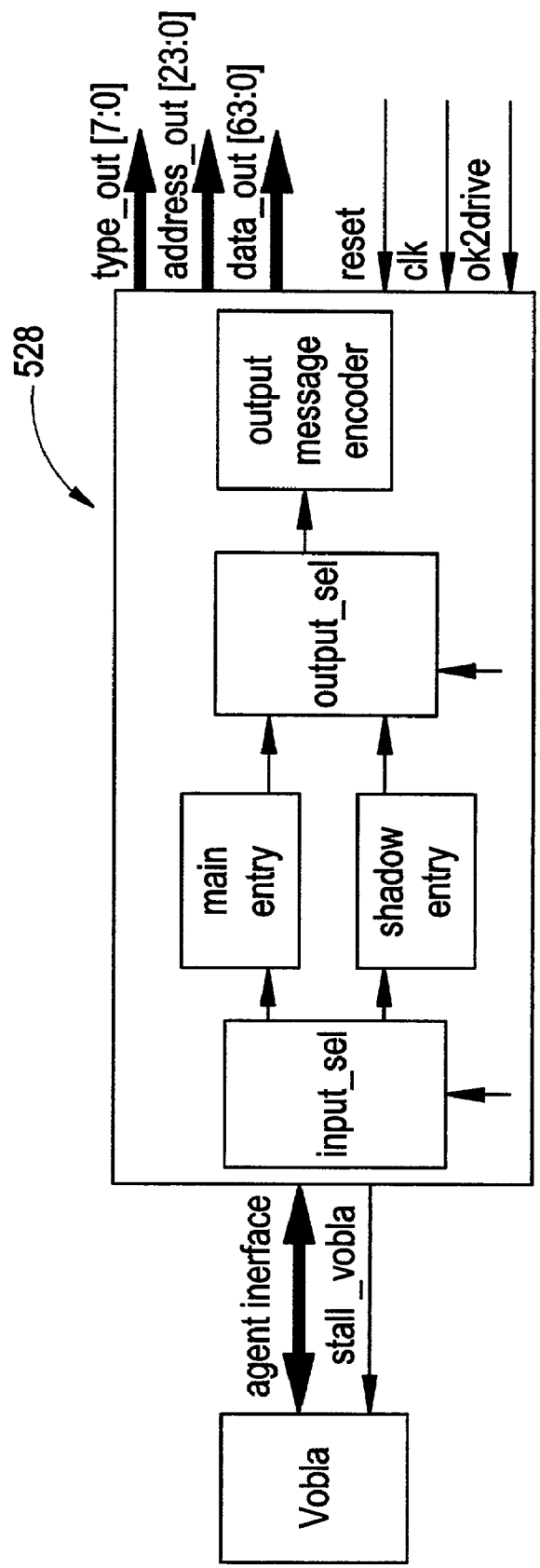
FIG. 51 is a schematic diagram illustrating an exemplary message sender of a network processor in accordance with at least one embodiment of the present invention.

The message sender agent 528 is a module which translates a network processor AGENT command to a message to be sent to a destination on the ring. The message sender is connected to the network processor agent interface. The message sender is a powerful module since it can generate messages in all the different messages types that are available in the system. This means that the network processor can send messages to all the modules that are connected to the ring, and even replace the host in sending supervisor messages. This feature can be very beneficial while debugging the system. The block diagram of the message sender 528 is shown as FIG. 51.

There are three instructions dedicated for agent commands: AGENTW, AGENTWI, and AGENTR. The message sender ignores the AGENTR command. The AGENTW/I commands drive the value of three registers, or two registers and an immediate value, on the agent bus. Those registers are marked RA, RAP, and RB (or imm8). The message sender will interpret the content of those registers in the following way (shown in FIG. 52):

Mapping for the AGENTW command is as follows:

RAP[23:0]—The destination address or the 32 LS (least significant) bits of the data. This is a 24-bit address of a module (destination) that is connected to the ring or the 4 LS bytes of the data that is sent to the ring when using the 64-bit data mode.

RA[31:0]—The data that will be sent to the destination (typically in work read messages it will include the return address for the data that was read from the module and the number of bytes to read).

RB[7:0]—The message type that will be sent to the destination (only the LSB of RB will be used). In a 64-bit data message RB is the address of the message destination.

The AGENTWI command drives the value of two registers, eight bit immediate value (imm8) on the agent bus. The registers are marked RA and RAP. The message sender will use the content of those register in the following way:

RAP[23:0], RA[31:0]—same as AGENTW command.

imm8—the message type that will be sent to the destination.

Figure 52:
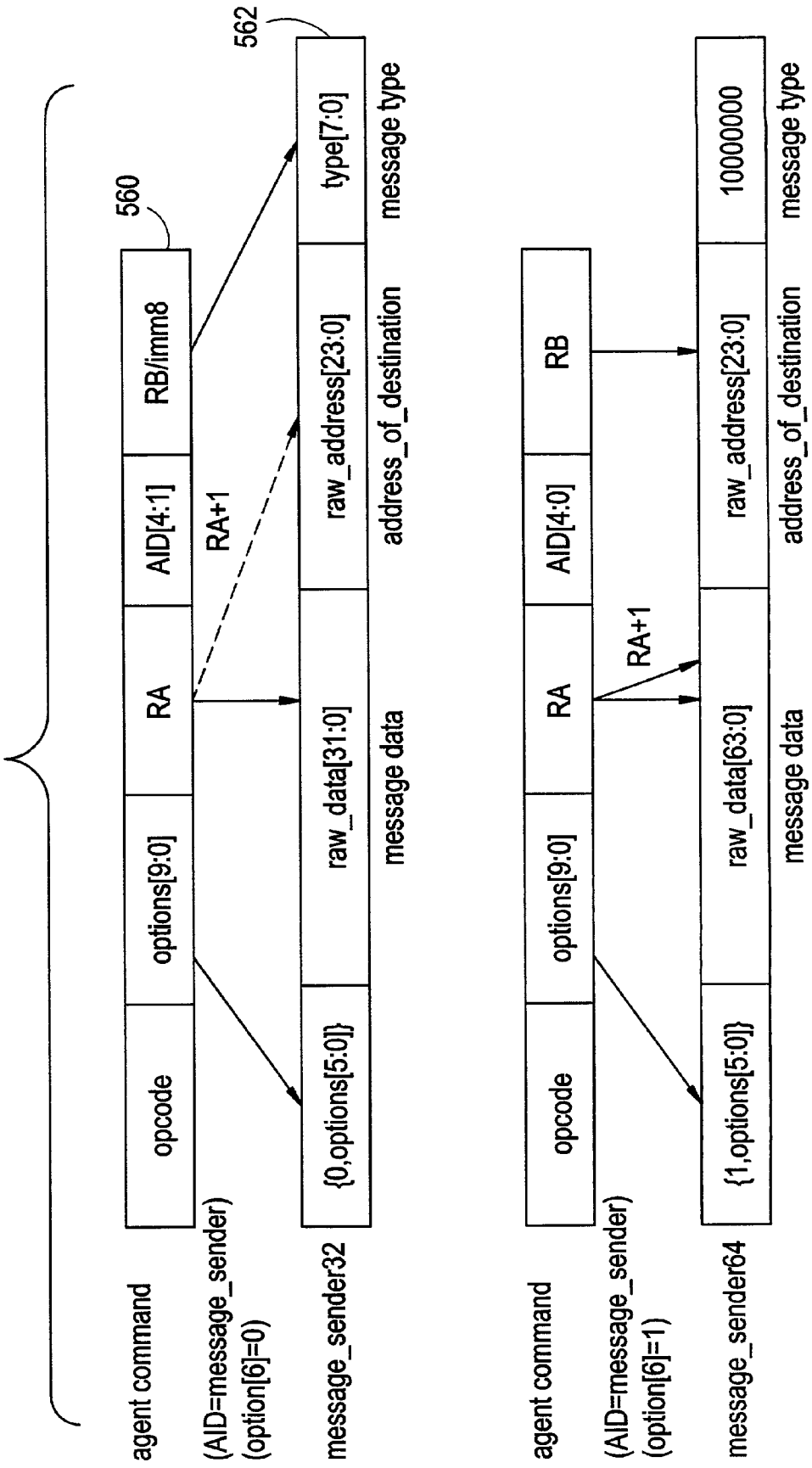
FIG. 52 is flow diagram illustrating an exemplary mapping of an agent write command to a message in accordance with at least one embodiment of the present invention.

Note: If the AGENTWI command is used there is no possibility to send a 64-bit data message. Both commands also drive option bits, which are part of the AGENT opcode. Each module uses those bits in a different way. The message sender will use 7 option bits. FIG. 52 illustrates a mapping an agent write command 560 to a message 562.

If the network processor sends new requests for message sending while the message sender is busy serving previous requests, those requests will stall network processor. The message sender will have an internal queue of 2 entries so it can store 2 requests for sending messages before stalling the network processor.

Message Sender Output Message Types

Table 8 illustrates the message sender output message format according to an embodiment of the invention.

TABLE 8

| Field | Description |
| --- | --- |
| type[7.0] | The type field describes the outgoing message type. The following types are valid. (see message type table for more details).<br>type[7.0] = 00000XXX: idle<br>type[7:0] = 11111NNN: supervisor.<br>type[7:0] = 010XXLFI: work read.<br>type[7:0] = 100FLZZZ: work write. |
| address[23.0] | The address of the destination. This is the content of RAP or RB according to the mode used (option bit 6). If option[6] is one the address is taken from RB. |
| data[63:0]/[31:0] | The message data. The content of RA or RA and RAP according to the mode used (option bit 6). If option[6] is one RA, RAP are used. |

Data alignment. The alignment of the message data is determined according to the message size and type. The following Table 9 describes message data alignment.

TABLE 9

| output message type | Operation mode (64/32) | data size (in bytes) | output message format |
| --- | --- | --- | --- |
| work write | 64 | 8 | {RA[31:0],RAP[31:0]} |
| work write | 32 | 1, 2, 3, 4 | {RA[31:0],32'b0}<br>{RA[31:0],32'b0}<br>{RA[31:0],32'b0}<br>{RA[31:0],32'b0} |
| work write | 32 | 8 | {32'b0,RA[31:0]} |

TABLE 9-continued

| output message type | Operation mode (64/32) | data size (in bytes) | output message format |
|---|---|---|---|
| work read | don't care | don't care | {32'b0,RA[31:0]} |
| supervisor | don't care | don't care | {32'b0,RA[31:0]} |

Sending a 64-bit Data Message

The message sender can send a 64-bit data message. Sending a 64 bit message is done by setting option bit[6] of the AGENTW command to one (this option is not available for the AGENTWI command). If this option is used the message sender uses the content of RA,RAP as the source for the raw data, and RB as the source for the raw address. In this mode the message type is always work write, with 8 valid data bytes. There is no provision for sending less than 8 bytes.

Handling Data and Address Options

The message sender uses six option bits that are driven by network processor in order to modify the value of the raw_data and raw_address. This feature is useful when the value in the registers are used as constants and are modified as required. For example, when writing to a FIFO the content of RAP will be the FIFO address, and when the system seeks to write the first in frame or last in frame locations the address will be modified using the option bits. Data modification is useful when sending a doorbell request. The data for the doorbell request is only 3 bits. Hence the raw data can be modified to generate data for the doorbell request. The address and data modification may be performed as follows: (1) the content of RAP[4:2] or RB (in 64 bit data mode) is OR'd with the option[2:0] bits to generate the message destination address; and (2) if the value of options bits[5:3] is not zero, the content of RA[2:0] or RAP (in 64 bit data mode) is replaced with options[5:3] bits to generate the message data. Address and data modification are active regardless of the message sender operation mode.

Software/Hardware Restrictions

Software/hardware restrictions include the following in one embodiment of the invention: (1) the 64-bit data mode is available only when using AGENTW command; and (2) in 64 bit mode the message type is always work write.

DMA Agent

In a system with multiple processors (e.g., a system on a chip with multiple network processors) that can send DMA transfer requests to one of multiple DMA controllers in the system, one challenge is knowing whether the DMA request can be serviced prior to issuing the request to a particular DMA controller. Otherwise, a DMA controller can be overloaded with DMA requests that it can not service.

According to one beneficial aspect of the present invention, this challenge is met by providing a DMA agent module as a peripheral to each processor in the system. For the network processor (Vobla) described herein, for example, such a DMA agent may be implemented as one of the tightly linked compounds on the overall network processor. In other words, the DMA agent is a compound that shares the same ring interface as the overall network processor existing as a ring member.

According to this approach, the DMA agent operates to control the DMA transfer requests that are sent by the processor as follows:

(1) Each DMA controller has a dynamic pool of tokens that the DMA controllers allocate for use by the DMA agents linked to the various processors. In other words, each DMA controller has a pool of tokens that the DMA controller can distribute among the various DMA agents.

(2) Each valid token allows a DMA agent to send one DMA request to the DMA controller that owns the token. If there are no valid tokens, no DMA requests can be issued by the DMA agent and the processor will stall.

(3) The DMA agent periodically queries the DMA controllers for tokens whenever the number of valid tokens in the DMA agent's pool is less than a number prespecified by software. The maximum number set by software can change.

In sum, this approach avoids the scenario of the DMA agent issuing requests that can not be serviced because the maximum number of requests that can be sent does not exceed the number of tokens held by the DMA agent.

Figure 53:
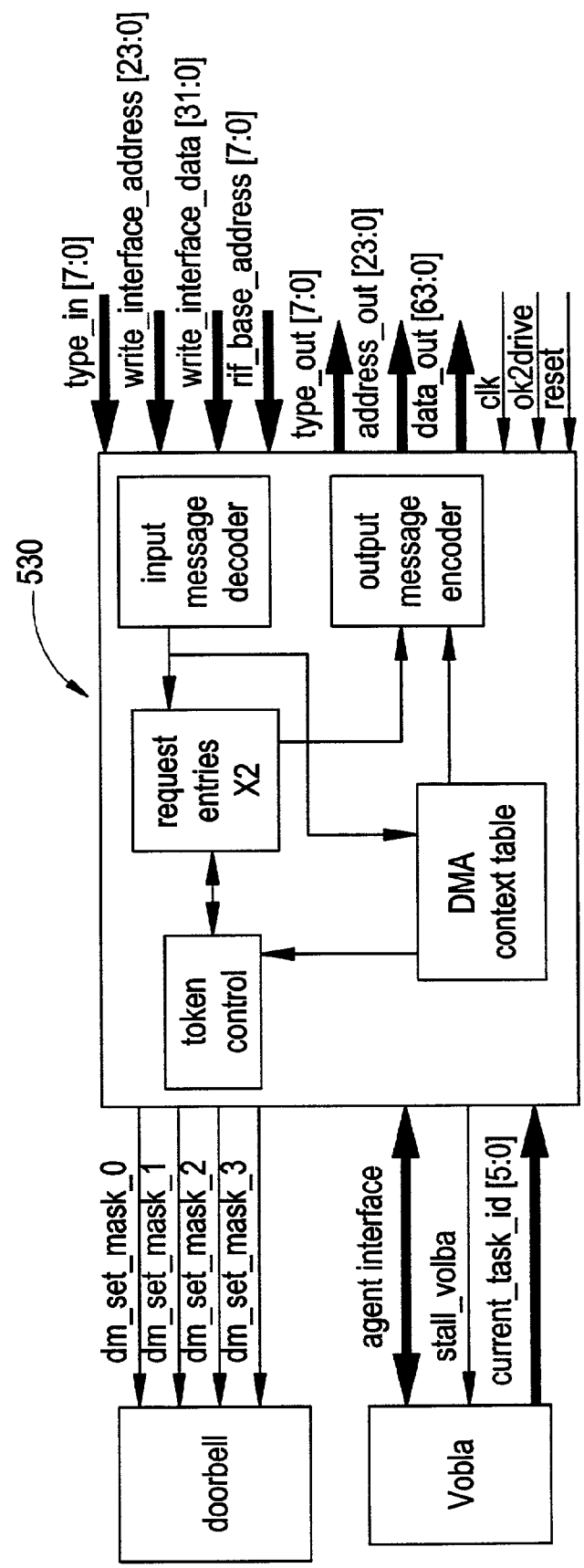
FIG. 53 is a schematic diagram illustrating an exemplary direct memory access agent module in accordance with at least one embodiment of the present invention.

The DMA agent module 530 (illustrated in FIG. 53) translates network processor DMA commands to ring messages used to initialize the DMA controller.

According to one embodiment of the invention, each network processor has one DMA agent. Each DMA agent has the ability to control each and every one of the DMA controllers that are available in the system, using the context table (e.g., in the implementation there are 3 DMA controllers, and each DMA agent can control up to 4 DMA controllers). According to one approach, the fourth DMA controller is provided for future system expansion.

The DMA agent is connected to the network processor agent interface and to the ring write interface. The DMA agent registers can be written by the host only via the write bus using ring messages. The context table is initialized by the PP once, and it is not changed during regular work. The token registers should be written only by the DMA controllers.

The Sources for Requests

The DMA agent can receive requests to initialize a DMA channel only via the agent interface using special network processor DMA commands. The DMA agent has a small request queue of two entries in order to minimize the need to stall the network processor if the DMA request could not be serviced (e.g., this could happen if for example there are no available tokens, or if the DMA is unable to send the messages to the DMA controller because the ring is busy).

Requests Priority. There are two priority levels for DMA requests in the DMA controller. The lower priority level is regular and the higher priority level is urgent. By default all DMA requests are regular. A DMA request can become urgent if the processor defines it as urgent. Requests that have urgent priority have the urg bit in the message set, and will get a higher priority in the DMA controller queue. The DMA agent ignores the urg bit (it sends it on to the DMA controller), and serves the requests in the order they arrive.

DMA Agent Context Table

The DMA agent context table maps a network processor DMA command to the actual request that will be sent to the DMA controller that was selected. The actual request defines the parameters for the current DMA transfer. The context table has four entries. The table entry to be used is determined by a two bit pointer encoded out of the 4 MSB (most significant bits) of the DRAM address in the DMA command. (The reason that 4 bits are used is because the DRAM address space is divided into 16 parts and only 4 could be accessed by the DMA). The entry allocation, which is hard coded. The context table could be written using write messages. The table should be initialized before starting any DMA access. The context table could be read using read messages.

ADDR=DMA-AGENT-BASE to DMA_AGENT_BASE+$F. Note: The maximum number of tokens which could be allocated for one channel is 15. Table 10 provides a description of the DMA context table.

TABLE 10

| field | description |
|---|---|
| address[13:0] | The physical base address of the DMA controller to be used. |
| visitor[2:0] | The number of the request and mask bits to set for the current DMA transfer. This field is common to all the contexts. |
| max_tokens[3:0] | This field describes the maximum number of tokens that could be used by this DMA channel. |

DMA agent token control. In order to manage DMA transfers from different sources with different contexts, a free token transfer based approach is used. According to this approach, the DMA agent has a pool of tokens. The service of a DMA request can start-only if there are available valid tokens allocated for this DMA channel in the DMA agent. If there are valid tokens, the processing of the DMA request can start as previously described. If there are no available tokens to execute the DMA request, it will be registered in the DMA agent queue, and will wait for execution until the DMA agent gets a token from the DMA controller (note that of the DMA agent queue is full the request will stall the network processor).

Token distribution is performed using messages. The DMA agent issues a request for a token to the DMA controller each time the number of valid tokens is less than the maximum allowed tokens (which is specified in the context table). The DMA controller sends the token back to the agent and marks this token as used in its token list. The DMA controller will free the token again when the DMA transfer is finished (i.e., before sending the message to the doorbell). If the DMA controller has no free tokens then it sends the DMA agent an invalid token (i.e., all the bits in the token response are zero).

The DMA controller sends the DMA agent a valid token to the address of the token that was used (the DMA agent sends this address in the token request message). According to one embodiment of the invention, each DMA controller has a pool of a maximum of 16 tokens for each DMA channel. Of course, the number of tokens that is available for each DMA controller is flexible and could change according to system needs. The DMA agent token registers contains the token numbers that the DMA controllers allocated for use (the valid tokens are marked by setting the appropriate bit to one). The token registers can be written only by the DMA controllers. There are four token registers in the DMA agent. Table 11 illustrates the DMA agent channel[i] token register.

Table 12 provides a description of the DMA agent channel [i] token register.

TABLE 12

| field | description |
|---|---|
| token[15:0] | This field describes which tokens are valid and can be used for DMA transfers:<br>token[i] = 0 token not valid.<br>token[i] = 1 token is valid. |
| req | This field indicates that the DMA agent had issued a token replacement request but did not get a response:<br>req = 0 no token request is pending.<br>req = 1 token request is pending. |
| novt[3.0] | This field describes the number of valid tokens that used by the DMA agent for this DMA channel. |

When a DMA request is registered with the DMA agent, the DMA agent searches the appropriate token register to see if there are valid tokens. If there are valid tokens, the DMA agent uses one of them (e.g., the first one it finds) and marks that token as invalid. Then, the DMA agent starts the data transfer for channel initialization. The DMA agent also sends the DMA controller a message to replace the used token with a new one (this will be work read type message). The indication that the DMA agent issued a token replacement request is made by setting the req bit of the relevant token register. If the DMA controller has a free token available it will send it to the DMA agent, and the agent will replace the used token with the new one (i.e., the request bit is cleared). If the DMA controller does not have a free token available, it will send the DMA agent an invalid token (i.e., all the token bits are cleared and the req bit is cleared). The DMA agent issues a new token replacement request after a maximum of 4 cycles.

Address Error Control

The DMA agent has the ability to recognize if the DMA transfer is made to an illegal external address for each of the external DMA channels. When the DMA agent identifies such an access, it sends a special error message to the PP, informing the PP of the illegal access parameters.

Address error calculation is performed on the SDRAM address written by the network processor using the DMA command. The SDRAM address is split into two parts. The first part is bits [31:28] of the address and the second part is bits [27:20] of the address. The address error logic compares the first part of the SDRAM address to each one of the values (0, 0x2, 0x4, 0xf), which correspond to the 4 MS bits of the SDRAM areas. If a match is not found, an address error occurs and a special error message is generated by the DMA agent. If there is a match, the bits of the second part are compared according to a programmed mask to zero. If the result is not equal to zero an address error is generated, and an error message is sent.

TABLE 11

| 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|
| novt | | | | req | token[15:0] | | | | | | | | | | | | | | | |
| 0 | | | | 0 | 0 | | | | | | | | | | | | | | | |

ADDR=DMA_AGENT-BASE+$10--DMA_AGENT_BASE+$1F

Address error mask register. Four (one for each external channel) 8-bit registers are used to store the mask values for address error computation. The mask value will be used to mask the comparison of some of the bits in the second part of the SDRAM address (bits 27–20). If a bit in the mask register is set, the corresponding SDRAM address bit will not be compared in the address error calculation. The reset value of the register is zero so as to enable the comparison of all 8 bits. Table 13 illustrates the DMA address error mask register[i].

TABLE 13

| 7 | 6 | 5 | 4 | 3 | 2 | 1 | 0 |
|---|---|---|---|---|---|---|---|
| mask[7:0] ||||||||

ADDR=DMA_AGENT_BASE+$30--DMA_AGENT_BASE+$3F

Table 14 provides a description of DMA address error mask register.

TABLE 14

| field | description |
|---|---|
| mask[7:0] | This field describes which bits of the SDRAM address are masked during the process of address error calculation.<br>mask[i] = 0 the corresponding SDRAM address is not masked.<br>mask[i] = 1 the corresponding SDRAM address is masked. |

(Note: There could be cases in which the DMA controller accesses an invalid external address that the address error logic does not detect. For example, this could happen if the base address of the transfer is in the real or normal range, but the address generated by the DMA during the transfer overflows this range.) (Note: If the network processor issues a DMA request to a channel that was not initialized [i.e., the corresponding context table entry was not initialized] and address error will occur.)

DMA Agent Input and Output Message Formats

The DMA agent input and output message format is now described. A general DMA agent message will have the format as shown in Table 15.

TABLE 15

| Field | description |
|---|---|
| type[7:0] | The type field describes the incoming message type. The following types are valid. If the last bits are X they are ignored:<br>type[7.0] = 00000XXX: idle.<br>type[7:0] = 010WXLFI: work read.<br>type[7:0] = 100FLZZZ: work write. |

TABLE 15-continued

| Field | description |
|---|---|
| address[23:0] | The field describes the starting address space of the DMA agent. The DMA agent register address is from DMA_AGENT_BASE_ADD to DMA_AGENT_BASE_ADD + $1F. |
| data[31:0] | The data to be written to the registers. |

The DMA agent output message format encoding is shown in Table 16 below.

TABLE 16

| field | description |
|---|---|
| type[7:0] | The type field describes the outgoing message types. If the last bits are X they are ignored.<br>type[7:0] = 00000XXX: idle<br>type[7:0] = 11111101: error<br>type[7:0] = 010WXLFI: work read.<br>type[7:0] = 100FLZZZ: work write. |
| address[23:0] | The address of the destination. This address is a function of the base address written in the context table and the token number (see FIG. 33 for more details). |
| data[63:0] | data[63:0]—This file contains the data for the DMA controller. |

DMA Controller Message Data According to one approach, the DMA agent will send the DMA controller two messages for each DMA transfer that was initiated by the network processor. The following tables describes the data part of each message. Table 17 illustrates the DMA controller message number 1.

TABLE 17

| 31 30 29 28 27 26 25 24 | 23 22 21 20 19 18 17 16 15 14 13 12 11 10 9 8 | 7 6 5 4 3 2 1 0 |
|---|---|---|
| address[23:0] = destination_addr 1 || type = 10000000 |
| rsrvd | doorbell_address[23:0] ||
| rsrvd | sram_address[23:0] ||

The first message that will be sent from the DMA agent to the DMA controller contains the return address for the DMA request doorbell and the internal SRAM address. The doorbell and the SRAM address are 24 bits wide:

doorbell address[23:0]—the 24 bits of the doorbell register to which the DMA controller should send the acknowledgement at the end of the transfer. The 6 LSB bits of this address are the task ID number at the time the DMA command was initiated.

SRAM address[23:0]—24 bit address inside the internal SRAM (this is a full ring address).

Table 18 illustrates the DMA controller message number 2.

TABLE 18

| 31 30 29 28 27 26 25 24 | 23 22 21 20 19 18 17 16 15 14 13 12 11 10 9 | 8 7 6 5 4 3 2 1 0 |
|---|---|---|
| address[23:0] = destination_addr 2 | | type = 10000000 |
| dram_address[31:0] | | |
| rsrvd | count[7:0] | rsrvd | end | vst[2:0] | ack | dir | urg |

The second message contains the external DRAM address and control information for the DMA transfer. The control information includes:

urg—1 bit of urgent DMA request.

dir—1 bit of the transfer direction (SRAM to DRAM or DRAM to EXAM). This information is found in the DMA command.(dir=0 SRAM to DRAM; dir=1 DRAM to SRAM).

ack 1—the bit of doorbell acknowledgement enable. This bit will tell the DMA whether it should send a doorbell at the end of the transfer. This information is found in the DMA command.

count[7:0]—8 bits of the transfer size. This information comes from the DMA command.

vst[2:0]—3 bits of visitor code. These bits indicate which request bit the DMA controller should set in the doorbell request register.

end—endian mode bit. The endian bit is the LSB bit of the DMA agent ID. (end=0 big endian mode).

Token request and token reply messages. Tables 19 and 20 illustrate a token request and token reply message, respectively. The data part of the token request contains the address in the token register that should be written with a new token.

DMA agent calculating the message destination address. According to one approach, the messages that the DMA agent sends to the DMA controller are sent to three different destinations. The first two of these message destinations are:

DESTINATION_ADDRESSI={DMA_BASE_ADDRESS[13:0],0,1, token_number[3:0], 0,0,0,0}

DESTINATION_ADDRESS2={DMA_BASE_ADDRESS[13:0],0,1, token_number [3:0],1,0,0,0}.

The destination address of the token request is:

DESTINATION_ADDRESS3={DMA_BASE_ADDRESS[13:0],10'b0}.

Error Message Format

Table 21 illustrates the error message format.

TABLE 21

| 31 30 29 28 27 26 25 24 23 22 21 20 19 18 17 16 15 14 13 12 11 10 9 | 8 7 6 5 4 3 2 1 0 |
|---|---|
| token_register_address[23:0] | type = 10000000 |
| rsrvd | token[15:0] |
| rsrvd | |

(Note: The doorbell address is the address to which a doorbell should have been sent at the end of the DMA transfer if an address error has not occurred. This address contains the task ID information in the six LSB bits and the base address of the network processor from which the message error was sent in bits 23–6.)

Network Processor DMA Request Format

Figure 54:
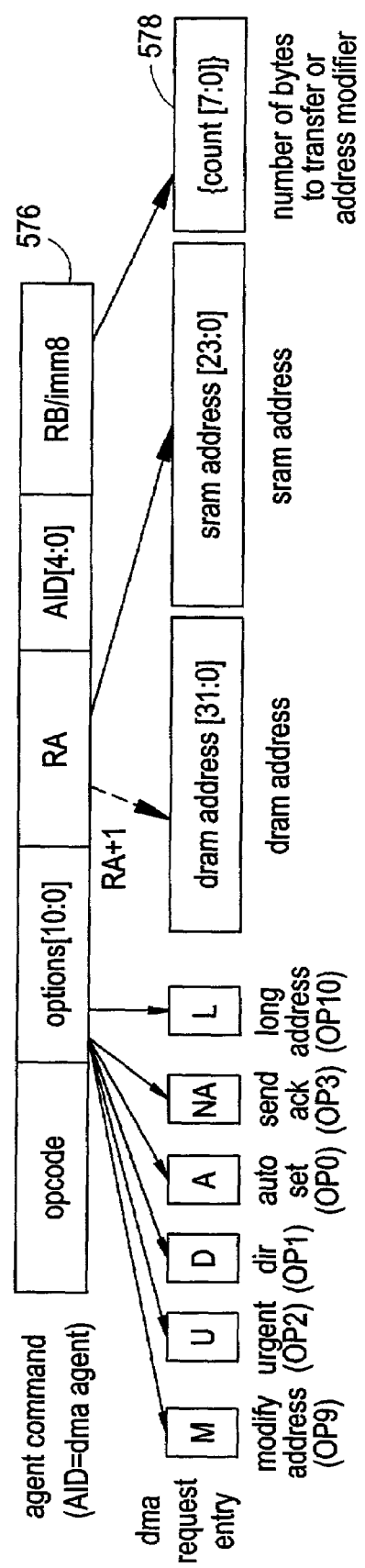
FIG. 54 is flow diagram illustrating an exemplary mapping of data on an agent bus to a direct memory access command.

When the network processor initiates a DMA request, FIG. 54 describes how the DMA agent maps the data on the agent bus 576 to the DMA request 578.

TABLE 19

| 31 30 29 28 27 26 25 24 23 22 21 20 19 18 17 16 15 14 13 12 11 10 9 | 8 7 6 5 4 3 2 1 0 |
|---|---|
| | type = 11111101 |
| sdram_address[31:0] | |
| rsrvd | doorbell_address[23:0] |

TABLE 20

| 31 30 29 28 27 26 25 24 | 23 22 21 20 19 18 17 16 15 14 13 12 11 10 9 | 8 7 6 5 4 3 2 1 0 |
|---|---|---|
| address[23:0] = destination_addr 3 | | type = 01000000 |
| rsrvd | token_register_address[23:0] | |
| rsrvd | | |

The options as shown in FIG. 54 are as follows:

D—direction of data transfer (D=0 SRAM to DRAM; D=I DRAM to SRAM).

NA—no acknowledgement at the end of DMA transfer (NA=O send acknowledgement; NA=I do not send acknowledgement). Setting this bit will also cause NOT to set the DMA mask bit in the doorbell agent when the DMA agents sends the messages to the DMA controller.

A—set auto set bit in the doorbell mask register.

U—urgent DMA request.

M—Modify address. Setting this bit enables the modification of the SRAM address and the DRAM address.

L—long address mode. Use 24 bits of RA as the SRAM internal address (in the regular mode [L=0] only 16 bits are used and the 8 MSB of the ring base address are appended to the 16 bits of RA to form the internal SRAM address).

The DMA agent will have two request entries for storing network processor DMA requests. If both entries are full and the network processor issues a new request, the network processor will be stalled until one of the requests is served.

Address Modification

One common operation in control code writing (such as for controlling the operation of the network processor of the instant invention) is the calculation of the destination address for read/write operations (such as read/write commands for the Vobla network processor). Destination addresses can be calculated, for example, according to several modes:

(1) Immediate addressing—the destination address is included in the command and no calculations are required.

(2) Register A+Register B—the destination address is the sum of the values of Register A and Register B.

(3) Register+Offset—the destination address is the sum of the value of Register A and an immediate offset value.

Often one of the arguments of an address calculation is used to point to the base address of a data structure and the other argument is used to point to an offset within the data structure. One difficulty is that if the same data structure is to be accessed multiple times with different offsets, or if different data structures are to be accessed using the same offset, the address calculation must be performed repeatedly (in the first case, computing a new offset each time; in the second case, computing a new base address each time). These redundant address calculations impose cycle costs and decrease overall efficiency.

Accordingly, one beneficial aspect of the present invention provides for adding a special address computation mode to the network processor data structure access commands. When activated, this special mode causes the destination address to be automatically computed using a base address, offset, and an address modifier.

According to one implementation, the destination address in this special mode is computed as:

DEST_ADDRESS =BASE_ADDRESS+OFFSET+MODIFIER

Accordingly, according to one embodiment of this approach, if agent option bit 9 (in one of the DMA commands) is set the DMA agent will modify the value of the SRAM address and the DRAM address (that were written by the network processor) before sending the control message to the DMA controller. Address modification is accomplished in the following fashion. DRAM address bits 1,2,3 are OR'd with count bits 2,3,4 (respectively), and SRAM address bits 1,2,3 are OR'd with count bits 5,6,7 (respectively). When address modification is used, the DMA transfer size is limited to one of the four options listed in Table 22 below.

TABLE 22

| count[1:0] | transfer size |
| --- | --- |
| 00 | 2 bytes |
| 01 | 4 bytes |
| 10 | 8 bytes |
| 11 | 16 bytes |

An example of the special mode of addressing is instructive. Assume that a data structure located inside internal memory for a communication processor including the Vobla starts at address X. The size of the structure is SIZE bytes. Further assume that we want to copy a part of this structure starting at offset address X+OFFSET1 from X to an external data structure which starts at address Y starting at address Y+OFFSET2. Thus, the X and Y based addresses are stored in a register. According to the conventional approach, address computation is as follows:

ADD1=X+OFFSET1

ADD2=Y+OFFSET2

DMA ADD1, ADD2, SIZE

This conventional approach takes at least 3 cycles to execute and consumes 3 program memory locations. Using the special mode according to the invention, the code using address modification will be only this line:

DMA ADD[1], ADD[2], SIZE, OFFSET1, OFFSET[2]

This code takes 1 cycle to execute and consumes 1 program memory location, which, therefore, saves program space and increase performance.

In accordance with one embodiment of the present invention, a method for performing address computation for a data structure address command in a communications processor is provided. The method comprises providing a library of read commands and write commands for a network processor in a rings based architecture, including an option bit in the read commands and write commands for an address calculation modification mode, providing an agent module for forwarding read requests and write requests to a DMA controller in response to requests including an address issued by the network processor, and modifying the value of the address when the option bit is set before forwarding the read requests and write requests to the DMA controller. The method, in one embodiment, permits repeated accesses to an external data structure without recomputing the destination address in its entirety each time.

Modifying the value of an address, in one embodiment, comprises automatically computing a destination address using a base address, an offset, and an address modifier.

Further, modifying the value of an address, in one embodiment, allows computation of the destination address using a single read command or write command.

Doorbell Set Mask

The DMA agent is responsible for setting the DMA mask bit in the doorbell agent each time a DMA command is issued. The DMA mask bit will be set only if the NA bit is cleared (if acknowledgement is not needed for the DMA transfer there is no need to set the mask). If the auto set option bit is set and the NA bit is cleared, then two mask bits will be set at the same time in the doorbell. The index of the bit that should be set is determined according to the visitor bits in the context table (the auto set code is fixed) DMA Agent Operation Scenario Examples Example A—The network processor asks for write DMA access:

(1) The Host has to initialize the DMA context table with all of the channel configurations. This should be done once for all possible configurations.

(2) The network processor issues a DMA command on the agent bus.

(3) The DMA agent registers the request in the request queue and extracts parameters.

(4) The DMA agent checks whether there is an available token from the DMA controller to start processing the request. If there is no token available the request waits in the queue for execution until there is an available token. If the request queue is also full, the network processor will be stalled.

(5) Assuming there is an available token, the processing of the request begins. The DMA agent sends the DMA controller two messages containing all the parameters of the transfer.

(6) Since this is a write request, the DMA controller issues a multireader message. The multireader message requests a data transfer from the network processor memory to the DMA write buffer.

(7) When the DMA transfer is finished, the DMA controller sends a message to the doorbell.

Example B—The network processor asks for read DMA access:

(1) The host has to initialize the DMA context table with all the channel configurations. This should be done at one time for all the possible configurations.

(2) The network processor issues a DMA command on the agent bus.

(3) The DMA agent registers the request in the request entries and extracts parameters.

(4) The DMA agent checks whether there is an available token from the DMA controller to start processing the request. If there is no token available, the processing is stalled until there will be an available token.

(5) Assuming there is an available token, the processing of the request begins. The DMA agent sends the DMA controller two messages which contain all the parameters of the transfer.

(6) When the transfer is finished, the DMA controller sends a message to the doorbell. The DMA controller can now send a new token to the DMA agent.

Software/Hardware restrictions. According to one embodiment of the invention, only the DMA controller can write to the token register.

In accordance with one embodiment of the present invention, a communications processor implemented as on at least one ring network is provided. The communications processor comprises a plurality of processors comprising ring members on the at least one ring network and a plurality of DMA controllers on the at least one ring network, the DMA controllers controlling servicing of DMA requests by the plurality of processors. The communications processor further comprises a plurality of DMA agents coupled to the plurality of processors, each DMA agent being part of a ring member including a processor, wherein each DMA agent is adapted to service processor DMA requests by determining whether a valid token exists from a pool of tokens reflecting available DMA controllers.

The tokens may be DMA controller specific tokens issued by the DMA controllers to the DMA agents to indicate when specific DMA controller access is available. Each time a processor issues a DMA request, in one embodiment, the associated DMA agent determines whether a valid token exists and, if a valid token exists, services that DMA request using the DMA controller associated with that token. The token can be marked as used or invalid when the token is used to service a DMA request. If no valid token exists the DMA agent queues the DMA request until a valid token exists. The associated DMA agent can be adapted to automatically request a new valid token after an existing valid token is used to service the DMA request. Each DMA agent, in one embodiment, is adapted to request additional valid tokens when the number of valid tokens in the pool falls below a maximum number. The processors comprise, in one embodiment, a plurality of network processors and the at least one ring network comprises a plurality of ring networks.

In one embodiment, the pool of tokens is stored in a register written to by the DMA controllers.

The DMA agents can be adapted to service processor DMA requests by converting them to messages transmitted onto the at least one ring network. Likewise, the DMA controllers can distribute valid tokens by transmitting messages on the ring network that are received by specific DMA agents. Each DMA controller further may be adapted to maintain a list of tokens including those tokens that have been distributed as valid tokens.

The DMA controllers can be adapted to respond to requests from the DMA agents for additional tokens with an invalid token when no valid tokens are available. Each DMA controller can have a pool of up to, for example, 16 tokens for each DMA channel. The DMA controllers, in one embodiment, are capable of reading registers having the pools of tokens for the DMA agents by issuing read messages traveling on the at least one ring network.

CRC Agent (Snoop) 520

Figure 55:
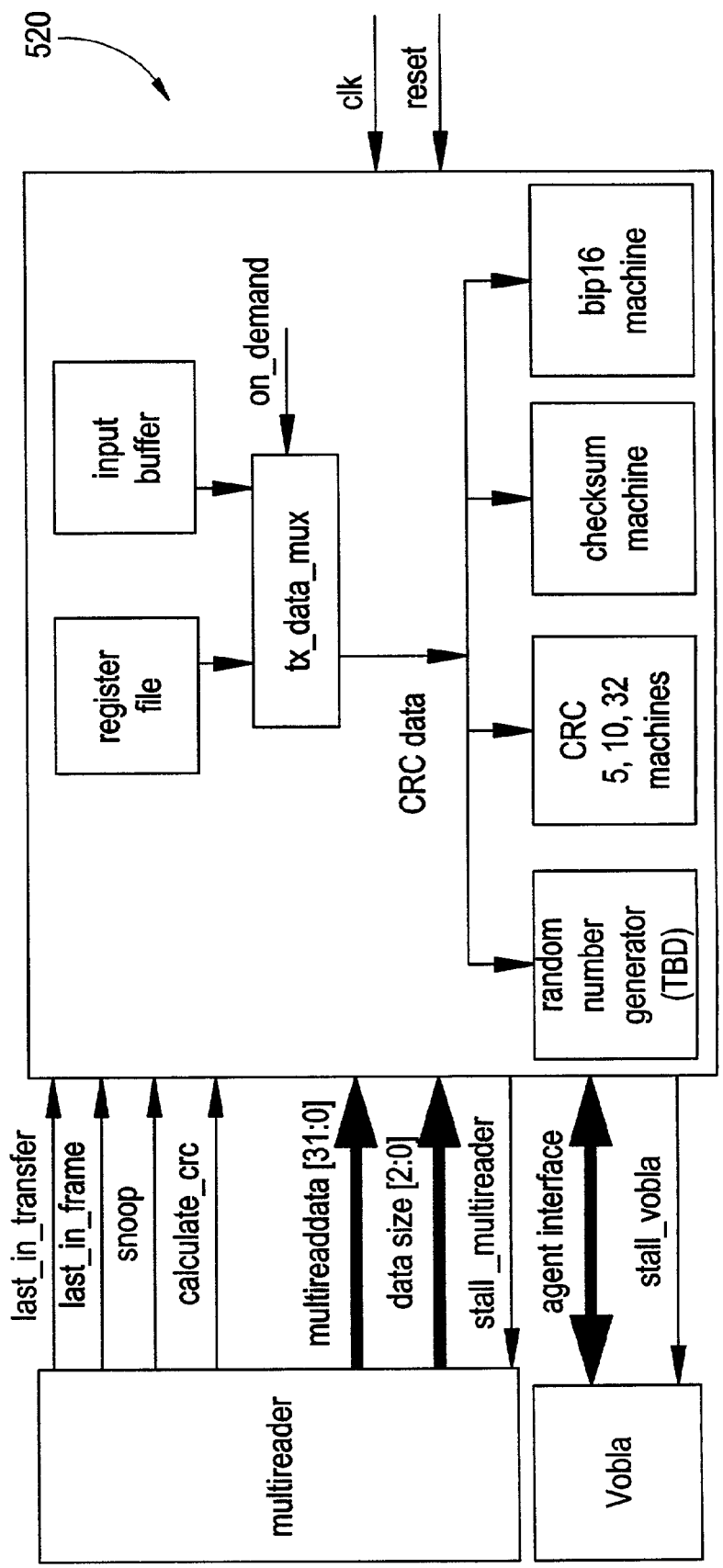
FIG. 55 is a schematic diagram illustrating an exemplary cyclical redundancy code agent in accordance with at least one embodiment of the present invention.

FIG. 55 is a schematic diagram of the CRC agent 520 according to one embodiment of the present invention. The Cyclic Redundancy Check (CRC) agent is a network processor compound module which implements logic to perform CRC calculations. The CRC agent supports different types of CRC calculations like CRC32, CRC16, CRC10, and so forth, for different data sizes (1 to 8 bytes). According to one approach, the CRC agents works in two major operational modes. The first mode is a snoop mode and the second mode is on-demand mode. In the snoop mode the CRC agent snoops for messages in which the S bit is set. The CRC will detect those messages and will calculate the selected CRC on the message data. The second mode of operation is the on-demand mode. In on-demand mode the network processor writes data to the CRC, and the CRC uses this data for its calculations.

The network processor can write the CRC registers via the agent bus using AGENTW/I commands. The network processor can read the CRC residue via the agent bus using an AGENTR command. The CRC agent can stall the network processor if the network processor reads the CRC results and the results are not yet ready. The CRC module may also be able to generate a 32 bit random number.

Features of the CRC Agent

Performs CRC calculations of: CRC32 for ATM cell processing AAL5; and CRC10 for OAM ATM cells. This requires the support of: calculating the CRC10 on 22-bit data of the last transmit word; merging the 10-bit CRC into the 22-bit data to generate the last 32-bit word to be transmitted by the multireader; BIP 16 for ATM performance monitoring—this process is done in parallel with the CRC calculation; CRC5 for ATM cell processing AAL2 (on-demand mode only); calculating CRC5 for 19-bit data for CRC generation (transmit)—(unless CRC5 is init by 0);

calculating CRC5 for 24-bit data for the CRC check (receive); checksum for IP streams. This will be done on 32-bit (or 64-bit) data. The convergence to 16-bit data will be performed by software.

The CRC Agent has two modes of operation:

On-demand mode, performed for any data transferred (e.g., CRC5, hashing function); and snoop mode, performed for a continuous data sequence transferred from/to the serial interfaces.

The CRC agent can be adapted to calculates CRC for 8, 16, 24 or 32 bits of data in a single cycle. If CRC is enabled for snooping, a network processor agent read instruction from a CRC residue register stalls until the last indication arrives with the last data word. Special control enables the CRC residue to be calculated on partial data (e.g. 22-bits in CRC10, or 0 bits in CRC32); then the CRC residue is combined with the partial data to form the 32-bit last word of the frame, and this is exposed to the multireader block for transmission. In CRC5, the CRC module is capable of calculating the 5-bit CRC out of 19-bit data for transmit, or out of 24-bit data for the CRC check in receive (on-demand mode).

CRC Agent in one embodiment is adapted to interface to: transmit bus—for snooping TX data and calculating CRC; and agent bus—for configuration, on-demand activation and read/write residue.

Network Processor Writing to the CRC.

Figure 56:
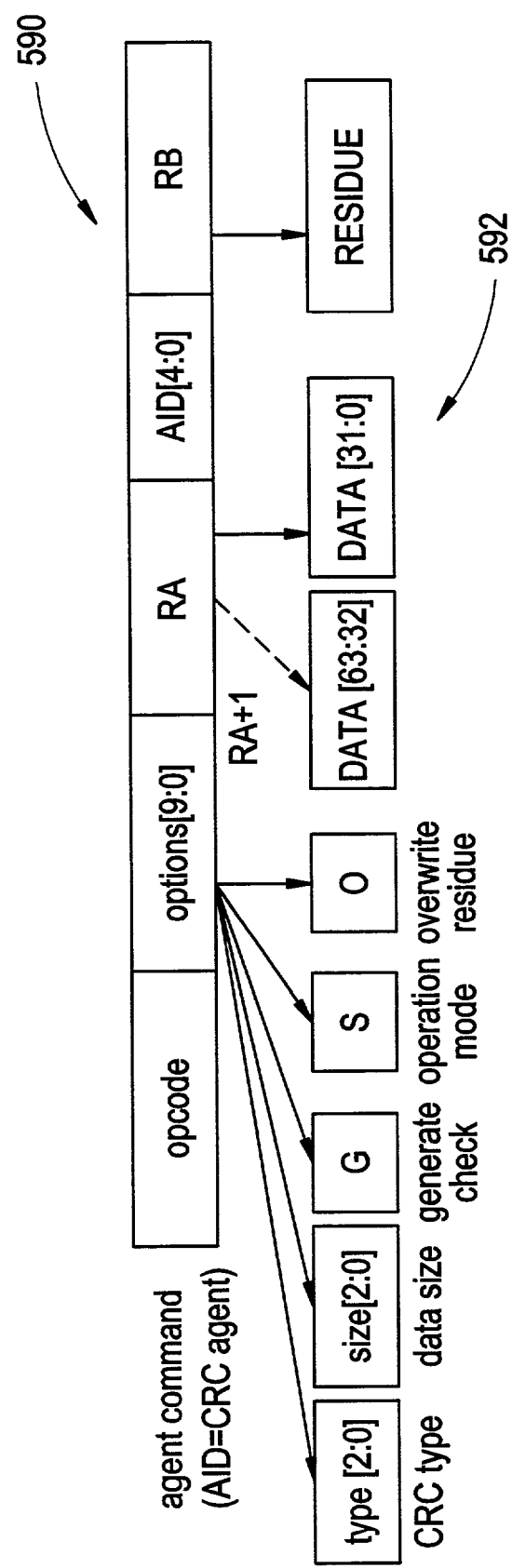
FIG. 56 is a flow diagram illustrating a mapping of data on an agent bus to cyclical redundancy code data in accordance with at least one embodiment of the present invention.

The network processor 514 can write to the CRC agent 520 using AGENTW commands. The mapping of the AGENT command 590 to CRC data 592 is described in FIG. 56.

The Options Include:

TYPE[2:0]—3 bit CRC. The types are: 000—CRC 32; 001—CRC 10; 010—CRC 5; 011—checksum; 100—CRC16; 111—BIP16 (only for writing BIP16 reside register).

The BIP 16 machine works in parallel to all of those machines.

SIZE[2:0]—The number of valid bytes in the data (1 to 8) starting at the LSB of RA (size=0 means 8 valid bytes in the message).

G—This bit indicates if the CRC agent works in the generate CRC or the check CRC mode.

S—The operation mode of CRC module. If S=I the CRC works in the snoop mode. If S=0 the CRC works in the on-demand mode. When working in on-demand mode, the data for the CRC calculation and the residue are written by the network processor. Since the data in the memory is stored in big endian format, and the data in the network processor register file is stored in little endian format, the CRC module may perform some manipulation of the message data before the CRC calculation (especially if the data size is not 32 or 64 bit).

O—overwrite residue. If O=I the new residue from RB/imm8 is used for the CRC calculation. If O=0 then the current value of the residue register is used.

CRC Residue Registers.

The CRC module contains two residue registers. The first residue register is a 64 bit register containing the residue for the CRC and checksum calculations. The second residue register is 32 bit register containing the residue for the BIP 16 calculation.

Reading CRC Registers by the Network Processor

The network processor can read the results of the CRC calculations using the AGENTR command. The result of the CRC machine that will be read is determined according to the operational mode that was selected.

The BIP16 machine calculation result will have a different register that could be read by the network processor (i.e., the two residue registers have two different addresses). If the network processor reads one of the CRC registers and the result is not ready, the network processor will be stalled.

The CRC calculation is considered to be complete after all the data had arrived (last indication in the message) in snoop mode. In on-demand mode the result of the CRC calculation will be available for reading one cycle after it was written if the data size is smaller than four bytes, and two cycles after it was written for larger data sizes.

CRC Agent Operation Scenarios, Examples

Example A—Calculating CRC in On-Demand Mode:

(1) The network processor writes the CRC agent using AGENTW command. The data that is written to the CRC agent contains: CRC type; the data on which the CRC is to be calculated, the size of the data (number of valid bytes), and a new residue if the current residue is to be overwritten; the operational mode is set to work in the on-demand mode; and in the CRC 5 mode the G should also be written.

(2) One or two cycles after the data was written to the CRC (depending on the number of valid bytes in the data, the CRC machine can calculate CRC on 32 bits in one cycle), the network processor can read the CRC result.

Example B—Calculating CRC on Transmit Data (Multi-reader Data Out):

The CRC machine can calculate the CRC of the transmit data by snooping the S and L bits of the multireader output messages. The network processor initializes the CRC agent in the following manner:

(1) CRC Type.

(2) A new residue if the current residue is to be overwritten. The data and the data size of the residue will be taken from the message data and type parts, respectively (the data part of the agent bus is ignored in the snoop mode).

(3) The operational mode must be set to work in the snoop mode, selecting the transmit data bus as a source for the data.

(4) One or two cycles after the last data has arrived at the CRC (depending on the number of valid bytes in the data, the CRC machine can calculate the CRC on 32 bits in one cycle) the network processor can read the CRC result.

Example C—calculating CRC of receive data: The CRC machine can calculate the CRC of the receive data by snooping the S and L bits of the agent write bus messages. The network processor initializes the CRC agent as follows:

(1) CRC type.

(2) A new residue if the current residue is to be overwritten. The data and the data size will be taken from the message data and type parts, respectively (the data of the agent bus is ignored in the snoop mode).

(3) The operational mode must be set to work in the snoop mode.

(4) One or two cycles after the last data has arrived at the CRC (depending on the number of valid bytes in the data, the CRC machine can calculate CRC on 32 bits in one cycle) the network processor can read the CRC result.

Timer Agent 526

Figure 57:
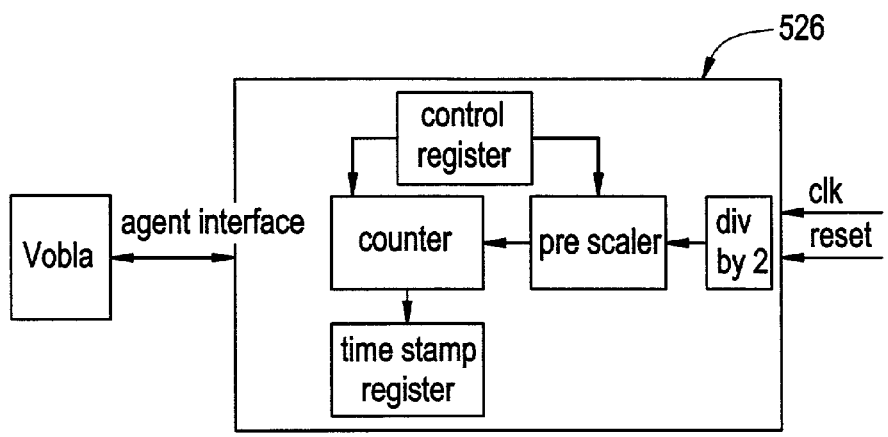
FIG. 57 is a schematic diagram illustrating an exemplary timer agent in accordance with at least one embodiment of the present invention.

Referring now to FIG. 57, an exemplary embodiment of the timer agent 526 is illustrated in accordance with one embodiment of the present invention. The timer module is designed to allow the assignment of time stamps to various events within network processor tasks. According to one approach, the timer contains a 32 bit count-up free running counter. The counter counts at a frequency which could be calculated using the following formula.

$$F(\text{counter}) = [F(\text{clock})]/[2*(\text{prescale value}+1)]$$

Usually the counter frequency will be set to 1 MHz (which corresponds to a 1 microsecond period). The prescale counter is a 10 bit down-counter, which divides its input clock frequency by the prescale value. If the prescale value is equal to zero the prescaler will be bypassed.

The time stamp value could be read by the network processor from the time stamp register using the agent interface.

Network Processor Writes to the Timer

Figure 58:
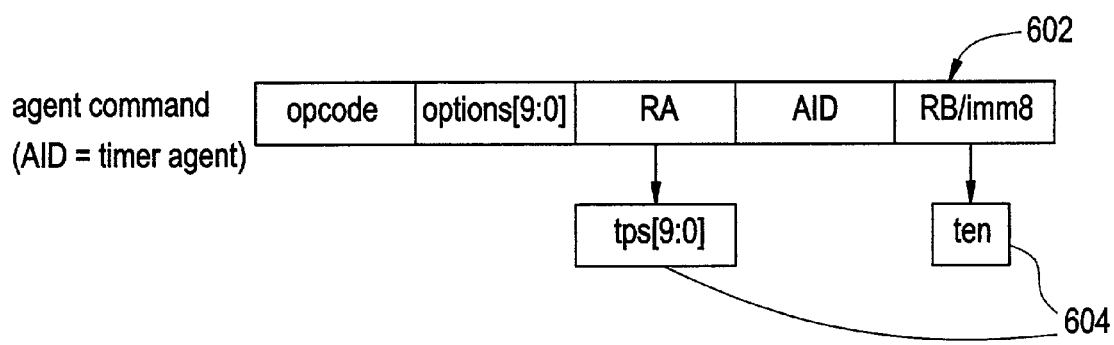
FIG. 58 is a flow diagram illustrating a mapping of data on an agent bus to timer data in accordance with at least one embodiment of the present invention.

The network processor can write to the timer using the AGENTW/AGENTWI commands. In order to enable timer operation only two values are required. The first value is the control information which resides in register RB or the imm8 value (according to one approach, only one bit is used). The second value is the prescale value which determines the counting frequency of the timer. The prescale value is taken from the 10 LSB of RA. The value of RAP is ignored. FIG. 58 illustrates the mapping of the AGENTW command 602 to the timer data 604.

Timer Control Register

The timer control register is used to store the prescale value and to enable/disable the timer count operation. The timer control register is written using AGENTW/I commands and read using the AGENTR command. Tables 23 and 24 show the timer control register and a description of the timer control register, respectively.

TABLE 23

| 16 | 15 14 13 12 11 | 10 9 8 7 6 5 4 3 2 1 0 |
|---|---|---|
| ten | RSRVD | tps[9:0] |
| reset = 0 | | |

TABLE 24

| field | description |
|---|---|
| ten | Timer enable bit. This bit enables the timer operation. |
| tps[9:0] | This field describes the division factor of the clock after it was divided by 2. |

Time Stamp Register

The timestamp register contains the value of the timer counter at the time of an agent read operation. The register is read by the network processor using the AGENTR command. Table 25 illustrates the time stamp register, and Table 26 provides the time stamp register description.

TABLE 25

| 31 30 29 28 27 26 25 24 23 22 21 20 19 18 17 16 15 14 13 12 11 10 9 8 7 6 5 4 3 2 1 0 |
|---|
| tsv[31:0] |
| reset = 0 |

TABLE 26

| field | description |
|---|---|
| tsv[31:0] | Timer stamp value. This value of the timer counter at the time of the read operation. |

Doorbell Agent 576

Figure 59:
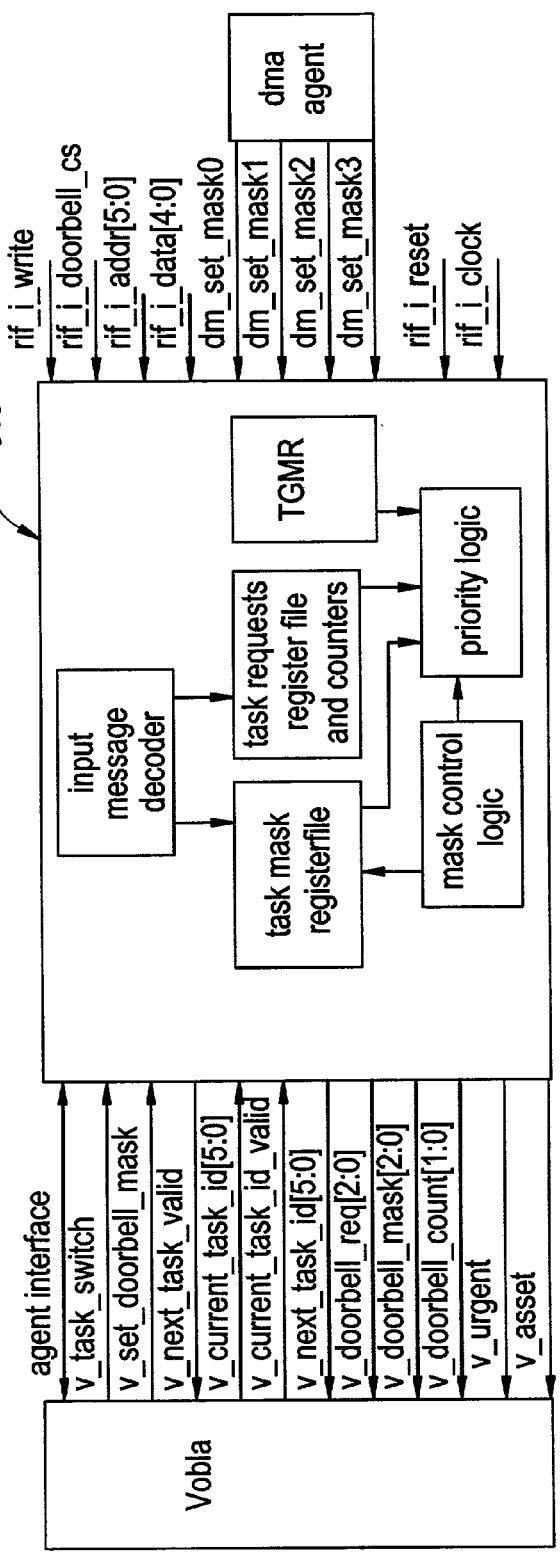
FIG. 59 is a schematic diagram of an exemplary doorbell agent in accordance with at least one embodiment of the present invention.

FIG. 59 is a schematic diagram of the doorbell agent 516 according to one embodiment of the invention. The doorbell agent is the scheduler module which handles the execution sequence of the tasks. The doorbell is connected to the network processor agent interface and to the ring write interface. The doorbell registers can be accessed by the network processor using the one of the special AGENT commands, or via the write bus using ring messages (e.g., by the serials and the host). All the possible service requests from the different sources go into the doorbell agent via the write bus. When the doorbell detects a request message it registers the request in the doorbell logic.

According to one embodiment of the invention, the doorbell agent can handle requests of up to 64 different tasks. The doorbell chooses the highest priority pending request (out of all the un-masked tasks), and sends its task ID to the network processor as the next task ID. The network processor sends back to the doorbell the current task ID that it is executing. The network processor uses the task ID information to perform the prefetch, bump and task switching, as previously described.

The Sources for Requests

The sources for doorbell requests include:Regular serial, timer, or software request: (e.g., a message from another task) This request indicates that a data fragment had been received in the RX FIFO or there is a place to write more data into the TX FIFO for transmission, or that a timer finished its count.

DMA request: The DMA had finished its data transfer.

Self-request: When a task yields itself (i.e., when the task execution time exceed the maximum allowed execution time), the software can resume its execution by setting the self-request bit. The starting point of the task will depend on what is written in the EP (entry point) register. The EP register can be updated by hardware or by software.

According to one approach, every request bit has its own mask bit (except the self-request). When the mask bit is cleared the request is ignored and the task can not trigger task switching. The self-request constitutes the only request bits that can not be masked. When a task enters execution, its corresponding request bit and all the mask bits are automatically cleared. (except the auto set [aset] and the urgent status bits [urg]). This is done to avoid serving the same request more than once.

Selecting Next Task for Execution

According to one approach, the algorithm for selecting the next task for execution is as follows. The tasks which participate in the selection of the next task for execution are the tasks for which their corresponding mask bit in the Task Global Mask Register (TGMR) is cleared. Tasks which participate in the selection of the next task and have unmasked requests are divided into four groups and served in the following order:

(1) Highest priority group include urgent requests of task numbers 0–31.

(2) Second priority group include regular requests of task numbers 0–31.

(3) Third priority group include urgent requests of task numbers 32–63.

(4) Lowest priority group include regular requests of task numbers 32–63.

Within each group the requests are served according to the task number. Lower task number requests are served before higher task number requests.

Accessing the Doorbell Registers from the Network Processor

The network processor can access the doorbell registers via the agent interface using one of special AGENT commands.

The network processor can directly modify only the register bits of the current task (the request, mask, counter bits value), or the global mask register (TGMR). Modifying other task register bits can be done via the ring write bus by sending a message from the message sender agent to the doorbell.

Figure 60:
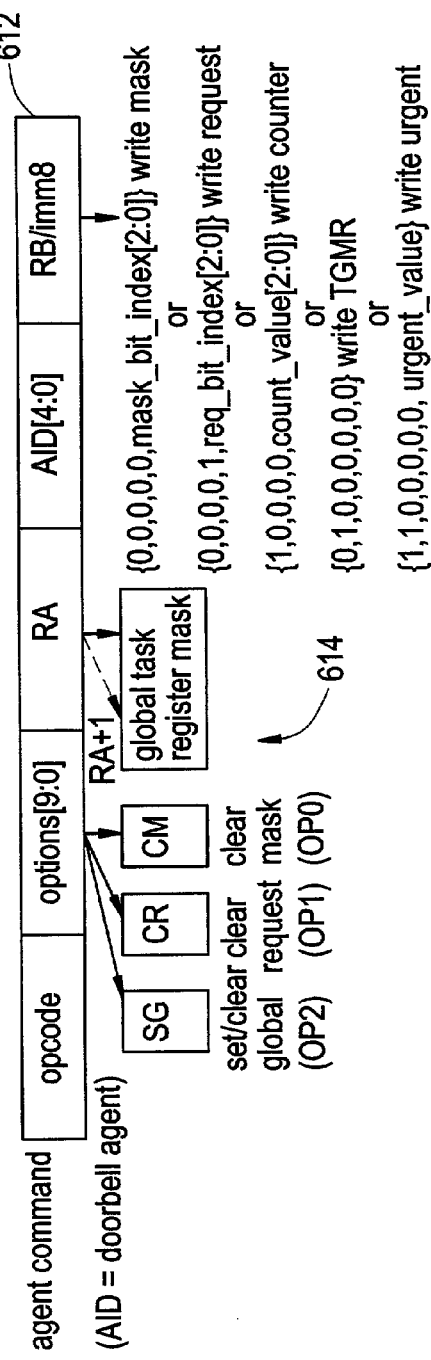
FIG. 60 is a flow diagram illustrating an exemplary encoding of task data for use by a doorbell agent in accordance with at least one embodiment of the present invention.

The data 612 for modifying the mask, request and the counter bits 614 of the current task is encoded in the RB/imm8 part of the agent command as illustrated in FIG. 60. The doorbell logic decodes the 8 LSB of RB/imm8 and sets the appropriate bits in the current task register, counter, urgent or TGMR.

Setting a request or mask bit is performed by writing 5 bits of the command index in the RB/imm8 part of the AGENT command and then 3 bits of the index or the request bit that is to be set, and then 3 bits of the mask bit that is to be set. Note: Only one mask bit at a time can be set by the network processor using a single agent command (if other mask bits were set they will be cleared by the agent write command, except for the autoset bit. Writing the auto set bit will not clear other mask bits). Writing to the request bits will not clear other requests bits if they were already set. If the index value is zero the write to that part of the register is ignored.

Table 27 describes the decoding of the RB/imm8 part of the message and the operations that take place.

The options in the agent command that are used by the doorbell are:

CM—Clear mask. Setting this bit will clear all the bits of the current task mask bits (including the auto set bit).

CR—Clear request. Setting this bit will clear all the bits of the current task request bits.

SG—Set global. This bit determines whether the task global mask register (TGMR) bits will be set or cleared according to the data in the RA/RAP part of the agent command. If the SG bit is set then the TGMR bits will be set at the locations corresponding to the set bits in RA,RA+I data.

Clearing the mask registers bits is accomplished by writing 1 to the clear mask (CM) bit in the command. If the CM option is used at the same time another mask bit is written, the set operation overwrites the CM operation.

Clearing the requests bits is done by writing 1 to the clear requests (CR) bit in the command. If clearing the requests happens at the same time the request is set from the ring then the request will be set (set will overwrite the reset).

The peripheral request mask bit (mpreq) could also be set by the network processor when there is a YIELD command and the set default mask option is used. Other request bits will be cleared.

The network processor can initialize the DMA requests counter of the current task by setting the RB/imm8 part of the agent bus to {1,0,0,0,0,count_value[2:0]}.

Writing the TGMR is done by setting the RB/imm8 part of the agent bus to {10,1,0,0,0,0,0,0} (see also the discussion on the Task Global Mask Register (TGMR) below.

Writing the current task priority bit is done by setting the RB/imm8 part of the agent bus to {1,1,0,0,0,0,0,urgent_value} (see also the discussion on Task Priority Control below).

Reading Doorbell Registers from the Network Processor.

The doorbell bits of the current task (i.e., the request bits, mask bits and the counter value) are reflected in the task SPR register of the network processor. The TGMR could be read using the agent read command (AGENTR).

Setting the Doorbell Mask Bits from the DMA Agent

Another option for setting the DMA mask (mdma) bit and the auto set (aset) bit is by using the network processor DMA

TABLE 27

| operation | RB/lmm8 | index value | mask | request |
|---|---|---|---|---|
| Write task register mask and request bits | {0.0.0.0.0.mask_bit_index[2,0]} {0.0.0.0.1.request_bit_index[2,0]} | 000 | don't change mask bits | don't change request bits |
| | | 001 | set the aset bit don't change other mask bits | set the sreq bit (self request). Other request bits are not changed. |
| | | 011 | set the mdma bit clear all other mask bits | decrement the DMA request counter by 1 |
| | | 100 | set the mpreq bit.clear all other mask bits | set the preq bit. Other request bits are not changed. |
| write request counter | {1.0.0.0.0.counter_value} | | | |
| write TGMR | {0.1.0.0.0.0.0.0} | | | |
| write urgent | {1.1.0.0.0.0.0.urgent_value} | | | | commands. The DMA commands have an option to set the DMA mask bit and the auto set bit.

When the DMA agent detects a DMA command, it can set the appropriate mask bit in the doorbell using the DMA context table (the context table stores the information as to which bit to set). The mask setting will be done if the NA bit in the DMA command is cleared. The auto set bit will be set if the A option bit in the DMA command is set.

Setting the Doorbell Requests Bits from the Ring

The doorbell registers could be accessed by the peripherals, the network processor and the host using ring messages. Every time a peripheral wants to set a request bit, the peripheral sends a write message with a destination address of the doorbell entry it wants to set. The doorbell will set the appropriate request bit in the doorbell registers according to the content in the data field of the message.

If a request bit and the corresponding mask bit are set, a valid request is sent to the doorbell priority logic. The mask and auto set bits can not be modified from the ring write bus. Table 28 shows the encoding for the input message format. The doorbell responds to messages from types mentioned in Table 28.

TABLE 28

| field | description |
| --- | --- |
| type[7:0] | The type field describes the outgoing message types. (If the last bits are X they are ignored).<br>type[7:0] = 00000XXX: idle<br>type[7:0] = 100FLZZZ: work write |
| address[23:0] | The address of the doorbell register. The doorbell register space ranges from DOORBELL_BASE_ADD to DOORBELL_BASE_ADD + $3F. |
| data[2:0] | The value of the doorbell bit that should be set.<br>data[2:0] = 000 do not change any request bit.<br>data[2:0] = 001 set self request (sreq) bit.<br>data[2:0] = 011 decrement request counter by 1.<br>data[2:0] = 100 set peripheral request (preq) bit. |
| P | Doorbell request priority status. This bit reflects the current status of the doorbell request.<br>P = 0 Current request status is normal.<br>P = 1 Current request status is urgent. |
| O | Overwrite task current priority status with doorbell request status.<br>O = 0 current priority status is not overwritten.<br>O = 1 current priority status is overwritten. |

Doorbell Register File Format

According to one embodiment, the doorbell register file contains 64 registers. Thus, each possible task has its own doorbell register. The doorbell registers have the format set forth in Table 29.

TABLE 29

| 31–21 | 20 | 19 | 18 17 16 | 15–12 | 11 | 10 | 8 | 3–7 | 2 | 1 | 0 |
| --- | --- | --- | --- | --- | --- | --- | --- | --- | --- | --- | --- |
| rsrvd | urg | rsrvd | count[2:0] | rsrvd | preq | dma | sreq | rsrvd | mpreq | mdma | aset |
| reset – 0 | 0 | 0 | 0  0  0 | 0 | 0 | 0 | 0 | 0 | 1 | 0 | 0 |

ADDR=DOORBELL_BASE to DOORBELL_BASE+ $3F (Note: Current task register bits are reflected in the network processor status register.) (Note: All of the request and mask bits [not including the auto set bit] are automatically cleared when the task enters execution.)Table 30 provides a description of the doorbell register according to an embodiment of the invention.

TABLE 30

| field | description |
| --- | --- |
| urg | The urg (urgent) bit is used to allow the software to control the priority level of a task (as opposed to the urgent request status which is being generated automatically and could not be controlled by software). If the bit is set the task has high priority. This bit is written only by the Vobla. |
| count[2:0] | These bits represent the number of DMA requests that should be acknowledged. Every DMA activation that requires acknowledgement at the end of the DMA transfer will cause the DMA agent to increment the counter value by 1. Every acknowledgement that is written to the dma bit in the doorbell register decrements the counter value by 1. If the counter value is equal to zero and the current task was yielded, the dma bit will be set (only if the counter was incremented at least once during the current task). If the dma mask (mdma) bit is set then a task switch will be triggered. Those bits can be written by the Vobla using the AGENT command. |
| preq | Regular peripheral request<br>preq = 0 no regular peripheral request is pending.<br>preq = 1 regular peripheral request is pending.<br>This bit can be set from the write bus or by the Vobla, and can be cleared by Vobla. In case the bit is set and cleared at the same time, the set will overwrite the reset. |
| dma | This bit indicates that the request counter had decremented to zero after a valid Vobla yield.<br>dma = 0 the request counter did not decrement to zero.<br>dma = 1 the request counter had decremented to zero.<br>This bit can be set by the doorbell logic. Writing to this bit from the write bus will decrement the request counter value by 1. This bit can be cleared by the Vobla. In case the bit is set and cleared at the same time, the set will overwrite the reset. |
| sreq | Self-request bit. This request is non-maskable.<br>sreq = 0 self-request is not pending.<br>sreq = 1 self-request is pending.<br>This bit can be set from the write bus or the Vobla, and can be cleared by the Vobla. In case the bit is set and cleared at the same time, the set will overwrite the reset. |
| mpreq | Peripheral request mask bit.<br>mpreq = 0 peripheral request is masked and can not trigger task switch.<br>mpreq = 1 peripheral request is not masked, and will trigger task switch when it is the highest priority pending request.<br>This bit can be set by the Vobla and the DMA agent and can be cleared by the Vobla. In case the bit is set and cleared at the same time, the set |

TABLE 30-continued

| field | description |
| --- | --- |
| | will overwrite the reset. |
| mdma | DMA request mask bit.<br>mdma = 0 DMA request bit is masked and can not trigger task switch. |

TABLE 30-continued

| field | description |
| --- | --- |
| | mdma = 1 DMA request bit is not masked and will trigger task switch when it is the highest priority pending request.<br>This bit can be set by the Vobla and DMA agent, and can be cleared by the Vobla. In case the bit is set and cleared at the same time, the set will overwrite the reset. |
| aset | Automatically sets the mask bits to their default value after serving the current request.<br>aset = 0 do not set the mask bits to their default after serving the current request.<br>asct = 1 set the mask bits to their default after serving the current request.<br>This bit can be set by the Vobla and DMA agent and can be cleared by the Vobla. In case the bit is set and cleared at the same time, the set will overwrite the reset. |
| rsrvd | Reserved bits are read as zero and can not be written. |

Task Global Mask Register (TGMR). The task global mask register (TGMR) is a 64 bit register (one bit per each task), which could be accessed by the network processor using the AGENT commands. The TGMR is used to determine which tasks are taken into consideration when calculating the next task for execution. Every set bit will prevent the corresponding task from being selected as the next task for execution, even if that task has valid requests to serve (at least one corresponding mask and request bits are set).

Writing the TGMR is done in the following way according to one embodiment. The AGENT write command must contain the value 01000000 in the LSB of RB or the imm8 field. Based on the value of the SG option bit and the value of RA,RAP, the TGMR bits are set or cleared. Only bits which have the corresponding RA,RAP bits set are affected.

The TGMR could be read using AGENTR commands. The 32 LSB of TGMR are located at address 0 of the doorbell, and the 32 MSB are located at address 1. The user can read all 64 bits using the read double option of the AGENTR command. If only 32 bits are read, the other part of the data will be zeroed.

Handling DMA Requests

In a system with multiple processors capable of running multiple tasks that can issue DMA requests to the multiple DMA controllers, one challenge is knowing at certain points in time whether all of the DMA requests issued by a specific task running on a processor are finished. The challenge can be significant because DMA requests may be issued by different tasks running on a processor to different DMA controllers. Also, the DMA requests may finish out of the order in which they were issued.

According to one approach, the invention provides that a DMA agent (previously discussed) be associated with each of the processors in the system. The role, in this instance, of the DMA agent is to control the DMA transfer requests made by the associated processor. For each DMA request issued by the DMA agent the DMA agent sends an indication to a book-keeping unit. In one embodiment, the book-keeping unit is a request counter in the doorbell task register for each processor. The book-keeping unit receives this indication and increments the request counter. Because the preferred system performs multi-tasking, the request counter may include a separate entry (or separate request counter) for each task performed by the processor.

When the target DMA controller completes the DMA transfer, the DMA controller issues a decrement counter message to the book-keeping unit. The relevant entry (or relevant request counter) is then decremented by one. When the relevant entry (ore relevant request counter) reaches zero, the system knows that all DMA transfers for that task have been completed.

Therefore, according to one embodiment of the invention, during normal task execution, there is a possibility that more than one DMA transfer is initiated. Each one of them could finish its data transfer at any given time, perhaps not in the order in which they were initiated. Typically it is preferable to trigger a valid request only after all DMA transfers from all the different DMA channels within a task have finished. In order to implement this requirement each doorbell task register has its own request counter.

The request counter is incremented every time it gets an increment counter indication. The increment counter indication is an option in the network processor DMA commands (this is the NA bit). Every time a DMA command is issued and NA bit is cleared, the counter is incremented by 1.

When the DMA controller or peripheral sends its acknowledgement back to the doorbell by writing to the DMA bit in the request register, the counter is decremented by 1. When the counter reaches zero and a valid YIELD was executed by the network processor, the DMA bit in the doorbell register will be set. If the mdma bit is also set, a task switch request will be issued.

In accordance with one embodiment of the present invention, a communications processor implemented as on at least one ring network is provided. The communications processor comprises a plurality of processors comprising ring members on the at least one ring network, a plurality of DMA controllers on the at least one ring network, the DMA controllers controlling servicing of DMA requests by the plurality of processors, and a plurality of DMA agents coupled to the plurality of processors. Furthermore, each DMA agent being part of a ring member including a processor, wherein each DMA agent is adapted to issue an indicator to a request counter coupled to the DMA agent for each DMA request issued by the DMA agent to a DMA controller, thereby allowing each DMA agent to maintain a count of the outstanding DMA requests that have been issued on behalf of the processor associated with the DMA agent. In one embodiment, the request counter maintains a separate count for each task being executed by the processor, wherein the request counter is contained in a doorbell register supporting up to 64 tasks.

Upon satisfaction of the DMA request by a target DMA controller, the target DMA controller can be adapted to issue a response that causes the request counter to decrement the count by one. In this case, the DMA requests issued by the DMA agent to the DMA controller and the response issued by the target DMA controller can be transmitted as messages on the at least one ring network. Also, upon the counter returning to zero the processor can be enabled to switch to other tasks because all DMA requests for a given task have been satisfied. In this case a new DMA request for a different task can be deferred until the counter has returned to zero for the given task.

In accordance with another embodiment of the present invention, a method of controlling access to DMA controllers in a multi-tasking communications processor implemented as on at least one ring network is provided. The method comprises issuing DMA requests to a target DMA controller, maintaining a count of DMA requests on a per-task basis, and issuing an acknowledgement that a DMA request has been satisfied by the target DMA controller. The method further comprises reducing the count based on the acknowledgement and enabling a processor responsible for issuing the DMA requests to perform new activity when the count has returned to zero. In one embodiment, the DMA requests are issued as messages on the at least one ring network. Similarly, the acknowledgement can be issued as a message on the at least one ring network.

Auto Set

In order to increase performance (e.g., to eliminate the need to set the default mask at the end of every task), the auto set functionality is defined. When the aset (auto set) bit is set, the mask bits will be set to their default value after the desired request has occurred without triggering a request to the network processor and a task switch. The auto set bit can be written by the network processor using the agent interface, or by using the DMA command (this is one of the options of the DMA command).

The default mask is: the peripheral request mask bit (mpreq) is set and all the other mask bits are cleared (see Table 28).

Task Priority Control

It is desirable to have the ability to control task priority level in order to influence task scheduling. The doorbell module supports this requirement in two ways. The first way is software control using the urg bit in the doorbell task register (not the task SPR). Each doorbell task has an urgent priority bit in its task register (urg). When this bit is set the task becomes urgent and all of its requests are considered as urgent requests. The urgent bit remains set as long as it is not cleared by the network processor.

A second way to control the request priority level is by sending messages to the doorbell with the urgent status indicating the request priority level. If the overwrite current status is also set then the request priority status bit in the doorbell is also updated. If the task urgent status bit is set the task requests are also considered urgent. This bit is mainly controlled by hardware.

It should also be noted that the task priority is reflected in the network processor status register.

Doorbell Operational Scenarios

Example A—Regular Serial Request:

(1) A serial sends a message with the destination address of its task requests register in the doorbell register file. The data part of the message specifies which bit to set.

(2) If the corresponding mask bit for this task is set (this is the default mask), then a valid request is sent to the doorbell priority logic.

(3) When this request becomes the highest priority pending request, it can trigger the network processor task switch.

(4) The doorbell samples the task number of highest priority pending request every time a yield is executed. If there are no pending tasks the doorbell waits until the first time there is a pending task (except if the next task is the current task, in which case the network processor waits until the yield indication, because there will be no task switch), and then samples the next task ID.

(5) After the next task ID is sampled by the network processor, the network processor performs the prefetch of the next task registers.

(6) The next task ID becomes current task ID.

(7) The doorbell logic clears the request bit and the mask register of the task which caused the task switch.

(8) The doorbell calculates a new next task ID.

Example B—DMA Request:

The handling of a DMA request is very similar to the handling of a serial request. The only difference is the process of setting the DMA request and the mask bits. At the time DMA command is issued there is no information as to which request mask bit should be set. The doorbell logic will get this information from the DMA agent. This will be done using the DMA context table and a special option in the Network processor DMA command (the NA bit in the DMA command). When the DMA request is registered with the DMA agent, the DMA agent will set the DMA mask bit in the doorbell register. The DMA agent will also tell the DMA controller which request bit it should send the acknowledgement when the DMA transfer is finished, in order to decrement the request counter. When the counter reaches zero and if the appropriate mask bit is set, a valid task switch request will be issued to the doorbell logic.

Example C—DMA Request With Auto Set:

When the auto set bit is set, the doorbell logic will set the mask to the default mask value after the current task is finished without asserting a request for task switching.

Software/Hardware Restrictions

According to one embodiment of the invention, the following restriction is imposed: Only eight pending DMA requests (DMA requests that were issued by the DMA agent for which acknowledgement has not reached the doorbell) per task are handled by the doorbell.

Network Processor Debug Module

According to one embodiment of the invention, the network processor compound includes a debug module. The debug module supports various breakpoints and enables program code patching. The debug module can be programmed through the ring interface. The debug module contains two breakpoint channels and eight patch channels. Each one of the patch channels can be configured to be used as a patch channel or as an additional program address breakpoint channel. A single step program trace is supported.

A Breakpoint Event and a Patch Event

The network processor core supports two kinds of program breaks: a breakpoint and a patch. A breakpoint event causes the program flow to jump to a program location pointed by a given vector and to enter the trap mode of execution by setting the trap mode bit located in the network processor task SPR. When in trap mode, no further breakpoint will be accepted. The trap mode bit will be cleared by executing an RFT (Return From Trap) instruction or by writing a zero to the trap mode bit. When the trap bit is cleared, the network processor returns to the normal execution mode where further breakpoints are accepted. A patch event causes the program flow to jump to a program location pointed by a given vector. In a patch event the trap mode bit will not be set, thus remaining in the normal execution mode. A patch event is useful for program patching of code written in ROM.

Patch Channels

According to one embodiment, there are eight patch channels. Each of the patch channels can be configured to operate as a patch channel or as an additional program address breakpoint channel. If a patch channel is enabled and is configured as a patch, a patch event will occur whenever there is a fetch from a program location equal to the catch address (discussed below). If a patch channel is enabled and is configured as a break, a breakpoint event will occur whenever there is a fetch from a program location equal to the catch address. Each one of the patch channels will cause the network processor program to jump to a different vector location according to a vector table (see the discussion on the vector table and Table 37 below).

Each of the patch channels includes a patch register as shown in Table 31.

TABLE 31

| | 31 30 | 29 28 | 27 26 | 25 24 | 23 22 | 21 20 | 19 18 | 17 | 16 | 15 14 13 12 11 10 9 8 | 7 6 5 4 3 2 1 0 |
|---|---|---|---|---|---|---|---|---|---|---|---|
| patch 0 | | | | | | | | en | bp | catch address | |
| patch 1 | | | | | | | | en | bp | catch address | |
| patch 2 | | | | | | | | en | bp | catch address | |
| patch 3 | | | | | | | | en | bp | catch address | |
| patch 4 | | | | | | | | en | bp | catch address | |
| patch 5 | | | | | | | | en | bp | catch address | |
| patch 6 | | | | | | | | en | bp | catch address | |
| patch 7 | | | | | | | | en | bp | catch address | |

Patch Register. This is a 32 bit read/write register (through the ring). This register is cleared by a hardware reset.

Bits 15:0—Catch Address: This is the 16 bit program address which causes a patch event or a breakpoint event.

Bit 16—Break or Patch (B/P): When the B/P bit is cleared, the patch channel operates as a patch channel. When the B/P is set, the patch channel operates as an additional program address breakpoint channel.

Bit 17—EN. This is the channel enable bit. When EN is set, the channel is enabled. When EN is cleared, the channel is disabled.

Bits 31–18—reserved: These bits are reserved. Reserved bits are read as zero.

Address Breakpoint Channels

According to one approach, the debug unit includes two address breakpoint channels. Address breakpoint channels can be configured to cause a breakpoint when there is a program or data memory access to specific locations. Each of the address breakpoint channels is configured by its address register and by the address breakpoint control register.

Address Registers. Each of the two address breakpoint channels include an Address Register. See Table 32 and Table 33, which show the channel 0 address register and the channel 1 address register, respectively. These are 32 bit read/write registers which are cleared by a hardware reset. Bits 15:0 hold the break address and bits 31:16 hold the break mask. The break address is the program location at which cause a breakpoint event. A breakpoint event occurs only if the address breakpoint is enabled and there is a match between the memory address accessed and the break address. The break mask is used to specify what address bits to compare. For example, if all the mask bits are set then the address comparison will be done on all address bits. If, for example, mask bit 0 is cleared and all the rest are set then the comparison will not include bit 0 of the address. This way, an address breakpoint can be generated not only on a specific address but also on a window range of addresses. Table 34 shows the address breakpoint control register.

TABLE 32

| 31 30 29 28 27 26 25 24 23 22 21 20 19 18 17 16 | 15 14 13 12 11 10 9 8 7 6 5 4 3 2 1 0 |
|---|---|
| break mask[15:0] | break address[15:0] |

TABLE 33

| 31 30 29 28 27 26 25 24 23 22 21 20 19 18 17 16 | 15 14 13 12 11 10 9 8 7 6 5 4 3 2 1 0 |
|---|---|
| break mask[15:0] | break address[15:0] |

TABLE 34

| 31 30 29 28 27 26 25 24 23 22 21 20 19 18 17 16 15 14 13 12 11 10 9 8 7 6 5 4 | 3 | 2 | 1 | 0 |
|---|---|---|---|---|
| | en1 | mode1 | en0 | mode0 |

Address Breakpoint Control Register. The address breakpoint control register is a 32 bit read/write register. This register is used to configure the operation of each one of the address breakpoint channels.

Bits 1:0—MODE0. These two bits specify for channel 0 on which event to cause an address breakpoint as specified in Table 35. Table 35 illustrates the Address Mode (AMODE) corresponding to bits 1:0.

TABLE 35

| Mode | Breakpoint On |
|---|---|
| 00 | Program Fetch |
| 01 | Data Read |
| 10 | Data Write |
| 11 | Data Read or Write |

Bit 2—Enable 0 (EN0): When EN0 is set, address breakpoint channel 0 is enabled and can cause a breakpoint event. When this bit is cleared, address breakpoint channel 0 is disabled.

Bits 4:3—MODE1: These two bits specify for channel 1 on which event to cause an address breakpoint as specified in Table 35. Bit 5—Enable 1 (EN1): When EN1 is set, address breakpoint channel 1 is enabled and can cause a breakpoint event. When this bit is cleared, address breakpoint channel 1 is disabled.

Debug Control Register

The Debug Control Register is a 32 bit read/write register. This register is cleared by a hardware reset. Table 36 illustrates the debug control register according to one embodiment of the invention.

TABLE 36

| 3 3 2 2 2 2 2 2 2 2 2 2 1 1 1 1 1 1 1 1 1 1 9 8 7 6 5 4 3 2 1 0 |
|---|
| 1 0 9 8 7 6 5 4 3 2 1 0 9 8 7 6 5 4 3 2 1 0 |
| trace / enyb / entb / tnot / tand / nd / vba |

Bits 10:0—Vector Base Address (VBA): The is the Vector Base Address. The VBA points to the starting location in memory of the vector table. The vector table is a 32 word table explained further below.

Bits 16:11—Task ID (TID): The TID is the task ID on which to cause or not to cause a breakpoint. It is used by the task breakpoint and can be used by the address breakpoints as explained by the following control bits.

Bit 19—TAND: When TAND is set, then an address breakpoint will occur only if there is both an address match and the current task ID is equal to the TID. Note: When a patch channel is configured to operate as a program address breakpoint channel, it has the same rules as the dedicated address channels and the TAND is treated the same.

Bit 20—TNOT: When TNOT is set, then an address breakpoint will occur only if there is an address match and the current task ID is different from the TID. Note: When a patch channel is configured to operate as a program address breakpoint channel, it has the same rules as the dedicated address channels and the TNOT is treated the same.

Bit 21—Enable Task Breakpoint (ENTB): This bit enables the task ID breakpoint. When ENTB is set, a task switch to a task ID which is equal to TID will cause a breakpoint event. When this bit is cleared, the task ID breakpoint is disabled. When setting the ENTB bit, the current task ID is compared to the TID and, if equal, there will be a breakpoint. Further task ID breakpoints will occur only upon switching to a new task which is equal to the TID.

Bit 22—Enable Yield Breakpoint (ENYB): This bit enables the yield breakpoint. When ENYB is set, any yield (task switch) will cause a breakpoint event. When this bit is cleared, the yield breakpoint is disabled.

Bit 31—TRACE: When the TRACE bit is set, a breakpoint will occur on every new instruction execution, thus allowing a single step instruction trace. When the TRACE bit is cleared, trace is disabled.

The Vector Table

In case of a breakpoint event or a patch event, the debug module supplies the network processor core with a vector for where to jump. The vector table is illustrated in Table 37. Each event has a different vector that is calculated by taking the 11 bit VBA and concatenating to it a 5 bit offset. For example, assume that the 11 bit VBA is all zeros. In this case, the breakpoint vector will point to program address $2, patch 0 will point to $4, and so on. The increments are of 2 instruction spaces for each of the events.

TABLE 37

| Address | For |
|---|---|
| VBA + $0 | Reserved for reset |
| VBA + $2 | Breakpoint |
| VBA + $4 | Patch 0 |
| VBA + $6 | Patch 1 |
| VBA + $8 | Patch 2 |
| VBA + $A | Patch 3 |
| VBA + $C | Patch 4 |
| VBA + $E | Patch 5 |
| VBA + $10 | Patch 6 |
| VBA + $12 | Patch 7 |
| VBA + $14 – VBA + $1F | Reserved |

Breakpoint Status Bits

According to one aspect of the invention, special status bits located in the processor Task SPR for reflecting the cause of the breakpoint event. These bits are the PAB, DAB, TB and YB bits. The PAB bit is for a program address breakpoint. The DAB bit is for a data address breakpoint. The TB bit is for a task breakpoint. The YB bit is for a yield breakpoint. These bits are set whenever the relevant breakpoint occurs. These bits are cleared by the RFT instruction.

Agent Interface

According to one aspect of the invention, the agent interface connects the processor to all of the agents in the compound. This interface is used by the network processor to read and write data.

Signal Description

Table 38 provides the agent interface signal list.

TABLE 38

| signal name | description | direction (relative to Vobla) | remarks |
|---|---|---|---|
| V_AGENT_RA[31:0] | The content of register RA from the AGENT opcode. | Output | |
| V_AGENT_RAP[31:0] | The content of register RAP. RAP is the RA + 1 register. | Output | |
| V_AGENT_RB[31:0] | The content of register RB from the AGENT opcode, or a 8 bit immediate value. | Output | May be reduced to 16 bits. |

TABLE 38-continued

| signal name | description | direction (relative to Vobla) | remarks |
|---|---|---|---|
| V_AGENT_ID[4:0] | Agent ID. The ID of the selected agent. | Output | |
| V_AGENT_OPTIONS[9:0] | Various options used by the agents. | Output | |
| [module_prefix]_read_DATA[63:0] | Data from the agents | Input | |
| V_AGENT_WR | Write to agent indication. | Output | |
| V_AGENT_RD | Read from agent indication. | Output | |
| V_AGENT_DOUBLE | Load double from agent. | Output | |

Agent ID Allocation
Table 39 below provides the agent ID allocation.

TABLE 39

| Agent Name | ID Number |
|---|---|
| DMA agent | 00000-0011 |
| CRC | 00100 |
| Multireader | 01000 |
| Doorbell | 01001 |
| Timer | 01010 |
| message sender | 01011 |

Agent Register Mapping
Table 40 illustrates agent register mapping.

TABLE 40

| Agent Name | Register Name | Register Address |
|---|---|---|
| CRC | crc_residue | 0 |
| | bip16_residue | 1 |
| Doorbell | TGMR_L | 0 |
| | TGMR_H | 1 |
| Timer | timer_control | 0 |
| | time_stamp | 1 |

Network Processor Compound Memory Map
Table 41 illustrates the network processor compound memory map according to an embodiment of the invention.

TABLE 41

| Name | Address |
|---|---|
| dma_agent_context_table0 | Vobla_compound_register_base + $0 |
| dma_agent_context_table1 | Vobla_compound_register_base + $2 |
| dma_agent_context_table2 | Vobla_compound_register_base + $4 |
| dma_agent_context_table3 | Vobla_compound_register_base + $F |
| dma_token_register0 | Vobla_compound_register_base + $10 |
| dma_token_register1 | Vobla_compound_register_base + $12 |
| dma_token_register2 | Vobla_compound_register_base + $14 |
| dma_token_register3 | Vobla_compound_register_base + $1F |
| dma_address_error_mask_register0 | Vobla_compound_register_base + $20 |
| dma_address_error_mask_register1 | Vobla_compound_register_base + $22 |
| dma_address_error_mask_register2 | Vobla_compound_register_base + $24 |
| dma_address_error_mask_register3 | Vobla_compound_register_base + $2F |
| channel0_address_register | Vobla_compound_register_base + $30 |
| channel1_address_register | Vobla_compound_register_base + $31 |
| address_breakpoint_control_register | Vobla_compound_register_base + $38 |

TABLE 41-continued

| Name | Address |
|---|---|
| debug_control_register | Vobla_compound_register_base + $39 |
| debug_petch_register0 | Vobla_compound_register_base + $40 |
| debug_petch_register1 | Vobla_compound_register_base + $41 |
| debug_petch_register2 | Vobla_compound_register_base + $42 |
| debug_petch_register3 | Vobla_compound_register_base + $43 |
| debug_petch_register4 | Vobla_compound_register_base + $44 |
| debug_petch_register5 | Vobla_compound_register_base + $45 |
| debug_petch_register6 | Vobla_compound_register_base + $46 |
| debug_petch_register7 | Vobla_compound_register_base + $47 |
| doorbell_request_register [63:0] | Vobla_compound_register_base + $80 – Vobla_compound_register_base + $BF |

Communications Processor Implementing a Ring Network

The inventive aspects of the ring network and/or the network processor, as described above, find particular benefit when implemented in combination in a high-performance communications processor in accordance with the present invention. The high performance communications processor (HPCP) of the invention may on occasion be referred to as the Trajan. As will be evident from the following written description, the HPCP may be implemented in various fashions without departing from the true spirit and scope of the invention. Just by way of example, the number of DMA modules, the characteristics of the control processor, the number of interfaces supported to ATM, the number of flexible packet processors, may vary. Generally, the flexible packet processor of the present invention may on occasion be referred to herein as the Vobla.

Generally, the HPCP should be capable of supporting a variety of applications in a range of markets. For example, the HPCP may be used for Customer Premises Equipment (CPE) applications, such as for Digital Subscriber Line (DSL) services. DSL, sometimes generically referred to as xDSL, refers to the family of digital lines that carriers may provide, such as ADSL, HDSL, SDSL, and so forth. These technologies are all well understood in the art. DSL CPE applications for the HPCP may include bridges for Ethernet and USB; DSL-Ethernet routers; DSL-home wireless routers; Voice Integrated Access Devices (IADs); and service gateways. The HPCP may also be used for consumer networking equipment, such as home routers (Ethernet and/or wireless) and networked appliances (e.g., Universal Plug 'n Play [UPnP] devices). The HPCP may also be used for access network equipment applications, line card applications, and voice processing applications (e.g., voice gateways). Generally, the HPCP will find beneficial application in any voice or communication processing application.

In sum, the goal of the HPCP is to provide a PHY-neutral communications processor that can be readily integrated with appropriate PHY functionality (e.g., ADSL PHY, SHDSL PHY, xDL PHY, etc.) to support a myriad of applications on a variety of network platforms based on a single system on a chip (SOC) building block.

According to just one embodiment, the HPCP (e.g., the so-called Trajan I) would have the baseline specifications set forth in Table 42 below. Table 42 is offered solely for purposes of example and the invention is in no way limited to this embodiment. In fact, it is anticipated that continuing advances in the processor art will result in continually changing parameters.

TABLE 42

| Processors | Clock Speed (MHz) | Network Interfaces | Expansion Interfaces | Hardware Accelerators | Router/Bridge Throughput ATM-Eth (kpps) | Shaped/Unshaped ATM throughput |
|---|---|---|---|---|---|---|
| 2 × NP, 1 × MIPS MMU | 200 266 | 2 × Utopia (8/16 bit); 4 × Ethernet MII/RMII (10/100) 256 time slots TDM I/f | External Peripheral Bus (EPB) | Cell/Packet lookup; 3 × DMA IO | 400 | 2 × OC-3 |

The communications architecture employed by the HPCP could be a conventional bus-based architecture, a switch fabric type architecture, star-based architecture, or other architecture known in the art. Preferably, the HPCP employs the rings architecture and message based protocol of the present invention, discussed above, whereby each module of the HPCP occupies a position on a ring, as discussed below.

In accordance with one embodiment of the present invention, a communications processing system utilizing a ring network architecture is provided. The communications processing system comprises a plurality of ring members connected in point-in-point fashion along the ring network, a transaction based connectivity for communicating at least one message among at least a portion of the ring members, wherein the message includes information indicative of a destination ring member for which the message is intended and the message is passed around the ring network until reaching the destination ring member, and wherein the destination ring member is adapted to receive the message and remove it from the ring network. The communication processing system, in one embodiment, is implemented on a single chip, while in other embodiments the system is implemented on more than one chip. The information indicative of a destination ring member can comprises a ring member identifier and/or an address corresponding to the destination ring member. In one embodiment, the ring network includes a bridge across the ring network that allows messages to travel from one side to another side without passing through intermediate ring members.

The transaction based connectivity of the system may provide for messages to be passed around the ring network according to a clocking scheme. In one implementation, the clocking scheme provides for the messages to travel one ring member per clock cycle. Similarly, the transaction based connectivity can provide for a plurality of messages to travel the ring network, each message traveling one ring member per clock cycle unless a message is consumed at a given ring member. Likewise, the connectivity may provide for messages comprising transactions to travel the ring network, and wherein the messages comprise one or more of a command, an instruction, a type, an address, and data.

In one embodiment, the message arriving at a non-destination ring member will be passed to the next ring member on the ring network. Alternatively, the message arriving at a destination ring member will be consumed by the destination ring member. In this case, the message can be removed from the ring network while being consumed so that a slot on the ring network is made available. The available slot may enable a downstream ring member to insert a message in the slot.

Furthermore, in one embodiment, each ring member receiving a message is adapted to check a destination address portion of the message to determine if the message is intended for that ring member, and if the destination address portion corresponds to that ring member, the ring member takes the message off of the ring network and consumes the message.

In one embodiment, the at least one message comprises a message that causes ring members to assign address space during configuration of the ring network. This message may comprise an enumeration message. The assignment of address space during configuration allows a processing ring member to subsequently infer the configuration of the ring network.

In accordance with another embodiment of the present invention, a communications processing system utilizing a ring network architecture is provided. The communications processing system comprises a plurality of ring members having unique addresses and connected in a point-in-point fashion along the ring network, a transaction based connectivity for communicating at least one message among at least a portion of the ring members, wherein the message includes a destination ring member address for which the message is intended and the message is passed around the ring network until reaching the destination ring member, and where the destination ring member being adapted to receive the message and remove it from the ring network. The communication processing system, in one embodiment, is implemented on a single chip, while in other embodiments the system is implemented on more than one chip. In one embodiment, the ring network includes a bridge across the ring network that allows messages to travel from one side to another side without passing through intermediate ring members.

The transaction based connectivity of the system may provide for messages to be passed around the ring network according to a clocking scheme. In one implementation, the clocking scheme provides for the messages to travel one ring member per clock cycle. Similarly, the transaction based connectivity can provide for a plurality of messages to travel the ring network, each message traveling one ring member per clock cycle unless a message is consumed at a given ring member. Likewise, the connectivity may provide for messages comprising transactions to travel the ring network, and wherein the messages comprise one or more of a command, an instruction, a type, an address, and data. The connective also may provide for messages comprising transactions to travel the ring network, and wherein the messages comprise one or more of a command, an instruction, a type, an address, and data. The destination ring member address can comprise a starting address for the destination ring member and/or an address within the address space assigned for the destination ring member.

In one embodiment, the message arriving at a non-destination ring member will be passed to the next ring member on the ring network or consumed by the destination ring member. In one embodiment, each ring member receiving a message checks the destination ring member address of the message to determine if the message is intended for that ring member, and if the destination ring member address corresponds to that ring member, the ring member takes the message off of the ring network and consumes the message. If consumed, the message can be removed from the ring network while being consumed so that a slot on the ring network is made available. The available slot may enable a downstream ring member to insert a message in the slot.

In one embodiment, the at least one message comprises a message that causes ring members to assign address space during configuration of the ring network. This message may comprise an enumeration message. The assignment of address space during configuration allows a processing ring member to subsequently infer the configuration of the ring network.

In accordance with yet another embodiment of the present invention, a communications processing system utilizing a ring network is provided. The system comprises a plurality of ring members having unique addresses and communicatively connected in a point-in-point fashion along the ring network and a transaction based connectivity for communicating at least one message among at least a portion of the ring members, wherein the message is travels from a first ring member to a second ring member based at least in part on an address assigned to the second ring member, the second ring member being the destination ring member for which the message is intended. The message is passed along the ring network from the first ring member to the second ring member by one or more other ring members each having an address intermediate the addresses of the first and second ring members, wherein the message is received and removed from the ring network upon receipt by the second ring member. The message can include information indicative of the address of second ring member. The communication processing system, in one embodiment, is implemented on a single chip, while in other embodiments the system is implemented on more than one chip. In one embodiment, the ring network includes a bridge across the ring network that allows messages to travel from one side to another side without passing through intermediate ring members.

In one embodiment, the transaction based connectivity provides for messages to be passed around the ring network according to a clocking scheme. The clocking scheme, in one implementation, provides for the messages to travel one ring member per clock cycle. Similarly, the transaction based connectivity can provide for a plurality of messages to travel the ring network, each message traveling one ring member per clock cycle unless a message is consumed at a given ring member. The message arriving at a non-destination ring member can be passed to the next ring member on the ring network or consumed by the destination ring member. In one embodiment, each ring member receiving a message checks a destination address portion of the message to determine if the message is intended for that ring member, and if the destination address portion corresponds to that ring member, the ring member takes the message off of the ring network and consumes the message. If consumed, the message can be removed from the ring network while being consumed so that a slot on the ring network is made available, where the available slot enables a downstream ring member to insert a message in the slot. The connectivity also may provide for messages comprising transactions to travel the ring network, and wherein the messages comprise one or more of a command, an instruction, a type, an address, and data.

In one embodiment, the at least one message comprises a message that causes ring members to assign address space during configuration of the ring network. This message may comprise an enumeration message. The assignment of address space during configuration allows a processing ring member to subsequently infer the configuration of the ring network.

In accordance with an additional embodiment of the present invention a communications processor implemented on a chip. The communications processor comprises a network processor including means for processing a plurality of protocols including ATM, frame relay, Ethernet, and IP, said means being programmable using a set of library commands to process additional protocols, and a protocol processor for controlling the network processor, wherein the protocol processor performs control plane processing and the network processor performs data plane processing. Further, the network processor and the protocol processor are ring members on at least one ring network, and wherein the communications processor further comprises a plurality of other ring members on the at least one ring network. The network processor, in one embodiment, includes a plurality of compounds that share a single ring interface to the ring network. The communications processor can be PHY neutral.

The at least one ring network, in one embodiment, comprises multiple ring networks including a protocol processor ring network and a network processor ring network, where the network processor ring network can include a first network processor for transmitting packets and a second network processor for receiving packets.

In another embodiment, the network processor includes ultrafast task switching using active registers for current tasks and shadow registers for preloading next tasks. The communications processor may further comprise multiple DMA controllers for access to external memories.

The protocol processor, in one embodiment, is adapted to perform the following: signaling protocols; protocol management; exception handling; and system configuration and control. Similarly, the network processor can be adapted to perform the following: per-packet processing; packet forwarding; packet classification; quality-of-service handling; and packet reformatting.

The control path protocol support can be provided by the protocol processor and the data path protocol support can be provided by the network processor. Furthermore, the network processor can be adapted to perform zero overhead task switching.

In one embodiment, the network processor includes compound modules operating as parallel engines. The communications processor can be implemented to provide an enterprise integrated access device (EIAD), a multi-tenant unit (MTU) or remote terminal unit (RTU), a media gateway, and/or a voice gateway.

Exemplary Architectures of the HPCP

Figure 61:
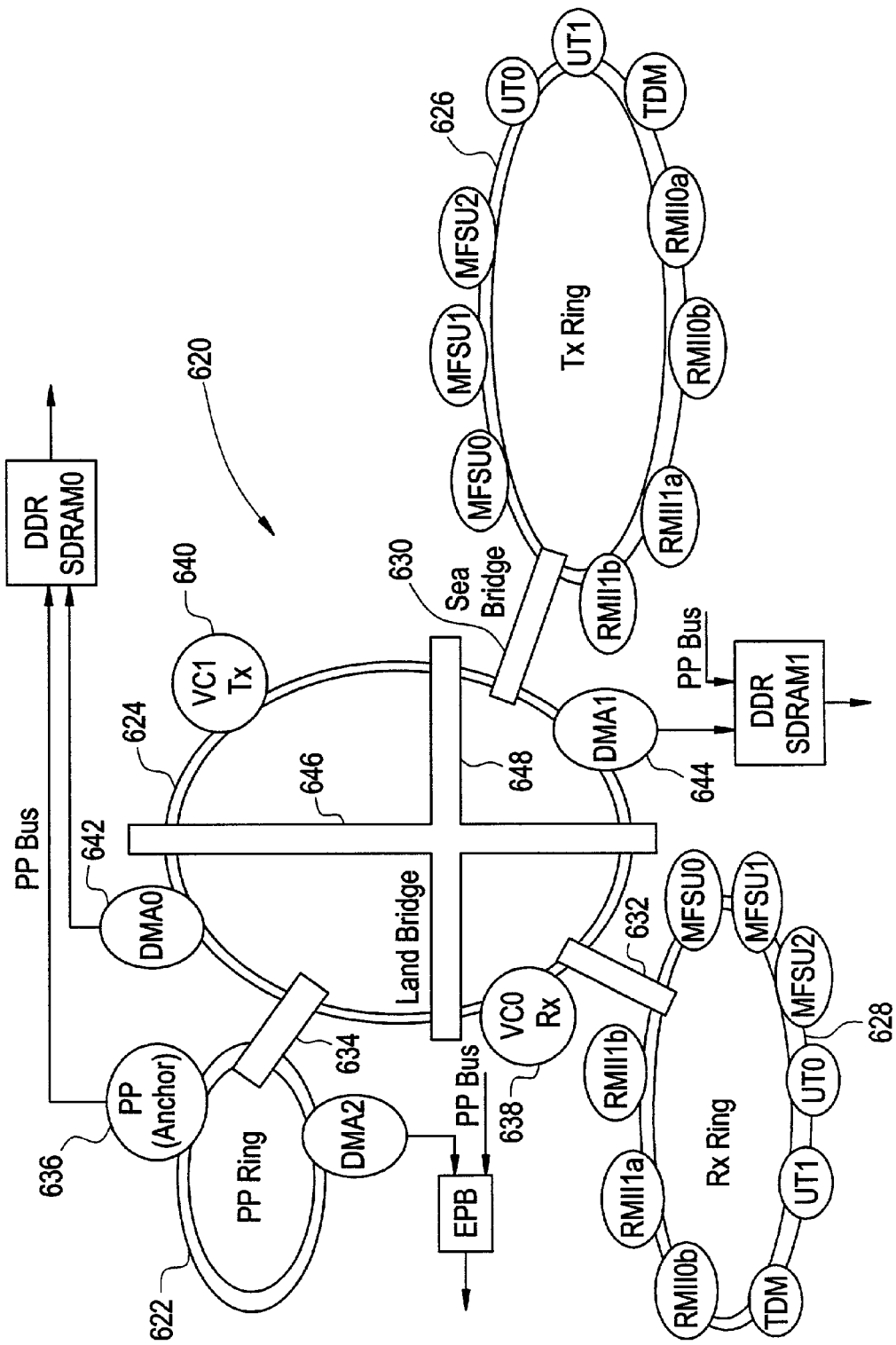
FIG. 61 is a block diagram illustrating an exemplary communications processor implementing a ring architecture in accordance with at least one embodiment of the present invention.

According to one embodiment, the HPCP is implemented using the rings architecture as illustrated in FIG. 61. This rings-type architecture is implemented on a semiconductor (e.g., on a chip) and is unlike token-ring arrangements in networks. According to FIG. 61, the HPCP SOC 620 employs four rings 622–628 that are connected by three inter-ring bridges 630–634. These bridges, also called sea bridges because they interconnect two disparate rings, have logic such that messages will traverse from the near side ring across the bridge if addressed to the far side ring. If messages are addressed to an address contained within the near side ring, the message is forwarded along the ring as in the usual case.

As illustrated, the HPCP 620 generally divides the modules along the rings according to functionality. There is a receiver (Rx) ring 628 for receiving data transmitted from outside the HPCP chip. There is a transmitter (Tx) ring 626 for transmitting data to go outside the HPCP chip. There is a main ring or control ring (PP Ring) 622 which includes the PP (packet processor) 636, which can be considered the host or CPU (anchor) of the HPCP. There is a packet processor ring 624 which includes several packet processors (i.e., the VC0 638 and VC1 640 network processors) and DMAs 642, 644 for packet processing of the various protocols that are handled by the HPCP 620. In order to reduce latency in messaging, the packet processor ring 624 includes several intra-ring bridges 646, 648, also called land bridges because they provide a bridge-type connection within a single ring.

In certain of the figures that follow, the illustration of the HPCP is not graphically depicted as a rings-type arrangement. However, unless stated otherwise, the arrangements correspond to a rings-type arrangement and logical path.

Generally, the improvement in the HPCP over other communications processors can be tied to, individually and in combination, the use of (1) a flexible packet processor with ultrafast task-switching, and (2) the any-to-any mesh internal rings-type communications architecture. This ensures architecture scalability for higher speed ports or higher port density. Additionally, the HPCP provides (3) a design for low system cost. The usage of low cost memories (DDR-SDRAM) and the unique streamline memory architecture eliminates the need for high speed SRAM or external lookup engines (CAM). The primary beneficiaries of the HPCP are relatively high-end applications for the CPE and access markets.

Preferably, the HPCP supports an about 1.2 Gbps (simplex serial rate) rate for L2/L3 wire speed IP/ATM/TDM protocol processing. As indicated above, the HPCP platform includes a core flexible packet processor (RISC [Reduced Instruction Set Computer] network processor technology) and an SOC rings-type interconnect technology. This approach provides a high performance programmable networking platform that permits rapid introduction of new features, new standards, and other enhancements. The robustness of the HPCP allows it to be shared among multiple product lines. According to one embodiment, the HPCP is designed as a 0.18 micron, 520 HS-PBGA (Heat Spread Plastic Ball Grid Array) chip.

Figure 62:
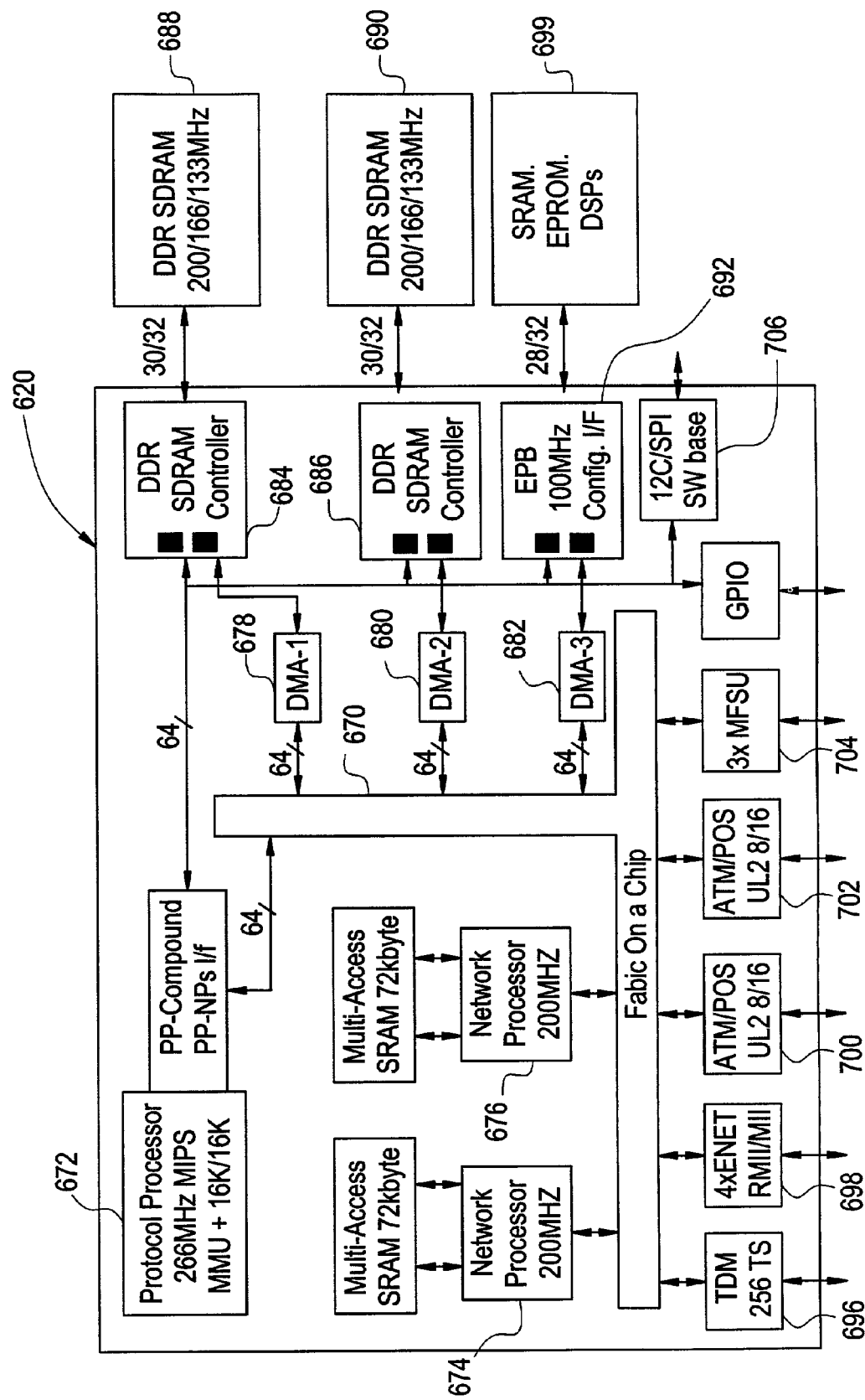
FIG. 62 is a schematic diagram illustrating the exemplary communications processor of FIG. 61 in accordance with at least one embodiment of the present invention.

FIG. 62 is a schematic diagram of an embodiment of the HPCP 620, sometimes referred to herein as the Trajan. According to this embodiment, the HPCP 620 employs a rings-type communication architecture, which is indicated on FIG. 62 as the Fabric on a Chip 670. The packet processor 672 (also referred to as control packet processor, MIPS, CPU, or simply, the host) functions as the control processor for the HPCP 620. The packet processor 672 can be implemented using any suitable processor. Preferably, the packet processor 672 has the following characteristics: 266 MHz (preferably, MIPS) processor; MIPS-I Instruction Set; 16K I, 16K D cache; supports Write back and Write forward or through; has cache coherency; supports Direct Map; and has a MMU 64 TLBs (Translation Look-aside Buffers). Other suitable alternatives to a MIPS processor could be employed. The HPCP embodiment of FIG. 62 employs two network processors 674, 676 (Voblas) for packet processing. Preferably, the network processors 674, 676 are designed in accordance with the flexible packet processor discussed elsewhere herein. Each of the network processors 674, 676 preferably communicates with an operatively connected multi-access SRAM, which preferably has 72 Kbytes of memory.

The HPCP embodiment of FIG. 62 employs three DMA modules, DMA 678, DMA 680, and DMA 682. There also are two DDR-SDRAM controllers 684, 686, each of which is capable of interfacing to a DDR-SDRAM 688, 690 running at 133/166/200 MHz. Each controller supports a 32 bit data bus. The controller 684, 686 supports two masters (DMA and PP) and arbiters between them. An efficient packing algorithm is used to optimize memory transactions. Coherency is reserved between the two masters and READ and WRITE operations. DMA 678 and DMA 680 can master the two memory controllers accordingly. Each can arbitrate for the memory bus and is capable of bursts up to 64 bytes on a transaction.

The EPB (External Peripheral Bus) interface (I/f) 692 is used to interface to a boot EPROM, Security Accelerators and a DSP (collectively figure element 694). The EPB bus runs at 80 MHz with asynchronous address/data protocol. The EPB 692 also has five (5) dedicated Chip Selects (CS) and a special 32 bit CS bus transaction.

The HPCP of FIG. 62 includes a number of peripheral modules, including TDM 696, 4× Ethernet (MII and RMII) 698, a first ATM Utopia Level 2 700, a second ATM Utopia Level 2 702, a 3×MFSU 704, and an 12C/SPI SW base 706.

The TDM module 696 may be used to support time division multiplexing connectivity, such as for T1/E1. Preferably, the TDM module 696 supports the following: up to 256 time slots; HDLC (high-level data link control) and a transparent mode. The TDM module can also interface high-speed TDM busses (backplane) such as H-MVIP, SCSA, H110, and ST-BUS. The 4× EthernetMII/RMII module 698 preferably supports 10/100 Ethernet connectivity. The 3×MFSU module 704 preferably supports high speed (up to 52 Mbps) HDLC or high-speed UART (Universal Asynchronous Receiver-Transmitter).

The HPCP has two ATM interfaces 700, 702 using Utopia Level 2. Each port can be configured for an 8 bit or 16 bit data path. The ATM port can be configured as master or as a slave. In a master configuration, one port (subscriber port) can master up to 124 PHYs and the second port (uplink or network port) can master up to 15 PHYs. Both ports can support an Extended Utopia Mode where the ATM cell length can be extended from 53 bytes up to 64 bytes programmable.

Ring Interface on an EPB

As discussed previously, in at least one embodiment, the HPCP is implemented using a ring architecture and message protocol as disclosed herein. As illustrated with reference to FIGS. 63–67 an external interface 720 may be implemented along with the EBP 692. An external FPGA 722 that sits on EPB busses may play the roll of external ring keeper, the Anchor can be external the network processor and on the FPGA. Of course, instead of FPGA it could be another HPCP. The input's job is to disable EPB operation for current transaction, and enable movement of ring data. This input is driven by either by the FPGA or by second HPCP. The output's job is to tell the second HPCP or the external FPGA who is the ring keeper, that the output data is for him. Regular EPB customers (like Flash) will look at the output as additional enable. One advantage of this arrangement is that a number of pre-existing pins are used for part-time ring transactions. The speed of ring messaging is reasonably high(same speed as of original EPB). The changes to existing EPB are minimal. The ring side implementation is exact copy of a bridge plus state machine.

Figure 63:
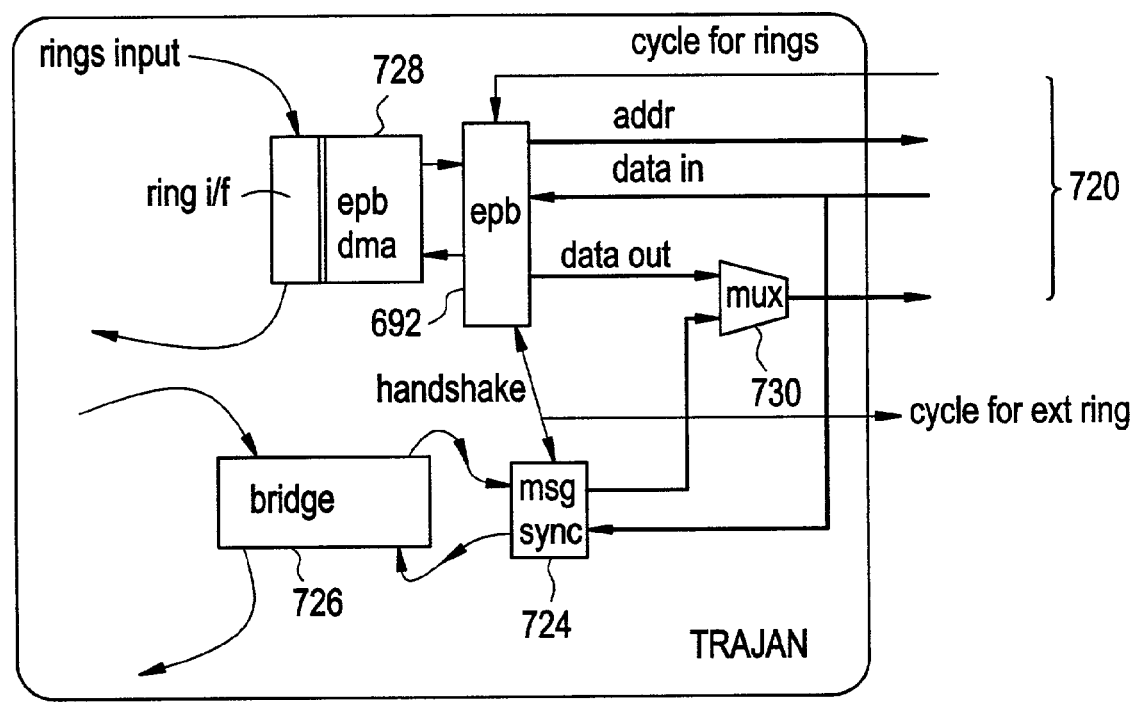
FIGS. 63–69 are schematic diagrams illustrating various implementations of an external ring interface in a communications processor in accordance with at least one embodiment of the present invention.
Figure 64:
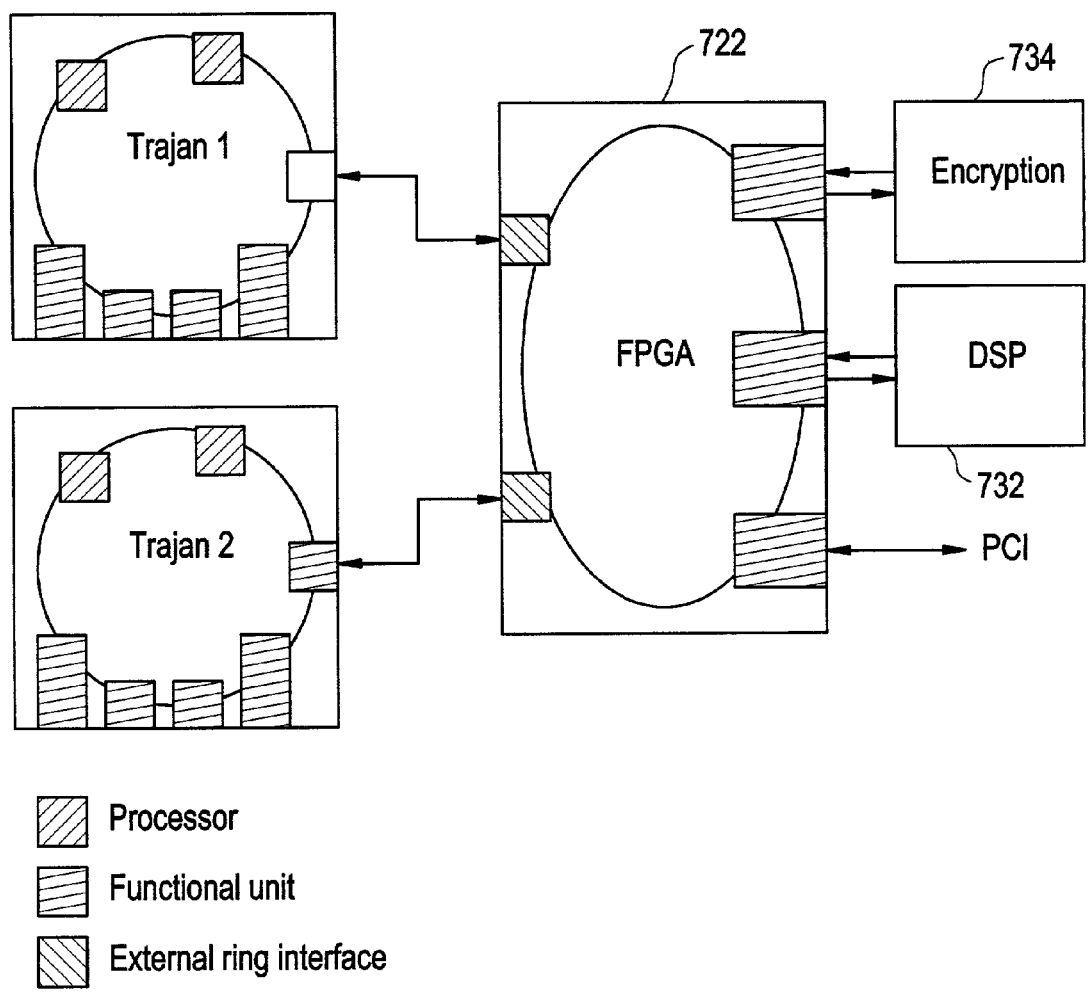
Figure 65:
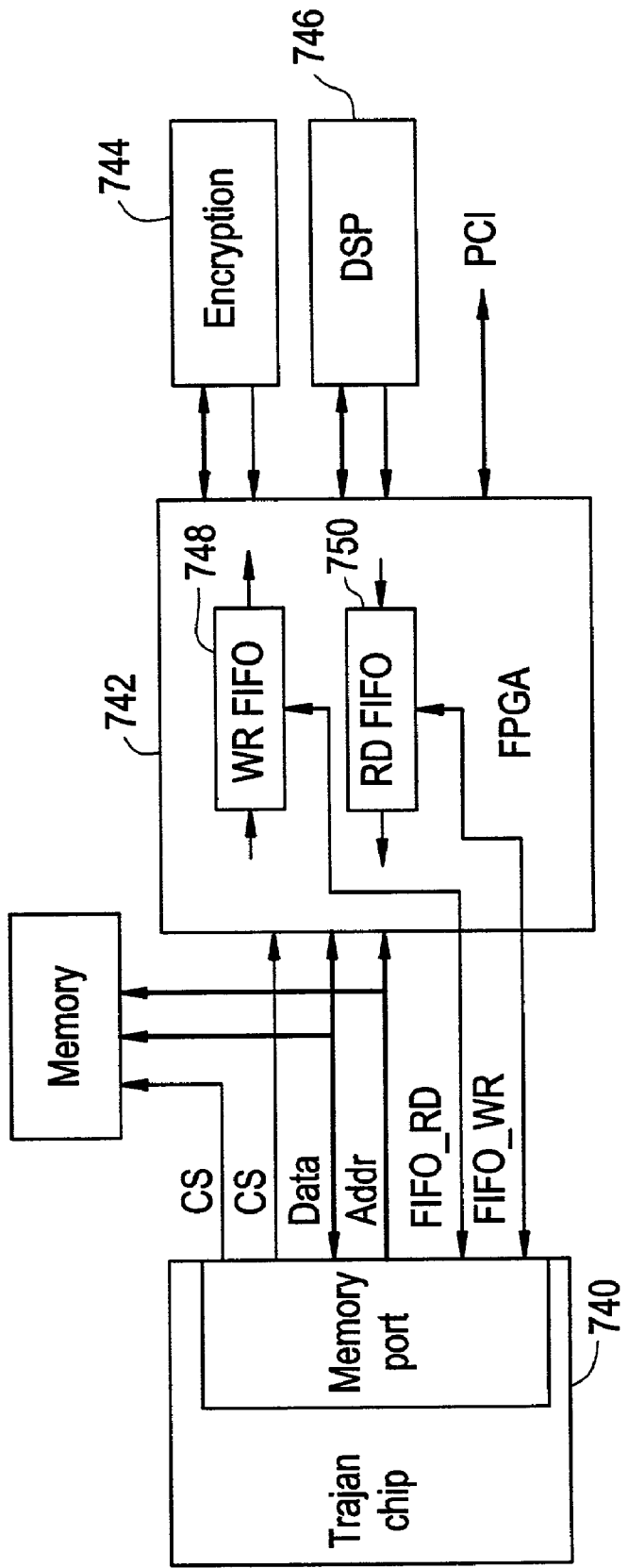
Figure 66:
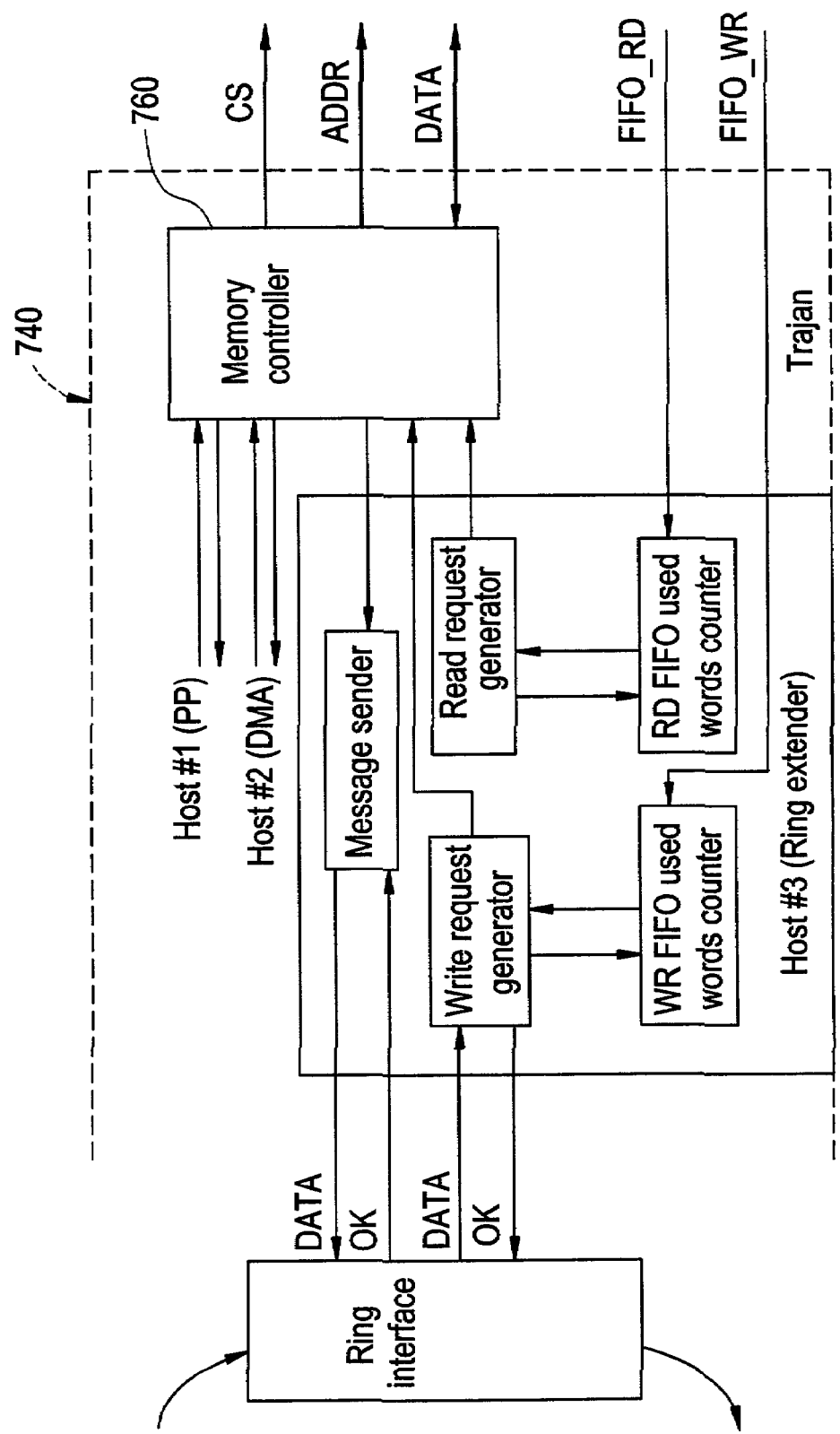
Figure 67:
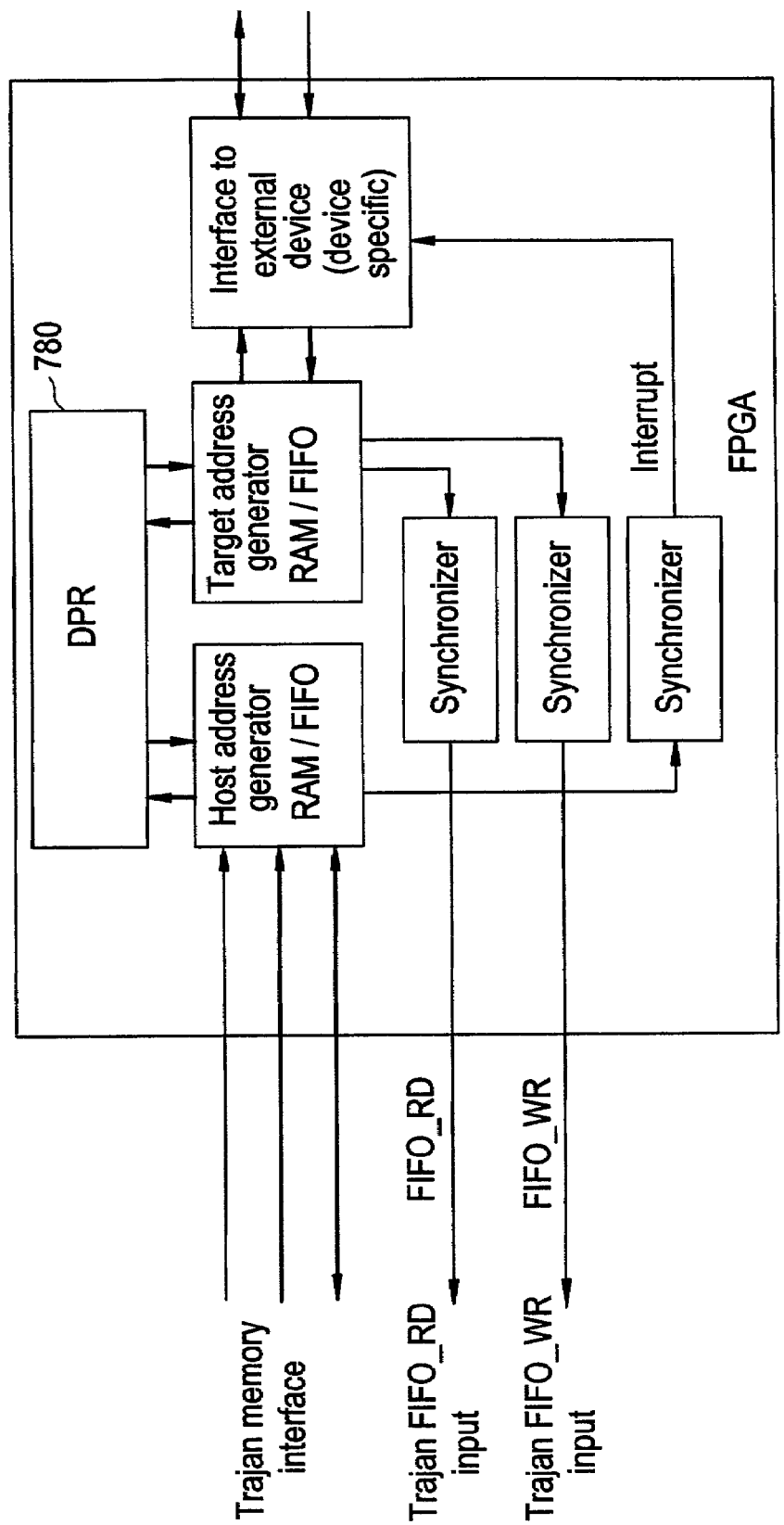

In the implementation illustrated in FIG. 63, 32 bits of data in/out is used to carry messages. There also is the potential to use also the address bits, thus increasing the throughput, but complicating the design. Message_sync 724 is a relatively simple block that takes care of turning 60 (or 92) bits of outgoing message into several (2..3) transactions on EPB like interface. It also turns incoming data (from 2..3 transactions) to messages. On the inside part message_sync interfaces wit a regular bridge 726. Since EPB DMA 728 can potentially sit on a busy ring, message_sync 724 and its bridge 726 can be placed on the less busy ring.

The mux 730 takes data either from EPB 692 or from message_sync 724 depending on the transaction. Handshake signals basically ask the EPB 692 to give up a cycle. And in the other direction EPB 692 acknowledges the tristate or mux surrender. Using this fact, the chip selects can be disabled in ring-oriented transactions.

In order to program the message_sync 724 and EPB 692 to enable/disable external ring operation, the hardware can sample a pin during power up reset. First, hardware reset puts message_sync in disabled mode such that during Enumeration, it passes on the Enumeration without attempting to talk to the other chip. The message_sync 724 assigns to itself space of one address. After initial Enumeration, PP enables (or not) the message_sync to work. If message_sync 724 is enabled., second Enumeration is done. This time message_sync transmits Enumeration message to the other chip. Then it waits for the message to circle back to it.

The HPCP chip requires interfaces to various devices, which can serve as both slaves and masters (or both). Some of these devices are: DSPs 732; encryption engines 734; external buses such as PCI; external memories; and other HPCP chips. Some of these devices may directly connect to the EPB port, on the chip. However, in order to use these devices, a complex handshake is often required which would force the PP to assist in each transfer. In the case where these devices should initiate a data transfer into the HPCP, a special mechanism is required, in order to avoid polling on the EPB port. The interface described is designed to allow a more robust and efficient connection of such devices to the chip, and is consistent with the HPCP hardware and software architecture. FIGS. 64–67 describe the interface, starting from a system view and ending with detailed block diagrams of the components.

Operation

The interface described above implements a ring interface to external logic, allowing the HPCP 740 to write out messages, and external devices to generate arbitrary ring messages in the HPCP 740. The FPGA 742, making the interface between the HPCP and the external devices 744, 746, serves as shared memory. This memory can be independently accessed from both sides. In addition, accesses from the HPCP 740 can send messages to the external devices, and accesses from the external devices can generate messages on the HPCP ring. The DPR (dual port RAM) 780 is seen as both random access memory (RAM) or as a FIFO, depending on the access address. Two FIFOs 748, 750 are implemented. One for receiving ring messages from the HPCP and one for sending messages to the HPCP.

Message Generation by the HPCP

When the ring interface recognizes a message to the external interface, a write burst is issued to the memory controller 760. This write has a fixed length of 128 bits. The write is always targeted to the same address, being the write FIFO address in the external device. The external device indicates to the HPCP 740 when data is being read from the FIFO. The HPCP 740 knows in advance the size of the write FIFO, and therefore knows when it is possible to issue more write commands to the memory controller. When it is no longer possible to issue writes, and all write buffers on the way are full, the OK signal to the ring interface is de-asserted.

Message Generation by the External Device

The FIFO mapping is used to queue messages to be read by the HPCP. The FIFO memory is 128 bits wide (not all bits have to be implemented in hardware). Each ring message occupies four 32-bit data entries, to be read be the HPCP. When the message is complete (all 128 bits written) the SYNC output to the HPCP is activated, indicating that a message has been written to the message queue. This allows the HPCP to keep track of the number of messages written, and to read the appropriate number of messages.

The HPCP counts the number of messages entered into the queue in a request counter, and the number of read messages in a service counter. When there are pending messages (the request counter is greater than the service counter) and the appropriate read port is free, the HPCP issues a 128-bit read. The implementation of this read request depends on the port type. Ports that support burst transfers are issued one 128-bit burst read. Ports that support only 32-bit data transfers are issued 4 reads. When the read request is complete, the service counter is incremented, indicating that an external message is served.

The data read from the port is used to generate a message. When all 128 data bits are received in the message sender, a message is sent to the ring interface.

Interrupts from HPCP to the External Device

The HPCP 740 can write data to special addresses that cause an interrupt to the external device. These addresses can either be mapped for interrupts only or interrupts and data (in the DPR 780).

General-Purpose Data Transfer

Besides sending messages from the external device to the HPCP, this interface serves as a buffered link for general-purpose data transfer. The DPR can be read and written by both the HPCP and the external device. When the HPCP moves data for processing in the external device, it writes the data to the DPR, and then causes an interrupt in the external device by writing to an interrupt address.

The external device processes the data and returns it to the DPR. It then generates a message to the HPCP, indicates it to read back the data from the DPR. Since the entire DPR can be mapped as a FIFO, the external device can also write the entire data directly to the NP memory in the HPCP, and then notify the NP that the data is complete.

Supporting Multiple External Eevices

One interface can support several external devices. Many DPR blocks can be implemented in a single FPGA, letting each of the external devices function independently. The message queue can either be unified into a single FIFO with write arbitration, or can be made of several FIFOs arbitrated during the message reads. Anyway, read or write arbitration is performed in the FPGA and is transparent to the HPCP chip.

Traffic Management

In one embodiment, traffic that is already on the ring gets priority. Also, modules may be designed to consume incoming messages without delay—or with well bounded delay. Further, a virtual watch dog timer can be implemented in the PP or one of the network processors. In this case, the watch dog timer periodically sends a message to itself via the ring. If this message is not there by the time the task is reawakened, indicating that the ring is locked and in need of a reset.

Memory Considerations

Network processor RAM can grow up to, for example 64 KB. The problem is, however, that this RAM uses 16 bits of ring addressing space. So with 20 bits of address there can be approximately 8 network processors in a reasonable system. Maximum theoretical number of network processors is 16. But space may be needed for other modules as well. There is no great penalty to extend ring address space to more than 20 bits and this can be done to accommodate design necessities, for this example just 20 bits.

Inside network processor compound there is more than RAM. There are doorbells, debug, timer and some more. They all need address space, but much more smaller. If they are assigned their own address space, the resulting address space used by network processor compound will be 128 k bytes. This is because 65 KB is actually used, but because the address space is rounded to next power of 2, 65 k become 128 k.

Another aspect of the present invention is to steal a little bit of space from RAM on the rings and assign the low 1k of bytes of ring address space to all the little modules. For example, doorbells take 64 entries of address space (32 bit entries). When work write message arrives for (vobla_base_address+32) it is routed to doorbells and not to RAM.

This effectively protects the lower portion of the RAM from the ring network. network processor can still load/store and even fetch from there, because load/store does not access the Rings.

Figure 68:
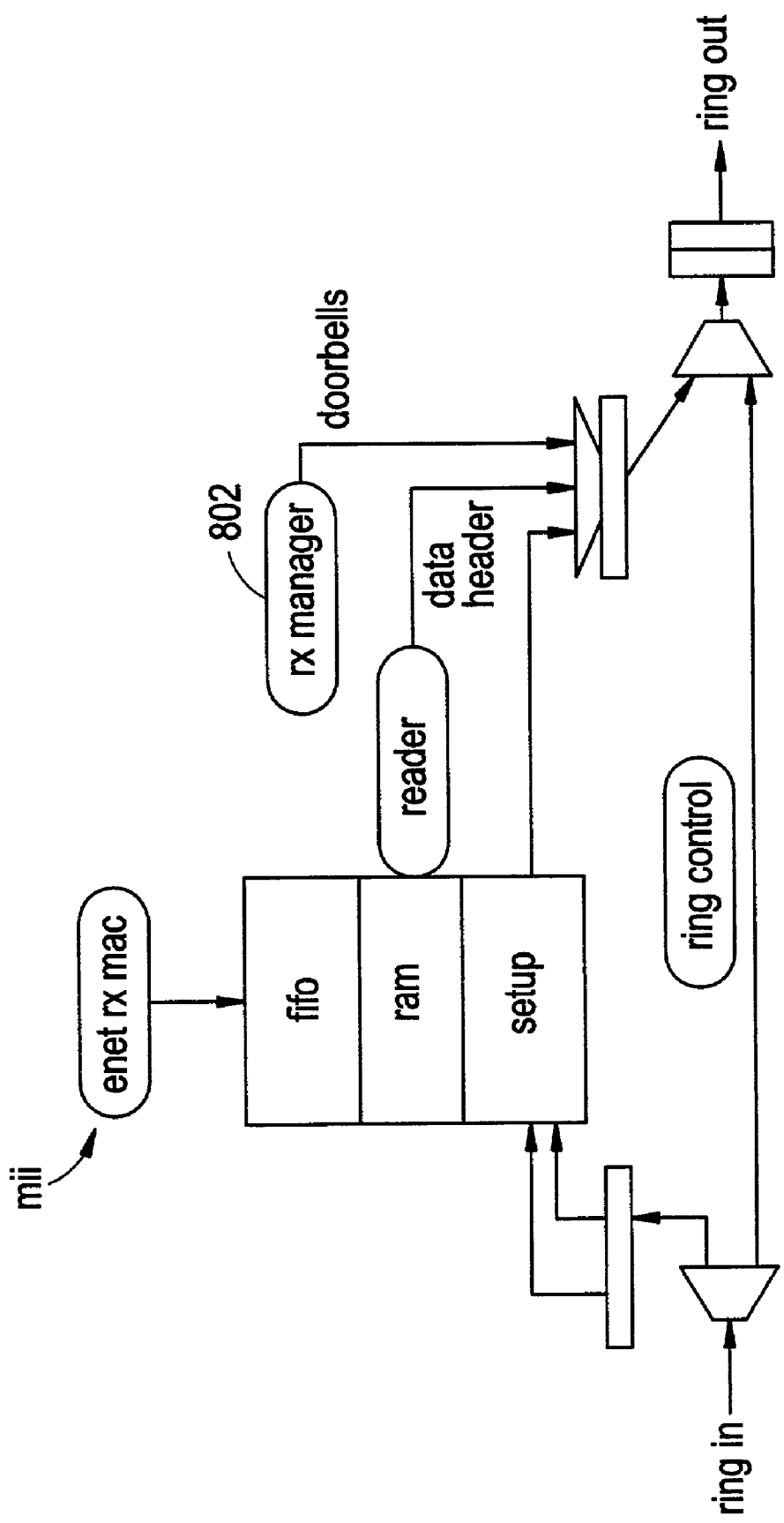
Figure 69:
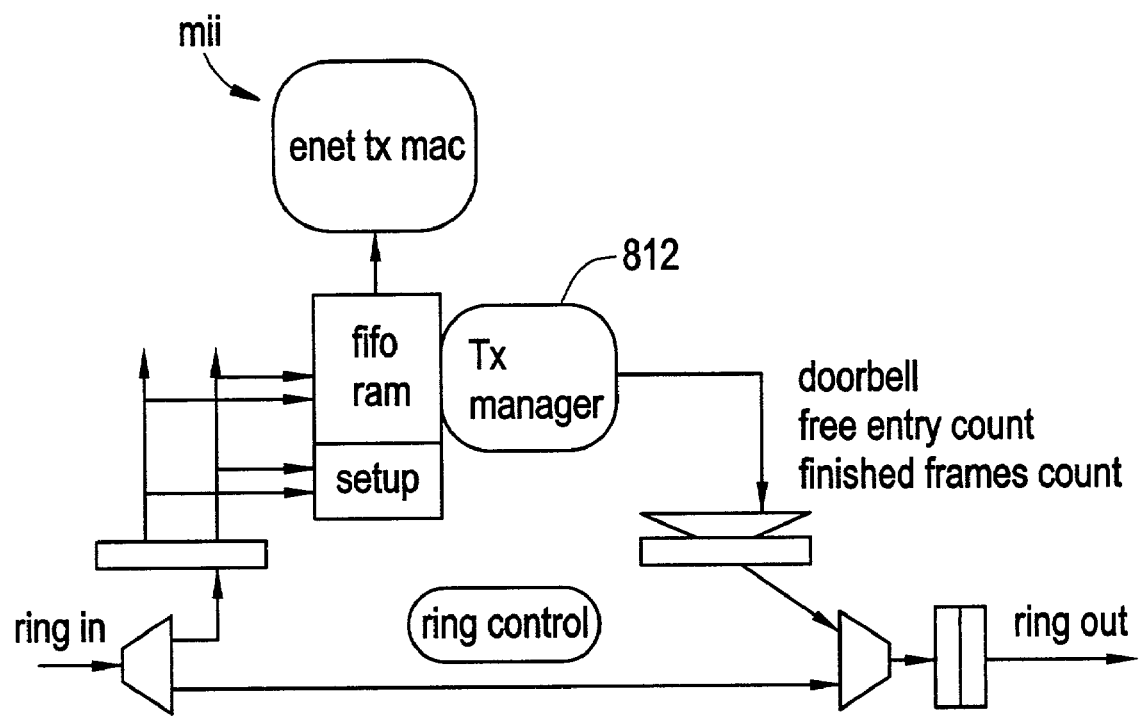

FIGS. 68 and 69 illustrate two typical scenarios for Tx and Rx Ethernet as may be implemented in accordance with the present invention. To summarize the Ethernet compounds:

The Rx manager 802 mis adapted to: send regular request, doorbell, taskid and viscode; header send Ahead—knows how many bytes, status and where; Multi read request service, for moving data to network processor RAM; and know when to switch to urgent request.

The Tx manager 812 is adapted to: know when to start transmitting, when to retransmit; when and how to issue aregular request—doorbell, taskid, viscode; perform free buffer count send ahead; perform urgent request—last buffer and not last in it; resend doorbell on request, if there are free entries in fifo—this is used by task that adds frames to transmit queue; keep RAM status fifo of finished frames—it sends tx complition status word and place to put it.

Rx Operation:

(1) Rx Frame starts incoming.
(2) It fills one entry (64 bytes) in fifo.
(3) Header+Status is pushed ahead to network processor RAM.
(4) Ring doorbell.
(5) Network processor switches to service the task.
(6) Network processor examines the header.
(7) Network processor sets up CRC snooper, especially the count.
(8) Network processor sends multi read request from the rx fifo.it takes 12+4 clocks, so network processor doesn't switch out, just polls the crc snooper at the end if after rewarding whole fifo entry, there are still valid entries, new doorbell is ringed and new header is sent ahead.
(9) Network processor issues DMA write request and yields out.
(10) DMA agent in network processor builds the messages to DMA based on the DMA opcode, src registers data and DMA context registers. This context has the knowledge of DMA address, token availability, little/big endian, etc. Part of communication with DMA is also a new token request.
(11) when the DMA is done, it sends doorbell to re-awake the task, to continue the work.

Tx Operation:

(1) ask that adds frames to transmit queue, adds a frame and also sends a message to transmitter fifo if transmitter is not doing anything, ring doorbell of transmit task.
(2) transmit task is waken up by doorbell
(3) DMA read issued and network processor switches out
(4) when DMA is finished, multi read is issued from network processor RAM to enet tx
(5) when fifo entry is full, tx starts transmitting
(6) tx fifo updates the number of empty fifo entries in network processor RAM.
(7) if task detects empty buffers it can fill, it fills them and retires(8) when fifo entry is empty, the free count is sent ahead and doorbell is rung.
(9) if last buffer is half full and it is not last, Enet fifo requests urgent (10) each time the frame is finished by Tx, the manager sends status word to circular fifo in RAM. the manager uses single address plus 2–3 bits counter to create the address, it also writes the counter value in fixed location.

Programming Model for the HPCP

Figure 70:
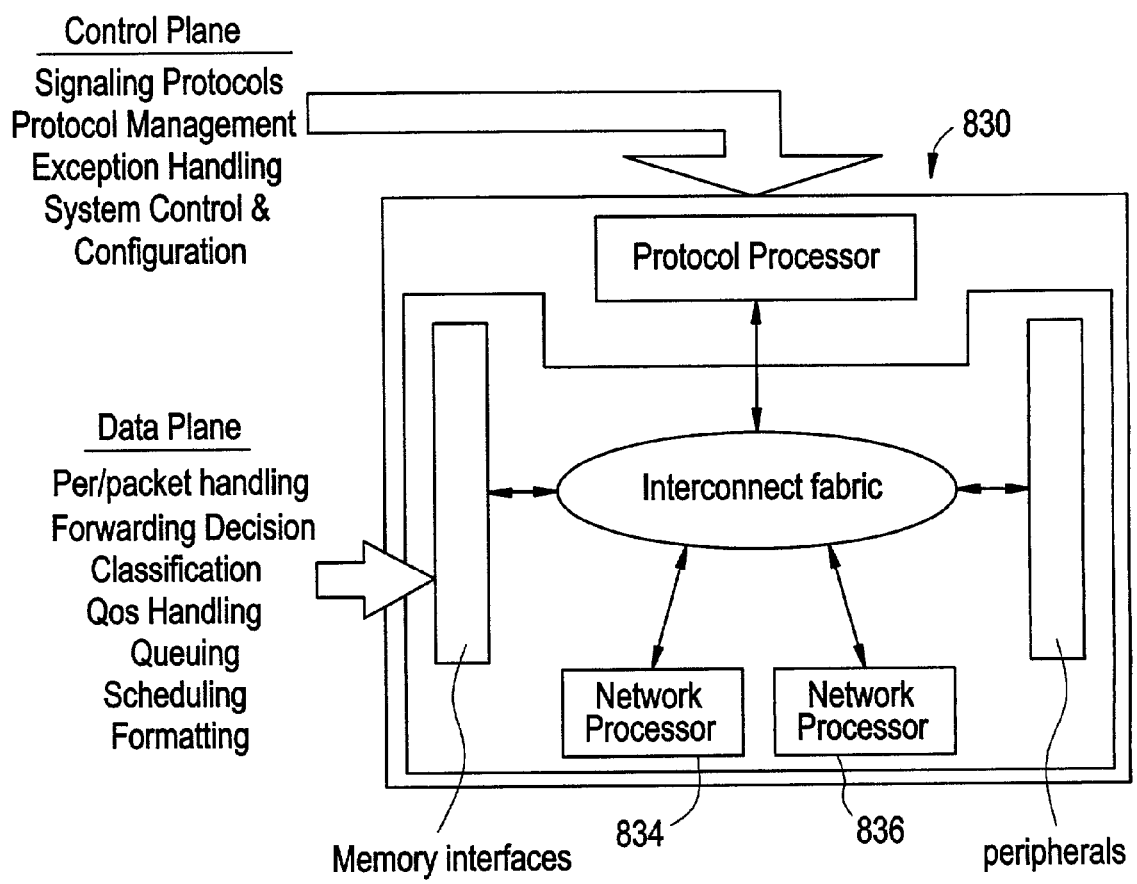
FIG. 70 is a block diagram illustrating an exemplary programming module for a communications processor in accordance with at least one embodiment of the present invention.

FIG. 70 illustrates the programming model 830 that may be employed for the HPCP. According to FIG. 70, the packet processor 832 (PP or control packet processor [CPP]) operates as the controller for the HPCP, performing such control plane functions as signaling protocols, protocol management, handling exceptions (faults), and system control and configuration. The network processors 834, 836 perform data plane functions such as per-packet handling, forwarding decisions, packet classification, quality-of-service (QOS) handling, queuing, scheduling and packet re-formatting.

Data Path Protocol Support for the HPCP

Figure 71:
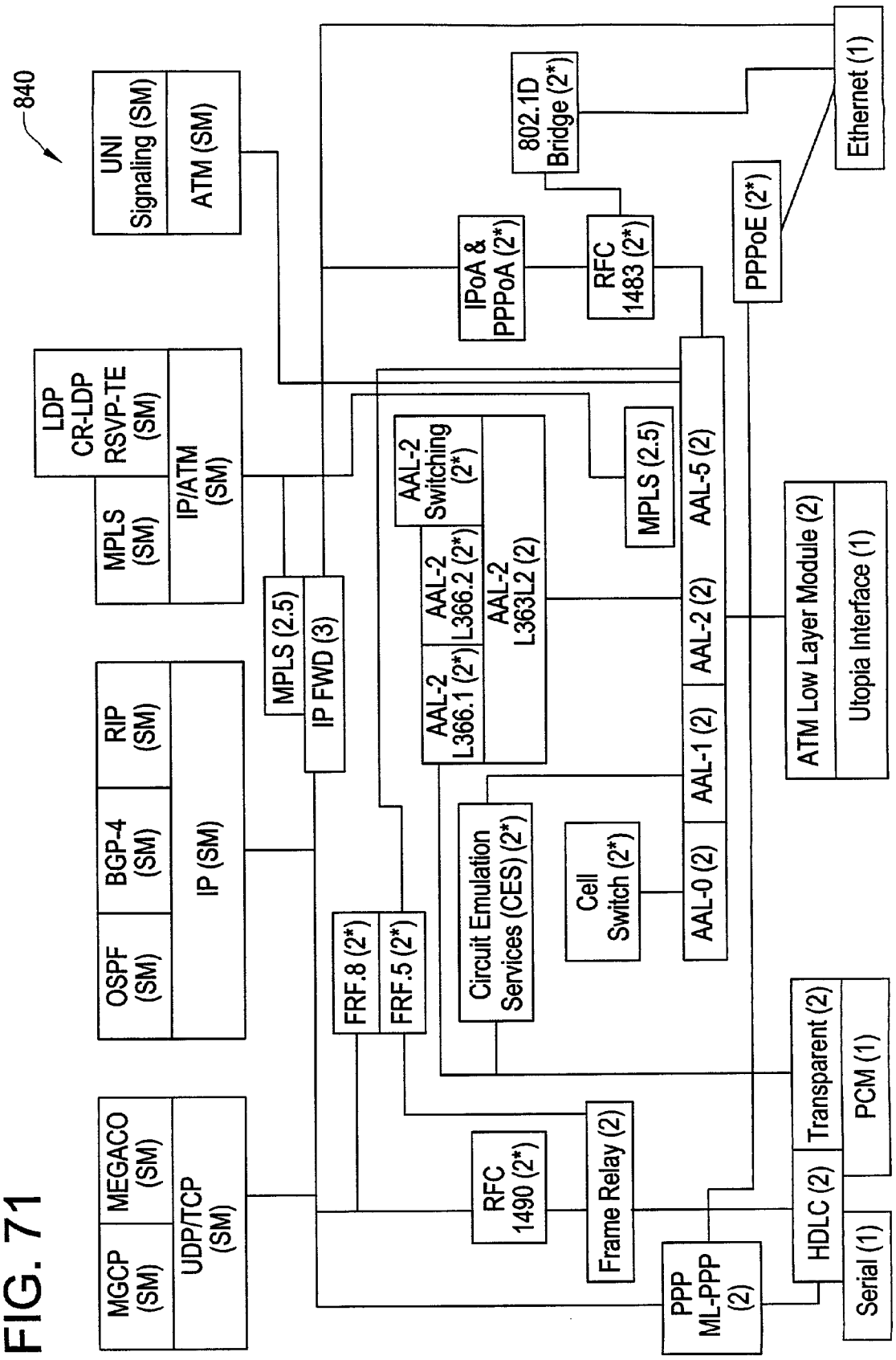
FIG. 71 is a block diagram illustrating an exemplary data path and protocol path of a communications processor in accordance with at least one embodiment of the present invention.

FIG. 71 illustrates the data path and control path protocol support 840 provided according to a preferred embodiment of the HPCP. This data path protocol support is provided by the network processor (e.g., flexible packet processor) engine of the HPCP. Each protocol capability shown in FIG. 71 is labeled according to its position in the Open Systems Interface (OSI) layered protocol model. The legend for FIG.

71 is as follows: (1)=Layer 1; (2)=Layer 2; (2*)=Layer 2 inter-working; (2.5*)=Layer 2.5 inter-working; and (3*)=Layer 3 inter-working.

The boxes in FIG. 71 labeled as (SM) illustrate the signaling and management provided in order to manage the data path protocol support according to a preferred embodiment of the HPCP. Preferably, the signaling and management operations shown in FIG. 71 correspond to the control plane operations performed by a CPP such as that shown in FIG. 63.

A Packet Processor for the HPCP

A flexible packet processor that could be employed in the HPCP typically includes capabilities, such as zero-overhead switching, not normally present in general purpose processors. Accordingly, the preferred packet processor provides the following characteristics:

nearly zero overhead task switch;

a Hardware scheduler (next_task_id)—strict priority scheme;

support for unlimited number of threads/tasks (e.g., 32 simultaneous tasks);

allows connection to multiple external memories in parallel;

modular interface to accelerators;

compiler friendly;

tailored instruction set, with about 60 instructions for: ALU (Arithmetic Logic Unit), data manipulation, flow control, load/store, task management (yield), agent (Accelerators), SPR (Special Purpose Register) move, and the like.

Figure 72:
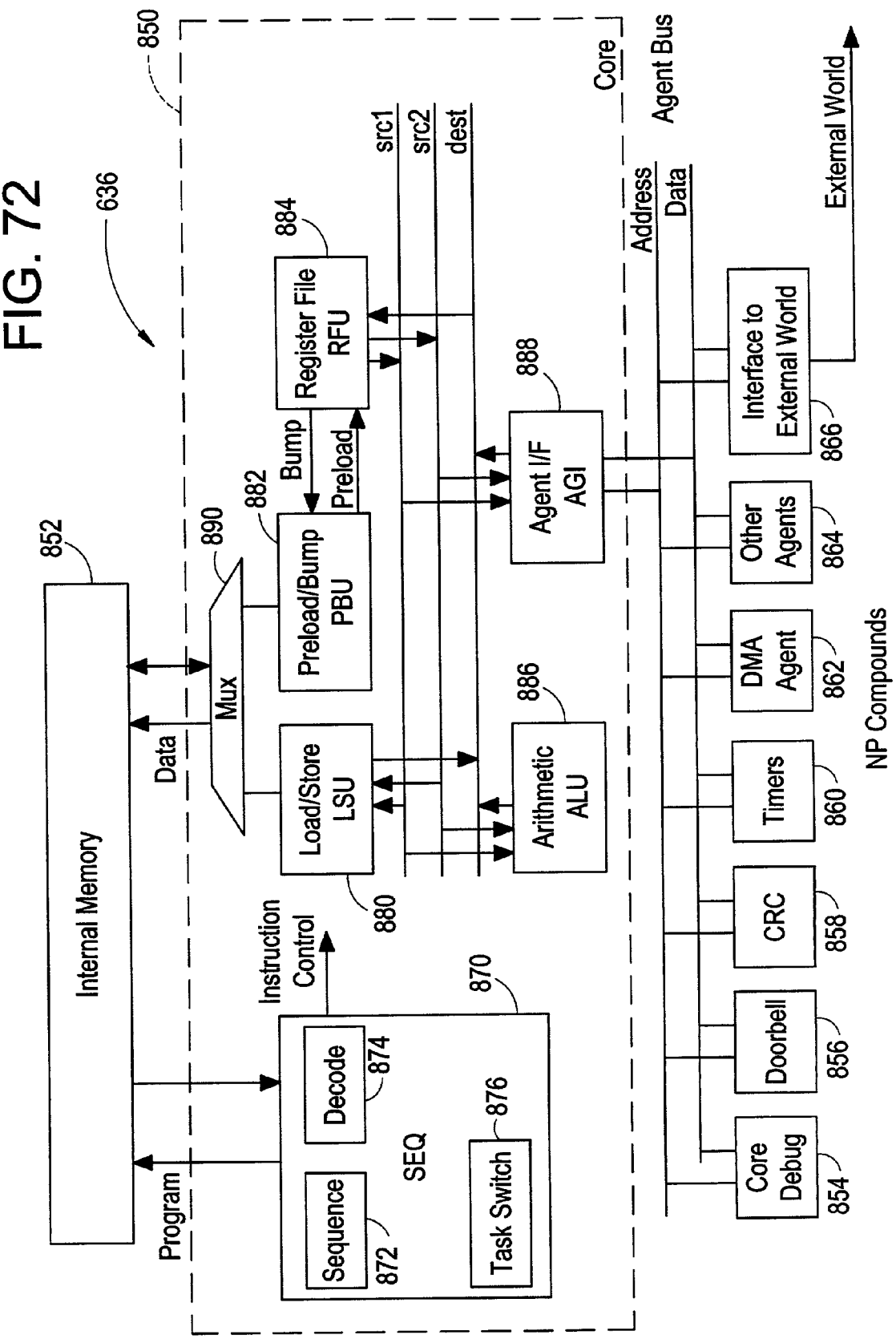
FIG. 72 is a schematic diagram illustrating an exemplary network processor utilized in a communications processor in accordance with at least one embodiment of the present invention.

FIG. 72 is a block diagram of the packet processor 636 employed in the HPCP 620 (FIG. 61) according to one embodiment of the invention. The packet processor 636 of FIG. 72 includes a packet processor core 850 (Vobla core), an internal memory 852 for programming and data; and a series of support submodules (compounds) for the packet processor, such as a core debug 854, a doorbell 856, a CRC 858, timers 860, DMA agent 862, and other agents 864. There is also an external interface 866 for interfacing to the fabric. The packet processor core 850 includes a program sequencer 870 that further includes a sequencer 872, a decoder 874 and a task switch block 876. There is also a load/store unit 880, a preload/bump unit 882, a register file unit 884, an arithmetic logic unit 886, and an agent interface module 888. A multiplexer 890 is disposed between the internal memory 852 and the load/store unit 880 and pre-load/bump unit 882. The packet processor 636 of FIG. 72 includes two source buses and a destination bus in the core, and an agent bus for interfacing with the agents.

Figure 73:
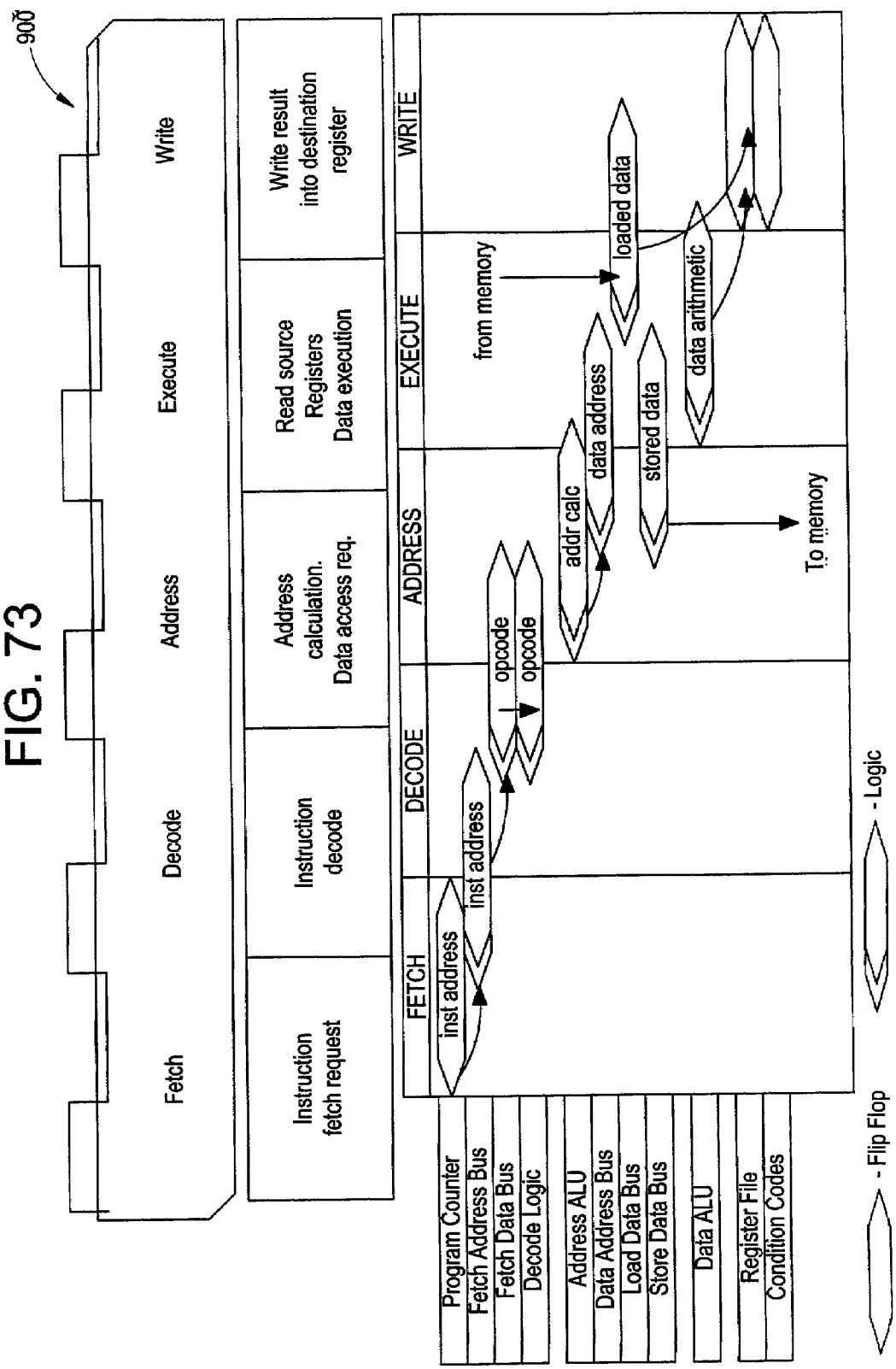
FIG. 73 is a flow diagram illustrating an exemplary processing pipeline of a network processor utilized in a communications processor in accordance with at least one embodiment of the present invention.

FIG. 73 illustrates an exemplary processing pipeline 900 for a packet processor used in the HPCP according to an embodiment of the invention. The pipeline 900 of FIG. 73 shows the steps carried out for the execution of each packet processor. According to FIG. 73, first an instruction is fetched. Then the instruction is decoded. The address for data to be accessed is then calculated. The source registers are read and the instruction is executed. The result is then written into the destination register.

Quality of Support Features for the HPCP

The HPCP may incorporate a number of quality of support (QOS) features according to one embodiment of the invention. For example, the HPCP may incorporate one or more of the following QOS operations: output queuing and scheduling; cell/frame pacing; IP classification (behavior aggregator); lookup engines; and congestion management. Preferably, these QOS operations are carried out by the packet processor implemented in the HPCP. The HPCP may provide frame-based output scheduling using an output scheduler. The output scheduler may provide a frame-based service to include: up to 8 configurable queues 910–924 per virtual/physical transmit queue; up to M ports Strict Priority (SP) 930, up to N ports of WFQ (Weighted Fair Queue) 932; and up to L ports Low Priority (LP) 934.

Figure 74:
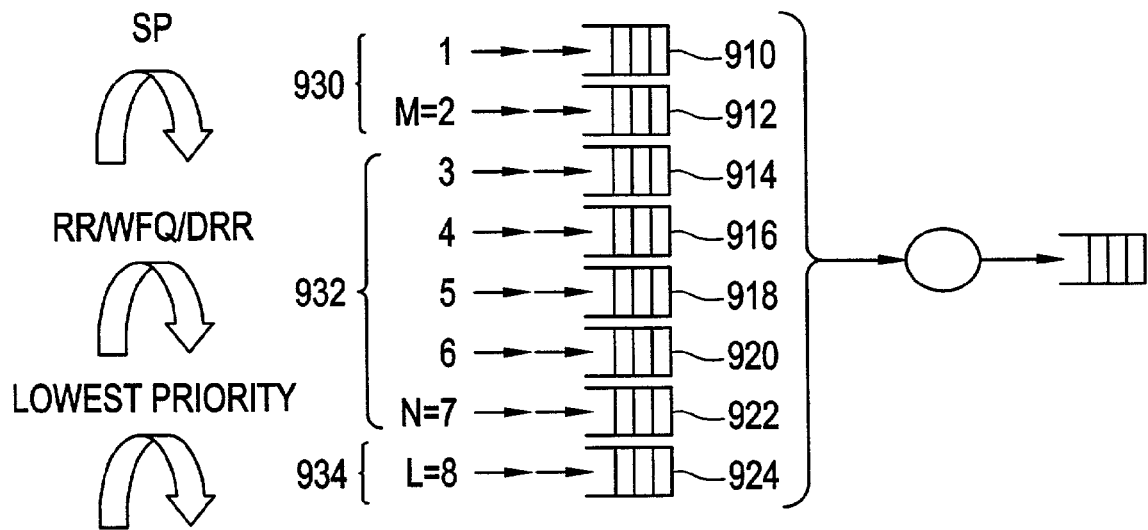
FIGS. 74 and 75 are flow diagrams illustrating exemplary pacing processes utilized in a communications processor in accordance with at least one embodiment of the present invention.

FIG. 74 illustrates the output scheduling for the HPCP according to an embodiment of the invention.

Work conserving schedulers: Scheduling order empty 1-M, empty M N according to scheduler, and then empty N-L. The HPCP may provide cell/frame pacing according to an embodiment of the invention. For example, an ATM pacer could employ a calendar wheel algorithm and provide a cell-based service with traffic management for UBR, UBR+, CBR, VBR, and VBRrt.

A frame-based pacer (bandwidth limiter) may provide pacing per port in order to limit the port overall output to a predefined rate (e.g., allow a 100 Mbps uplink to be limited to a 12 Mbps service if required).

Figure 75:
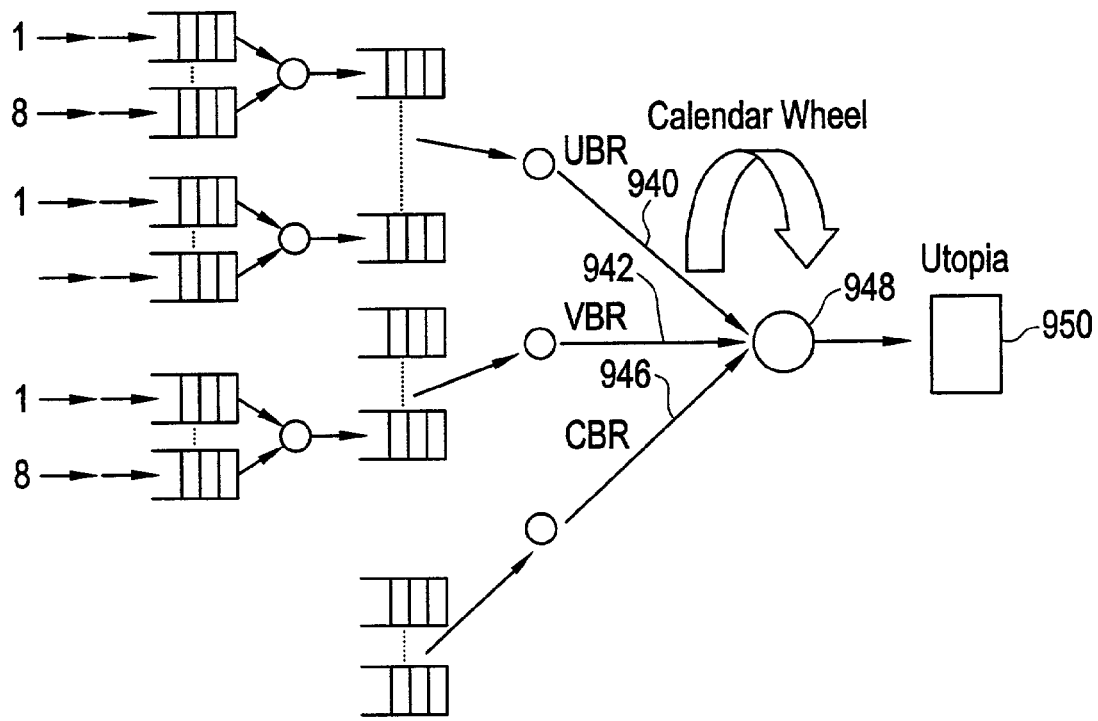

Combining QOS for scheduling and pacing may be implemented in the HPCP as shown in FIG. 75. According to FIG. 75, the ports are fed to the configurable queues, which are then output as a UBR (unspecified bit rate) 940, VBR (variable bit rate) 942 or CBR (constant bit rate) data stream 946 to the calendar wheel algorithm 948. The output of the calendar wheel algorithm 948 is fed to the Utopia interface 950.

The HPCP may provide IP packet classification according to an embodiment of the invention. Preferably, the HPCP provides IPv4 packet classification.

The HPCP may provide this feature based on up to 512 classification rules that are prioritized by order. The packet classification is based on 5 or as many as 7 (see italicized fields) matching fields: IP Source Address; IP Destination Address; Protocol ID; TCP/UDP Source Port Number; TCP/UDP Destination Port Number; Type Of Service (TOS) bits; and Physical/Logical I/f Port Number. The matching criteria may be based on an exact match, a prefix match, and/or a range match on each field. Classification rules can be set dynamically by protocols such as MPLS or RSVP, or manually.

The HPCP may also provide address lookup engines according to an embodiment of the invention. At Layer 2, the following address lookup capability is provided:

Ethernet MAC (Media Access Control) Address Uni-cast/Multicast.

ATM VPI (Virtual Path ID)/VCI (Virtual Connection ID). Algorithmic approach supports single PHY and multi PHY.

MPLS Label Lookup.

At Layer 3, the Following Address Lookup Capability is Provided:

IPv4 LPM (Longest Prefix Match) lookup.

The HPCP may also provide congestion management QOS according to an embodiment of the invention. The congestion management QOS includes random early detection (RED) per queue for frame based transmit queues and ATM congestion recovery EPD and PPD (Early Packet Discard and Partial Packet Discard, respectively).

Exemplary Embodiments Showing Beneficial Applications for the HPCP

The HPCP (Trajan) is a versatile communications processor that can be used in many application scenarios. The HPCP's frame, cell and circuit processing capabilities makes it well-suited for access applications. Set forth below are some exemplary application scenarios where HPCP can be used as a SBC (Single Board Computer) or on a line card application in a chassis configuration.

Figure 76:
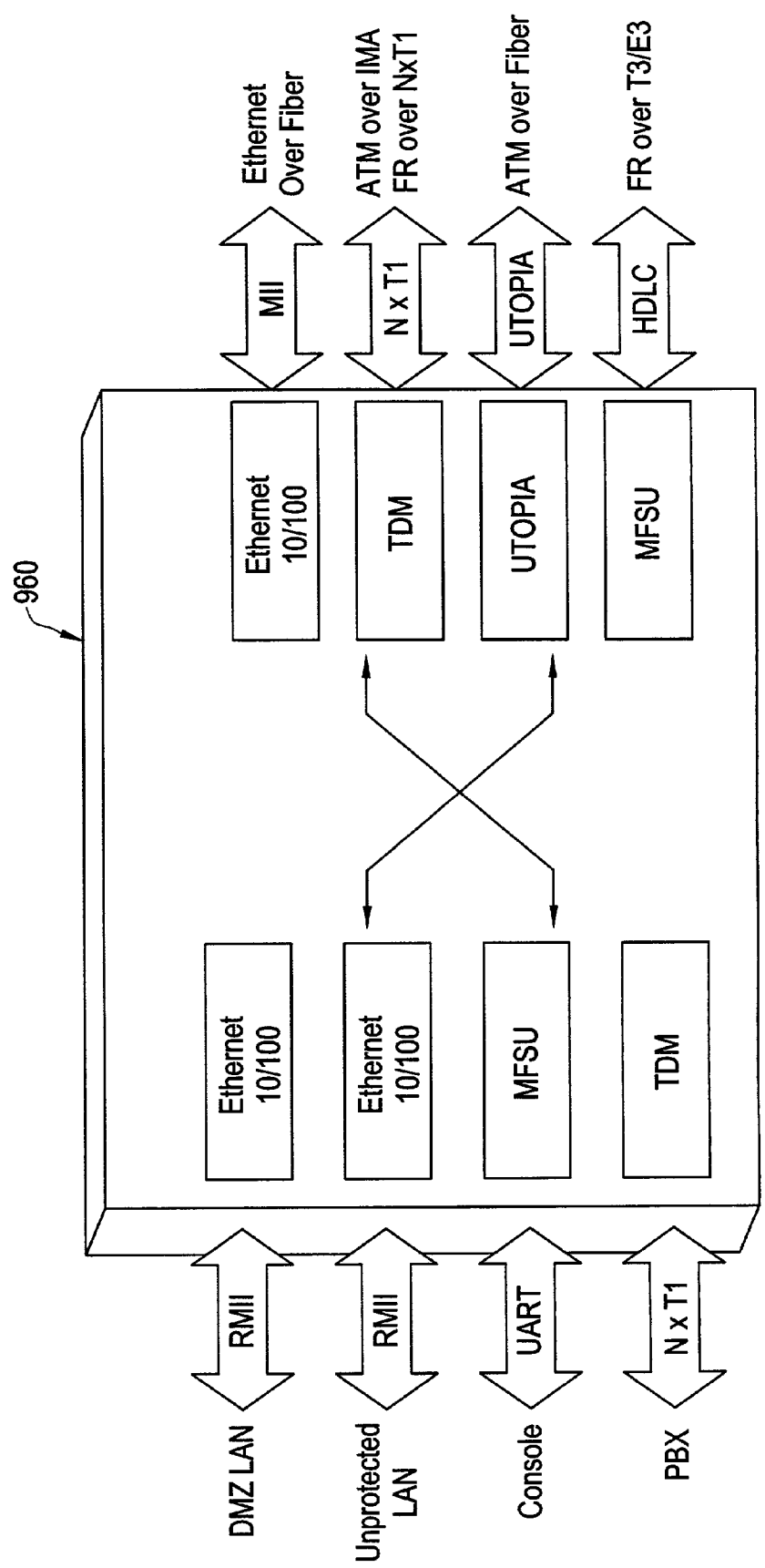
FIGS. 76–80 are schematic diagrams illustrating various exemplary implementations of a communications processor in communications systems in accordance with at least one embodiment of the present invention.

FIG. 76 illustrates a exemplary application of the HPCP in order to provide an Enterprise Integrated Access Device (E-IAD) 960.

Enterprise IADs are used at the edge of a corporate network. This class of box or device is usually used at the edge of a corporate remote office. The enterprise IAD manages the traffic from the internal LAN (Local Area Network) to the external WAN (Wide Area Network). The WAN connectivity can be a dedicated leased line (Intranet) and/or connectivity to an ISP (Internet Service Provider), or both. An IAD will typically also handle voice traffic, which may be from a direct connection to a PBX, or derived voice (over either ATM or IP networks).

The major tasks that an IAD needs to perform include routing, bridging, QoS prioritization (for voice packets), and inter-working functionality (RFC 1483, T1 emulation using CES or FRF). The various uplinks (WAN access methods) may be ATM, Frame Relay, and Ethernet. The media used by the uplink is typically either nxT1 for both ATM and Frame Relay and fiber for Ethernet and ATM.

Figure 77:
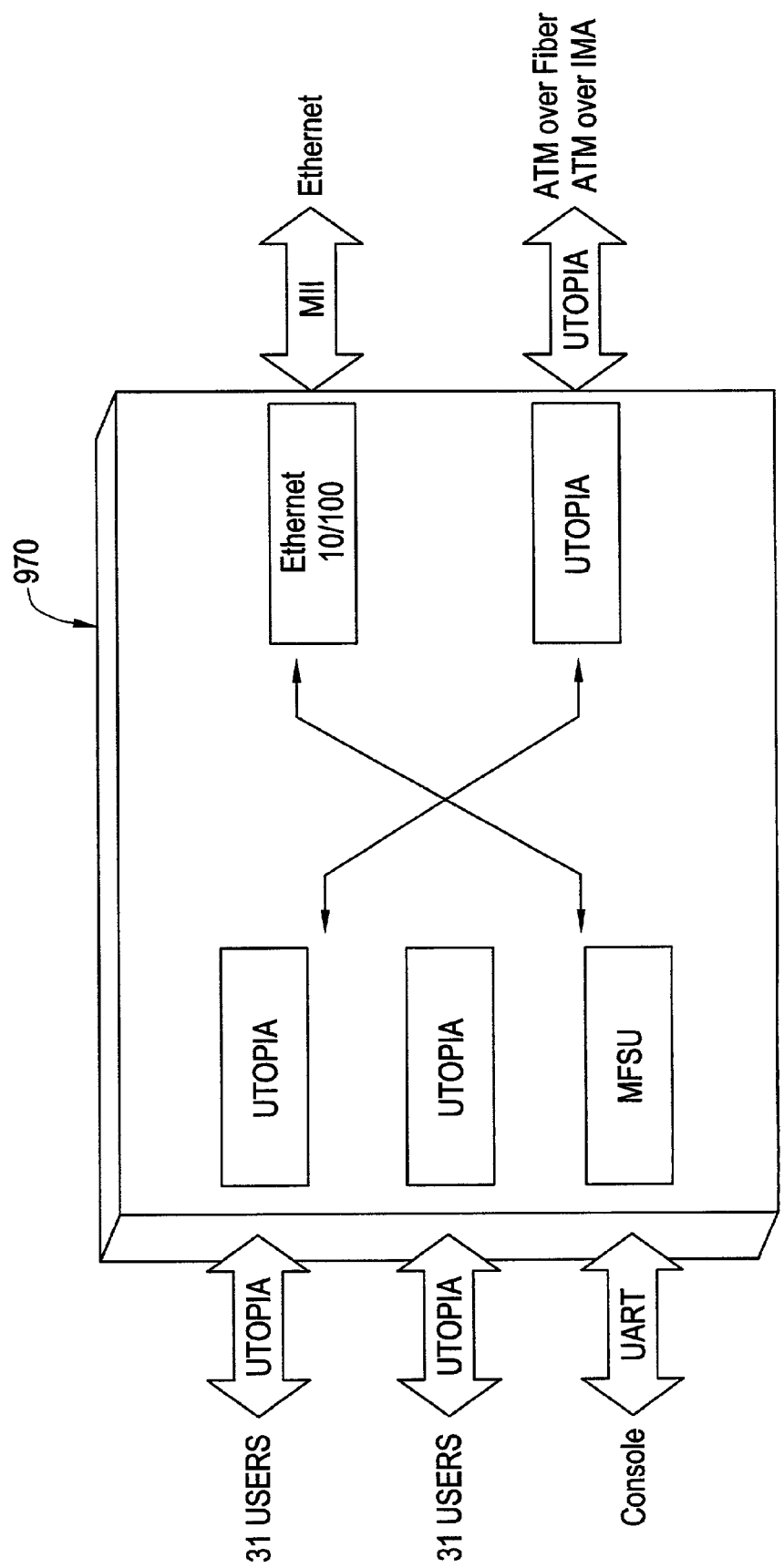

FIG. 77 illustrates an exemplary application of the HPCP in order to provide _Toc530832294a Multi Tenant Unit (MTU)/Remote Terminal Unit (RTU_Toc530832294) 970. An MTU is very similar to the IAD in design. Both applications reside in the customer premises.

The MTU device is physically located in a basement of a building, providing distribution of high speed Internet access to a building. Typical applications will distribute xDSL connections to the offices/flats of a building using the existing copper infrastructure. The networking architecture will be stackable boxes using Ethernet or ATM as the backbone network. The MTU will be connected to an external edge router or the router functionality can be integrated into the system.

RTU's have similar functionality to an MTU (e.g., distribution of xDSL connectivity to a remote neighborhood). Unlike an MTU, however, an RTU is physically located outside a premise: it is managed and maintained by the ILEC or CLEC (Competitive Local Exchange Carrier). RTU functionality may be considered as a DSLAM, meaning the aggregation of subscriber's traffic into high-speed uplink. In terms of functionality, the RTU may be considered as an ATM switch.

The exemplary embodiment of FIG. 77 shows the MTU configuration where the HPCP can provide up to 62×DSL subscribers ports and 10/100 Ethernet to the backbone network. In this scenario, the HPCP will perform the IP routing functionality or Ethernet bridging via RFC 1483.

In the RTU case, HPCP will perform ATM switching functionality, whereby user traffic will be policed according to the subscriber's contracts on the subscriber side, and shaped towards the network side on the aggregate (VP shaping). In this case, there is a support for total of 61 subscribers. In the RTU case, the POTS (Plain Old Telephone System) lines that are terminated at the RTU can be either backhauled on a separate TDM link, in which case there is no processing involving the HPCP, or can be packetized over ATM (CES or AAL2 trunking) using one pipe to backhaul both data and voice services.

Other exemplary uses of the HPCP include its application for a_Toc530832295 media gateway (MG) and voice gateway_Toc530832295 (VG). Many Telecom operators are updating their networks to support packetized voice services. One of the main driving forces is the savings in infrastructure support that result from an operator being able to maintain one network supporting both voice and data services.

A media gateway is a network element that links dissimilar networks, such as TDM to ATM or TDM to IP networks. Conceptually, the media gateway consists of four elements: a TDM I/f, a transcoding engine, a gateway controller, and a packet network interface.On the circuit-switched network side, a line card is used to connect the time TDM channels from the PSTN to the gateway. A transcoding engine performs processing to convert between standards. A gateway controller manages the gateway and call routing. Finally, a packet network interface routes calls between the gateway and the packet infrastructure.

Figure 78:
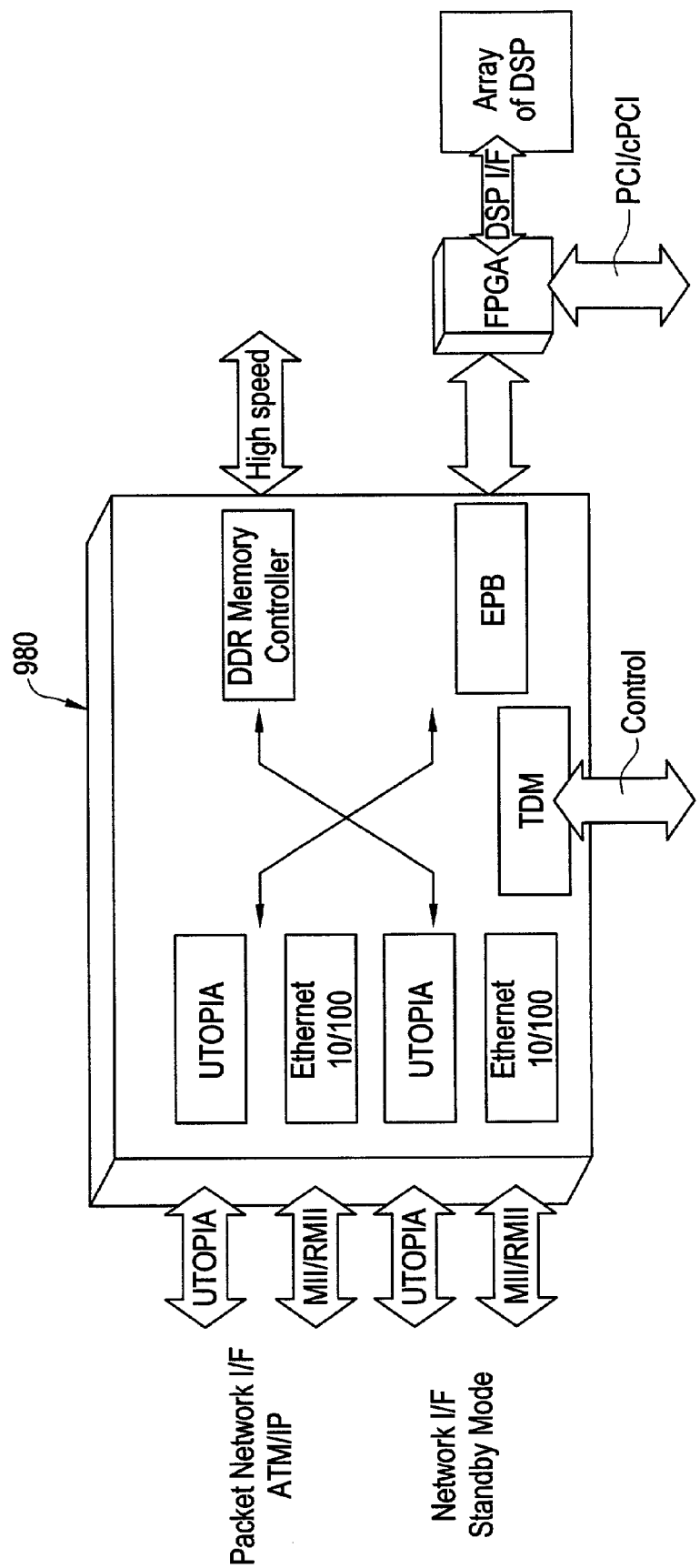

FIG. 78 illustrates one exemplary application of the HPCP (Trajan) in a media gateway application 980. In the proposed scheme, the HPCP will perform the networking protocols—both data path (termination and packetization of AAL2 or RTP) and control using the PP (signaling protocols such as MGCP, V5.2, GR-303). External DSPs will perform the transcoding functions.

As shown in FIG. 78, an array of DSPs can be connected to the HPCP EPB (External Peripheral Bus). According to a proposed approach, FPGA mediator logic is used in order to boost the total system performance and to offload the PP processing bottleneck. Since many DSP vendors have a HOST PORT I/f as the mechanism to transfer data into/out of DSP memory, each transfer requires some control transactions (write to host port control register). This operation is costly and requires the involvement of the PP in each transfer. When the number of transactions is high, the PP will become a bottleneck. The solution is to create a protocol between the FPGA and the HPCP that can run in a burst mode and have the FPGA handle and manage the control side. The HPCP provides packet network interfaces both for ATM (Utopia) and for IP (Ethernet or POS). Signaling information for the TDM network can be transferred to the TDM cross connect using the HPCP's TDM ports.

In a trunking gateway application, the HPCP can be connected both to the TDM network and to the packet network and can perform the entire application.

Figure 79:
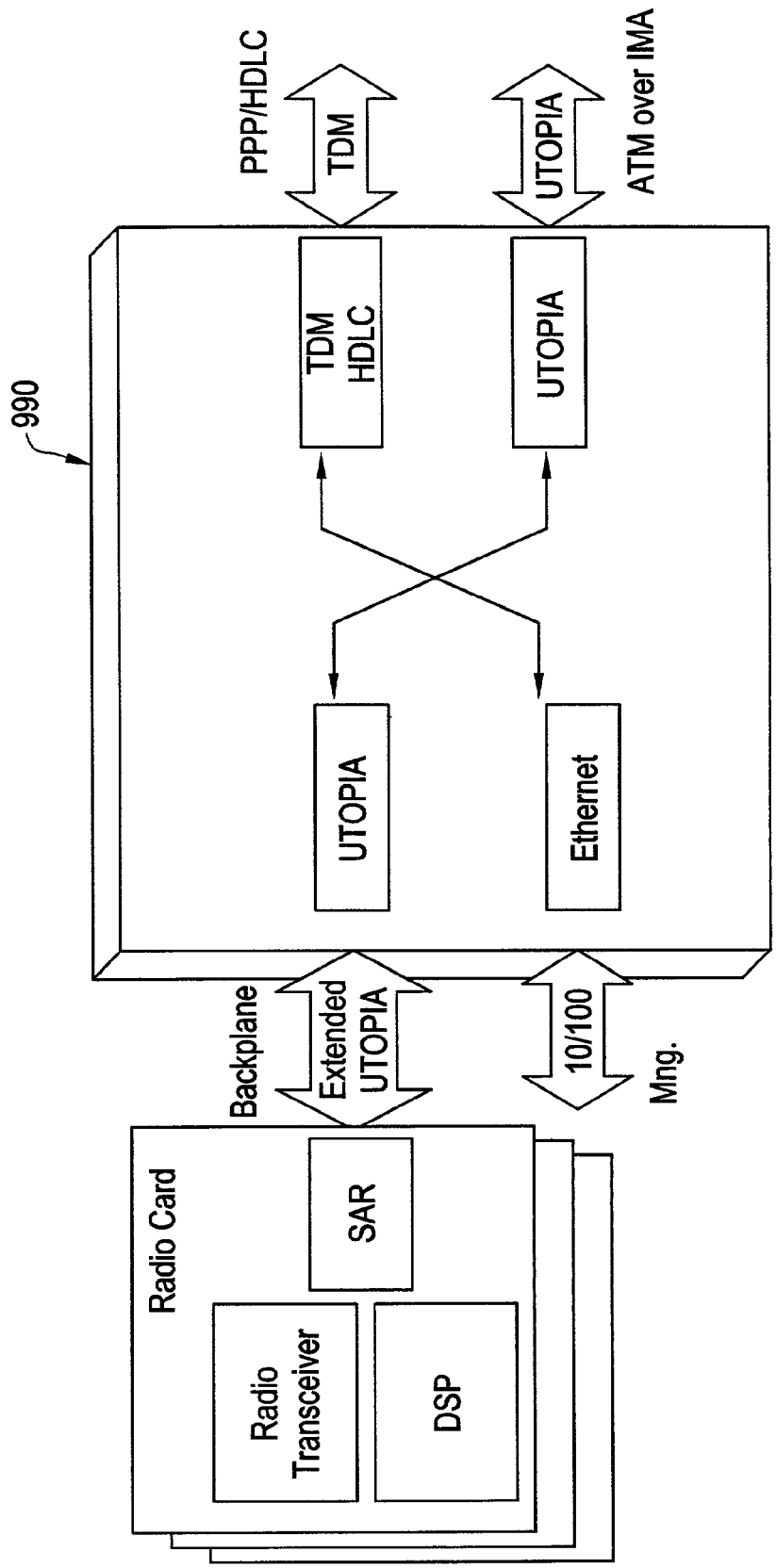

FIG. 79 illustrates another exemplary application of the HPCP for a wireless access network (AN) 990. Wireless access networks (AN) consist of Base Transceiver Stations (BTS in 2G and NODE-B in 3G) and Base Station Controllers (BSC in 2G and RNC in 3G) that aggregates BTSs. The BTS interfaces between the radio network (RN) and the wireline access network. The BSCs manage radio resources and network functions between multiple BTSs and exchange traffic with the media gateway and the packet switching node in the wireline core transport network.

Generally, a BTS is connected to the WAN using T1/E1 lines. The transport layer on the WAN is either ATM or IP. For utilization and QoS reasons in an ATM transport choice, AAL2 is chosen as the transport layer. In this case, the BTS needs the following functionalities: ATM UNI functionality; wire-speed support for AAL2-Mux (I.366.1, I.366.2); and Inverse Multiplexer for ATM (IMA).

When the transport layer is IP-based, the BTS architecture will require the following functionalities: IP termination point; IP QoS support IP classification, Diffserv and enhanced queuing/scheduling algorithms; RTP/UDP/IP header compression; and wire-speed support for PPP-Mux and/or ML-PPP.

In both architectures, the HPCP can be used as the central system processor based on its ability to process wire speed ATM and IP with 8 T1/E1 Interfaces to the WAN and Utopia or 10/100 interface to the backplane. The HPCP can also be used in the BSC as the aggregation processor. In this case, the processor needs to perform IP routing and ATM switching (AAL2 switching) at OC-3 rates (wire-speed).

Figure 80:
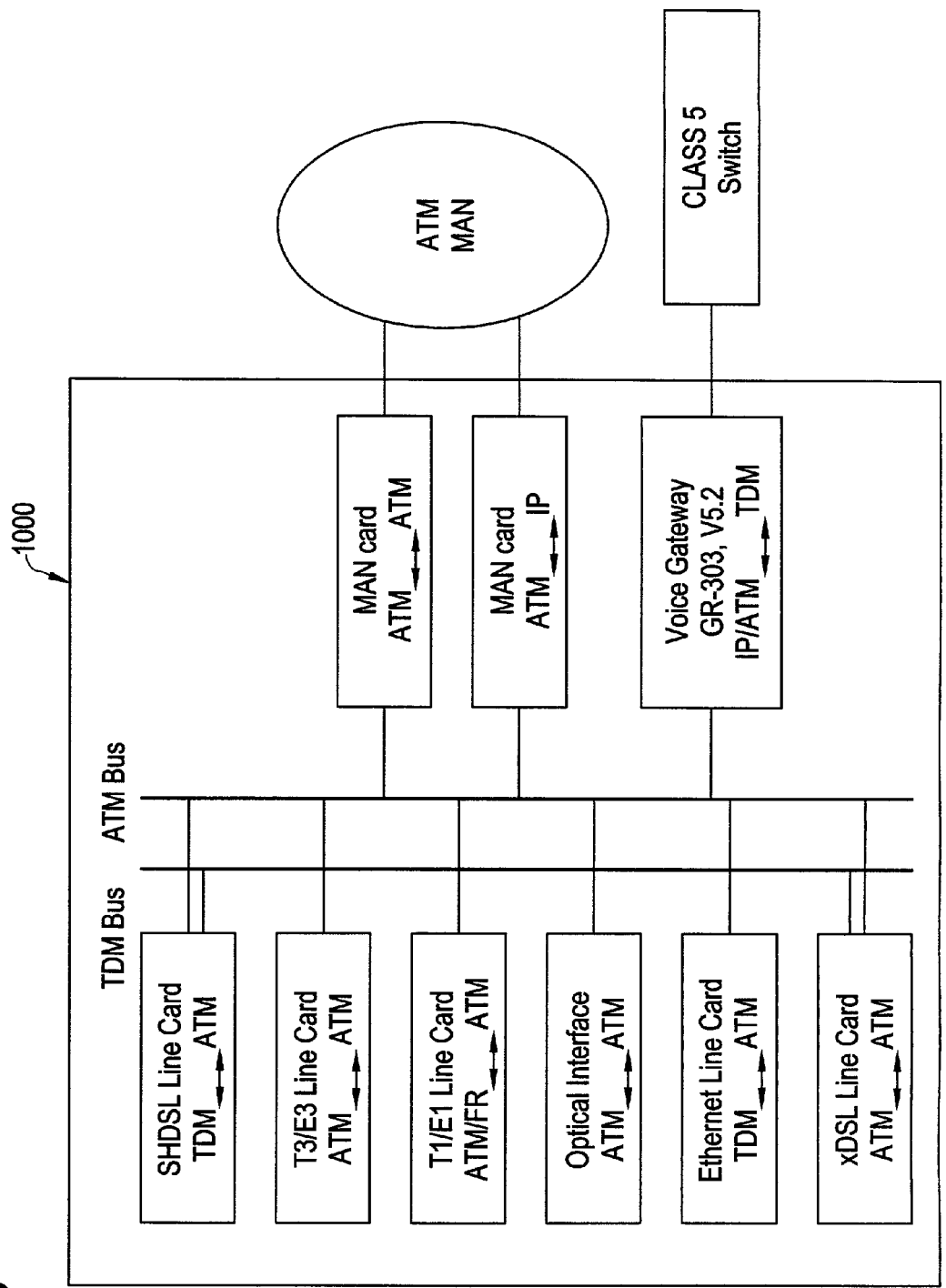

FIG. 80 illustrates an exemplary application of the HPCP for a multi-service access platform 1000. A multi-service access platform combines numerous functions, services, access technologies and protocols in one network element. This flexibly configurable network element simplifies network design, planning, roll-out, and network management. Typical functions include the following:

Optical carrier (OC)-3c/12c/48c optical multiplexer
T3/OC3c aggregator
GR303 gateway
ATM switch
IP router
Access technologies include the following:
T1
T1-inverse multiplexing over ATM (IMA)
T3
XDSL ADSL, VDSL
Single-line highbit rate DSL (SHDSL)
Ethernet Time division multiplexing (TDM), frame relay, ATM, and IP are supported as protocols. The multi-service access platform provides optimized network architecture and transport efficiency from the customer premises into the metropolitan area network (MAN).

The architecture of a multi-service access platform is shelf based with an ATM and TDM backplane. Numerous subscriber (downlink) line cards connect customer premise equipment such as IADs, routers, and PABX and network elements as DSLAMS to the platform. The uplink connectivity is usually to an SDH/SONET network via an optical link. A special voice gateway subsystem can be added for termination of VoPacket.

The HPCP is positioned to fit in or be compatible with many line cards and trunk cards in a multi-service access platform application. For example, the HPCP can handle up to 8 T1/E1 Frame-Relay to ATM interworking functions (FRF.5, FRF.8) on a line card; it can perform ATM switching both on a LC or at the trunk card at 2xOC-3 rate. It can also be used to terminate 4 10/100 Ethernet links and perform 1483 Ethernet bridging, IP routing or SAR frames. Additionally, the HPCP can be used to terminate PPP, PPPoE or PPPoATM traffic on an xDSL line card.

In terms of voice support, the HPCP can be used in the voice gateway subsystem to terminate VOATM or VOIP; it can also be used for trunking application on the trunk card to take the narrowband traffic off the TDM backplane and trunk it (AAL2 trunking or/and CES) towards the ATM network.

A major advantage for using the HPCP in a multi-service access platform application is its versatility in terms of IO interfaces and protocol support. A system designer can re-use board design, system knowledge and expertise to leverage the HPCP as a networking platform in the access space.

Exemplary Approaches to the Software in the HPCP

The software provided for the HPCP (HPCP software) is preferably fully integrated with the HPCP hardware and architecture, highly optimized, and includes complete applications to support the myriad of uses for the HPCP. According to one embodiment, the software developed and sold by, for example, GlobespanVirata, Inc. known as Integrated Software on Silicon (ISOS) (e.g., ISOS version R8.0, etc.) can be run on the HPCP. The ISOS software includes tools and a developmental environment and is well-suited to the HPCP. The HPCP software includes a complete port to various operating systems, such as VxWorks, Linux, OSE (a real-time kernel from Enea Systems), and ATMOS-2 (ATM-Operating System [Virata's proprietary operating system]). The HPCP software may be integrated with other software products, such as for Web management (e.g., the emWeb™ [embedded Web server] management product sold by GlobespanVirata, Inc.), UPnP, security and firewall functions. The HPCP software may be integrated with voice processing software (e.g., the vCore™ voice DSP software sold by GlobespanVirata, Inc.) for voice processing solutions.

Preferably, the HPCP software combines the software solutions for both the CPP (MIPS) for the control plane and the packet processor for the data plane. The HPCP software may include basic drivers for ATM AAL0, AAL1, AAL2, AAL5, Ethernet, HDLC, UART, Transparent (PCM), SPI and I2C.

The data applications include support for bridging, such as for spanning tree (802.1d), prioritized bridge (802.1p), Ethernet to Ethernet, and Ethernet to AAL5 (via RFC 1483). The data applications may also include support for routing and IP forwarding (such as RIP [Routing Information Protocol], OSPF [Open Shortest Path First] and MPLS), and for frame relay.

The HPCP software may include voice applications, such as for VoATM (AAL2 [SS-SAR]). According to one embodiment, the HPCP software is fully integrated with the vCore™ voice DSP software sold by GlobespanVirata, Inc. of Red Bank, N.J. The HPCP voice applications include support for circuit emulation (e.g., CES [Circuit Emulation Services]) and VoIP (e.g., RTP/RTPC in the packet processor and MEGACO, MGCP and SIP [Session Initiation Protocol] in the CPP).

According to one embodiment, the CPP software package includes a flow manager element. The flow manager element creates applications by linking micro-coded building blocks, isOS (operating system) independent, and provides a convenient API (Application Program Interface) for customers not wishing to use all other CPP software.

Figure 81:
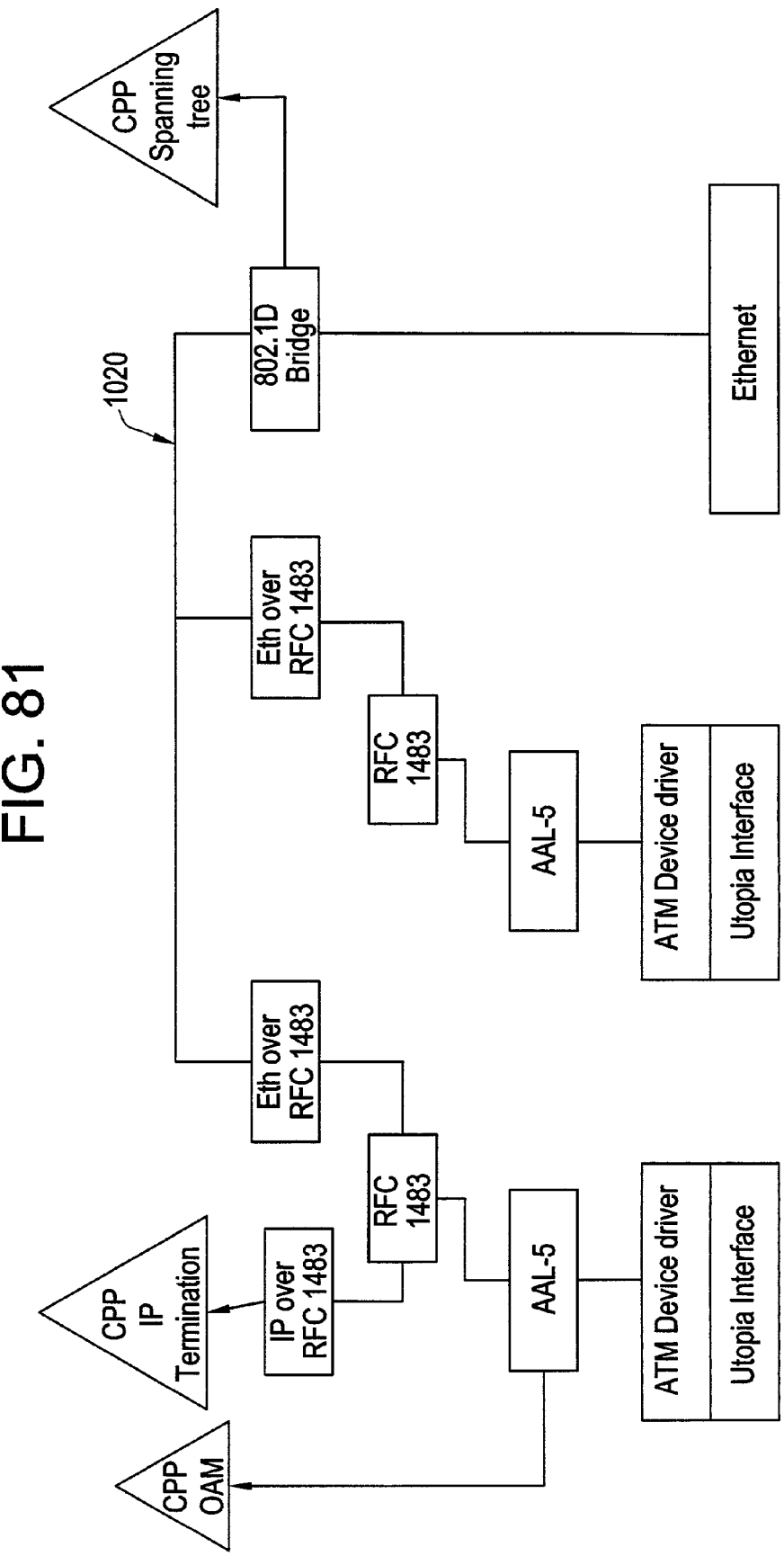
FIG. 81 is a flow diagram illustrating an exemplary flow manager functionality of a communications processor in accordance with at least one embodiment of the present invention.

FIG. 81 illustrates of the flow manager functionality 1020 according to an embodiment of the invention. As stated above, the HPCP software may be integrated with voice processing software such as, for example, the vCore voice DSP software sold by GlobespanVirata, Inc. for voice processing.

Figure 82:
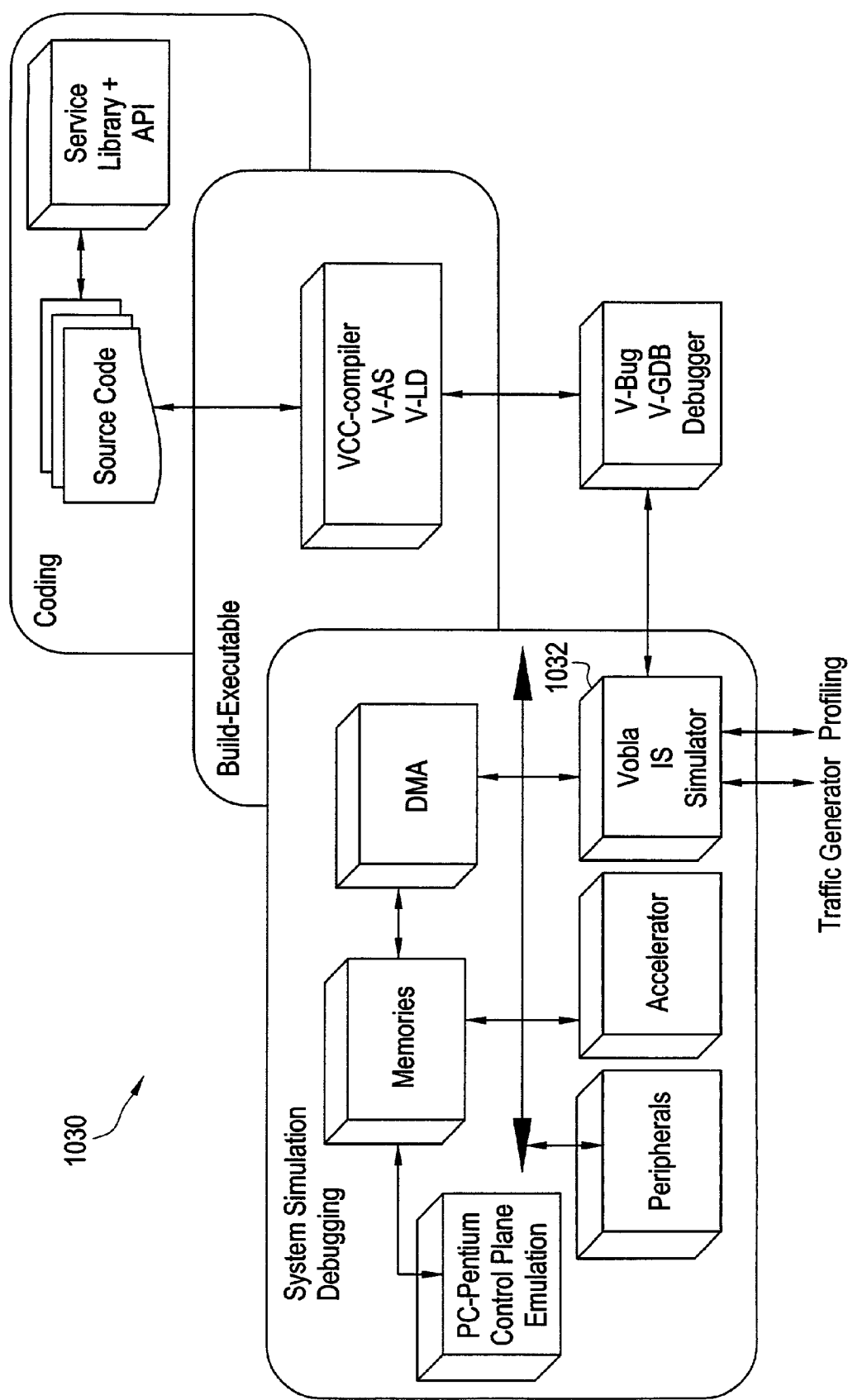
FIG. 82 is a block diagram illustrating an exemplary data plane development for use in software development for a communications processor in accordance with at least one embodiment of the present invention.

Development of software for the HPCP may be facilitated through the use of certain data plane development tools. For example, a functional network processor (packet processor) simulator may be employed. GlobespanVirata, Inc. markets a packet processor simulator called Vsim™ which may be employed for this purpose. Vsim™ is a high speed system simulator which simulation includes the following: packet processor core Instruction Set (IS); functional behavior for DMAs; internal and external memories; and functional level peripherals. Vsim™ provides performance analysis and includes traffic generators. Another data plane development tool that may be employed is Vas™, which is a stand-alone packet processor assembler. Another data plane development tool that may be employed is V-bug™, which is an assembler level debugger. Another data plane development tool that could be employed would be VCC™, a packet processor C compiler. Another data plane development tool is V-GDB™, which is a packet processor C source level debugger (like V-bug™). Each of these tools can be hosted on a Windows NT™ or Sun™ platform. Each of the aforementioned exemplary development tools is marketed by GlobespanVirata, Inc. FIG. 82 illustrates an exemplary data plane development 1030 that could be employed for software development for the HPCP. The Vobla IS simulator 1032 refers to the packet processor simulator. According to another approach, software development could be undertaken using reference platform hardware instead of the simulated modules.

Specific Strategies for the Software in the HPCP

Development of software to power the HPCP processor as described herein is well within the skill of the ordinary artisan. Some of the considerations in designing the HPCP software are now discussed. In developing the HPCP software, there are various tradeoffs to consider in providing a software end-product that provides an acceptable balance between performance, robustness, portability, and other factors. For the balance of the discussion in this section, the HPCP includes the packet processor (PP) (or control packet processor [CPP]) and the flexible packet processor referred to as the Vobla or NP (network processor).

Operating System and Portability

The main goal of HPCP software is to perform functions in cooperation with the HPCP hardware to enable HPCP/Vobla chips to perform as desired in communication systems. Taking into account the vast diversity of different software embedded platforms currently used in the market of communications processors (VxWorks, Linux, Nucleus, OSE, etc.), it seems reasonable to try to offer sufficient flexibility in HPCP software package to address different embedded environments and different customer expectations for value-added software components.

In one manner, the HPCP could be an OEM (Original Equipment Manufacturer) product with a very limited software support package, such as drivers and initialization sequence applications. On the other hand, main embedded software platform providers offer solutions allowing potential customers to choose any preferable platform based on different considerations (e.g., existing code base and experience, performance, value-added components, reference platforms and applications, etc.).

Balancing these considerations, the goal should be should try to find those points where HPCP could be more attractive not only as a more powerful communications processor but also as a more flexible and convenient solution in different environments with more value-added components. One more consideration relates to system performance, which may depend on the particular embedded environment. For many popular embedded platforms (VxWorks, OSE, Linux, etc.), the introduced system overhead (which is usually measured in average system call processing time and interrupt latency) is unacceptable for many applications. This triggers suggestions to use other light dedicated environments (e.g., ATMOS, many home-grown simple monitors). Although the main network processor driving force is moving most or all of the critical data path code to the NP microcode area (including most popular switching, interworking, bridging, routing and forwarding scenarios), the CPP-termination data path still needs to be efficient. Therefore, OS-dependent overheads must be kept to a minimum.

From the above considerations it is reasonable to formulate the following HPCP SW-to-RTOS (Real-Time Operating System) integration strategy principles:

(1) HPCP software is to be provided in such portable form which enables its easy integration with different existing (and future) embedded platforms.

(2) HPCP software should meet different customer expectations for value-added components. In other words, there should be the possibility to offer different levels of support starting from simple object libraries providing low-level network processor drivers, through source-level packages allowing the generation of different libraries for different customer applications, including glue interfaces for different third-party components and deliveries with more value-added components with different implementations. Exemplary embedded platforms that may be the target for HPCP software integration include: VxWorks, Linux, OSE, CHAOS (a next generation ATMOS), Nucleus, PSOS, and others.

Configuring microcode applications. One of the innovations of the HPCP software is the placing of the critical data path functions to the NP microcode area. In this case the CPP serves mostly as a control/management plane for those data paths (data flows) created in the NP and acts as the NP flow manager which represents the look and feel model of the HPCP software. This approach assumes that other software requirements and/or software design decisions should strive meet the following main goal: NP processing should be as simple and effective as possible, meaning that:

All data structures (tables, flow contexts, etc.) used by the NP (and possibly shared with CPP) should be designed to be the most effective from the NP code perspective.

NP should blindly perform flow-specific processing by calling different functional blocks—the work for linking (stacking) of these NP functional blocks should be done in run-time by the CPP flow manager code when a request for new flow creation comes from the user application and/or control/management plane in the CPP. Such functional stacking is done by proper linkage of flow contexts in the shared RAM. To implement these points, NP data structures are known to the CPP.

Figure 83:
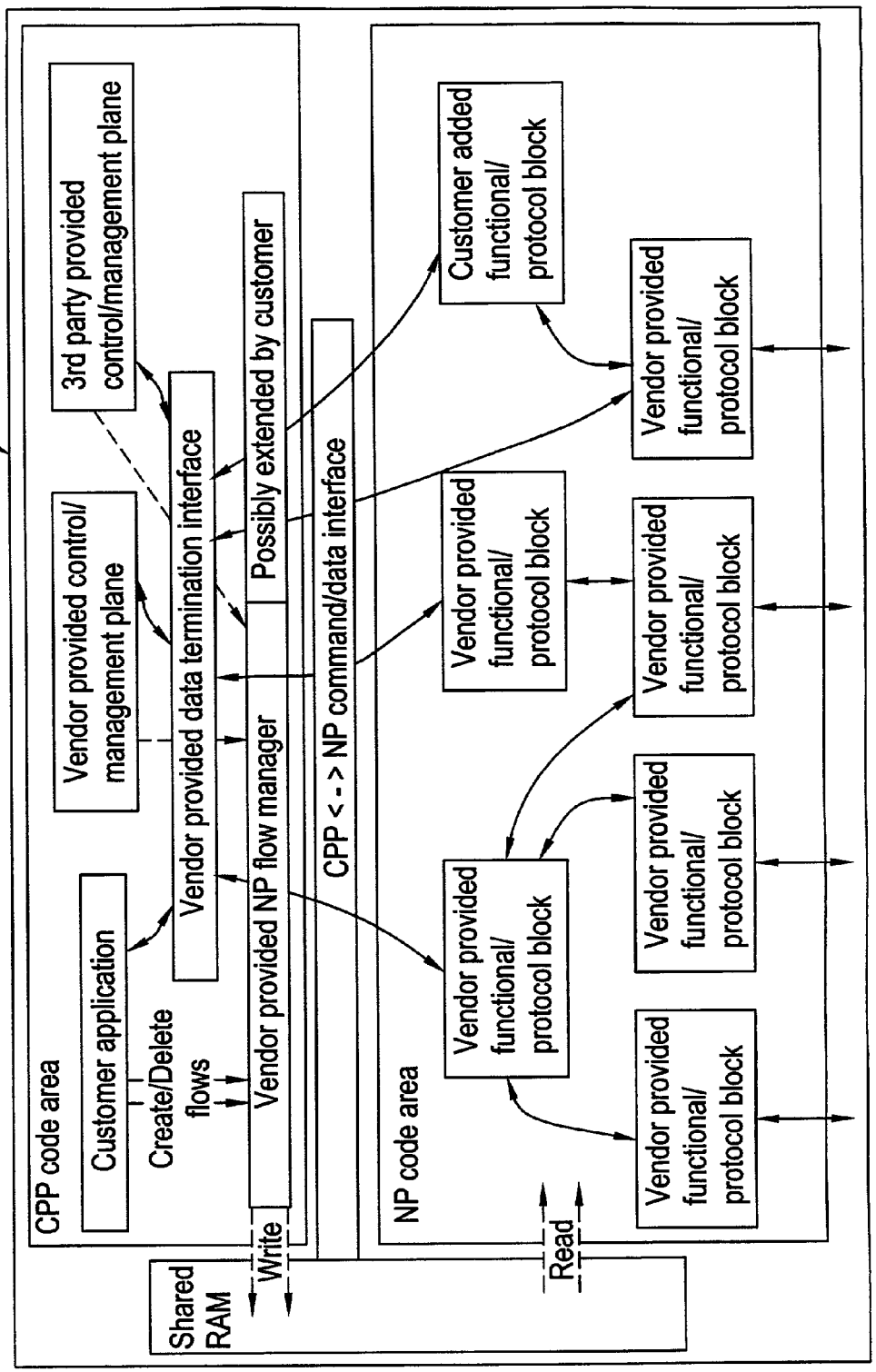
FIG. 83 is a block diagram illustrating an exemplary software development model in accordance with at least one embodiment of the present invention.

FIG. 83 illustrates a HPCP look and feel model 1040 as described above.

NP load configuration. Considering the vast diversity of network applications for the targeted market and also the intention to provide an open communications processor architecture (i.e., the ability to program and add custom implementations to the NP microcode area), it is desirable that the NP software load be configurable at compile-time. Configuration files (for setting compile-time parameters) may be set either manually or, alternatively, via, for example, the System-Builder™ tool available from GlobespanVirata, Inc. Each one of the several NPs within a HPCP device may be loaded with a different microcode image.

Loading microcode. Dynamic NP code reload (i.e., changing the NP code contents during run-time) is not be supported. The NP microcode image will be loaded only once at NP reset time and will contain all functionality needed by a particular network device. Note that the NP may be reset by the CPP without a complete system reset occurring. This allows the user to change an NP load, after which the NP is soft-reset.

Control versus data plane processing. Much of the design of the HPCP software is aimed at extracting critical-path processing from the CPP and executing it in the NP. Critical path processing, in this context, means processing that is performed on virtually all data packets (or cells) on an interface. It varies from one application to another and covers all layers of processing performed on the packet by the HPCP. Therefore, there is a divergence from a strictly layered architecture where the NP performs (for example) layer 2 and 3 and the CPP performs all higher layer processing in favor of a model in which the NP will preferably perform all critical path processing, irrespective of the layers involved (layers 2, 3 and, at times, layers 4 and higher). The CPP, then, will perform all non-critical (or control plane) processing—from layers 2 and up.

For example, in an OSPF router, the critical path may consist of IP forwarding table lookups, ARP (Address Resolution Protocol) cache table lookups (where successful) and forwarding. Non-critical path functions will include all of the OSPF control plane (learning next-hops, etc.), generating the ARP requests, and handling the ARP responses.

Network Processor software design approach. Network Processor microcode covering most of the data path processing is a component implemented from scratch in the HPCP SW project which makes its performance efficiency an important design goal. Other design goals are flexibility, expandability and architectural openness.

From the HPCP software look and feel model defined above, the ATIC-like approach could be pretty useful for network processor microcode design, which involves the following concepts.

Network Processor objects and contexts. The network processor microcode may be divided into functional blocks, which may be operationally joined (e.g., chained) in various combinations by the application builder in order to create different execution paths.

The concept of an object is introduced to describe a section of code that has a particular state. The object is an instantiation of any entity that executes this code and has its own state information (referred to as its context). The context contains protocol state information, necessary data structures and resources that have been dynamically allocated to the object. For example, an object's context may include a protocol state value, transmit queue of frames, timer information and links to subsequent objects in the execution path.

The context (i.e., associated data structures) belonging to an object is object-dependent and the known only to the object itself. Objects have "next object" pointers and "next function" pointers. The "next object" indicates the object that will be activated after the current object has completely handled its current event (similar to the "this" pointer for the next object in C++ terminology). The "next function" pointer is the address of the routine that the next object will execute.

Different contexts for the Rx and the Tx parts of a flow (as is done in the Helium™ communications processor sold by GlobespanVirata, Inc.) may be employed because in most cases Rx and Tx processing are independent. This helps minimize the amount of control data needed to be transferred within the system.

Flexible mapping of Network Processor execution threads. In one manner, mapping of functional processing blocks to the network processor's threads (tasks) is performed not based on functional breakdown (i.e., task=protocol entity), but rather based on operational effectiveness.

With this approach, the network processor task is considered as an abstract operational vehicle capable of performing different functional blocks and/or protocol stack layers depending on the type of message in its input queue.

In order to optimize incoming message decoding, every message will contain at a pre-defined place (e.g., the first word) the pointer to the routine that will be called to handle the incoming message. This concept, of course, could be used only for network processor tasks having input queues. So-called HW network processor tasks (i.e., related to physical port specific processing) should be hard-coded to some port specific function.

Task boundaries will break the continuous execution of a flow, but these do not necessarily need to coincide with protocol (or layer) boundaries. In general, these breaks in a flow should be avoided unless functionally required since they add overhead. For example, in configurations involving a few different physical ports and/or networking applications, dedicated tasks empty/fill the serial port's FIFOs in order to guarantee low latency, while other tasks run application code which does not have such hard real-time requirements.

Memory allocation/handling approach. It appears that all port level contexts would be better allocated in internal network processor SRAM (for the sake of effectiveness and also because their number is limited by physical chip configuration and allows static preallocation), while all other data structures (connection level contexts and lookup tables) are stored in external SDRAM and allocated dynamically.

Certain structures (e.g., lookup tables) may be partially located in internal and external memory spaces or configured to reside in either one or the other.

Memory allocations in both of the network processor's SRAM and the external SDRAM are performed by the CPP. The network processor recognizes SRAM partitioning either via compile-time definitions (initialization is done by CPP, which initializes the memory data structures for the NP's tasks and for the different protocols) or via pointers in a well-known area filled in by the CPP in run-time by its SRAM manager.

Context and lookup data allocated dynamically in external SDRAM are processed by the network processor code after DMA'ing this data (only the needed part of it) to special areas in the network processor's internal SRAM. Buffer area for this data in SRAM is to be reserved in a per-task scratchpad area, which means that for abstract tasks (i.e., tasks that are not oriented to some particular processing), the scratchpad area should be allocated to be big enough to fit the maximum size of the context data being processed.

In one manner, only one copy of any context data should exist in SRAM at any given time. It is assumed that all context data is always copied to a fixed offset in the task's scratchpad and that there is a one-to-one correspondence between any context data field and the network processor task dealing with it (i.e., any data field is to be processed by only one network processor task).

Figure 84:
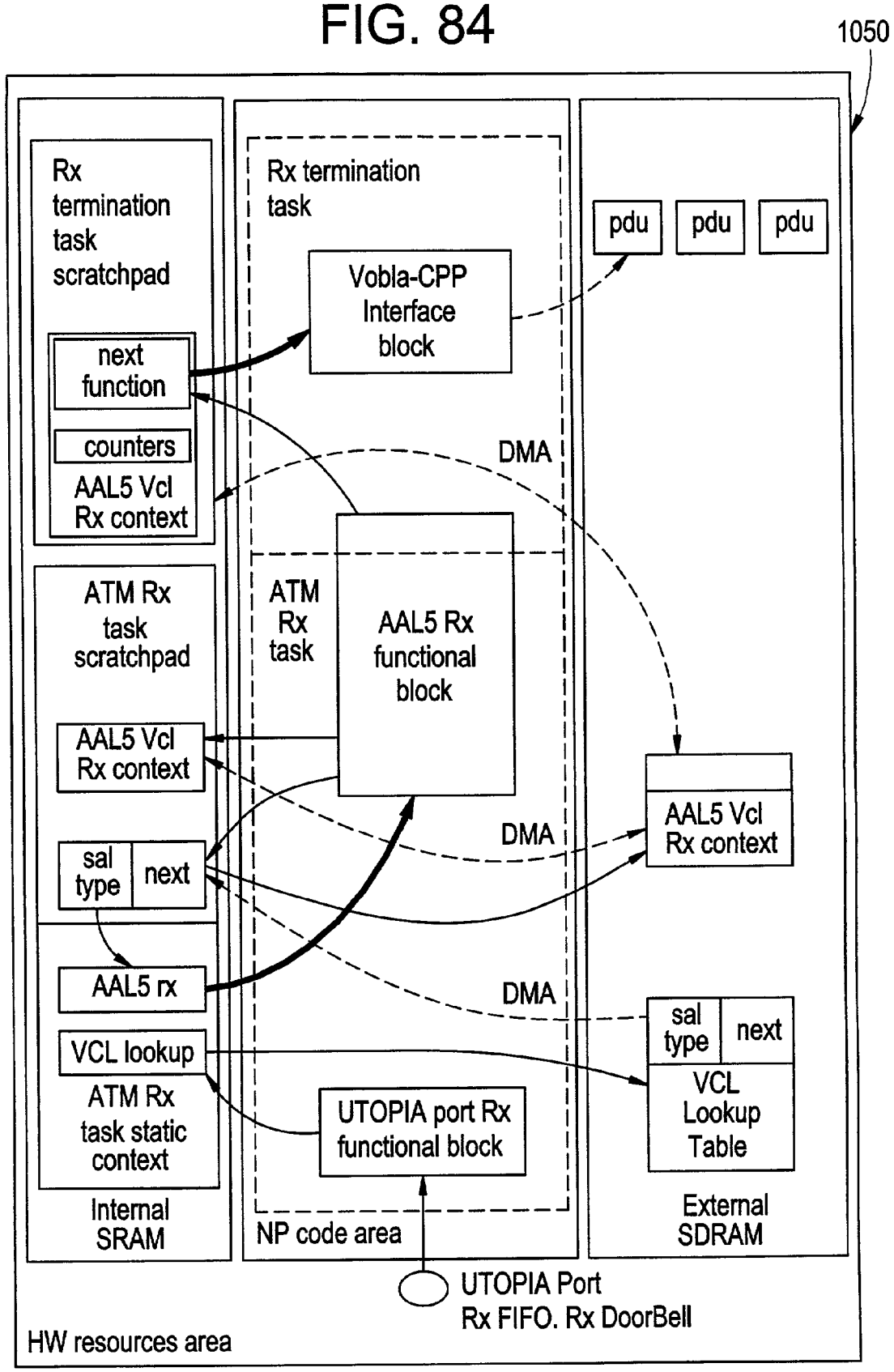
FIG. 84 is a block diagram illustrating an exemplary software design approach in accordance with at least one embodiment of the present invention.

At the same time, there could be considerable flexibility in context data processing with the goal of gaining processing effectiveness. For example, context data may be subdivided into sub-blocks where data in a sub-block is grouped based on a common processing principle: few fields on context are grouped together to be DMA'd at one time (in one shot) when all/most of these fields are to be in use by a specific functional block. On the other hand, for example, specific statistics counters in context could be read-modify-written only when the need arises (at end of a PDU [Packet Data Unit] or upon an error). This allows processing of different context sub-blocks by different network processor tasks. Of course, this approach makes context data design more tricky and difficult. FIG. 84 illustrates the network processor software design approach 1050 for an AAL5 receiver flow example.

Timers in Network Processor. A CPP-based timer service may be employed via the network processor-to-CPP command interface (especially when needed timers are big and are started/used rarely). Whenever possible, the internal free running timer for time-stamping of different events (e.g., to recognize reassembly timeouts) may be used. In this case, instead of getting a timer expiration event, a delta between the current free-running timer and the previous timestamp is calculated every time (each timer event) and a timer expiration event is generated where needed locally, without any message passing.

CPP software design approach. The CPP software design goals may include the following:

(1) A simple and convenient API should be designed allowing easy integration of CPP software with both different RTOS platforms and third party products while using thin SW shims.

(2) Maximum possible reuse of existing control/management plane code base should be sought. This may entail the introduction of a new simple SW shim and/or some restructuring of existing SW (i.e., the existing GlobespanVirata ISOS code).

(3) The ISOS-ATIC convergence program and principles are to be considered when decisions about code base choice are made.

The aforedescribed look and feel model of HPCP software having the CPP SW function as the NP flow manager has the following consequences.

CPP control and data API considerations. A control API may be provided for NP flows creation/deletion and their attributes change/query. This API is to be used mostly by user applications, but also (e.g., through a shim) by control/management plane SW (e.g., by signaling protocol and/or an SNMP [Simple Network Management Protocol] agent).

It may be desirable to provide a generic control API with a minimal and fixed set of control primitives (e.g., similar to the so-called ISOS White interface). According to this approach, flow of any (including any future) type may be created/deleted using the same control primitive (e.g., FLOW_CREATE) while flow type and other attributes are provided as primitive parameters. Flow attribute change/query may be handled via generic primitives (e.g., FLOW_GET_/FLOW_SET).

The text string used to pass flow type and attributes as a FLOW_CREATE primitive parameter seems to meet the requirement of API generality, flexibility and expandability.

The FLOW_CREATE primitive can both create the data path protocol layer components and also link them together in different ways. Also, it is desirable to have primitive syntax traceable to protocol specifications which makes its usage easier. It is feasible to start the needed control plane component implicitly while processing FLOW_CREATE primitives when proper parameters are supplied in the parameter string. Another requirement concerns the possibility of access to various layers/components created/linked by the FLOW_CREATE primitive, because the same protocol components could be involved in different flows.

For linkage of previously created termination flows in interworking/bridging/routing applications, a special primitive (FLOW_LINK, FLOW_UNLINK) may be employed.

Implementation of the FLOW_CREATE primitive for a specific data path protocol component (e.g., the CPP driver activated for particular flow type) can also be provided in the CPP data path processing transparently for upper application if the proper network processor microcode block is not yet available.

There may be a data API provided as well for termination data passing to/from the NP. This API may be used both by user applications and the control/management plane SW. Receive termination and transmit confirmation are bound via a standard call-back technique.

The goal that the NP code be simple, small and effective means that the CPP driver software activated via the control API for NP flow creation/deletion/alteration/ query must recognize the flow context internal structure (even though this contradicts a strict object-oriented approach). However, this is useful because it allows both effective flow building/removing without NP interaction and also permits easy integration with MIBs (Management Information Bases). One consequence is that versions of the CPP and NP code should match exactly and should be tightly linked to each other.

Linking of NP flows by the CPP assumes that CPP knows the addresses of NP functional blocks which are inserted as next function pointer in contexts. This could be achieved when the CPP load is built while using symbol information of the previously built NP load. However, a difficulty arises when multiple NPs (e.g., with different functionalities) are served by the same CPP. Thus, some mapping (flow type to function block address) is needed that is specific for each NP. This could be implemented using a mapping array created in the NP internal SRAM during NP initialization, which is then read by the CPP for flow linking information retrieving.

The knowledge about internal flow context structure should still be localized in the particular CPP driver responsible for specific flow manipulation. Additionally, care should be taken while updating context data shared by the CPP and the NP. The object is simple: For every field it is desirable to have only one write owner operating without memory locking. If this is not possible, the CPP-to-NP command interface is to be used to pass a write request to the write access owner of the data. Also, additional means may exist to ensure that both the CPP and the NP code view or recognize a context structure in the same way. This may involve various checks of the compatible software loads used in the CPP and the NP.

The same approach as outlined above is to be adopted for the various look-up tables used/updated by both the CPP and the NP. These tables seem may be handled by the control/management plane software in the CPP. There may be no need to introduce a special API for the table update in the CPP. Alternatively, there may be some table-specific driver code which knows the particular table structure (chosen to be more effective from the NP perspective) and which is activated (via a SW shim) from the control/plane software. Again, care should be taken in implementing table update operations if a table could be changed from both cores, as well as in the case when the table update is a complicated operation requiring a set of changes in different places/entries.

Control and data API proposal. The following exemplary API meets the above design functionality and could be used as a basis for further design decisions:

NewFlowHandle=FLOW_CREATE (ExistingFlowHandle, /type=FLOW_TYPE/param=PARAM);
   status=FLOW_DELETE(ExistingFlowHandle);
   status=FLOW_TRANSMIT(ExistingFlowHandle, Frame);
   status=FLOW_SET(ExistingFlowHandle, attribute_name, attribute_value);
   status=FLOW_GET(ExistingFlowHandle, attribute_name, &attribute_value);
   status=FLOW_LINK(ExistingUpperFlow, ExistingTerminationFlow);
   status=FLOW_UNLINK(ExistingUpperFlow, ExistingTerminationFlow);

Enabling and disabling of flows in the Tx and/or the Rx directions could be implemented through a FLOW_SET primitive with proper attributes (e.g., TxEn, TRUE) which also could be provided in the FLOW_CREATE parameter string.

Starting of the control plane component may be initiated via the same FLOW_CREATE (or FLOW_SET) primitive. For example, creation of an AAL5 termination connection while starting corresponding OAM F5 process could be as follows:

AtmPortHandle1=FLOW_CREATE(Voblald+PhysycalPortNumber, "e=UTOPIA/Phy=0/Name=A1) Aal5Handle FLOW_CREATE (AtmPortHandle1,/Type=AAL5/TxVci=5/TxVpi=0/Pcr=100/OamF5=Yes) FLOW_SET (Aal5Handle, RxHandler,0xADDRESS0) FLOW_SET(Aal5Handle, TxConfirmationHandler,0xADDRESS1)=/Type The following example demonstrates the creation of a bridge application over one Ethernet port and two RFC 1483 encapsulated AAL5 connections created on different network processors. The IP termination flow is multiplexed on one of the AAL5 VCI, starting spanning tree process as a control plane of bridge application, OAM F5 flow started for the other AAL5 VCI and ILMI initiated for one of ATM ports.

EthernetPortHandle=FLOW_CREATE(Vobla1+PhysicalPort2, /Type=Ethernet/Promisc=Yes) BridgeHandle=FLOW_CREATE (EthernetPortHandle, /Type=Bridge/Spanning=Yes) AtmPortHandle1=FLOW_CREATE (Vobla1+PhysicalPort1, /Type=UTOPIA/Phy=1) Aal5Hanldle1=FLOW_CREATE (AtmPortHandle1, /Type=AAL5/TxVci=5/TxVpi=0/Pcr=10000) Rfc1483Handle1=FLOW_CREATE(Aal5Hanldle1,/Type=Rfc1483) IpHandle1=FLOW_CREATE (Rfc1483Handle1, /Type=Ip/IpAddr=10.0.0.1/Mask=255.0.0.0) FLOW_SET(IpHandle1, IpRxHandler, 0xADDRESS0) LanHandle1=FLOW_CREATE (Rfc1483Handle1, /Type=Ethernet) ATM PortHandle2=FLOW_CREATE(Vobla2+PhysicalPort3, /Type=UTOPIA/Phy=5/IImi=Yes) Aal5Hanldle2=FLOW_CREATE (AtmPortHandle2, /Type=AAL5/TxVci=20/TxVpi=1/Pcr=10000) FLOW_SET (Aal5HanIdle2, OamF5,Yes); Rfc1483Handle2=FLOW_CREATE (Aal5HanIdle2,/Type=Rfc1483) LanHandle2=FLOW_CREATE (Rfc1483Handle2, /Type=Ethernet) FLOW_LINK(BridgeHandle,LanHandle1) FLOW_LINK (BridgeHandle,LanHandle2)

CPP API thread safety. Both control and data termination APIs in the CPP may be represented as a passive library (possibly provided in binary form as a part of the platform specific BSP) handling primitives from the user/control/management SW. These APIs should be thread safe and also should provide effective separation of control and data primitive flows. This avoids the scenario where processing of a termination data primitive is delayed because of control primitive handling. An ATIC-like vertical thread optimization model can help to solve such problems, and, in this case, API functions could be implemented as wrappers that cause message sending where needed.

CPP system software base. The goal of supporting a vast diversity of different RTOS platforms suggests the use of ATIC system services and the ATIC RTOS porting technique as a system base for CPP software development.

This approach is further desirable because ATIC system services have been chosen as well as a preferable base for the ATIC-to-ISOS convergence strategy.

Due to the high degree of similarity, the ISOS BUN framework could be reused as the CPP API implementing framework, perhaps with few changes. This conceivably may allow the reuse of existing BUN drivers and the same legacy peripheral ports for re-implementation on the network processor.

HPCP Software Partitioning

The goal of this section is to characterize the HPCP software partitioning as more or less independent blocks while trying to roughly define:

Functional specification of every block.

Interfaces between blocks and interfaces to outer world (external) software.

Strategy and estimation of possible software reuse and the definition of any needed shims.

The guiding principles used for software partitioning are the design approach defined in the previous discussion and the traditional information hiding approach.

Figure 85:
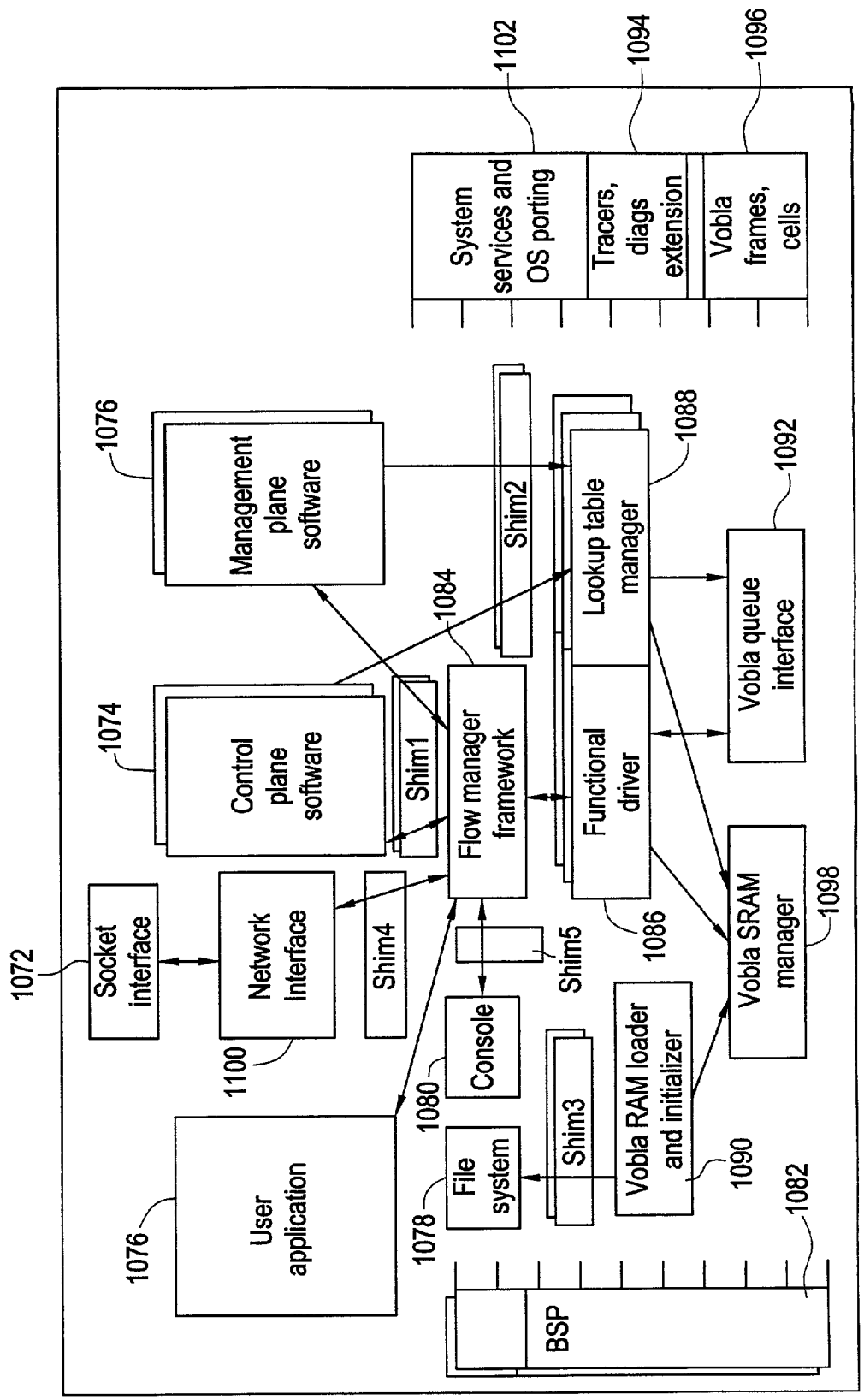
FIG. 85 is a block diagram illustrating an exemplary partitioning of software and interfaces in a communications processor in accordance with at least one embodiment of the present invention.

CPP software partitioning. FIG. 85 illustrates suggested partitioning and interfaces. According to an embodiment, the functional blocks and interfaces of 85 are provided as follows. A first set may correspond to user or third party components. This first set may include the following blocks in FIG. 85: user application 1070, socket interface 1072, control plane software 1074, management plane software 1076, file system 1078, and console 1080. A second set may correspond to new components created for the HPCP. This second set may include the following blocks in FIG. 85: BSP 1082, Flow manager framework 1084, Functional driver 1086, Lookup table manager 1088, Vobla RAM loader and initializer 1090, Vobla SRAM manager 1098, Vobla queue interface 1092, Shims 1–5, Tracers and diags extension 1094, and Vobla frames/cells 1096. A third set may correspond to existing (e.g., ATIC/ISOS) components. This third set may include the following blocks in FIG. 85: Network interface 1100 (between the Socket interface and Flow manager framework) and System services and OS porting 1102 (above Tracers, diags extension).

Software Block Functional Specification.

Flow Manager Framework

This Flow Manager Framework block 1084 implements the network processor Flow Manager API and provides the framework and services (attribute parsing and registration, data path stacking, etc.) for functional drivers. This component should also deal with API thread safety mechanisms, control and data thread separation, and message sending, wrapping, and queuing, as needed.

Shim 1—Flow Manager-to-Control Plane and Flow Manager-to-Management Plane.

The control plane software to be supported may entail the use of a set of shim layers for different control plane implementations. The purpose of Shim 1 is to provide for translation of connection creation/deletion primitives from the control plane to the network processor flow creation/deletion primitives, and also to connect the control plane to the flow termination data path. The same may be done for different management plane implementations as well. For management plane integration this shim also provides mapping of MIB GET/SET methods to proper FLOW_SET/FLOW_GET calls.

Functional Driver Blocks

The number of different supported functional drivers may depend on the number of supported network protocols/applications. A particular driver is responsible for implementation of flow create/delete primitives for flow of a particular type and also for linkage of flows. Termination data path functionality should be provided for all drivers primarily as a general service of the Flow Manager Framework.

The Functions of the Driver Include:

Low level serial port initialization/deinitialization while processing port level flow creation/deletion primitives.

Allocation and initialization/deallocation and deinitialization of port level static contexts in internal SRAM (via services of the network processor SRAM manager) and lookup tables in external SDRAM (or internal SRAM when so requested) while processing of port level flow creation/deletion primitives.

Allocation/deallocation in external SDRAM connection level contexts and its initialization/deinitialization as result of connection level flow creation/deletion primitive processing.

Linkage/delinkage of flows by setting next and next_function pointers in proper contexts and lookup tables as result of flow create/delete/link/unlink primitive processing via using flow_type-to-function mapping provided via services of the network processor SRAM manager.

Implementation of driver specific FLOW_SET/GET primitives, particularly, create/start control plane protocols when possible and so requested through attributes of FLOW_CREATE and FLOW_SET primitives.

Implementation of not ready yet data flow fragments, for example, for the AAL2 termination path. The SSSAR (Service Specific Segmentation and Reassembly) sublayer may be implemented by a functional driver in the CPP if a microcode solution does not exist.

Lookup Table Manager 1088 and Shim 2

The Lookup Table Manager 1088 manages the modification of lookup tables of particular types and, accordingly, it recognizes or knows the internal table structure (optimized for network processor microcode usage). For various control/management plane components, Shim 2 glue layers (which may be specific for each particular implementation) are provided to implement access to the tables. Instead of providing a generic API, every particular control/management plane component may be restructured to be operable with the network processor's lookup tables using a specific Shim 2 layer. When the lookup table is allocated in SRAM, the network processor SRAM Manager 1098 services are used for accessing the lookup table. When the network processor is a table write owner, modification of the table is done by sending command messages through the network processor Queue Interface 1092 (discussed below).

Network Processor Queue Interface 1092

The network processor Queue Interface 1092 is responsible for the CPP-to-network processor interface. This component performs interface polling and/or interrupt processing, as well as the handling of messages going to/from the queues on the interface and routing them to proper recipients. Network Processor SRAM Manager 1098The network processor SRAM Manager 1098 coordinates all SRAM allocations and per-network processor task SRAM partitioning and initialization. This component provides flow_type-to-microcode_function mapping functionality. It also may initialize all needed mapping information for access to different agents on the network processor rings via learning the results of ring enumeration process (discussed previously).

Network Processor RAM Loader and Initializer 1090 and Shim 3

The network processor RAM Loader and Initializer 1090 is responsible for the process of network processor image loading and handshaking with the network processor starting code. Through different Shim 3 implementations, the network processor RAM Loader and Initializer 1090 interfaces with different file system components to get the network processor image for loading into the proper network processor.

System Services and OS Porting 1102

According to one approach, ATIC system services and the OS porting technique are to be used. Additionally, network processor-specific frame/cell re-implementation is to be undertaken. It is desirable to extend existing ATIC tracing/diags support to produce a more generic and convenient framework. Such a framework will allow activation both in compile- and run-time for tracing of events registered by different components both in the network processor and the CPP. For example, based on the suggested design approach for the network processor and the CPP Flow Manager Framework, various tracers/injectors may be dynamically linked inside the data path between any of its flow fragments (e.g., similar to trace/debug BUN drivers).

Network Interface 1100 and Shim 4

The Network Interface (NI) 1100 connects the termination data path to/from the Flow Manager with the native IP stack. Shim 4 is used for existing NI implementations for primitive translation.

Shim 5

Shim 5 is defined to connect the existing console implementations with the Flow Manager FLOW_GET/SET interface.

BSP 1082

According to one approach, it is desirable to reuse an existing BSP 1082 for a similar chip (i.e., a chip with a MIPS core). This may impose additional requirements for reference board design. In that case, it might be feasible to reuse some of the BSP components (e.g., flash drivers, memory initialization, etc.). At the same time, the main BSP function (i.e., to provide basic connectivity, typically for UART and Ethernet/IP connections) is to be reimplemented in the network processor. This might entail delivery as part of a BSP a simple network processor image containing UART and Ethernet/IP support and needed CPP drivers. In this case, the network processor image is a part of the CPP load on flash that is loaded to network processor via the network processor RAM Loader and Initializer during system initialization. In this case, if a particular end-user gets the appropriate tools for customized network processor load building, this task should be a part of the BSP building process (UART+Ethernet/IP support should be selected). According to another approach, a BSP with JTAG (a serial debug port)-based connectivity with the target could be employed. In this case, the combined CPP plus network processor(s) image can be viewed as the usual application load build.

CPP drivers should be integrated (through Flow Manager Framework and the proper shim) with the particular BSP driver framework.

Figure 86:
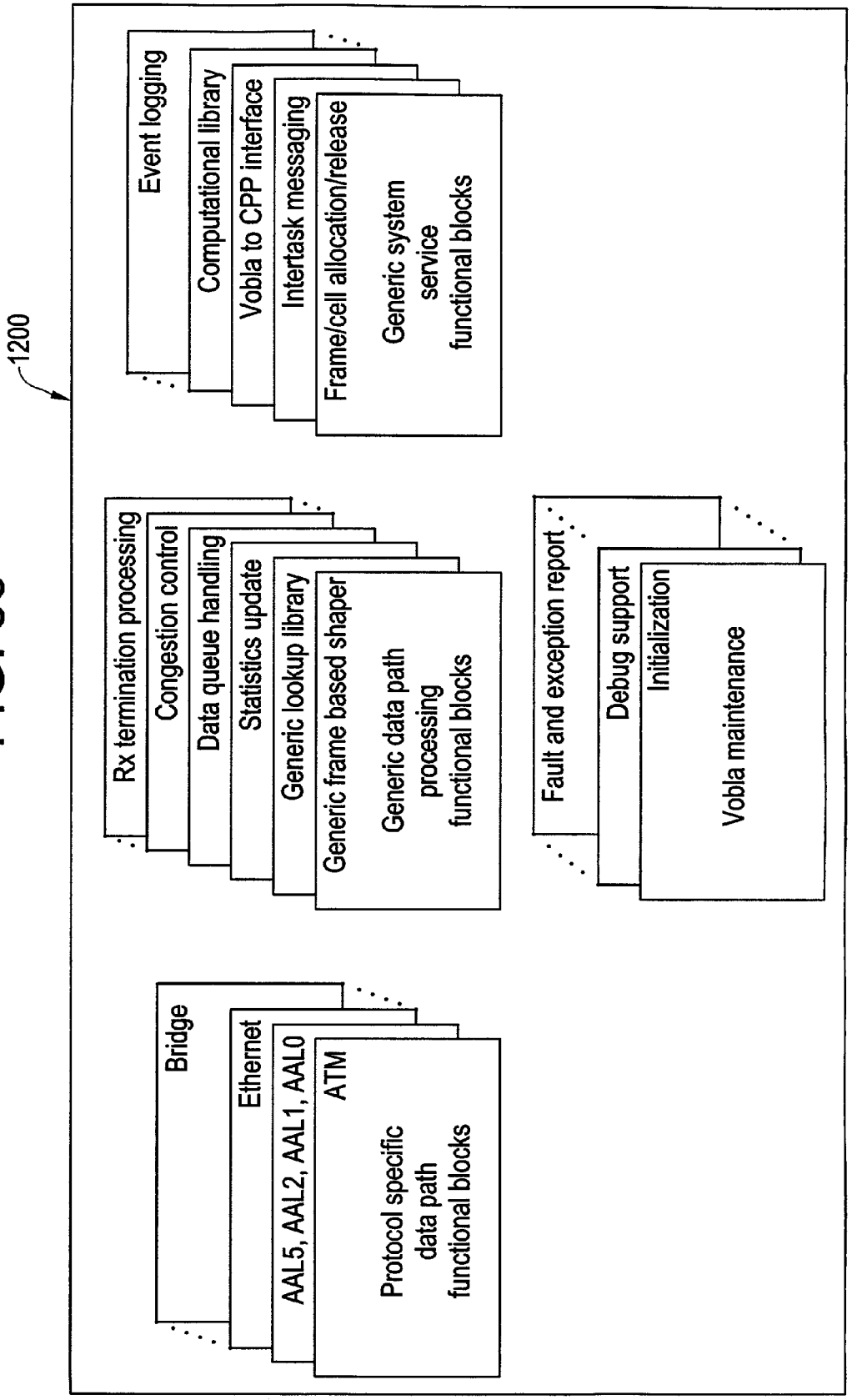
FIG. 86 is a block diagram illustrating an exemplary partitioning of software in a network processor in accordance with at least one embodiment of the present invention.

Network Processor software partitioning. The goal of the network processor software partitioning approach may be to have a maximum reuse of common code/algorithms while preserving processing efficiency by using inlining and/or macros in the coding practice. FIG. 86 provides one possible partitioning approach 1200 for the network processor. Performance estimates for RFC 1483 bridging By way of example, a performance estimate for RFC 1483 bridging can be computed as follows in Table 43.

TABLE 43

RFC 1483 Bridging Performance Estimate

Receive 128 byte Ethernet back to back frames
Receive frame - 120 cycles
802.1d - Ethernet bridging
Bridge learning process - 50 cycles
Enet address lookup - 50 cycles
Optional QoS support
QoS decision via IP classification - 500 cycles
Per IP src/dst, src/dst port numbers and protocol id
Forward to transmit object - 10 cycles
Transmit side operations
Append 1483 encapsulation header - 10 cycles
Optional QoS support
AAL5 queue scheduling - 35 cycles
RED - 15 cycles
AAL5 segmentation and transmit - 320 cycles (100 + 100 + 120)
General overhead (inter-task msgs, etc.) - 50 cycles
Total processing = 619 cycles (@ 200 MHz = 323K pps)
With QoS support = 1169 cycles (@ 200 MHz = 171K pps)
Wire speed (full duplex) = 2*100 M/(8*128) = 200K pps Executing Branch Instructions Based On An Accumulative Condition Flag As discussed previously, in at least one embodiment, an accumulative condition flag, i.e., sticky bit, is used by the HPCP and/or network processor to execute branch instructions. A conventional processing device commonly performs a branching operation by pairing a compare instruction with a branch instruction. More specifically, such a processing device commonly performs the compare operation by subtracting a first specified operand from a second specified operand. As a result of this operation, the processing device sets various conditions flags. Such flags provide information regarding the magnitude of the first operand relative to the second operand, and well as other information regarding the operation. The subsequent branch instruction provides a branch in program execution on the basis of the values of the condition flags. The condition flags are typically overwritten based on the next instruction executed by the processing device. Hence, the programmer will typically include the branch instruction directly subsequent to a relevant compare instruction.

Figure 87:
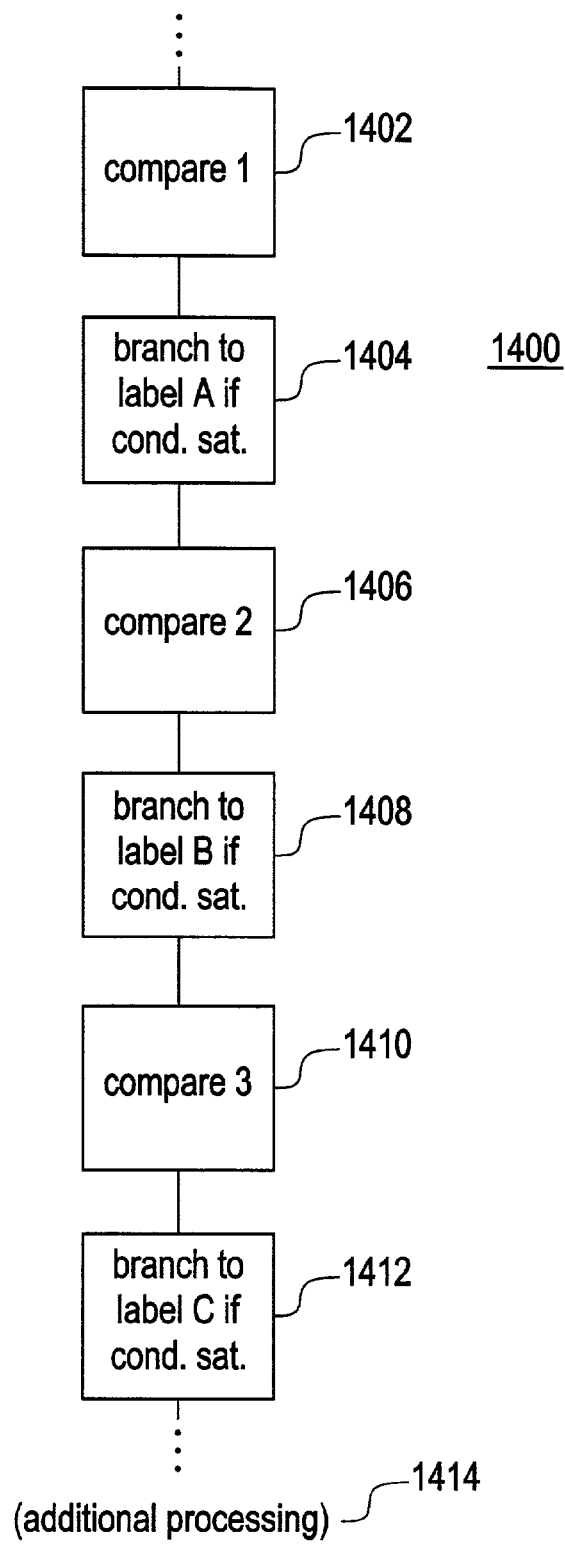
FIG. 87 is a flow diagram illustrating a typical process for executing program instructions using a known multiple-branch technique.

A typical program may contain a complex series of such pairings of compare and branch instructions. FIG. 87 illustrates the execution of such a program 1400. In step 1402, the processing device executes a first compare instruction (i.e., the compare1 instruction). As mentioned above, in this step, a first operand is subtracted from a second operand. The processing device also sets condition flags on the basis of the outcome of the comparing operation. Subsequently, in step 1404, the processing device executes a branch instruction on the basis of the values of the condition flags. That is, if the condition flags contain prescribed values, the processing device advances to a specified branch address. In the illustrated case of FIG. 87, the processing device branches to address A if the compare1 instruction satisfies prescribed conditions, as reflected by the values of the condition flags.

As shown, the program 1400 contains multiple additional pairings of compare and branch instructions. For instance, in step 1406, the processing device performs a second comparison operation (i.e., the compare2 instruction). The processing device also resets the condition flags on the basis of the outcome of the second comparing operation. In step 1408, the processing device executes a branch instruction of the basis of the new values of the condition flags. Namely, the processing device branches to address B if the compare2 instruction satisfies prescribed conditions, as reflected by the value of the condition flags.

In step 1410, the processing device performs a third comparison operation (i.e., the compare3 instruction). Again, the processing device also resets the condition flags on the basis of the outcome of the comparing operation. In step 1412, the processing device executes a branch instruction on the basis of the new values of the condition flags. Namely, the processing device branches to address C if the compare3 instruction satisfies prescribed conditions, as reflected by the value of the condition flags.

Yet additional pairings of compare and branch instructions may be included (although not illustrated). Following the series of compare and branch instructions, the program may include additional processing 1414.

The known technique shown in FIG. 87 may be applied in numerous applications, such as in performing error check operations. For example, a network processor often performs a series of error checks prior to performing a prescribed main processing task. In the IPv4 packet network protocol, for instance, the network processor checks to determine whether the protocol version of information being processed is equal to 4. The processing device may also determine whether the header of the information being processed is at least five words. The processing device may also determine whether the total length of the packet of information is not grater than the length specified by the MAC layer.

The processing device may assign a different pair of compare and branch instructions to each of the above requirements, as indicated in Table 44.

TABLE 44

| Instruction Index | Action |
| --- | --- |
| 1 | compare 1 |
| 2 | branch if "not equal" to error1 |
| 3 | compare2 |
| 4 | branch if "less equal" to error2 |
| 5 | compare3 |
| 6 | branch if "greater than" to error3 |
| 7–n | additional processing |

The first and second instructions identified correspond to steps 1402 and 1404 of FIG. 87. The third and fourth instructions correspond to steps 1406 and 1408 of FIG. 87. The fifth and sixth instructions correspond to steps 1410 and 1412 of FIG. 87. The indicated additional processing in steps 7 et seq. corresponds to step 1412 of FIG. 87.

The technique described above has shortcomings. Namely, the proliferation of branch instructions in a program reduces the efficiency of the processing device. For instance, each of the branch instructions takes a prescribed amount of time to perform. Thus, a program that includes a multitude of such instructions may suffer from processing delays. Further, a lengthy program comprising several compare and branch instructions also requires sufficient memory capacity to store the program, and therefore detracts from efforts to deploy the processing device in computationally sparse technical environments.

Further, in the above-noted IPv4 application, the processing device may encounter the above-described error conditions relatively infrequently. In this sense, these conditions are considered rare. Nevertheless, the processing device must sequence through the above-described six error checking instructions before advancing to the main processing routine (e.g., in step 1414 of FIG. 87). In view of these factors, the use of multiple branching instructions appears to impose an unwarranted bottleneck in the course of normal processing of IPv4 data. For all of the above reasons, the use of branch instructions is considered expensive to a design implementation.

Figure 88:
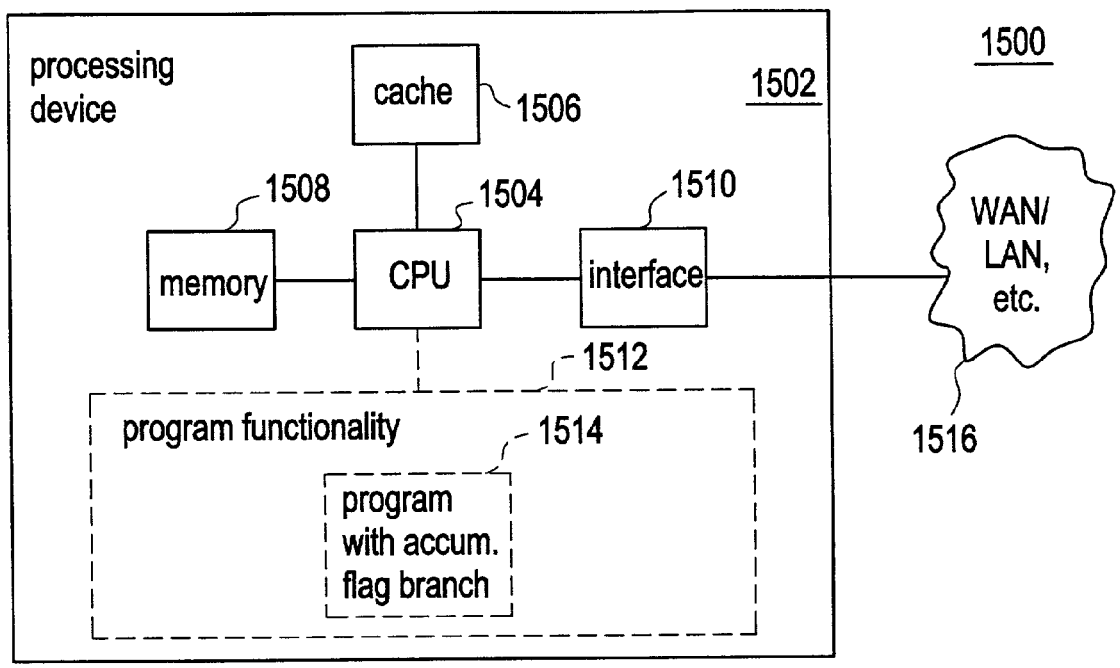
FIG. 88 is a schematic diagram illustrating an exemplary processing environment in accordance with at least one embodiment of the present invention.

The apparatus and method described herein is applicable to any type of processing environment. For example, FIG. 88 provides one such general processing environment 1500 for the purposes of illustration. The environment 1500 includes a processing device 1502, including a central processing unit (CPU) 1504. The processing device 1502 may also include other conventional processing units coupled to the processing unit 1504, such as memory 1508, cache 1506, and communication interface 1510. The CPU 1504 serves as a central engine for executing machine instructions. The memory 1508 (such as a Random Access Memory, or RAM) and cache 1506 serve the conventional role of storing program code and other information for use by the processor 1504 in performing its ascribed functions. The communication interface 1510 serves the conventional role of interacting with external equipment, such as the network 1402, or some other peripheral device.

The processing device 1502 also includes program functionality 1512 for executing various processing functions. This program functionality 1512 may be implemented as software stored in memory (e.g., memory 1508, or some other memory). As indicated in FIG. 88, the program functionality 1512 may include one or more programs 1514 that are specifically designed to make use of the unique branching technique of the present invention, to be described in greater detail below.

The processing device 1502 may include additional hardware and/or software to serve specific computational roles. For instance, the processing device 1502 may comprise an apparatus having hardware and/or software functionality specifically adapted for communication with a packet network, such as network 1516. For instance, the packet network 1516 may comprise any type of local-area or wide-area network for transmitting data in packet format. More specifically, the packet network 1516 preferably comprises some type of network governed by the IP/TCP protocol, such as the Internet, or an Internet. The network may include any types of physical links, such as fiber-based links, wireless links, copper-based links, etc.

Figure 89:
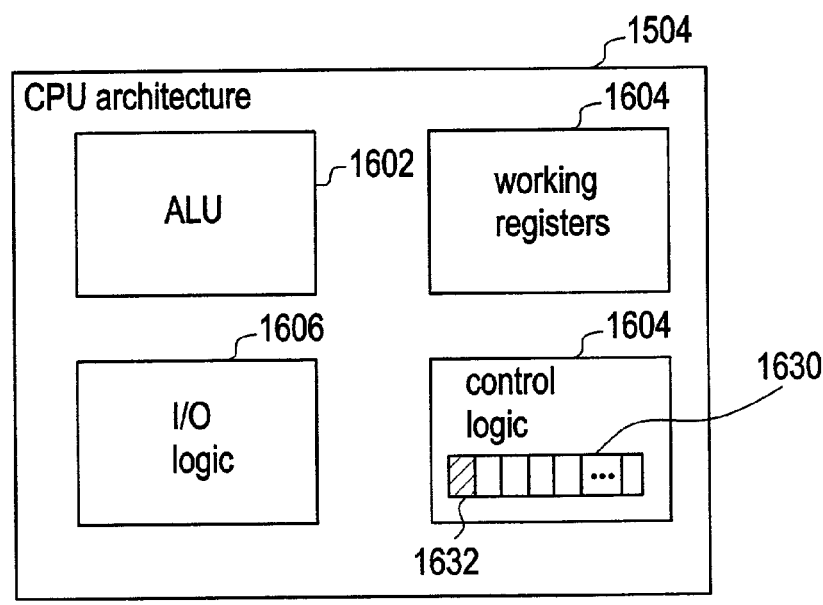
FIG. 89 is a schematic diagram illustrating an exemplary architecture of a processing unit of the processing environment of FIG. 88 in accordance with at least one embodiment of the present invention.

FIG. 89 provides additional details regarding an exemplary architecture of the processing unit 1504. The processing unit 1504 may include an arithmetic logic module (ALU) 1602, a control logic module 1604, input/output (I/O) logic module 1606, and various working registers 1608.

The control logic module 1604 includes logic for decoding and executing machine instructions. To this end, this module 1604 may include conventional features, such as an instruction register for holding an instruction while it is being processed by the processing device 1502, a program counter, etc. The control logic module 1604 may further include one or more storage locations 1630 for storing condition flags. As described above in the Background section, the processing device 1502 modifies the contents of the condition flags when an instruction is performed by the processing device 1502, so as to indicate the outcome of the instruction. Different processing devices designed by different manufacturers employ different sets of processing flags. Known flags include an SF flag which is equal of the MSB (most significant bit) of the result of an operation, indicating whether the result was negative or non-negative. A ZF flat is set to 1 if the result of an operation is 0. A CF is set 1 if the result of an operation produces a carry. Still other types of flags are known to those skilled in the art.

In addition, the solution described herein provides at least one additional condition flag referred to as an accumulative flag 1632. Unlike the other flags, the accumulative flag 1632 may provide a value that reflects the outcome of more than one instruction. For instance, after a sequence of three compare instructions, the condition flag may be set to indicate whether any of these three instructions satisfy pre-established conditions. In other words, the accumulative flag 1632 in this case represents the logical OR of the separate compare instructions. The flag is referred to accumulative in the sense that its final status reflects the accumulation of separate determinations made in separate compare instructions (or other instructions). It is also appropriate to refer to this flag as a sticky flag. The flag is sticky in the sense that it can remain set for multiple computer instructions (such as multiple compare instructions). That is, unlike the known art, the accumulative (or sticky) flag 1632 not change after every computer instruction (such as after every compare instruction). Additional details regarding the use of the accumulative flag are presented below.

The flags stored in storage 1630 may comprise binary information expressed in one or more bits. The storage 1630 may contain a single accumulative flag, or multiple accumulative flags.

The ALU 1602 performs various logical and arithmetic operations in a conventional manner. The I/O logic 1606 coordinates transfer of information between the processing unit 1504 and other modules in the environment 1500 in a conventional manner. The working registers 1608 retain information for use in the execution of program instructions, and may include various conventional address registers and arithmetic registers.

Figure 90:
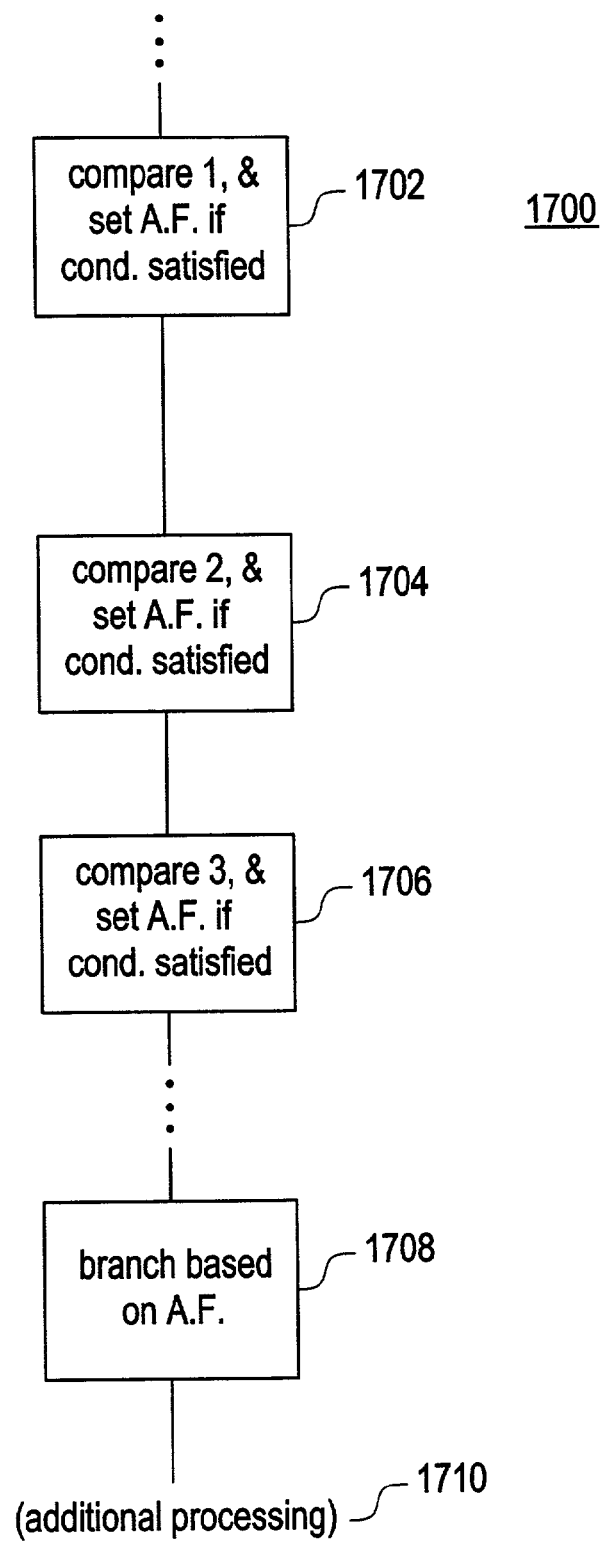
FIG. 90 is a flow diagram illustrating an exemplary process for executing program instructions based on the value of an accumulative flag in accordance with at least one embodiment of the present invention.

FIG. 90 describes an exemplary method for executing program instructions based on the value of the accumulative flag. It begins in step 1402, where the processing device executes a first compare instruction (i.e., the compare1 instruction). As mentioned above, in this step, a first operand is subtracted from a second operand. The processing device also sets the value of the accumulative flag to reflect whether the compare1 instruction satisfies a first prescribed condition. In step 1404, the processing device executes a second compare instruction (i.e., the compare2 instruction). The processing device also updates the value of the accumulative flag to reflect whether either the compare1 instruction satisfies the first prescribed condition, or whether the compare2 instruction satisfies a second prescribed condition. In step 1404, the processing device executes a third compare instruction (i.e., the compare3 instruction). The processing device also updates the value of the accumulative flag to reflect whether any of the compare1, compare2, or compare3 instructions satisfy their respective prescribed conditions. Yet additional compare instructions may be included (although not illustrated).

After the series of compare instructions, in step 1708, the processing device executes a branch instruction based on the value of the accumulative flag. At this stage, the accumulative flag reflects whether any one of the first through third compare instructions produced an outcome which satisfies its respective prescribed condition. In this sense, the accumulative flag reflects the logical OR of individual condition flag values produced in preceding comparison steps. This is in marked contrast with the known prior art, where the condition bits strictly reflected the outcome of the single instruction that was last performed.

If the accumulative flag is set, then the processing device branches to an indicated address (in this case, address D). If the accumulative flag is not set, then the processing device advances to the remainder of the program, generically represented as instructions 1710 in FIG. 90.

Two examples serve to further clarify the exemplary use of the above-described technique.

1) Example A: Error Checking

The technique shown in FIG. 90 may be applied in numerous applications, such as in performing error checks. As mentioned above, a network processor often performs a series of error checks prior to performing a prescribed main processing task. In the IPv4 packet network protocol, for instance, the network processor checks to determine whether the protocol version of information being processed is equal to 4. The processing device may also determine whether the header of the information being process is at least five words. The processing device may also determine whether the total length of the packet of information is not greater than the length specified by the MAC layer.

In contrast to the approach described in FIG. 87, the technique shown in FIG. 90 performs the above-described three comparison operations, followed by a single branch instruction based on the accumulative flag that reflects the accumulative outcome of the three comparison operations. Table 45 illustrates the series of instructions used to perform the error check using the technique of FIG. 90.

TABLE 45

| Instruction Index | Action |
|---|---|
| 1 | compare 1, overwrite accumulative flag with "not equal" condition |
| 2 | compare2, set accumulative flag if "less equal," and otherwise maintain accumulative flag if set in prior operation |
| 3 | compare3, set accumulative flag if "greater than," and otherwise maintain accumulative flag if set in prior operations |
| 4 | branch if accumulative flag is true to error1_or2_or3 |
| 5 | additional processing |

The first through third instructions correspond to steps 1402 to 1706, respectively, of FIG. 90. The accumulative outcome of these three compare operations sets the value of the accumulative flag if any of the error conditions reflected in the three comparison operations hold true. The fourth instruction corresponds to step 1708 in FIG. 90. The indicated additional processing in steps 7 et seq. corresponds to step 1710 of FIG. 88.

A comparison of the technique shown in FIG. 90 with the technique shown in FIG. 87 illustrates the merits of the present invention with respect to the known art. For instance, the technique shown in FIG. 87 uses six instructions to accomplish the error checking operation. In contrast, the technique shown in FIG. 90 uses only four instructions to accomplish the error checking.

It will be noted that the technique shown in FIG. 90 provides a single branch instruction when any of the extreme error conditions are present, and hence does not provide branching that is specific to individual error conditions. Nevertheless, these extreme error conditions are relatively rare. Thus, it is preferred to streamline the process which checks for these errors by reducing the number of required branching operations. In the relatively rare event that an error condition is encountered, then the processing device can then discriminate the exact cause of the failure in a separate routine without presenting a bottleneck situation to normal error-free processing.

2) Example 2: Logical Operations (e.g., AND and OR Operations)

The technique shown in FIG. 90 also may streamline the execution of various logical operations, such as various operations that involve AND and OR logical operations. Consider, for example, the case where a program requires branching in the event that the following condition (1) is true:

if (a>=7 AND b<8) then goto label D (1).

In the known technique, testing this condition would require the execution of multiple pairs of compare and branch instructions. In the present technique, the operation may be performed using a series of compare operations following by a single branch instruction.

More specifically, it should first be noted that condition (1) may be rephrased in the negative using OR logic (e.g., the expression c AND d can be expressed as NOT (NOT c OR NOT d)). With this in mind, the condition (1) can be executed by performing the following series of instructions using the accumulative flag:

cmp.o.lt a, 7
cmp.ge b, 8
bc.accumulative0 label D.

The first instruction commands the processing device to compare operand "a" with the value 7, and then set the accumulative flag if operand "a" is equal to or less than 7 (and clear it otherwise). The second instruction commands the processing device to compare operand "b" with the value 8, and then to set the accumulative flag if the operand "b" is greater than or equal to 8. It will be noted that these operations are the opposite of the condition (1) because the instructions are executing using the negative counterpart of this equation. The third instruction commands the processing device to branch to label D if the final value of the accumulative flag is 0.

The following Truth Table 46 illustrates different scenarios depending on the input values of operands "a" and "b".

TABLE 46

| a >= 7 | b < 8 | result | accumulative flag after first compare | accumulative flag after second compare |
|---|---|---|---|---|
| 0 | 0 | 0 | 1 | 1 |
| 0 | 1 | 0 | 1 | 1 |
| 1 | 0 | 0 | 0 | 1 |
| 1 | 1 | 1 | 0 | 0 |

A similar, but complementary, series of instructions may be used to implement the condition:

if (a>=7 OR b<8) then goto label D (2).

Namely, the instructions for implementing this condition are as follows.

cmp.o.ge a, 7
cmp.lt b, 8
bc.accumulative1 label D.

The first instruction commands the processing device to compare operand "a" with the value 7, and then set the accumulative flag if operand "a" is equal to or greater than 7 (and clear it otherwise). The second instruction commands the processing device to compare operand "b" with the value 8, and then to set the accumulative flag if the operand "b" is less than 8. The third instruction commands the processing device to branch to label D if the final value of the accumulative flag is 1. It will be noted that there is no need to negate the operations described in the above condition, as a logical OR is being performed in this case (rather than an AND operation).

Finally, the following Truth Table 47 illustrates different scenarios depending on the input values of operands "a" and "b".

TABLE 47

| a >= 7 | b < 8 | result | accumulative flag after first compare | accumulative flag after second compare |
|---|---|---|---|---|
| 0 | 0 | 0 | 0 | 0 |
| 0 | 1 | 1 | 0 | 1 |
| 1 | 0 | 1 | 1 | 1 |
| 1 | 1 | 1 | 1 | 1 |

In typical processors, many instructions can be predicated (conditional) on any condition code. In the ARM processor, for example, 4 opcode bits are required. However, in one implementation of the present invention, instructions can be predicated using only the sticky bit, requiring only two opcode bits (one bit for conditional/unconditional and one bit for bit 0/bit 1).

Although the above-described invention was described in the context of multiple compare instructions following by a single branch instruction, it has general applicability to other types of processing instructions. Likewise, the present invention can be implemented for any number of compares in combination with any number of AND/OR operations (e.g., (a>7 AND b==8) OR c!=9)). Generally, the invention may be applied to the generic case where an accumulative flag is set based on whether either a first or second instruction satisfy their respective prescribed conditions. Then, a third instruction performs some other operation that is conditional on the value of the accumulative flag.

In accordance with one embodiment of the present invention, a method for executing machine instructions in a processing device is provided. The method comprises the steps of executing a first instruction, identifying whether an outcome of the execution of the first instruction satisfies a first specified condition, and setting an accumulative flag result which reflects whether the first instruction satisfies the first specified condition. The method further comprises the steps of executing at least a second additional instruction, identifying whether an outcome of the execution of the second instruction satisfies a second specified condition, and updating the accumulative flag depending on whether either the first instruction or the second instruction satisfy their respective first and second specified conditions, and a third instruction based on the value of the accumulative flag subsequent to the execution of the first and second instructions. The first and second instructions, in one embodiment, are compare instructions that each compare a first operand with a second operand. The third instruction, in one embodiment, is a branch instruction which bases its branching determination on the value of the accumulative flag. In another embodiment, the first and second instructions are compare instructions that each compare a first operand with a second operand, and wherein the third is a branch instruction which bases its branching determination on the value of the accumulative flag.

In one embodiment, the compare instructions of the above method determine whether two respective error conditions are present, and the branch instruction bases it branching determination on whether either of the two respective error conditions are present, as reflected by the value of the accumulative flag after the second compare instruction is performed.

In accordance with another embodiment of the present invention, a computer readable medium containing program code for execution by a processing device is provided. The medium includes a first instruction for performing a first operation, which, when executed by the processing device, generates a first outcome result, at least a second additional instruction for performing a second operation, which, when executed by the processing device, generates a second outcome result, and at least an additional third instruction for performing a third operation based on an accumulative flag, wherein the accumulative flab represents the logical OR of the first and second outcomes. In one embodiment, the first and second instructions are compare instructions that each compare a first operand with a second operand. In another embodiment, the third instruction is a branch instruction which bases its branching determination on the value of the accumulative flag. In yet another embodiment, the first and second instructions are compare instructions that each compare a first operand with a second operand, and wherein the third instruction is a branch instruction which bases its branching determination on the value of the accumulative flag.

In one embodiment, the compare instructions determine whether two respective error conditions are present, and the branch instruction bases it branching determination on whether either of the two respective error conditions are present, as reflected by the value of the accumulative flag after the second compare instruction is performed.

In accordance with another embodiment of the present invention, an apparatus for executing machine instructions is provided. The apparatus comprises a storage for storing an accumulative flag, logic for executing instructions and for determining whether the outcomes of the instructions satisfy respective prescribed conditions, logic for setting the accumulative flag to reflect the outcomes of the instructions, wherein the logic for setting the accumulative flag includes logic for determining the value of the accumulative flag based on the logical OR of at least first and second instructions, and wherein the logic for executing instructions also includes logic for executing at least an additional third instruction based on the value of the accumulative flag stored in the storage. In one embodiment, the first and second instructions are compare instructions that each compare a first operand with a second operand. The third instruction can include a branch instruction which bases its branching determination on the value of the accumulative flag. Furthermore, the first and second instructions can include compare instructions that each compare a first operand with a second operand, and wherein the third instruction is a branch instruction which bases its branching determination on the value of the accumulative flag. The compare instructions, in one embodiment, determine whether two respective error conditions are present, and the branch instruction bases it branching determination on whether either of the two respective error conditions are present, as reflected by the value of the accumulative flag after the second compare instruction is performed.

In accordance with an additional embodiment of the present invention, an apparatus for executing machine instructions is provided. The apparatus comprises a storage for storing an accumulative flag, logic for executing instructions and for determining whether the outcomes of the instructions satisfy respective prescribed conditions, logic for setting the accumulative flag depending on the outcomes of the executed instructions, wherein the logic for setting the accumulative flag includes logic for determining the value of the accumulative flag based on whether at least one instruction within a group of at least two instructions had an outcome which satisfied its respective prescribed condition, and another storage for storing a program that comprises plural instructions, including: a first instruction for performing a first operation, which, when executed by the processing device, generates a first outcome result; at least a second additional instruction for performing a second operation, which, when executed by the logic for executing, generates a second outcome result; and at least an additional third instruction for performing a third operation based on an accumulative flag.

The first and second instructions, in one embodiment, are compare instructions that each compare a first operand with a second operand. The third instruction can include a branch instruction which bases its branching determination on the value of the accumulative flag. Furthermore the first and second instructions can include compare instructions that each compare a first operand with a second operand while the third instruction includes a branch instruction which bases its branching determination on the value of the accumulative flag.

In one embodiment, the compare instructions determine whether two respective error conditions are present, and the branch instruction bases it branching determination on whether either of the two respective error conditions are present, as reflected by the value of the accumulative flag after the second compare instruction is performed.

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

What is claimed is:

1. A communications processor implemented as on at least one ring network, comprising:
   a plurality of processors comprising ring members on the at least one ring network;
   a plurality of DMA controllers on the at least one ring network, the DMA controllers controlling servicing of DMA requests by the plurality of processors;
   a plurality of DMA agents coupled to the plurality of processors, each DMA agent being part of a ring member including a processor;
   each DMA agent adapted to service processor DMA requests by determining whether a valid token exists from a pool of tokens reflecting available DMA controllers.

2. The communications processor of claim 1, wherein the tokens are DMA controller specific tokens issued by the DMA controllers to the DMA agents to indicate when specific DMA controller access is available.

3. The communications processor of claim 2, wherein each time a processor issues a DMA request the associated DMA agent determines whether a valid token exists and, if a valid token exists, services that DMA request using the DMA controller associated with that token.

4. The communications processor of claim 3, wherein the token is marked as used or invalid when the token is used to service a DMA request.

5. The communications processor of claim 3, wherein the associated DMA agent automatically requests a new valid token after an existing valid token is used to service the DMA request.

6. The communications processor of claim 1, wherein each DMA agent is adapted to request additional valid tokens when the number of valid tokens in the pool falls below a maximum number.

7. The communications processor of claim 1, wherein the pool of tokens is stored in a register written to by the DMA controllers.

8. The communications processor of claim 1, wherein the DMA agents service processor DMA requests by converting them to messages transmitted onto the at least one ring network.

9. The communications processor of claim 3, wherein if no valid token exists the DMA agent queues the DMA request until a valid token exists.

10. The communications processor of claim 1, wherein the DMA controllers distribute valid tokens by transmitting messages on the ring network that are received by specific DMA agents.

11. The communications processor of claim 1, wherein each DMA controller maintains a list of tokens including those tokens that have been distributed as valid tokens.

12. The communications processor of claim 1, wherein the DMA controllers responds to requests from the DMA agents for additional tokens with an invalid token when no valid tokens are available.

13. The communications processor of claim 1, wherein each DMA controller has a pool of up to 16 tokens for each DMA channel.

14. The communications processor of claim 1, wherein the DMA controllers are capable of reading registers having the pools of tokens for the DMA agents by issuing read messages traveling on the at least one ring network.

15. The communications processor of claim 1, wherein the processors comprise a plurality of network processors and the at least one ring network comprises a plurality of ring networks.

* * * * *